US012578993B2

(12) United States Patent
Long et al.

(10) Patent No.: US 12,578,993 B2
(45) Date of Patent: Mar. 17, 2026

(54) APPLICATION PROGRAMMING INTERFACE TO SHARE MEMORY BETWEEN GROUPS OF BLOCKS OF THREADS

(71) Applicant: NVIDIA Corporation, Santa Clara, CA (US)

(72) Inventors: Ze Long, San Jose, CA (US); Kyrylo Perelygin, Broomfield, CO (US); Harold Carter Edwards, Campbell, CA (US); Gokul Ramaswamy Hirisave Chandra Shekhara, Bangalore (IN); Jaydeep Marathe, Kirkland, WA (US); Ronny Meir Krashinsky, Portola Valley, CA (US); Girish Bhaskarrao Bharambe, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 595 days.

(21) Appl. No.: 17/955,175

(22) Filed: Sep. 28, 2022

(65) Prior Publication Data

US 2024/0036957 A1 Feb. 1, 2024

(30) Foreign Application Priority Data

Jul. 29, 2022 (IN) .............................. 202241043444

(51) Int. Cl.
G06F 9/48 (2006.01)
G06F 8/41 (2018.01)
(Continued)

(52) U.S. Cl.
CPC ............ G06F 9/4881 (2013.01); G06F 8/456 (2013.01); G06F 9/30072 (2013.01);
(Continued)

(58) Field of Classification Search
None
See application file for complete search history.

(56) References Cited

U.S. PATENT DOCUMENTS 5,745,778 A 4/1998 Alfieri
7,690,003 B2 3/2010 Fuller
(Continued)

FOREIGN PATENT DOCUMENTS

CN 102099789 A 6/2011
CN 107357661 A 11/2017
(Continued)

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.
(Continued)

*Primary Examiner* — Craig C Dorais
(74) *Attorney, Agent, or Firm* — Davis Wright Tremaine LLP

(57) ABSTRACT

Apparatuses, systems, and techniques to execute CUDA programs. In at least one embodiment, an application programming interface is performed to cause memory to be shared between two or more groups of blocks of threads.

36 Claims, 73 Drawing Sheets

(51) Int. Cl.
    *G06F 9/30*       (2018.01)
    *G06F 9/50*       (2006.01)
    *G06F 9/52*       (2006.01)
    *G06F 9/54*       (2006.01)

(52) U.S. Cl.
    CPC ............ *G06F 9/5044* (2013.01); *G06F 9/505* (2013.01); *G06F 9/522* (2013.01); *G06F 9/544* (2013.01); *G06F 9/545* (2013.01)

(56)           References Cited

U.S. PATENT DOCUMENTS

| | | | |
|---|---|---|---|
| 7,788,468 | B1 | 8/2010 | Nickolls et al. |
| 11,080,111 | B1 | 8/2021 | Perelygin et al. |
| 11,568,523 | B1 | 1/2023 | Ligowski et al. |
| 11,609,921 | B2 | 3/2023 | King et al. |
| 2003/0212671 | A1 | 11/2003 | Meredith et al. |
| 2004/0078420 | A1 | 4/2004 | Marrow et al. |
| 2007/0067606 | A1* | 3/2007 | Lin ...................... G06F 9/5044 712/10 |
| 2007/0294666 | A1 | 12/2007 | Papakipos et al. |
| 2008/0276262 | A1 | 11/2008 | Munshi et al. |
| 2009/0259997 | A1 | 10/2009 | Grover et al. |
| 2009/0307699 | A1* | 12/2009 | Munshi ...................... G06F 9/44 718/102 |
| 2009/0307704 | A1 | 12/2009 | Munshi et al. |
| 2011/0063313 | A1 | 3/2011 | Bolz et al. |
| 2011/0072249 | A1* | 3/2011 | Nickolls ............. G06F 9/30072 712/234 |
| 2011/0087860 | A1 | 4/2011 | Nickolls et al. |
| 2011/0285729 | A1 | 11/2011 | Munshi et al. |
| 2012/0198214 | A1 | 8/2012 | Gadre et al. |
| 2012/0222051 | A1 | 8/2012 | Kakulamarri et al. |
| 2012/0254875 | A1 | 10/2012 | Marathe et al. |
| 2013/0085730 | A1 | 4/2013 | Shaw et al. |
| 2015/0160970 | A1 | 6/2015 | Nugteren et al. |
| 2015/0187042 | A1 | 7/2015 | Gupta |
| 2015/0199787 | A1 | 7/2015 | Pechanec et al. |
| 2016/0232107 | A1 | 8/2016 | Ros et al. |
| 2016/0364829 | A1 | 12/2016 | Apodaca et al. |
| 2016/0371081 | A1 | 12/2016 | Powers et al. |
| 2017/0024924 | A1 | 1/2017 | Wald et al. |
| 2018/0033114 | A1 | 2/2018 | Chen et al. |
| 2018/0307529 | A1 | 10/2018 | Koker et al. |
| 2020/0004602 | A1 | 1/2020 | Pawlowski et al. |
| 2020/0250005 | A1 | 8/2020 | Munshi et al. |
| 2020/0394202 | A1 | 12/2020 | Slesarenko et al. |
| 2021/0165699 | A1 | 6/2021 | Parravicini et al. |
| 2021/0287325 | A1 | 9/2021 | Kramer et al. |
| 2022/0051093 | A1 | 2/2022 | Skaljak |
| 2022/0108497 | A1 | 4/2022 | Panteleev |
| 2022/0342721 | A1 | 10/2022 | Shveidel et al. |
| 2022/0342761 | A1 | 10/2022 | Hukerikar et al. |
| 2023/0084951 | A1 | 3/2023 | Fontaine et al. |
| 2023/0086989 | A1 | 3/2023 | Ciolkosz et al. |
| 2023/0185706 | A1 | 6/2023 | Kini et al. |
| 2023/0244549 | A1 | 8/2023 | Fontaine et al. |
| 2023/0305853 | A1 | 9/2023 | Ciolkosz et al. |
| 2023/0350661 | A1 | 11/2023 | Reed et al. |
| 2024/0036944 | A1 | 2/2024 | Long et al. |
| 2024/0036945 | A1 | 2/2024 | Long et al. |

FOREIGN PATENT DOCUMENTS

| | | | |
|---|---|---|---|
| JP | 2023070746 | A | 5/2023 |
| WO | 2009148713 | A1 | 12/2009 |

OTHER PUBLICATIONS

Munshi, Aaftab, "The Open Specification" Khronos OpenCL Working Group, Version: 1.2, Document Revision: 19, Last Revision Date Nov. 14, 2012, 380 pages.

Harris et al., "Cooperative Groups: Flexible CUDA Thread Programming", NVIDIA Technical Blog, Oct. 4, 2017, 15 pages.

* cited by examiner

100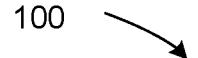
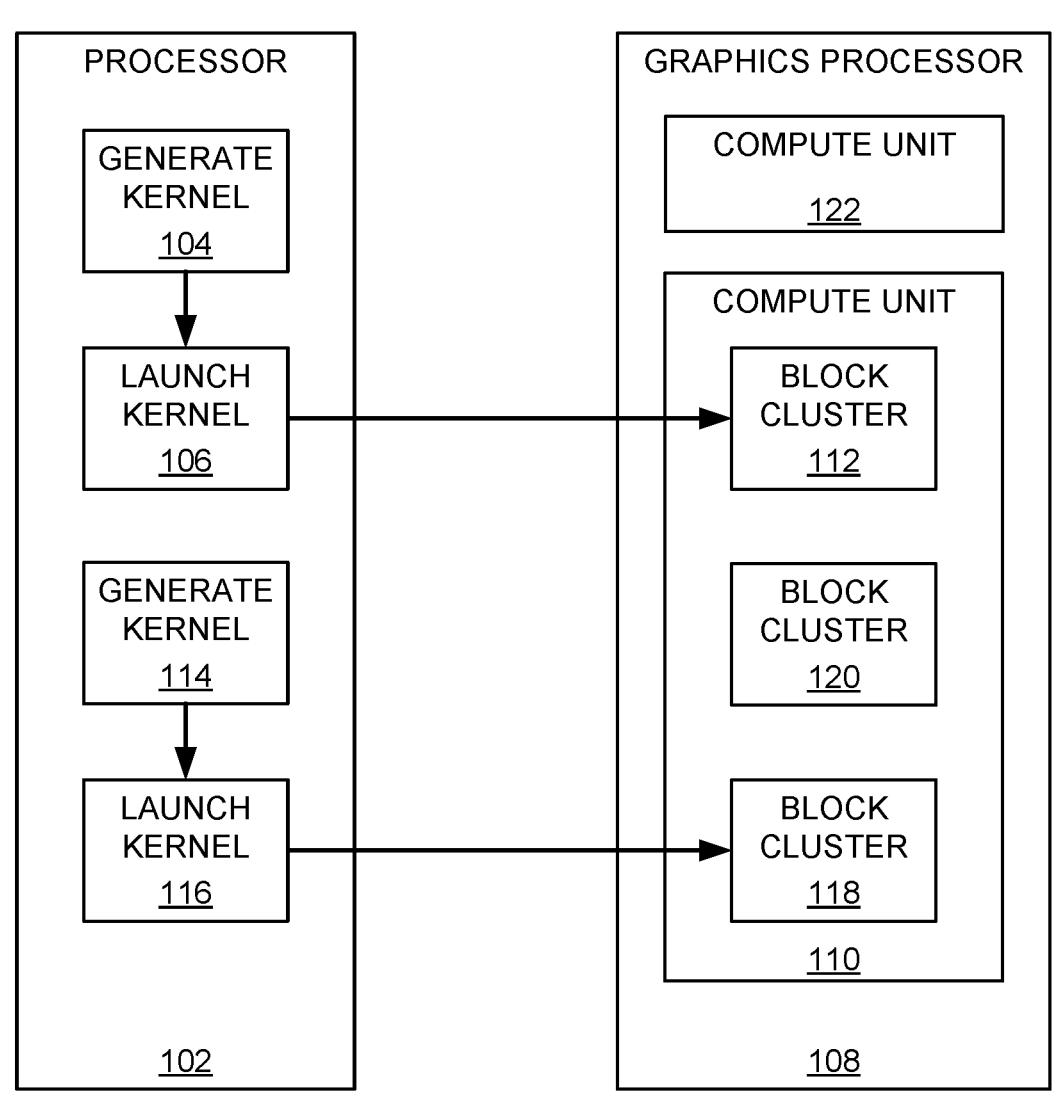
FIG. 1

THREAD BLOCK
$(T_x, T_y, T_z)$

THREAD
$(1,1,T_z)$

• • •

THREAD
$(1,T_y,T_z)$

THREAD
$(T_x,1,T_z)$

• • •

THREAD
$(T_x,T_y,T_z)$

THREAD
$(1,1,1)$

• • •

THREAD
$(1,T_y,1)$

THREAD
$(T_x,1,1)$

• • •

THREAD
$(T_x,T_y,1)$

202

300

COMPUTE UNIT
GRID SIZE ($B_x$, $B_y$, $B_z$)

BLOCK
$(1,1,B_z)$

• • •

BLOCK
$(1,B_y,B_z)$

BLOCK
$(B_x,1,B_z)$

• • •

BLOCK
$(B_x,B_y,B_z)$

BLOCK
$(1,1,1)$

• • •

BLOCK
$(1,B_y,1)$

BLOCK
$(B_x,1,1)$

• • •

BLOCK
$(B_x,B_y,1)$

SHARED MEMORY

304

302

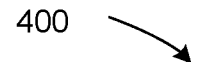
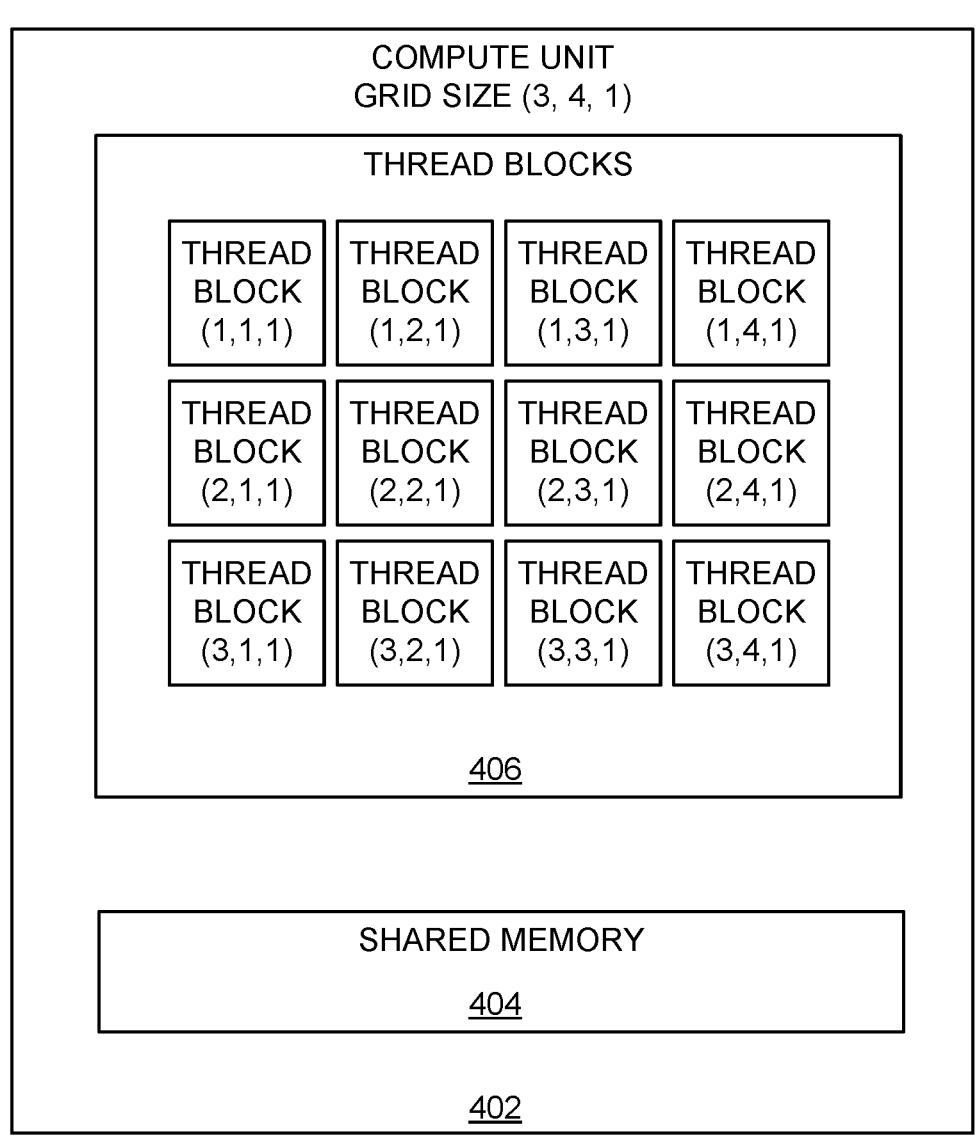
FIG. 4

500

| COMPUTE UNIT |
| --- |
| GRID SIZE (3, 4, 1) |

BLOCK CLUSTERS
CLUSTER GROUP SIZE (2,3)

| BLOCK CLUSTER (1,1) | BLOCK CLUSTER (1,2) | BLOCK CLUSTER (1,3) |
| --- | --- | --- |
| THREAD BLOCK (1,1) · THREAD BLOCK (1,2) · THREAD BLOCK (2,1) · THREAD BLOCK (2,2) | THREAD BLOCK (1,1) · THREAD BLOCK (2,1) | THREAD BLOCK (1,1) · THREAD BLOCK (2,1) |
| 508 | 510 | 512 |

| BLOCK CLUSTER (2,1) | BLOCK CLUSTER (2,2) | BLOCK CLUSTER (2,3) |
| --- | --- | --- |
| THREAD BLOCK (1,1) · THREAD BLOCK (1,2) | THREAD BLOCK (1,1) | THREAD BLOCK (1,1) |
| 514 | 516 | 518 |

506

| SHARED MEMORY |
| --- |
| 504 |

502

600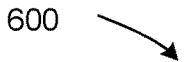

```
┌─────────────────────────────────┐
│   RECEIVE KERNEL SPECIFICATION  │─── 602
└─────────────────────────────────┘
                 │
                 ▼
┌─────────────────────────────────┐
│    RECEIVE CLUSTER PARAMETERS    │─── 604
└─────────────────────────────────┘
                 │
                 ▼
┌─────────────────────────────────┐
│      SET KNOWN CLUSTER          │─── 606
│        PARAMETRS                │
└─────────────────────────────────┘
                 │
                 ▼
            ╱╲                            YES    ┌──────────────────────────┐
          ╱      ╲  ─────────────────────────────│   SET OTHER CLUSTER      │
        ╱ OTHERS?  ╲                              │    PARAMETERS            │─── 610
          ╲      ╱                                └──────────────────────────┘
            ╲  ╱  608                                        │
             ╲╱                                              │
             │ NO                                            │
             ▼                                               │
┌─────────────────────────────────┐                         │
│     SET CLUSTER ATTRIBUTES      │◄────────────────────────┘
└─────────────────────────────────┘─── 612
                 │
                 ▼
            ╱╲                            NO     ┌──────────────────────────┐
          ╱      ╲  ─────────────────────────────│     RETURN ERROR         │─── 616
        ╱COMPLETE?╲                              └──────────────────────────┘
          ╲      ╱  614
            ╲  ╱
             ╲╱
             │ YES
             ▼
┌─────────────────────────────────┐           ┌──────────────────────────┐
│  LAUNCH KERNEL USING CLUSTER    │──────────▶│    RETURN SUCCESS        │─── 620
└─────────────────────────────────┘           └──────────────────────────┘
              618
```

FIG. 6

700

SET BLOCK CLUSTER SIZE = 8

SET BLOCK CLUSTER DIM = (X,Y,Z)

702

BLOCK
CLUSTER
(2,2,2)

THREAD
BLOCK
(1,1,2)

THREAD
BLOCK
(1,2,2)

THREAD
BLOCK
(1,1,1)

THREAD
BLOCK
(1,2,1)

THREAD
BLOCK
(2,1,2)

THREAD
BLOCK
(2,2,2)

THREAD
BLOCK
(2,1,1)

THREAD
BLOCK
(2,2,1)

704

BLOCK
CLUSTER
(2,4,1)

THREAD
BLOCK
(1,1,1)

THREAD
BLOCK
(1,2,1)

THREAD
BLOCK
(1,3,1)

THREAD
BLOCK
(1,4,1)

THREAD
BLOCK
(2,1,1)

THREAD
BLOCK
(2,2,1)

THREAD
BLOCK
(2,3,1)

THREAD
BLOCK
(2,4,1)

706

BLOCK
CLUSTER
(8,1,1)

THREAD
BLOCK
(1,1,1)

THREAD
BLOCK
(2,1,1)

THREAD
BLOCK
(3,1,1)

THREAD
BLOCK
(4,1,1)

THREAD
BLOCK
(5,1,1)

THREAD
BLOCK
(6,1,1)

THREAD
BLOCK
(7,1,1)

THREAD
BLOCK
(8,1,1)

800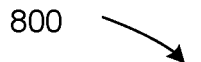
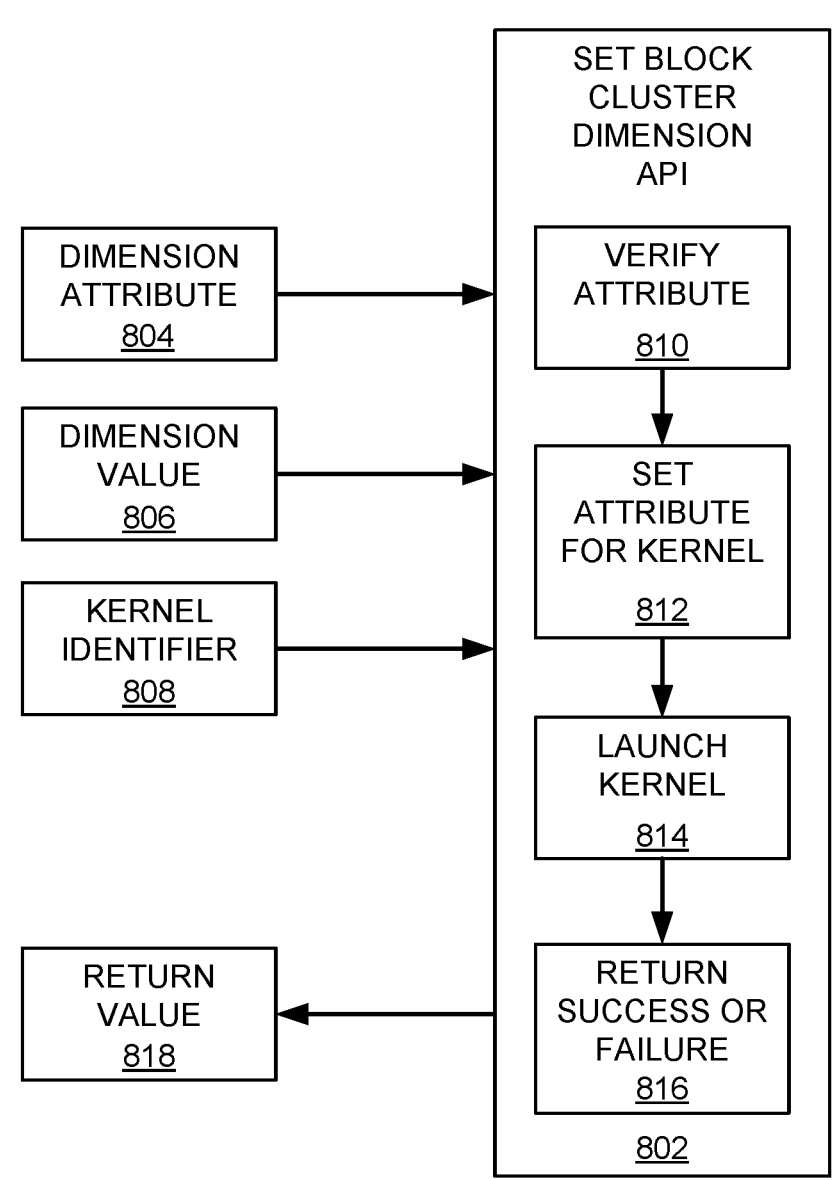
FIG. 8

900

GET CLUSTER DIMENSION
API

DIMENSION SET?
906

YES

NO

CLUSTER
IDENTIFIER
904

RETURN
(0,0,0)
908

RETURN
VALUE
912

RETURN
DIMENSION
910

902

1000

BLOCK CLUSTER

SPREAD
SCHEDULING
POLICY

1004

THREAD
BLOCK

1006

THREAD
BLOCK

1008

THREAD
BLOCK

1010

THREAD
BLOCK

1012

1002

COMPUTE UNIT

THREAD
BLOCK

1006

1014

COMPUTE UNIT

THREAD
BLOCK

1008

1016

COMPUTE UNIT

THREAD
BLOCK

1010

1018

COMPUTE UNIT

THREAD
BLOCK

1012

1020

1100

BLOCK CLUSTER

BALANCE
SCHEDULING
POLICY

1104

THREAD
BLOCK

1106

THREAD
BLOCK

1108

THREAD
BLOCK

1110

THREAD
BLOCK

1112

1102

COMPUTE UNIT

THREAD
BLOCK

1106

THREAD
BLOCK

1122

1114

COMPUTE UNIT

THREAD
BLOCK

1108

THREAD
BLOCK

1110

1116

COMPUTE UNIT

THREAD
BLOCK

1124

THREAD
BLOCK

1126

1118

COMPUTE UNIT

THREAD
BLOCK

1112

1120

1200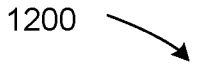
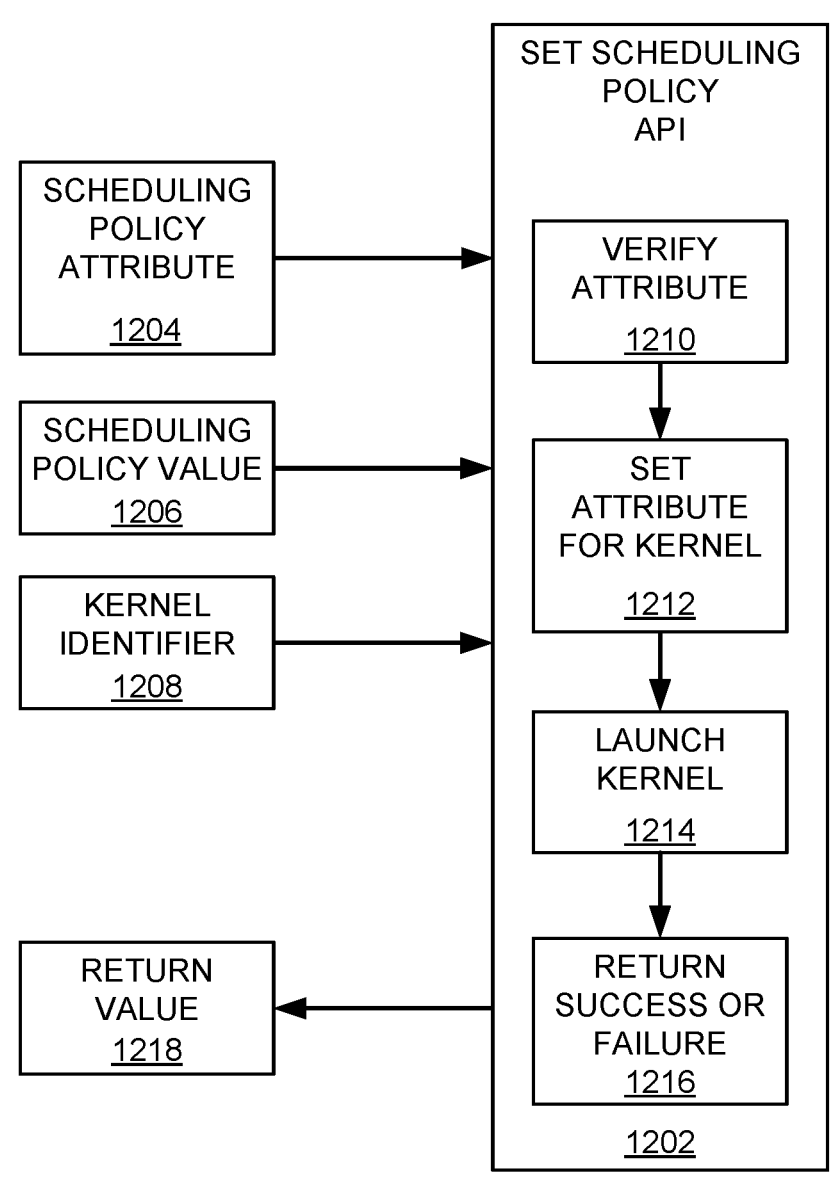
FIG. 12

1300

GET SCHEDULING POLICY
API

```
CLUSTER
IDENTIFIER
1304
```

POLICY SET?
1306

YES

NO

RETURN
DEFAULT
POLICY
1308

RETURN
VALUE
1312

RETURN
SCHEDULING
POLICY
1310

1302

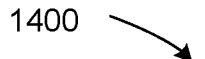
1400
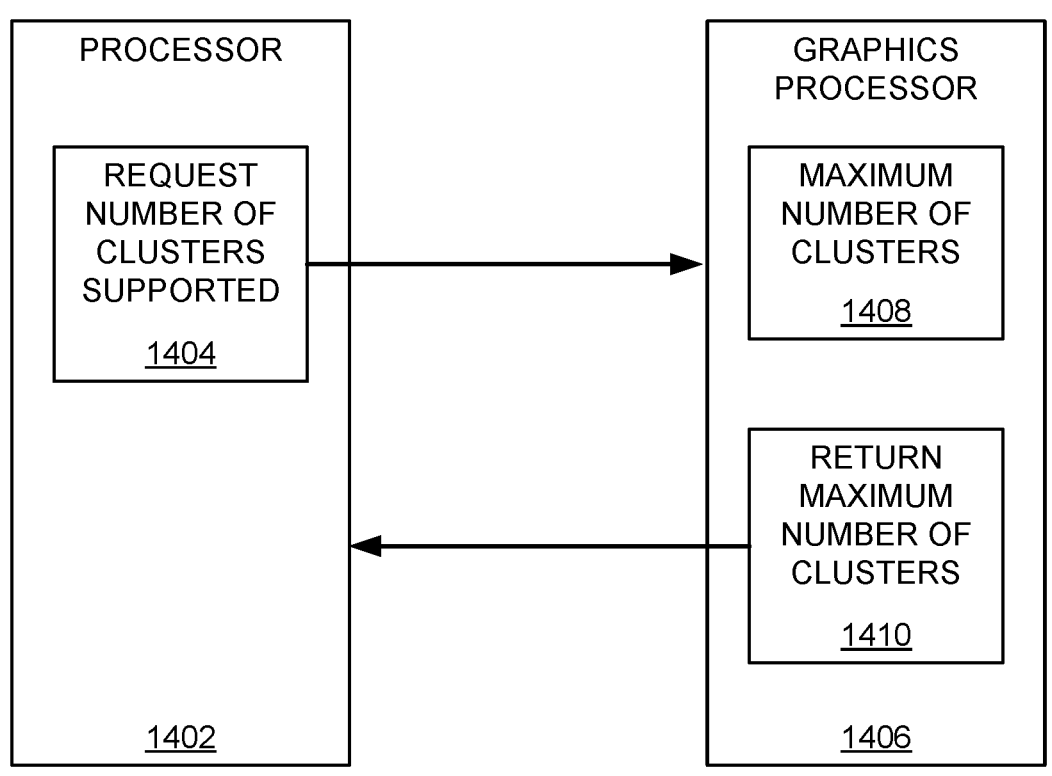
FIG. 14

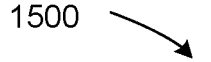
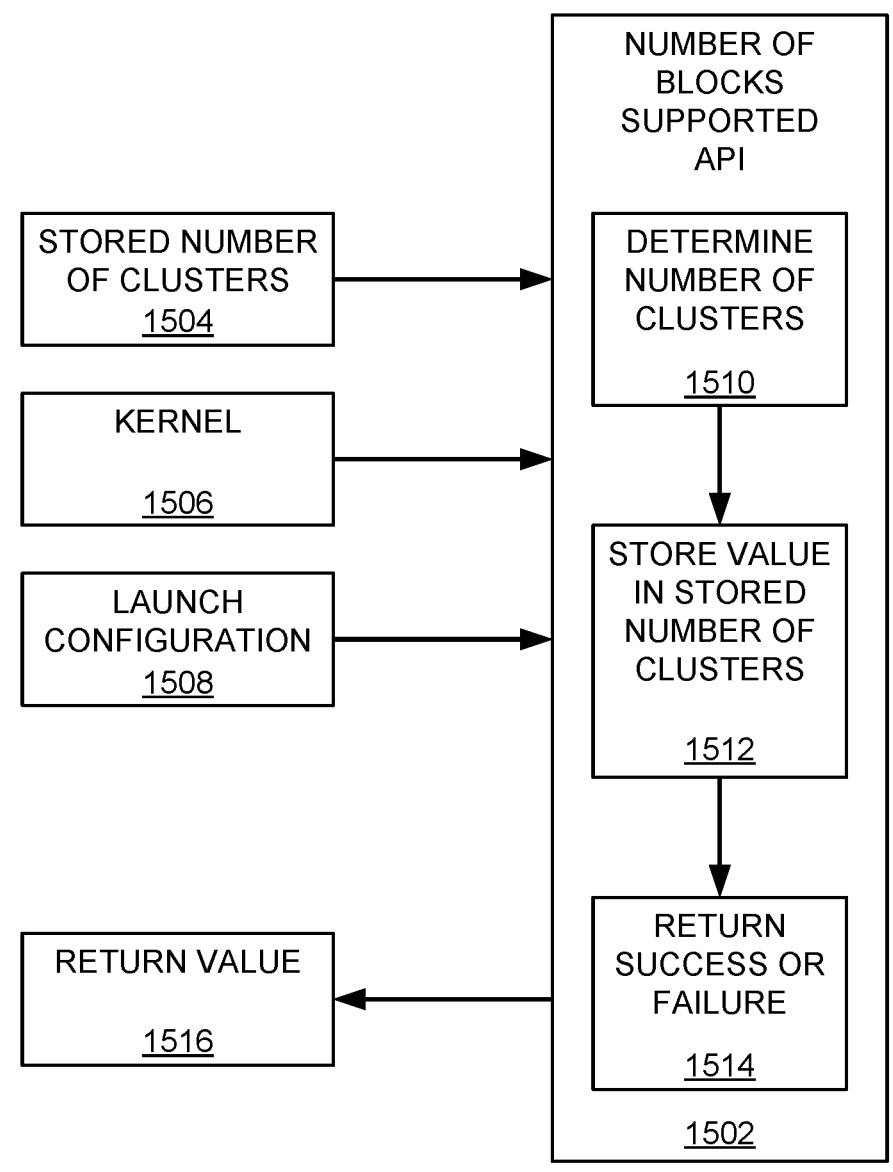
FIG. 15

1600

1700

INDICATE CLUSTER PARAMETERS API

ATTRIBUTE

1704

ATTRIBUTE
VALUE
1706

GET/SET
INDICATOR
1708

GET OR SET?
1712

GET

GET
ATTRIBUTE
1714

STORE
ATTRIBUTE
1716

RETURN
SUCCESS
1718

SET

SETTABLE?
1720

NO

RETURN
FAILURE
1722

YES

RETURN
VALUE
1728

SET
ATTRIBUTE
1724

RETURN
SUCCESS
1726

1702

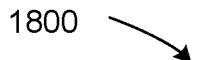
1800
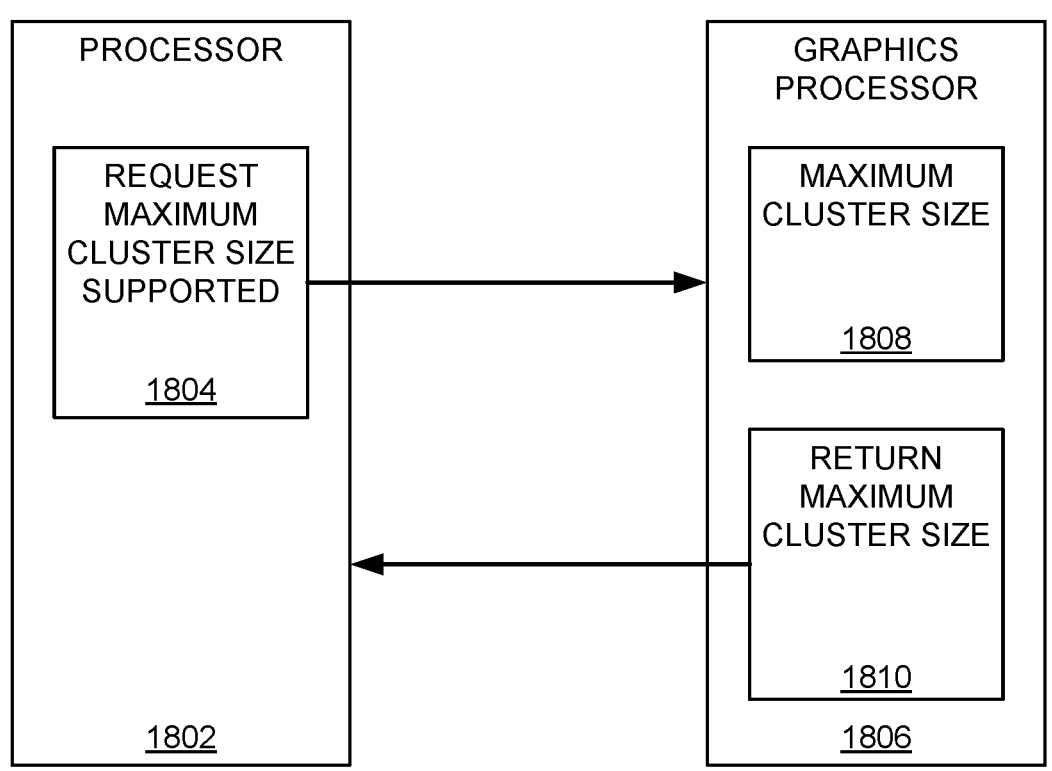
| PROCESSOR | GRAPHICS PROCESSOR |
|---|---|
REQUEST MAXIMUM CLUSTER SIZE SUPPORTED
1804
MAXIMUM CLUSTER SIZE
1808
RETURN MAXIMUM CLUSTER SIZE
1810
1802
1806
FIG. 18

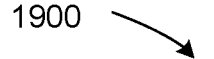
1900
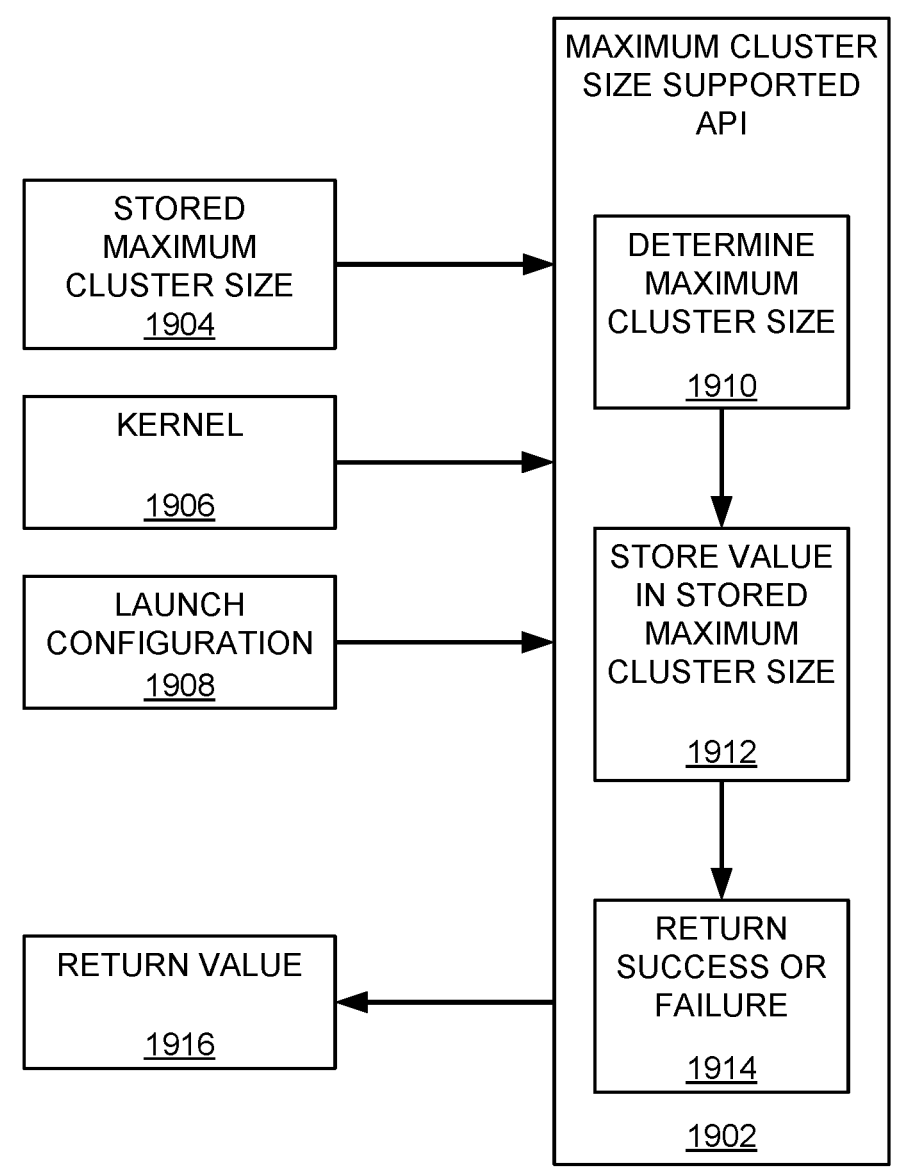
MAXIMUM CLUSTER SIZE SUPPORTED API
STORED MAXIMUM CLUSTER SIZE
1904
KERNEL
1906
LAUNCH CONFIGURATION
1908
DETERMINE MAXIMUM CLUSTER SIZE
1910
STORE VALUE IN STORED MAXIMUM CLUSTER SIZE
1912
RETURN SUCCESS OR FAILURE
1914
RETURN VALUE
1916
1902
FIG. 19

2000

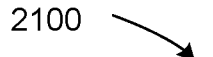
2100
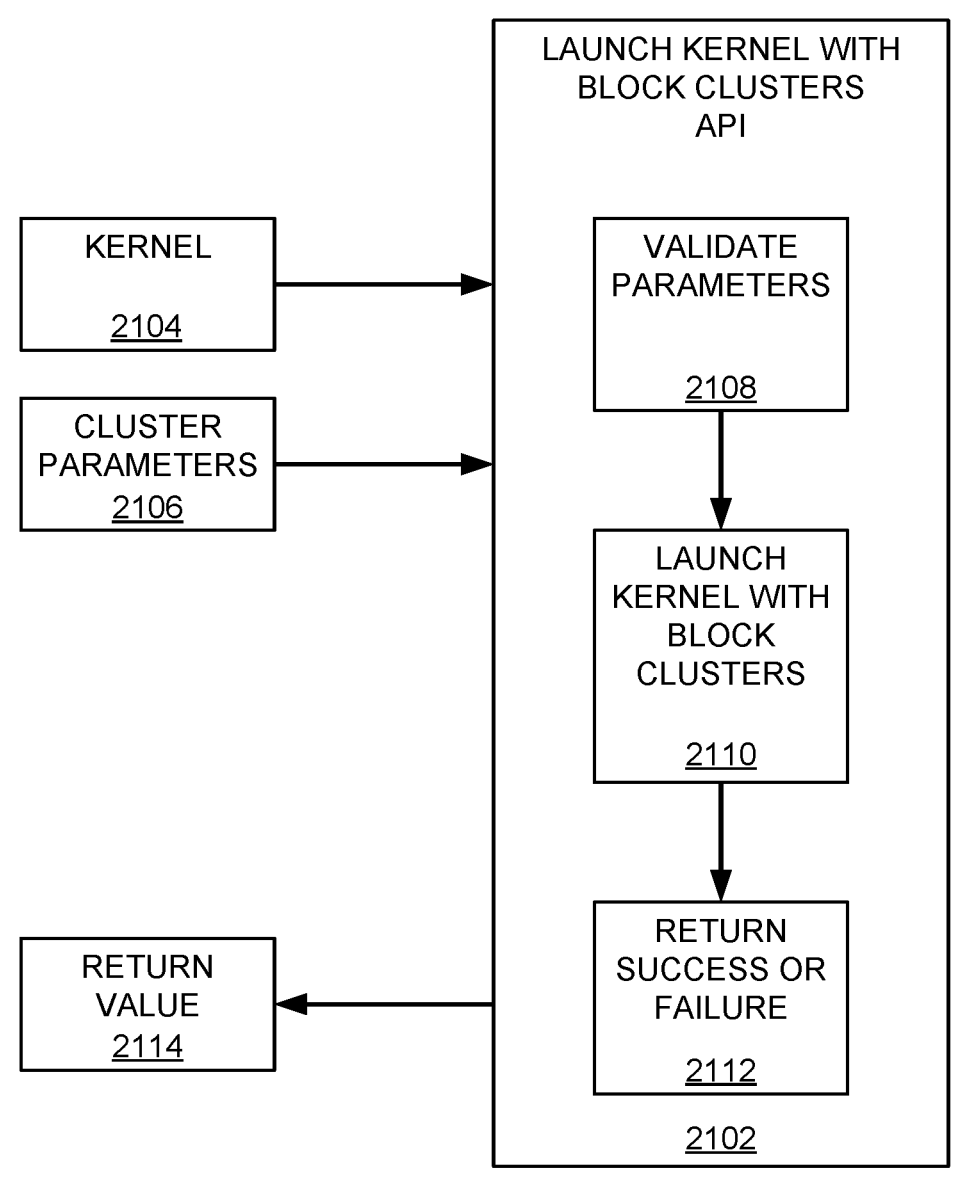
LAUNCH KERNEL WITH
BLOCK CLUSTERS
API
KERNEL
2104
CLUSTER
PARAMETERS
2106
VALIDATE
PARAMETERS
2108
LAUNCH
KERNEL WITH
BLOCK
CLUSTERS
2110
RETURN
VALUE
2114
RETURN
SUCCESS OR
FAILURE
2112
2102
FIG. 21

2200

GRAPHICS PROCESSOR

COMPUTE UNIT

BLOCK CLUSTER

THREAD BLOCK

| THREAD | | THREAD |
| --- | --- | --- |
| 2216 | • • • | 2218 |

2212

•
•
•

THREAD BLOCK

2214

2208

•
•
•

BLOCK CLUSTER

2210

2204

•
•
•

COMPUTE UNIT

2206

2202

2300

2500

2600

2700

BLOCK CLUSTER

THREAD BLOCK

THREAD EXECUTION
(EXECUTING)
2706

THREAD EXECUTION
(WAITING)
2710

2704

THREAD BLOCK

THREAD EXECUTION
(WAITING)
2714

THREAD EXECUTION
(WAITING)
2716

2712

2708

BARRIER INSTRUCTION

2702

2800

BLOCK CLUSTER

THREAD BLOCK

THREAD EXECUTION
(ARRIVED)
2806

2808

THREAD EXECUTION
(WAITING)
2810

2804

BARRIER INSTRUCTION

THREAD BLOCK

THREAD EXECUTION
(WAITING)
2814

THREAD EXECUTION
(WAITING)
2816

2812

2802

2900

BLOCK CLUSTER

THREAD BLOCK

THREAD EXECUTION
(EXECUTING)
2906

2908

THREAD EXECUTION
(EXECUTING)
2910

2904

BARRIER INSTRUCTION

THREAD BLOCK

THREAD EXECUTION
(EXECUTING)
2914

THREAD EXECUTION
(EXECUTING)
2916

2912

2902

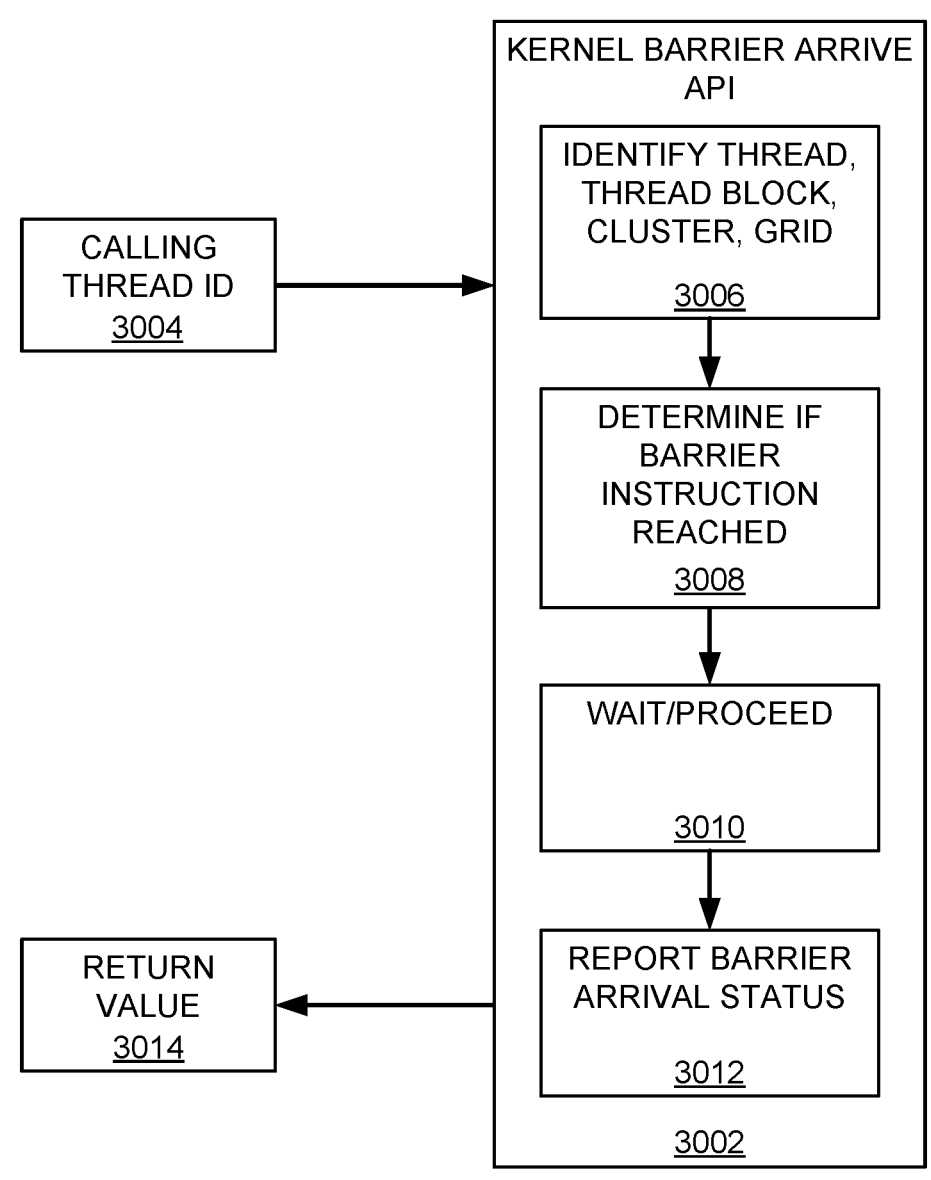
FIG. 30

3100

CALLING
THREAD ID
3104

KERNEL BARRIER WAIT
API

IDENTIFY THREAD,
THREAD BLOCK,
CLUSTER, GRID

3106

DETERMINE IF
OTHER THREADS
HAVE REACHED
BARRIER
INSTRUCTION
3108

RETURN
VALUE
3112

WAIT OR PROCEED

3110

3102

3200

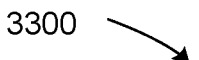
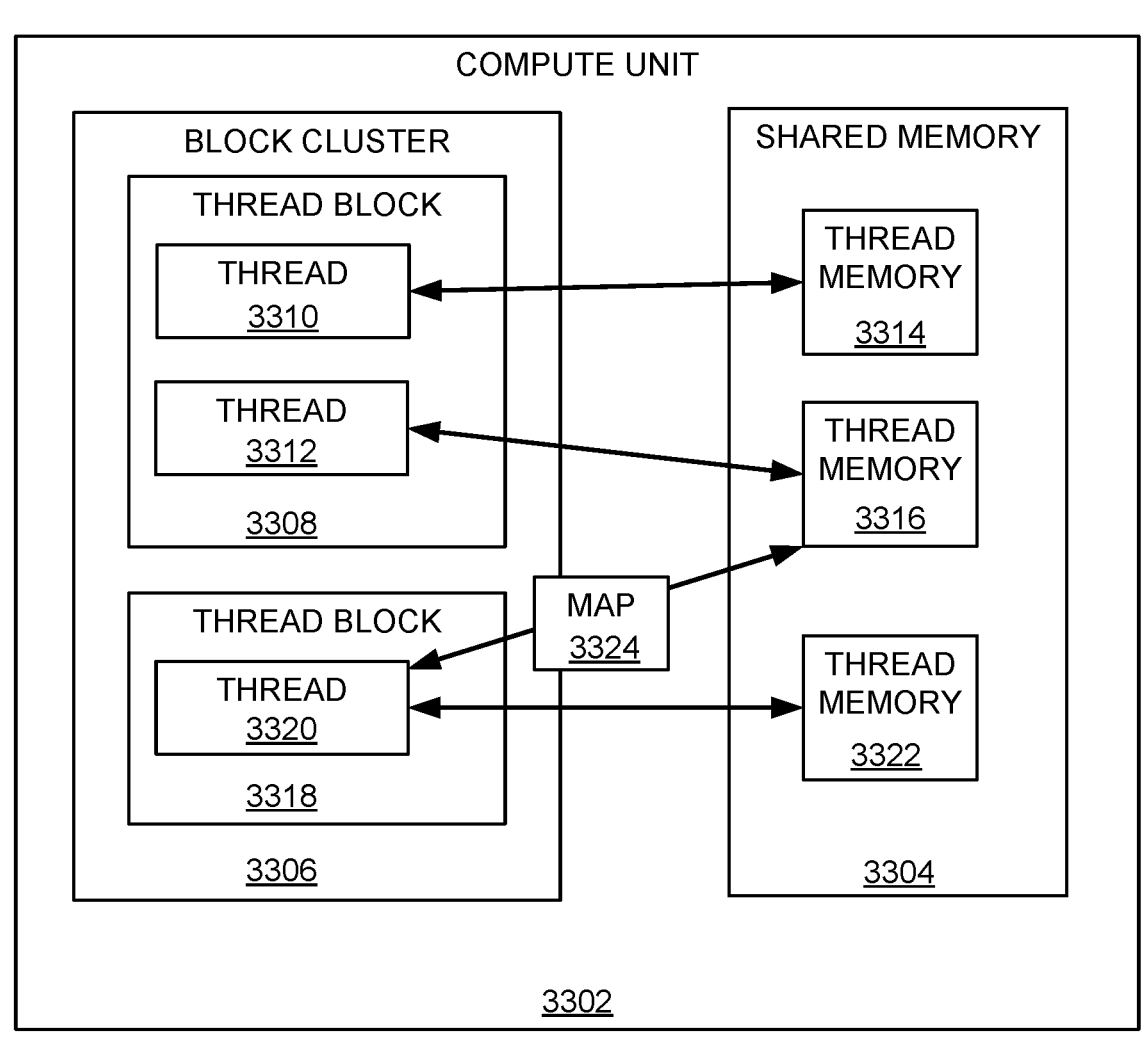
FIG. 33

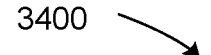
3400
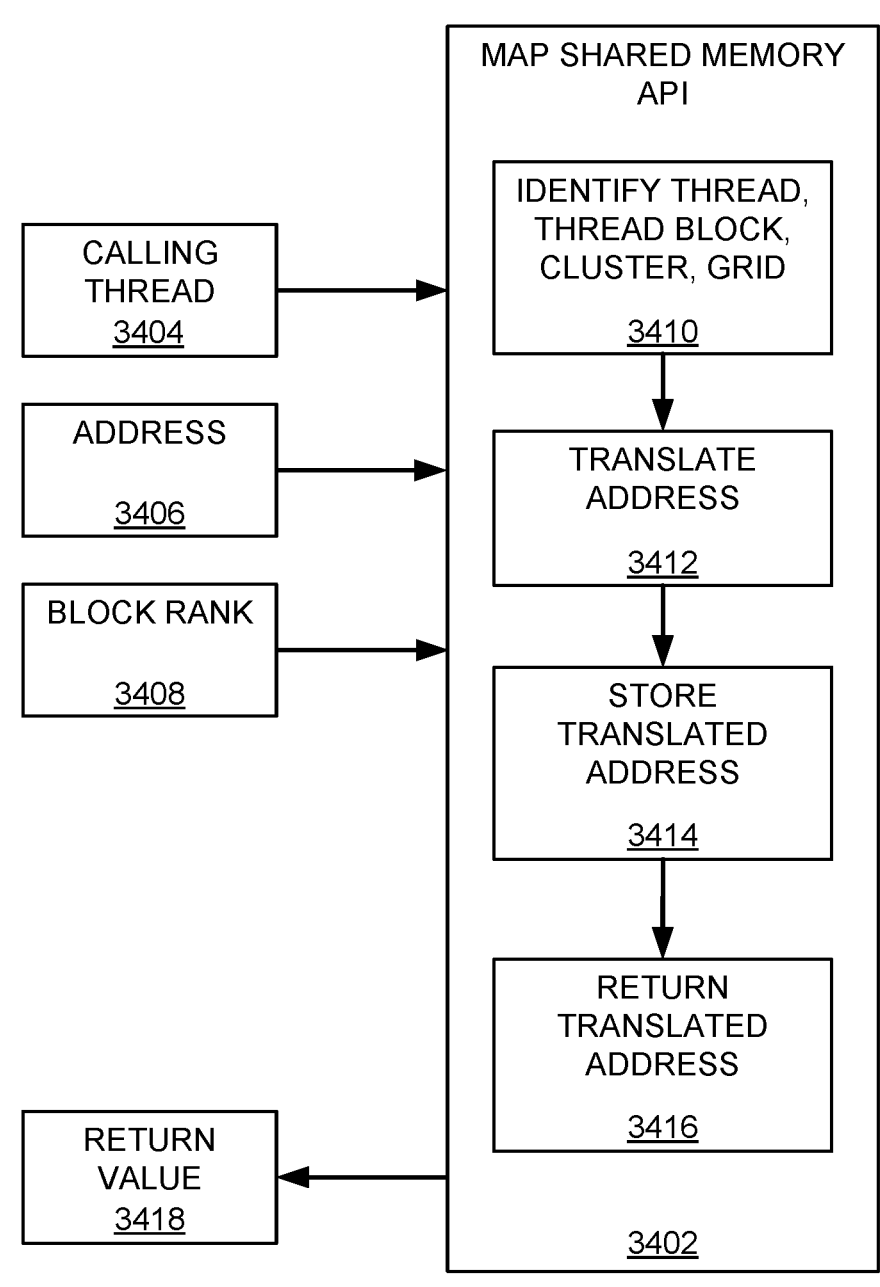
FIG. 34

Figure 35:
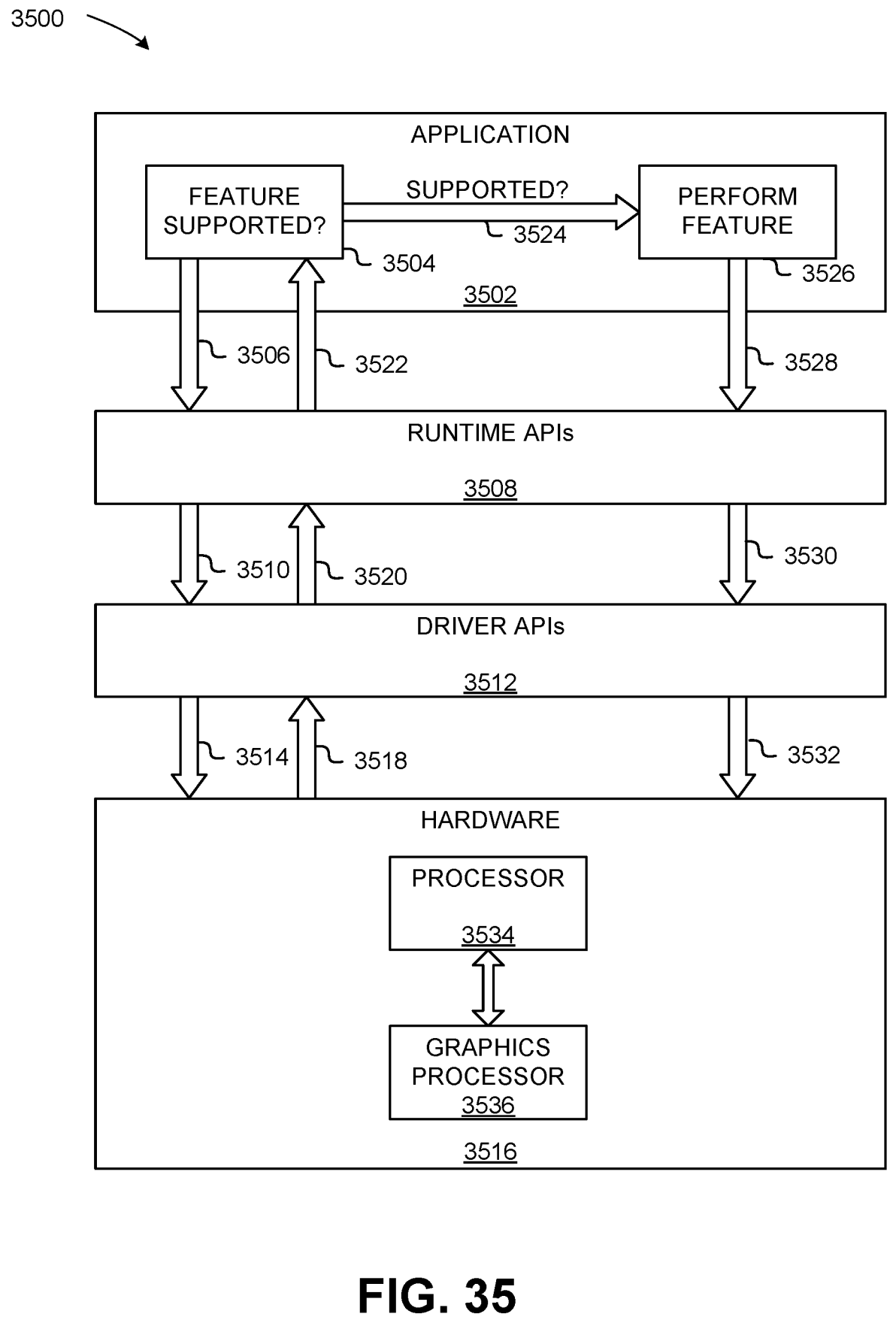

3500

APPLICATION

FEATURE SUPPORTED?

SUPPORTED? 3524

PERFORM FEATURE

3504

3526

3502

3506  3522

RUNTIME APIs

3508

3510  3520

3528

3530

DRIVER APIs

3512

3514  3518

3532

HARDWARE

PROCESSOR

3534

GRAPHICS PROCESSOR

DATA CENTER
3600

APPLICATION LAYER 3640

APPLICATION(s) 3642

SOFTWARE LAYER 3630

SOFTWARE 3652

FRAMEWORK LAYER 3620

JOB SCHEDULER 3632 ← CONFIGURATION MANAGER 3634

DISTRIBUTED FILE SYSTEM 3638

RESOURCE MANAGER 3636

DATA CENTER INFRASTRUCTURE LAYER 3610

RESOURCE ORCHESTRATOR 3612

GROUPED COMPUTING RESOURCES 3614

NODE C.R. 3616(1)    NODE C.R. 3616(2)    • • •    NODE C.R. 3616(N)

GRAPHICS PROCESSOR
4510

GRAPHICS PROCESSOR
4540

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
} int main()
{
    ...
    // Kernel call
    dim3 threadsPerBlock(16, 16);
    dim3 numBlocks(N / threadsPerBlock.x, N / threadsPerBlock.y);
    MatAdd<<<numBlocks, threadsPerBlock>>>(A, B, C);
    ...
}
```

CUDA Source Code
6310

CUDA to HIP Translation Tool 6320

CUDA Kernel Launch Syntax 6410

KernelName<<<GridSize, BlockSize,
SharedMemorySize,
Stream>>>(KernelArguments);

HIP Kernel Launch Syntax 6420 hipLaunchKernelGGL(KernelName, GridSize,
BlockSize, SharedMemorySize, Stream,
KernelArguments);

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
} int main()
{
    ...
    // Kernel invocation
    dim3 threadsPerBlock(16, 16);
    dim3 numBlocks(N / threadsPerBlock.x, N / threadsPerBlock.y);
    hipLaunchKernelGGL(MatAdd, numBlocks, threadsPerBlock, 0, 0, A, B, C);
    ...
}
```

HIP Source Code
6330

FIG. 64

APPLICATION PROGRAMMING INTERFACE TO SHARE MEMORY BETWEEN GROUPS OF BLOCKS OF THREADS

CROSS-REFERENCE TO RELATED APPLICATIONS

This application incorporates by reference for all purposes the full disclosures of co-pending U.S. patent application Ser. No. 17/955,023, filed concurrently herewith, entitled "APPLICATION PROGRAMMING INTERFACE TO INDICATE THREAD BLOCKS", co-pending U.S. patent application Ser. No. 17/955,052, filed concurrently herewith, entitled "APPLICATION PROGRAMMING INTERFACE TO SCHEDULE THREAD BLOCKS", co-pending U.S. patent application Ser. No. 17/955,070, filed concurrently herewith, entitled "APPLICATION PROGRAMMING INTERFACE TO PERFORM A SCHEDULING POLICY", co-pending U.S. patent application Ser. No. 17/955,085, filed concurrently herewith, entitled "APPLICATION PRO-GRAMMING INTERFACE TO INDICATE SCHEDUL-ING POLICIES", co-pending U.S. patent application Ser. No. 17/955,094, filed concurrently herewith, entitled "APPLICATION PROGRAMMING INTERFACE TO INDICATE PARALLEL SCHEDULING MAXIMUM", co-pending U.S. patent application Ser. No. 17/955,106 filed concurrently herewith, entitled "APPLICATION PRO-GRAMMING INTERFACE TO INDICATE ATTRIBUTES OF GROUPS OF BLOCKS OF THREADS", co-pending U.S. patent application Ser. No. 17/955,110, filed concur-rently herewith, entitled "APPLICATION PROGRAM-MING INTERFACE TO INDICATE BLOCK MAXI-MUM", co-pending U.S. patent application Ser. No. 17/955,123, filed concurrently herewith, entitled "APPLICATION PROGRAMMING INTERFACE TO GENERATE KER-NELS", co-pending U.S. patent application Ser. No. 17/955,133, filed concurrently herewith, entitled "APPLICATION PROGRAMMING INTERFACE TO INDICATE ATTRI-BUTE LIMITATIONS", co-pending U.S. patent application Ser. No. 17/955,143, filed concurrently herewith, entitled "APPLICATION PROGRAMMING INTERFACE TO INDICATE PERFORMANCE OF BARRIER INSTRUC-TION", co-pending U.S. patent application Ser. No. 17/955,153, filed concurrently herewith, entitled "APPLICATION PROGRAMMING INTERFACE TO STOP PERFOR-MANCE OF THREADS", and co-pending U.S. patent application Ser. No. 17/955,163, filed concurrently herewith, entitled "APPLICATION PROGRAMMING INTERFACE TO INDICATE PERFORMANCE OF BARRIER INSTRUCTION AND STOP PERFORMANCE OF THREADS".

FIELD

At least one embodiment pertains to processing resources used to execute one or more CUDA programs. For example, at least one embodiment pertains to processing resources used to execute one or more CUDA programs that set parameters of one or more clusters of one or more groups of instructions, get parameters of one or more clusters of one or more groups of instructions, share resources between one or more clusters of one or more groups of instructions, and/or synchronize execution between one or more clusters of one or more groups of instructions.

BACKGROUND

Performing computational operations can use significant memory, time, or computing resources. Computer programs can be organized in different ways without various portions that can be performed independently or dependently from one another. Despite computer hardware advances that accelerate or otherwise assist the performance of the various components of a computer program, the advances are gen-erally unable to take into account all the various ways in which computer programs can be structured. A processor may, for example, be unable to take into account various aspects of a computer program, thereby causing delay or other inefficiencies.

BRIEF DESCRIPTION OF THE DRAWINGS

FIG. 1 illustrates an example computer system where software kernels are launched using block clusters, in accor-dance with at least one embodiment;

FIG. 4 illustrates an example diagram of a compute unit where threads of a thread block are processed, in accordance with at least one embodiment;

FIG. 6 illustrates an example process to launch software kernels using block clusters, in accordance with at least one embodiment;

FIG. 7 illustrates an example diagram where sizes and dimensions of block clusters are shown, in accordance with at least one embodiment;

FIG. 8 illustrates an example application programming interface to indicate dimensions of a block cluster, in accor-dance with at least one embodiment;

FIG. 12 illustrates an example application programming interface to indicate a scheduling policy of a block cluster, in accordance with at least one embodiment;

FIG. 14 illustrates an example computer system where a maximum number of clusters supported by hardware is obtained, in accordance with at least one embodiment;

FIG. 15 illustrates an example application programming interface to obtain a maximum number of clusters supported by hardware, in accordance with at least one embodiment;

FIG. 18 illustrates an example computer system where a maximum cluster size that can be simultaneously performed is obtained, in accordance with at least one embodiment;

FIG. 19 illustrates an example application programming interface to obtain a maximum cluster size that can be simultaneously performed by hardware, in accordance with at least one embodiment;

FIG. 21 illustrates an example application programming interface to execute a software kernel using block clusters, in accordance with at least one embodiment;

FIG. 30 illustrates an example application programming interface to determine if threads of a block cluster have performed a barrier instruction, in accordance with at least one embodiment;

FIG. 33 illustrates an example diagram where shared memory of a compute unit is mapped between threads of a block cluster, in accordance with at least one embodiment;

FIG. 34 illustrates an example application programming interface to map memory between threads of a block cluster, in accordance with at least one embodiment;

FIG. 35 illustrates an example software stack where application programming interface calls associated with block clusters are processed, in accordance with at least one embodiment;

FIG. 64 illustrates an exemplary kernel translated by CUDA-to-HIP translation tool of FIG. 63C, in accordance with at least one embodiment;

DETAILED DESCRIPTION

Figure 2:
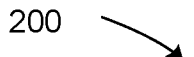
FIG. 2 illustrates an example diagram of a thread block where execution threads are organized, in accordance with at least one embodiment.

FIG. 1 illustrates an example computer system 100 where software kernels are launched using block clusters, in accordance with at least one embodiment. In at least one embodiment, a processor 102 executes or otherwise performs one or more commands to generate a software kernel 104 and to launch a software kernel 106. In at least one embodiment, processor 102 is a single-core processor, a multi-core processor, a graphics processors, a parallel processor, a general purpose graphics processor, and/or some other processor such as those described herein in connection with FIGS. 36 to 67.

In at least one embodiment, software kernel comprises a set of one or more executable functions, as described herein. In at least one embodiment, a software kernel is generated (e.g., when processor 102 executes or otherwise performs one or more commands to generate a software kernel 104) from one or more functions as described herein at least in connection with FIGS. 63A, 63C, and 64. In at least one embodiment, a software kernel is launched (e.g., when processor 102 executes or otherwise performs one or more commands to launch a software kernel 106 using systems and methods such as those described herein at least in connection with FIGS. 63A, 63C, and 64. In at least one embodiment, a software kernel is referred to as a kernel when, for example, a kernel is being generated and launched on graphics processor hardware such as that described herein. In at least one embodiment, not shown in FIG. 1, one or more additional processors may be elements of example computer system 100.

In at least one embodiment, processor 102 executes or otherwise performs one or more commands to launch software kernel 106 by causing a software kernel to be executed using a graphics processor 108. In at least one embodiment, graphics processor 108 is a single-core graphics processor, a multi-core graphics processor, a parallel processor, a general purpose graphics processor, and/or some other graphics processor such as those described herein in connection with FIGS. 45A to 54. In at least one embodiment, not shown in FIG. 1, one or more additional graphics processors may be elements of example computer system 100.

In at least one embodiment, graphics processor 108 includes one or more compute units (e.g., compute unit 110 and/or compute unit 122). In at least one embodiment, compute unit 110 (and/or compute unit 122) is a compute unit such as those described herein at least in connection with FIG. 66. In at least one embodiment, compute unit 110 (and/or compute unit 122) is a programmable streaming multiprocessor ("SM") 5314 as described herein at least in connection with FIG. 53. In at least one embodiment, compute unit 110 (and/or compute unit 122) is a streaming multiprocessor ("SM") 5400 as described herein at least in connection with FIG. 54.

In at least one embodiment, compute unit 110 implements one or more block clusters such as those described herein (e.g., block cluster 112, block cluster 120, and/or block cluster 118) using systems and methods such as those described herein. In at least one embodiment, processor 102 executes or otherwise performs one or more commands to launch software kernel 106 by causing a software kernel to be executed using block cluster 112 of compute unit 110 on graphics processor 108. In at least one embodiment, compute unit 110 may include one or more additional block clusters such as block cluster 120 that may be used to launch one or more other software kernels by a processor such as processor 102 and/or by another processor not shown in FIG. 1. In at least one embodiment, block cluster 120 may be used to launch one or more other software kernels before, during, or after processor 102 executes or otherwise performs one or more commands to launch software kernel 106 using block cluster 112. In at least one embodiment, not shown in FIG. 1, block cluster 120 may be on a different compute unit (e.g., compute unit 122) than block cluster 112. In at least one embodiment, not shown in FIG. 1, block clusters such as block cluster 112, block cluster 118, and/or block cluster 120 include one or more thread blocks such as thread block 202, as described herein at least in connection with FIG. 2.

In at least one embodiment, processor 102 may also execute or otherwise perform one or more commands to generate another software kernel 114 and to launch another software kernel 116. In at least one embodiment, software kernel 114 is identical to software kernel 104. In at least one embodiment, software kernel 114 is different from software kernel 104. In at least one embodiment, processor 102 executes or otherwise performs one or more commands to launch software kernel 116 by causing a software kernel to be executed using block cluster 118 of compute unit 110 on graphics processor 108. In at least one embodiment, block cluster 118 may be used to launch software kernel 116 before, during, or after processor 102 executes or otherwise performs one or more commands to launch software kernel 106 using block cluster 112. In at least one embodiment, not shown in FIG. 1, block cluster 118 may be on a different compute unit (e.g., compute unit 122) than block cluster 112.

In at least one embodiment, not shown in FIG. 1, processor 102 executes or otherwise performs one or more commands to launch software kernel 106 by causing a software kernel to be executed using a plurality of block clusters such as block cluster 112, on a plurality of compute units using a graphics processor 108. In at least one embodiment, for example, processor 102 executes or otherwise performs one or more commands to launch software kernel 106 by launching a portion of a software kernel on a block cluster 112 on compute unit 110 and by launching a second portion of a software kernel on a block cluster (not illustrated in FIG. 1) on compute unit 122.

In at least one embodiment, processor 102 and/or graphics processor 108 comprise one or more circuits to perform an API to indicate two or more blocks of threads to be scheduled in parallel. In at least one embodiment, processor 102 and/or graphics processor 108 comprise one or more circuits to perform an API to indicate one or more dimensions of one or more clusters of one or more groups of instructions. In at least one embodiment, processor 102 and/or graphics processor 108 comprise one or more circuits to perform an API to indicate two or more blocks of threads to be scheduled in parallel using an API such as set block cluster dimension API 802, described herein at least in connection with FIG. 8. In at least one embodiment, processor 102 and/or graphics processor 108 comprise one or more circuits to perform an API to indicate one or more dimensions of one or more clusters of one or more groups of instructions using an API such as set block cluster dimension API 802, described herein at least in connection with FIG. 8.

In at least one embodiment, processor 102 and/or graphics processor 108 comprise one or more circuits to perform an API to determine which of two or more blocks of threads to be scheduled in parallel. In at least one embodiment, processor 102 and/or graphics processor 108 comprise one or more circuits to perform an API to obtain one or more dimensions of a one or more clusters of one or more groups of instructions. In at least one embodiment, processor 102 and/or graphics processor 108 comprise one or more circuits to perform an API to determine which of two or more blocks of threads to be scheduled in parallel using an API such as get cluster dimension API 902, described herein at least in connection with FIG. 9. In at least one embodiment, processor 102 and/or graphics processor 108 comprise one or more circuits to perform an API to obtain one or more dimensions of a one or more clusters of one or more groups of instructions using an API such as get cluster dimension API 902, described herein at least in connection with FIG. 9.

In at least one embodiment, processor 102 and/or graphics processor 108 comprise one or more circuits to perform an API comprising one or more parameters to cause a scheduling policy of one or more blocks of one or more threads to be performed. In at least one embodiment, processor 102 and/or graphics processor 108 comprise one or more circuits to perform an API to indicate a scheduling policy of one or more clusters of one or more groups of instructions. In at least one embodiment, processor 102 and/or graphics processor 108 comprise one or more circuits to perform an API to comprising one or more parameters to cause a scheduling policy of one or more blocks of one or more threads to be performed using an API such as set scheduling policy API 1202, described herein at least in connection with FIG. 12. In at least one embodiment, processor 102 and/or graphics processor 108 comprise one or more circuits to perform an API to indicate a scheduling policy of one or more clusters of one or more groups of instructions using an API such set scheduling policy API 1202, described herein at least in connection with FIG. 12.

In at least one embodiment, processor 102 and/or graphics processor 108 comprise one or more circuits to perform an API comprising one or more parameters to indicate a scheduling policy of one or more blocks of one or more threads. In at least one embodiment, processor 102 and/or graphics processor 108 comprise one or more circuits to perform an API to obtain a scheduling policy of one or more clusters of one or more groups of instructions. In at least one embodiment, processor 102 and/or graphics processor 108 comprise one or more circuits to perform an API comprising one or more parameters to indicate a scheduling policy of one or more blocks of one or more threads using an API such as get scheduling policy API 1302, described herein at least in connection with FIG. 13. In at least one embodiment, processor 102 and/or graphics processor 108 comprise one or more circuits to perform an API to obtain a scheduling policy of one or more clusters of one or more groups of instructions using an API such as get scheduling policy API 1302, described herein at least in connection with FIG. 13.

In at least one embodiment, processor 102 and/or graphics processor 108 comprise one or more circuits to perform an API to indicate a maximum number of blocks of threads capable of being scheduled in parallel. In at least one embodiment, processor 102 and/or graphics processor 108 comprise one or more circuits to perform an API to obtain a limit of a number of allowable clusters of one or more groups of instructions. In at least one embodiment, processor 102 and/or graphics processor 108 comprise one or more circuits to perform an API to indicate a maximum number of blocks of threads capable of being scheduled in parallel using an API such as number of blocks supported API 1502, described herein at least in connection with FIG. 15. In at least one embodiment, processor 102 and/or graphics processor 108 comprise one or more circuits to perform an API to obtain a limit of a number of allowable clusters of one or more groups of instructions using an API such as number of blocks supported API 1502, described herein at least in connection with FIG. 15.

In at least one embodiment, processor 102 and/or graphics processor 108 comprise one or more circuits to perform an API comprising one or more parameters to indicate one or more attributes of one or more groups of blocks of one or more threads. In at least one embodiment, processor 102 and/or graphics processor 108 comprise one or more circuits to perform an API to obtain one or more attributes of one or more clusters of one or more groups of instructions. In at least one embodiment, processor 102 and/or graphics processor 108 comprise one or more circuits to perform an API comprising one or more parameters to indicate one or more attributes of one or more groups of blocks of one or more threads using an API such as indicate cluster parameters API 1702, described herein at least in connection with FIG. 17. In at least one embodiment, processor 102 and/or graphics processor 108 comprise one or more circuits to perform an API to obtain one or more attributes of one or more clusters of one or more groups of instructions using an API such as indicate cluster parameters API 1702, described herein at least in connection with FIG. 17.

In at least one embodiment, processor 102 and/or graphics processor 108 comprise one or more circuits to perform an API to indicate a maximum number of blocks of threads to be scheduled in parallel. In at least one embodiment, processor 102 and/or graphics processor 108 comprise one or more circuits to perform an API to obtain a limit of a number of concurrently performable clusters of one or more groups of instructions. In at least one embodiment, processor 102 and/or graphics processor 108 comprise one or more circuits to perform an API to indicate a maximum number of blocks of threads to be scheduled in parallel using an API such as maximum cluster size supported API 1902, described herein at least in connection with FIG. 19. In at least one embodiment, processor 102 and/or graphics processor 108 comprise one or more circuits to perform an API to obtain a limit of a number of concurrently performable clusters of one or more groups of instructions using an API such as maximum cluster size supported API 1902, described herein at least in connection with FIG. 19.

In at least one embodiment, processor 102 and/or graphics processor 108 comprise one or more circuits to perform an API to cause a kernel to be generated to cause two or more blocks of two or more threads to be scheduled in parallel. In at least one embodiment, processor 102 and/or graphics processor 108 comprise one or more circuits to perform an API to cause a software kernel to be performed using one or more clusters of one or more groups of instructions. In at least one embodiment, processor 102 and/or graphics processor 108 comprise one or more circuits to perform an API to cause a kernel to be generated to cause two or more blocks of two or more threads to be scheduled in parallel using an API such as launch kernel with block clusters API 2102, described herein at least in connection with FIG. 21. In at least one embodiment, processor 102 and/or graphics processor 108 comprise one or more circuits to perform an API to cause a software kernel to be performed using one or more clusters of one or more groups of instructions using an API such as launch kernel with block clusters API 2102, described herein at least in connection with FIG. 21.

In at least one embodiment, processor 102 and/or graphics processor 108 comprise one or more circuits to perform an API comprising one or more parameters to indicate one or more limitations of one or more attributes of one or more groups of blocks of one or more threads. In at least one embodiment, processor 102 and/or graphics processor 108 comprise one or more circuits to perform an API to obtain one or more parameters of one or more clusters of one or more groups of instructions of a set of one or more clusters of one or more groups of instructions. In at least one embodiment, processor 102 and/or graphics processor 108 comprise one or more circuits to perform an API comprising one or more parameters to indicate one or more limitations of one or more attributes of one or more groups of blocks of one or more threads using an API such as get attributes API 2602, described herein at least in connection with FIG. 26. In at least one embodiment, processor 102 and/or graphics processor 108 comprise one or more circuits to perform an API to obtain one or more parameters of one or more clusters of one or more groups of instructions of a set of one or more clusters of one or more groups of instructions using an API such as get attributes API 2602, described herein at least in connection with FIG. 26.

In at least one embodiment, processor 102 and/or graphics processor 108 comprise one or more circuits to perform an API to indicate whether one or more threads within two or more blocks of threads have performed a barrier instruction. In at least one embodiment, processor 102 and/or graphics processor 108 comprise one or more circuits to perform an API indicate arrival at a barrier instruction of a cluster of one or more groups of instructions. In at least one embodiment, processor 102 and/or graphics processor 108 comprise one or more circuits to perform an API to indicate whether one or more threads within two or more blocks of threads have performed a barrier instruction using an API such as kernel barrier arrive API 3002, described herein at least in connection with FIG. 30. In at least one embodiment, processor 102 and/or graphics processor 108 comprise one or more circuits to perform an API to indicate arrival at a barrier instruction of a cluster of one or more groups of instructions using an API such as kernel barrier arrive API 3002, described herein at least in connection with FIG. 30.

In at least one embodiment, processor 102 and/or graphics processor 108 comprise one or more circuits to perform an API to cause performance of one or more threads within a group of blocks of threads to stop at least until all threads within the group of blocks have performed a barrier instruction. In at least one embodiment, processor 102 and/or graphics processor 108 comprise one or more circuits to perform an API to cause one or more first instructions to be prevented from being performed until a cluster of one or more groups of instructions have performed one or more second instructions. In at least one embodiment, processor 102 and/or graphics processor 108 comprise one or more circuits to perform an API to cause performance of one or more threads within a group of blocks of threads to stop at least until all threads within the group of blocks have performed a barrier instruction using an API such as kernel barrier wait API 3102, described herein at least in connection with FIG. 31. In at least one embodiment, processor 102 and/or graphics processor 108 comprise one or more circuits to perform an API to cause one or more first instructions to be prevented from being performed until a cluster of one or more groups of instructions have performed one or more second instructions using an API such as kernel barrier wait API 3102, described herein at least in connection with FIG. 31.

In at least one embodiment, processor 102 and/or graphics processor 108 comprise one or more circuits to perform an API to indicate whether one or more threads within two or more blocks of threads have performed a barrier instruction and to cause performance of one or more threads within the group of blocks of threads to stop at least until all threads within the group of blocks have performed the barrier instruction. In at least one embodiment, processor 102 and/or graphics processor 108 comprise one or more circuits to perform an API to indicate whether one or more threads within two or more blocks of threads have performed a barrier instruction and to cause performance of one or more threads within the group of blocks of threads to stop at least until all threads within the group of blocks have performed the barrier instruction using an API such as a kernel barrier sync API 3202, described herein at least in connection with FIG. 32. In at least one embodiment, processor 102 and/or graphics processor 108 comprise one or more circuits to perform an API to cause one or more first instructions to be prevented from being performed until a cluster of one or more groups of instructions have performed one or more second instructions using an API such as a kernel barrier sync API 3202, described herein at least in connection with FIG. 32.

In at least one embodiment, processor 102 and/or graphics processor 108 comprise one or more circuits to perform an API to cause memory to be shared between two or more groups of blocks of thread. In at least one embodiment, processor 102 and/or graphics processor 108 comprise one or more circuits to perform an API to cause one or more memory locations of first cluster of one or more groups of instructions to be accessible to a second cluster of one or more groups of instructions. In at least one embodiment, processor 102 and/or graphics processor 108 comprise one or more circuits to perform an API to cause memory to be shared between two or more groups of blocks of thread using an API such as map shared memory API 3402, described herein at least in connection with FIG. 34. In at least one embodiment, processor 102 and/or graphics processor 108 comprise one or more circuits to perform an API to cause one or more memory locations of first cluster of one or more groups of instructions to be accessible to a second cluster of one or more groups of instructions using an API such as map shared memory API 3402, described herein at least in connection with FIG. 34.

FIG. 2 illustrates an example diagram 200 of a thread block 202 where execution threads are organized, in accordance with at least one embodiment. In at least one embodiment, thread block 202 includes one or more threads. In at least one embodiment, thread block 202 is a three-dimensional (3D) thread block that has dimensions ($T_x$, $T_y$, $T_z$)

(e.g., there are $T_x \times T_y \times T_z$ threads). In at least one embodiment, for example, if $T_x$ is 8, $T_y$ is 8, and $T_z$ is 4, thread block 202 includes 256 threads. In at least one embodiment, thread block 202 may be one-dimensional (e.g., may have $T_x$ threads), or may be two-dimensional (e.g., may have $T_x \times T_y$ threads), may be four-dimensional (e.g., may have $T_x \times T_y \times T_z \times T_w$ threads), or may have some other dimensionality. In at least one embodiment, thread block 202 is a thread block such as thread blocks 6630(1,1)-6630(BX,BY), described herein at least in connection with FIG. 66.

Figure 66:
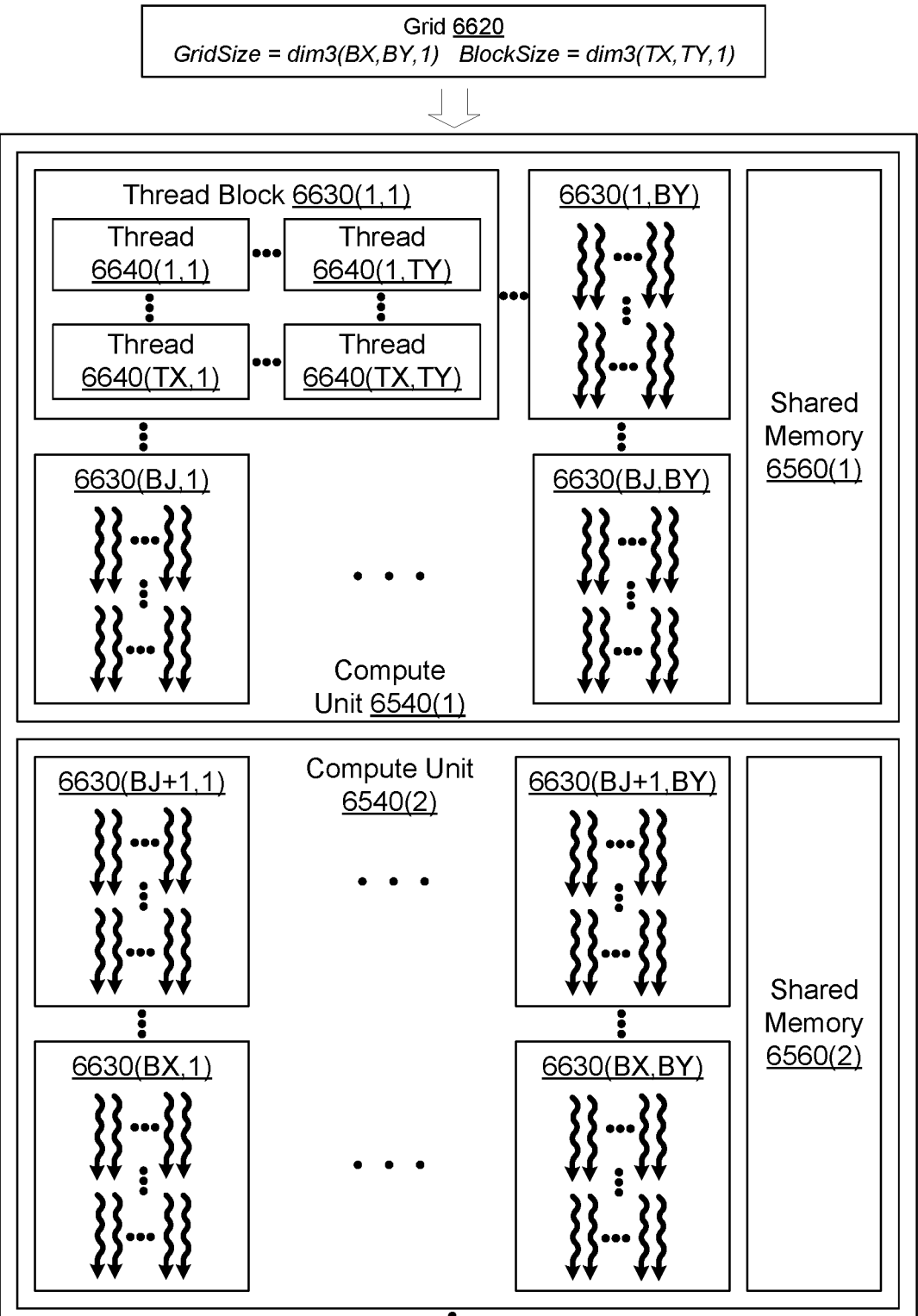
FIG. 66 illustrates how threads of an exemplary CUDA grid are mapped to different compute units of FIG. 65, in accordance with at least one embodiment.

In at least one embodiment, thread block 202 includes a plurality of threads in a grid (e.g., a $T_x \times T_y \times T_z$ grid) which are threads such as threads 6640(1,1)-6640(TX,TY) as described herein at least in connection with FIG. 66. In at least one embodiment, threads of thread block 202 may be used to execute a software kernel such those described. In at least one embodiment, for example, threads of thread block 202 may be used to execute a software kernel when processor 102 launches kernel 106 using block cluster 112, as described herein at least in connection with FIG. 1.

Figure 3:
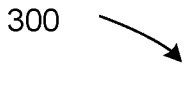
FIG. 3 illustrates an example diagram of a compute unit where thread blocks are processed by, in accordance with at least one embodiment.

FIG. 3 illustrates an example diagram 300 of a compute unit 302 where thread blocks are processed, in accordance with at least one embodiment. In at least one embodiment, compute unit 302 is a compute unit such as compute unit 110 and/or compute unit 122, as described herein at least in connection with FIG. 1. In at least one embodiment, compute unit 302 has one or more thread blocks such as thread block 202, as described herein at least in connection with FIG. 2. In at least one embodiment, compute unit 302 includes shared memory 304, which is shared memory such as shared memory 6660(1) and/or shared memory 6660(2), as described herein at least in connection with FIG. 66. In at least one embodiment, shared memory 304 comprises one or more memory locations accessible by one or more threads, one or more thread blocks, and/or one or more block clusters. In at least one embodiment, shared memory 304 includes one or more physical memory locations. In at least one embodiment, shared memory 304 includes one or more virtual memory locations. In at least one embodiment, shared memory 304 is memory hosted by a processor and/or a graphics processing unit (GPU) such as those described herein.

In at least one embodiment, not shown in FIG. 3, blocks (e.g., thread blocks) are executed using an entire graphics processor such as graphics processor 108, described herein at least in connection with FIG. 1, with one or more blocks (e.g., thread blocks) executing on each of a plurality of compute units such as compute unit 302. In at least one embodiment, blocks of a grid of blocks as illustrated in FIG. 3 are organized as a logical grid so that, for example, block (1,1,1) may be hosted on a first compute unit and a logically neighboring block (e.g., block (1,1,2), block (1,2,1), block (2,1,1), etc.) may be on a different compute unit.

In at least one embodiment, compute unit 302 has a three-dimensional (3D) grid of thread block that has dimensions $(B_x, B_y, B_z)$ (e.g., there are $B_x \times B_y \times B_z$ thread blocks). In at least one embodiment, for example, if $B_x$ is 4, $B_y$ is 4, and $B_z$ is 4, compute unit 302 includes 64 thread blocks. In at least one embodiment, where, for example, a thread block has 256 threads, compute unit 302 may have 16,384 threads. In at least one embodiment, compute unit 302 may be one-dimensional (e.g., may have $B_x$ thread blocks), or may be two-dimensional (e.g., may have $B_x \times B_y$ thread blocks), may be four-dimensional (e.g., may have $B_x \times B_y \times B_z \times B_w$ thread blocks), or may have some other dimensionality. In at least one embodiment, thread blocks of compute unit 302 are used to execute a software kernel such those described. In at least one embodiment, for example, thread blocks of compute unit 302 are used to execute a software kernel when processor 102 launches kernel 106 using block cluster 112, as described herein at least in connection with FIG. 1.

FIG. 4 illustrates an example diagram 400 of a compute unit 402 where threads of a thread block are processed, in accordance with at least one embodiment. In example computer system 400 illustrated in FIG. 4, thread blocks 406 are illustrated in two dimensions for clarity (e.g., a $B_z$ dimension of a compute unit 402 is 1). In at least one embodiment, compute unit 402 is a compute unit such as those described herein. In at least one embodiment, compute unit 402 is referred to as a grid. In at least one embodiment, compute unit 402 includes shared memory 404 and one or more thread blocks 406. In at least one embodiment, thread blocks 406 are contained in one or more block clusters, as described herein. In at least one embodiment, thread blocks 406 of compute unit 402 are used to execute a software kernel such those described. In at least one embodiment, for example, thread blocks 406 of compute unit 402 are used to execute a software kernel when processor 102 launches kernel 106 using block cluster 112, as described herein at least in connection with FIG. 1.

In at least one embodiment, not shown in FIG. 4, thread blocks are executed using an some or all of a graphics processor such as graphics processor 108, described herein at least in connection with FIG. 1, with one or more thread blocks executing on each of a plurality of compute units such as compute unit 402, as described herein. In at least one embodiment, dimensions of thread blocks of a grid of blocks on a compute unit, as illustrated in FIG. 4, are organized logically as described herein and have different dimensions so that, for example, a first compute unit may have a grid size of (3,4,1), a second compute unit may have a grid size of (2,2,2), etc.

Figure 5:
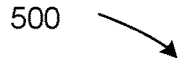
FIG. 5 illustrates an example diagram of a compute unit where block clusters are processed, in accordance with at least one embodiment.

FIG. 5 illustrates an example diagram 500 of a compute unit 502 where block clusters are processed, in accordance with at least one embodiment. In example computer system 500 illustrated in FIG. 5, thread blocks of block clusters 506 are illustrated in two dimensions for clarity (e.g., a $B_z$ dimension of a compute unit 502 is 1). In at least one embodiment, compute unit 502 is a compute unit such as those described herein. In at least one embodiment, compute unit 502 includes shared memory 504 and one or more thread blocks in one or more block clusters 506.

In at least one embodiment, block clusters 506 includes twelve thread blocks (e.g., a 3×4×1 grid of thread blocks) that are distributed among six block clusters (e.g., a 2D 2×3 grid of block clusters). In at least one embodiment, a block cluster 508 includes four thread blocks. In at least one embodiment, thread block (1,1) of block cluster 508 is thread block (1,1,1) of thread blocks 406, thread block (1,2) of block cluster 508 is thread block (1,2,1) of thread blocks 406, thread block (2,1) of block cluster 508 is thread block (2,1,1) of thread blocks 406, and thread block (2,2) of block cluster 508 is thread block (2,2,1) of thread blocks 406, described herein at least in connection with FIG. 4. In at least one embodiment, block cluster 508 has identifier (1,1) and has dimensions of (2,2).

In at least one embodiment, a block cluster 510 includes two thread blocks. In at least one embodiment, thread block (1,1) of block cluster 510 is thread block (1,3,1) of thread blocks 406 and thread block (2,1) of block cluster 510 is thread block (2,3,1) of thread blocks 406, described herein at least in connection with FIG. 4. In at least one embodiment, block cluster 510 has identifier (1,2) and has dimensions of (2,1).

In at least one embodiment, a block cluster 512 includes two thread blocks. In at least one embodiment, thread block (1,1) of block cluster 512 is thread block (1,4,1) of thread blocks 406 and thread block (2,1) of block cluster 512 is thread block (2,4,1) of thread blocks 406, described herein at least in connection with FIG. 4. In at least one embodiment, block cluster 512 has identifier (1,3) and has dimensions of (2,1).

In at least one embodiment, a block cluster 514 includes two thread blocks. In at least one embodiment, thread block (1,1) of block cluster 514 is thread block (3,1,1) of thread blocks 406 and thread block (1,2) of block cluster 512 is thread block 3,2,1) of thread blocks 406, described herein at least in connection with FIG. 4. In at least one embodiment, block cluster 514 has identifier (2,1) and has dimensions of (1,2).

In at least one embodiment, a block cluster 516 includes one thread block. In at least one embodiment, thread block (1,1) of block cluster 516 is thread block (3,3,1) of thread blocks 406, described herein at least in connection with FIG. 4. In at least one embodiment, block cluster 516 has identifier (2,2) and has dimensions of (1,1). In at least one embodiment, a block cluster 518 includes one thread block. In at least one embodiment, thread block (1,1) of block cluster 518 is thread block (3,4,1) of thread blocks 406, described herein at least in connection with FIG. 4. In at least one embodiment, block cluster 518 has identifier (2,3) and has dimensions of (1,1).

In at least one embodiment, thread blocks of block clusters 506 of compute unit 502 are used to execute a software kernel such those described. In at least one embodiment, for example, thread blocks of block clusters 506 of compute unit 402 are used to execute a software kernel when processor 102 launches kernel 106 using block cluster 112, as described herein at least in connection with FIG. 1. In at least one embodiment, threads, thread blocks, block clusters, and compute units (also referred to herein as grids) are organized and/or indexed as illustrated in FIG. 5. In at least one embodiment, threads, thread blocks, block clusters, and compute units (also referred to herein as grids) are organized and/or indexed using some other method including, but not limited to, one or more dynamic methods that may be used to determine dimensions, indices, and/or identifiers of threads, thread blocks, block clusters, and/or compute units based, at least in part, on GPU architecture, number of compute units of a GPU, number of cores of a GPU, etc. In at least one embodiment, dimensions, indices, and/or identifiers of threads, thread blocks, block clusters, and/or compute units are referred to as properties of a group of blocks of threads.

In at least one embodiment, block clusters such as those illustrated in FIG. 5 execute on different compute units (not illustrated in FIG. 5) so that, for example, block cluster 508 executes on a first compute unit, block cluster 510 executes on a second compute unit, block cluster 512 executes on a third compute unit, etc. In at least one embodiment, one or more block clusters execute on a single compute unit and a plurality of block clusters execute on a plurality of compute units. In at least one embodiment, as described herein, thread blocks if a block cluster (e.g., block cluster 508) are organized logically so that, for example, thread block (1,1) executes on a first compute unit, thread block (1,2) executes on a second compute unit, etc.

In at least one embodiment, a block cluster is a group of thread blocks within a higher level of a hierarchy that organizes threads, where a group of thread blocks can be an organizational construct that comprises one or more thread blocks. In at least one embodiment, a block cluster (which may also be referred to in other ways, such as a cluster) is a subset of a grid of thread blocks. In at least one embodiment, a block cluster is a partition of a partitioning of a set of thread blocks, such as a partitioning of a grid of thread blocks or a partitioning of a set of thread blocks that comprise a software kernel. In at least one embodiment, a block cluster is a subset of a set of thread blocks (e.g., of a grid or of a software kernel), where a set is organized into subsets of thread blocks and where subsets can overlap (e.g., have one or more thread blocks that are common to a plurality of subsets) or where subsets are disjoint (e.g., have no thread block that is a member of multiple subsets). In at least one embodiment, application programming interfaces (APIs), such as described below and elsewhere herein, which may be CUDA APIs, OneAPI APIs, HIP APIs and/or other APIs such as described herein, are callable to obtain information about and otherwise manage block clusters and other hierarchical groupings of threads, such as grids, thread blocks, warps, and other groupings of threads. In at least one embodiment, one or more APIs such as those described herein are used to manage one or more portions of a block cluster, using systems and methods such as those described herein. In at least one embodiment, as used herein, an application programming interface is referred to as an API.

FIG. 6 illustrates an example process 600 to launch software kernels using block clusters, in accordance with at least one embodiment. In at least one embodiment, a processor such as processor 102 (e.g., a CPU), described herein at least in connection with FIG. 1, executes or otherwise performs one or more commands to perform example process 600. In at least one embodiment, a graphics processor such as graphics processor 108, described herein at least in connection with FIG. 1, executes or otherwise performs one or more commands to perform example process 600. In at least one embodiment, a processor such as one or more of those described herein, executes or otherwise performs one or more commands to perform example process 600.

In at least one embodiment, at step 602 of example process 600, a processor performing example process 600 receives a kernel specification. In at least one embodiment, a kernel specification received at step 602 is an argument of an API such as those described herein. In at least one embodiment, at step 602, a kernel specification received at step 602 may be used to generate and/or launch a software kernel, as described herein. In at least one embodiment, at step 602, a kernel specification received at step 602 may be used to generate and/or launch a software kernel using one or more block clusters, as described herein. In at least one embodiment, after step 602, example process 600 advances to step 604.

In at least one embodiment, at step 604 of example process 600, a processor performing example process 600 receives cluster parameters. In at least one embodiment, a cluster parameters received at step 604 are arguments of an API such as those described herein. In at least one embodiment, at step 604, cluster parameters received are cluster parameters that describe one or more aspects of a block cluster including, but not limited to, size of one or more block clusters, shape of one or more block clusters, scheduling policies, execution priorities, memory management techniques, synchronization methods, and/or other cluster parameters such as those described herein. In at least one embodiment, at step 604, cluster parameters are received using one or more application programming interfaces (APIs) such as those described herein. In at least one embodiment, after step 604, example process 600 advances to step 606.

In at least one embodiment, at step 606 of example process 600, a processor performing example process 600 sets one or more known cluster parameters. In at least one embodiment, at step 606, a processor performing example process 600 sets one or more known cluster parameters as a result of execution of an API such as those described herein. In at least one embodiment, at step 606, a processor performing example process 600 sets one or more known cluster parameters by altering one or more values in a data structure used to store cluster parameters of block clusters. In at least one embodiment, at step 606 a processor performing example process 600 sets one or more known cluster parameters by calculating parameters, reading parameters from memory, deriving parameters, and/or storing parameters, as described herein. In at least one embodiment, at step 606, a processor performing example process 600 sets one or more default values of cluster parameters where cluster parameters received at step 604 do not include parameters and/or where default values are specified to indicate missing parameters. In at least one embodiment, at step 606, for example, a block cluster may have a default size that may be used in an embodiment where one or more known cluster parameters received at step 606 does not include a size parameter. In at least one embodiment, after step 606, example process 600 advances to step 608.

In at least one embodiment, at step 608 of example process 600, a processor performing example process 600 determines whether other parameters are needed to complete a specification of a block cluster. In at least one embodiment, at step 608, some parameters received at step 606 may not be specified and, accordingly, other parameters may be needed to complete a specification of a block cluster. In at least one embodiment, at step 608, if a processor performing example process 600 determines that other parameters are needed to complete a specification of a block cluster ("YES" branch) example process 600 advances to step 610. In at least one embodiment, at step 608, if a processor performing example process 600 determines that other parameters are not needed to complete a specification of a block cluster ("NO" branch) example process 600 advances to step 612.

In at least one embodiment, at step 610 of example process 600, a processor performing example process 600 sets one or more other cluster parameters are set (e.g., parameters not set at step 606), using systems and methods such as those described herein. In at least one embodiment, at step 610, a processor performing example process 600 sets one or more other cluster parameters using default parameters, as described herein. In at least one embodiment, at step 610, a processor performing example process 600 derives one or more other cluster parameters from existing parameters. In at least one embodiment, for example, if dimension parameters are received at step 604 (e.g., a dimension of X, Y, Z, as described herein), at step 610, a size parameter (e.g., X times Y time Z) is derived from dimensions. In at least one embodiment, after step 610, example process 600 advances to step 612.

In at least one embodiment, at step 612 of example process 600, a processor performing example process 600 sets one or more cluster attributes, using systems and methods such as those described herein. In at least one embodiment, at step 612, a processor performing example process 600 sets one or more cluster attributes using one or more APIs, such as described herein. In at least one embodiment, at step 612, a processor performing example process

600 sets one or more cluster attributes using one or more compile-time APIs, as described herein. In at least one embodiment, at step 612, a processor performing example process 600 sets one or more cluster attributes using one or more launch-time APIs, as described herein. In at least one embodiment, at step 612, a processor performing example process 600 sets one or more cluster attributes using one or more run-time APIs, as described herein. In at least one embodiment, after step 612, example process 600 advances to step 614.

In at least one embodiment, at step 614 of example process 600, a processor performing example process 600 determines whether one or more cluster attributes have been set. In at least one embodiment, at step 614, if it is determined that one or more cluster attributes have not been set ("NO" branch) example process 600 advances to step 616. In at least one embodiment, at step 614, if it is determined that one or more cluster attributes have been set ("YES" branch) example process 600 advances to step 618.

In at least one embodiment, at step 616 of example process 600, a processor performing example process 600 returns an error. In at least one embodiment, a processor performing example process 600 returns an error as a result of determining that one or more cluster attributes have not been set (e.g., at step 614). In at least one embodiment, at step 616, a processor performing example process 600 returns an error to a calling process such as those described herein. In at least one embodiment, after step 616, example process 600 terminates. In at least one embodiment, not shown in FIG. 6, after step 616, example process 600 continues at step 602 to receive another kernel specification.

In at least one embodiment, at step 620 of example process 600, a processor performing example process 600 returns an indicator of success. In at least one embodiment, a processor performing example process 600 returns an indicator of success as a result of determining that one or more cluster attributes have been set (e.g., at step 614) and after launching a kernel using a cluster (e.g., at step 618). In at least one embodiment, at step 620, an indicator of success is returned to a calling process such as those described herein. In at least one embodiment, after step 620, example process 600 terminates. In at least one embodiment, not shown in FIG. 6, after step 620, example process 600 continues at step 602 to receive another kernel specification.

In at least one embodiment, at step 620 of example process 600, a processor performing example process 600 returns an indicator of success. In at least one embodiment, a processor performing example process 600 returns an indicator of success as a result of determining that one or more cluster attributes have been set (e.g., at step 614) and after launching a kernel using a cluster (e.g., at step 618). In at least one embodiment, at step 620, an indicator of success is returned to a calling process such as those described herein. In at least one embodiment, after step 620, example process 600 terminates. In at least one embodiment, not shown in FIG. 6, after step 620, example process 600 continues at step 602 to receive another kernel specification.

In at least one embodiment, operations of example process 600 are performed in a different order than is illustrated in FIG. 6. In at least one embodiment, operations of example process 600 are performed simultaneously or in parallel. In at least one embodiment, for example, operations that do not depend on each other (e.g., are order independent) are performed simultaneously or in parallel. In at least one embodiment, operations of example process 600 are performed by a plurality of threads executing on a processor such as those described herein.

FIG. 7 illustrates an example diagram 700 where sizes and dimensions of block clusters are shown, in accordance with at least one embodiment. In at least one embodiment, an operation to set block cluster size 702 is performed as described herein (e.g., using set block cluster dimension API 802, described herein at least in connection with FIG. 8). In at least one embodiment, set block cluster size 702 specifies a block cluster size (e.g., 8). In at least one embodiment, set block cluster size 702 specifies one or more block cluster dimensions (e.g., (2,2,2) or (2,4,1), or (4,2,1), or (8,1,1)), or some other such dimensions. In at least one embodiment, set block cluster size 702 specifies size but not dimension. In at least one embodiment, set block cluster size 702 specifies dimension but not size. In at least one embodiment, dimensions are computed from size. In at least one embodiment, size is computed from dimensions.

In at least one embodiment, a block cluster 704 with eight blocks that has dimensions (2,2,2) is created. In at least one embodiment, a block cluster 706 with eight blocks that has dimensions (2,4,1) is created. In at least one embodiment, a block cluster 708 with eight blocks that has dimensions (8,1,1) is created. In at least one embodiment, a block cluster that has two dimensions is created (e.g., (2,4) or (8,1)). In at least one embodiment, a block cluster that has one dimension is created (e.g., (8)). In at least one embodiment, a block cluster that has four (or more) dimensions is created (e.g., (2,1,2,2), (2,1,2,1,2), etc.).

FIG. 8 illustrates an example application programming interface 800 to indicate dimensions of a block cluster, in accordance with at least one embodiment. In at least one embodiment, example application programming interface 800 for indicating dimensions of a block cluster is a set block cluster dimension API 802. In at least one embodiment, an API such as set block cluster dimension API 802 is performed by a processor, such as those described herein. In at least one embodiment, an API such as set block cluster dimension API 802 is performed as one or more steps of a computer-implemented method, as described herein. In at least one embodiment, an API such as set block cluster dimension API 802 is performed by one or more processors of a computer system, as described herein. In at least one embodiment, an API such as set block cluster dimension API 802 is stored as instructions on a machine-readable medium, which can be performed using one or more processors, as described herein. In at least one embodiment, an API such as set block cluster dimension API 802, when performed, is to indicate two or more blocks of threads to be scheduled in parallel.

In at least one embodiment, set block cluster dimension API 802 is an API to indicate two or more blocks of threads to be scheduled in parallel. In at least one embodiment, set block cluster dimension API 802 is an API to indicate one or more dimensions of one or more clusters of one or more groups of instructions. In at least one embodiment, set block cluster dimension API 802 is an API to set sizes and/or dimensions of block clusters as described herein at least in connection with FIG. 7. In at least one embodiment, set block cluster dimension API 802 receives one or more parameters including, but not limited to, a dimension attribute 804, a dimension value 806, and a kernel identifier 808. In at least one embodiment, set block cluster dimension API 802 returns a return value 818.

In at least one embodiment, dimension attribute 804 of set block cluster dimension API 802 is an attribute that indicates that set block cluster dimension API 802 is setting a dimension value 806. In at least one embodiment, for example, dimension attribute 804 may be a three-dimensional attribute and dimension value 806 may be three values (e.g., one value corresponding to each of three dimensions). In at least one embodiment, kernel identifier 808 is an identifier of a kernel that will be launched using a block cluster of dimensions specified in set block cluster dimension API 802 using systems and methods such as those described herein.

In at least one embodiment, not shown in FIG. 8, set block cluster dimension API 802 receives one or more additional parameters and/or of flags that specify how dimension attribute 804, dimension value 806, and/or kernel identifier 808 will be used to indicate dimensions of a block cluster. In at least one embodiment, when additional parameters and/or of flags that specify how dimension attribute 804, dimension value 806, and/or kernel identifier 808 will be used to indicate dimensions of a block cluster are not received, one or more default parameters and/or flags may be used by set block cluster dimension API 802 to obtain dimensions of a block cluster, using systems and methods such as those described herein.

In at least one embodiment, set block cluster dimension API 802 causes a processor such as those described herein to execute one or more commands to verify block cluster dimension attributes and attribute values 810 and set block cluster dimensions of a kernel 812, as identified by kernel identifier 808. In at least one embodiment, set block cluster dimension API 802 causes a processor such as those described herein to execute one or more commands to launch a kernel 814 using a block cluster as described herein. In at least one embodiment, not shown in FIG. 8, one or more commands to launch a kernel 814 are executed at a different time and/or by a different API.

In at least one embodiment, set block cluster dimension API 802 returns success or failure 816 using return value 818. In at least one embodiment, set block cluster dimension API 802 returns success using return value 818 when set block cluster dimension API 802 sets block cluster dimension attributes of a kernel, as described herein. In at least one embodiment, set block cluster dimension API 802 returns failure using return value 818 when set block cluster dimension API 802 does not set block cluster dimension attributes of a kernel, as described herein.

In at least one embodiment, set block cluster dimension API 802 returns success or failure 816 using return value 818 to a calling process such as example process 600 described herein at least in connection with FIG. 6. In at least one embodiment, set block cluster dimension API 802 returns success or failure 816 using return value 818 to a calling process using integer value, or using a Boolean value, or using an enumerated value, or using a flag, or using a signal, or using a semaphore, or using an event, or using a combination of these and/or other such return value types including, but not limited to, those described herein.

Figure 9:
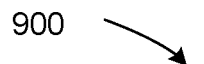
FIG. 9 illustrates an example application programming interface to obtain dimensions of a block cluster, in accor-dance with at least one embodiment.

FIG. 9 illustrates an example application programming interface 900 to obtain dimensions of a block cluster, in accordance with at least one embodiment. In at least one embodiment, example application programming interface 900 to obtain dimensions of a block cluster is a get cluster dimension API 902. In at least one embodiment, an API such as get cluster dimension API 902 is performed by a processor, such as those described herein. In at least one embodiment, an API such as get cluster dimension API 902 is performed as one or more steps of a computer-implemented method, as described herein. In at least one embodiment, an API such as get cluster dimension API 902 is performed by one or more processors of a computer system, as described herein. In at least one embodiment, an API such as get cluster dimension API 902 is stored as instructions on a machine-readable medium, which can be performed using one or more processors, as described herein. In at least one embodiment, an API such as get cluster dimension API 902, when performed, is to determine which of two or more blocks of threads to be scheduled in parallel.

In at least one embodiment, get cluster dimension API 902 is an API to determine which of two or more blocks of threads to be scheduled in parallel. In at least one embodiment, get cluster dimension API 902 is an API to obtain one or more dimensions of a one or more clusters of one or more groups of instructions. In at least one embodiment, get cluster dimension API 902 is an API to is an API to get sizes and/or dimensions of block clusters as described herein at least in connection with FIG. 7. In at least one embodiment, get cluster dimension API 902 receives one or more parameters including, but not limited to, a cluster identifier 904. In at least one embodiment, get cluster dimension API 902 returns a return value 912.

In at least one embodiment, cluster identifier 904 of get cluster dimension API 902 is an identifier used to identify a cluster using systems and methods such as those described herein. In at least one embodiment, for example, cluster identifier 904 is an indexed value of a cluster that is based on a total number of clusters of a compute unit. In at least one embodiment, cluster identifier 904 is a location of a cluster within a group of clusters.

In at least one embodiment, not shown in FIG. 9, get cluster dimension API 902 receives one or more additional parameters and/or of flags that specify how cluster identifier 904 will be used to obtain dimensions of a block cluster. In at least one embodiment, when additional parameters and/or of flags that specify how cluster identifier 904 will be used to obtain dimensions of a block cluster are not received, one or more default parameters and/or flags may be used by get cluster dimension API 902 to obtain dimensions of a block cluster, using systems and methods such as those described herein.

In at least one embodiment, get cluster dimension API 902 causes a processor such as those described herein to execute one or more commands to determine 906 whether dimensions of a cluster are set, as described herein. In at least one embodiment, if it is determined that dimensions are not set ("NO" branch), a default return value 908 may be returned (e.g., (0,0,0)). In at least one embodiment, if it is determined that dimensions are set ("YES" branch), dimensions of a cluster are returned 910. In at least one embodiment, get cluster dimension API 902 returns dimensions or default values using return value 912.

In at least one embodiment, get cluster dimension API 902 returns dimensions or default values using return value 912 to a calling process such as example process 600 described herein at least in connection with FIG. 6. In at least one embodiment, get cluster dimension API 902 returns dimensions or default values using return value 912 to a calling process using integer value, or using a Boolean value, or using an enumerated value, or using a flag, or using a signal, or using a semaphore, or using an event, or using a combination of these and/or other such return value types including, but not limited to, those described herein.

Figure 10:
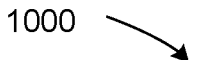
FIG. 10 illustrates an example diagram where a spread scheduling policy of block clusters is shown, in accordance with at least one embodiment.

FIG. 10 illustrates an example diagram 1000 where a spread scheduling policy of block clusters is shown, in accordance with at least one embodiment. In at least one embodiment, a block cluster 1002 with a spread scheduling policy 1004 causes thread blocks to be distributed to multiple compute units, for example, as many compute units as possible. In at least one embodiment, spread scheduling policy 1004 is set using set scheduling policy API 1202, described herein at least in connection with FIG. 12. In at least one embodiment, for example, block cluster 1002 with spread scheduling policy 1004 distributes four thread blocks to four compute units (e.g., thread block 1006 to compute unit 1014, thread block 1008 to compute unit 1016, thread block 1010 to compute unit 1018, and thread block 1012 to compute unit 1020). In at least one embodiment, a scheduling policy such as spread scheduling policy 1004 is a preferred scheduling policy so that, for example, when thread blocks are distributed to compute units, a scheduling policy may be satisfied or may be violated (e.g., multiple thread blocks may be distributed to a single compute unit). In at least one embodiment, a scheduling policy such as spread scheduling policy 1004 is a default scheduling policy.

Figure 11:
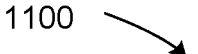
FIG. 11 illustrates an example diagram where a balance scheduling policy of block clusters is shown, in accordance with at least one embodiment.

FIG. 11 illustrates an example diagram 1100 where a balance scheduling policy of block clusters is shown, in accordance with at least one embodiment. In at least one embodiment, a block cluster 1102 with a balance scheduling policy 1104 causes thread blocks to be balanced among available compute units so that work loading is evenly distributed between compute units. In at least one embodiment, balance scheduling policy 1104 is set using set scheduling policy API 1202, described herein at least in connection with FIG. 12. In at least one embodiment, for example, thread block 1106 is distributed to compute unit 1114, where compute unit 1114 has thread block 1122 (e.g., from a different block cluster, not shown in FIG. 11), thread block 1108 and thread block 1110 are distributed to compute unit 1116, which has no other thread blocks, thread block 1112 is distributed to compute unit 1120, which has no other thread blocks, and no thread blocks from block cluster 1102 are distributed to compute unit 1118, because compute unit 1118 already has thread block 1124 and thread block 1126 (e.g., from a different block cluster not shown in FIG. 11). In at least one embodiment, a scheduling policy such as balance scheduling policy 1104 is a preferred scheduling policy so that, for example, when thread blocks are distributed to compute units, a scheduling policy may be satisfied or may be violated (e.g., thread blocks may be distributed to compute unit in an unbalanced manner). In at least one embodiment, a scheduling policy such as balance scheduling policy 1104 is a default scheduling policy.

FIG. 12 illustrates an example application programming interface 1200 to indicate a scheduling policy of a block cluster, in accordance with at least one embodiment. In at least one embodiment, example application programming interface 1200 to indicate a scheduling policy of a block cluster is a set scheduling policy API 1202. In at least one embodiment, an API such as set scheduling policy API 1202 is performed by a processor, such as those described herein. In at least one embodiment, an API such as set scheduling policy API 1202 is performed as one or more steps of a computer-implemented method, as described herein. In at least one embodiment, an API such as set scheduling policy API 1202 is performed by one or more processors of a computer system, as described herein. In at least one embodiment, an API such as set scheduling policy API 1202 is stored as instructions on a machine-readable medium, which can be performed using one or more processors, as described herein. In at least one embodiment, an API such as set scheduling policy API 1202, when performed, is to cause a scheduling policy of one or more blocks of one or more threads to be performed.

In at least one embodiment, set scheduling policy API 1202 is an API comprising one or more parameters to cause a scheduling policy of one or more blocks of one or more threads to be performed. In at least one embodiment, set scheduling policy API 1202 is an API to indicate a scheduling policy of one or more clusters of one or more groups of instructions. In at least one embodiment, set scheduling policy API 1202 is an API to set a scheduling policy such as spread scheduling policy 1004, described herein at least in connection with FIG. 10. In at least one embodiment, set scheduling policy API 1202 is an API to set a scheduling policy such as balance scheduling policy 1104, described herein at least in connection with FIG. 11. In at least one embodiment, set scheduling policy API 1202 receives one or more parameters including, but not limited to, a scheduling policy attribute 1204, a scheduling policy value 1206, and/or a kernel identifier 1208. In at least one embodiment, set scheduling policy API 1202 returns a return value 1218.

In at least one embodiment, scheduling policy attribute 1204 of set scheduling policy API 1202 is an attribute that indicates that set scheduling policy API 1202 is setting a scheduling policy value 1206 of a block cluster. In at least one embodiment, scheduling policy value 1206 is a spread scheduling policy, as described herein. In at least one embodiment, scheduling policy value 1206 is a balance scheduling policy, as described herein. In at least one embodiment, scheduling policy value 1206 is a default scheduling policy, as described herein. In at least one embodiment, kernel identifier 1208 is an identifier of a kernel that will be launched using a block cluster with a scheduling policy specified using set scheduling policy 1202, using systems and methods such as those described herein.

In at least one embodiment, not shown in FIG. 12, set scheduling policy API 1202 receives one or more additional parameters and/or of flags that specify how scheduling policy attribute 1204, scheduling policy value 1206, and/or kernel identifier 1208 will be used to indicate a scheduling policy of a block cluster. In at least one embodiment, when additional parameters and/or of flags that specify how scheduling policy attribute 1204, scheduling policy value 1206, and/or kernel identifier 1208 will be used to indicate a scheduling policy of a block cluster are not received, a default set of parameters and/or flags may be used by set scheduling policy API 1202 to indicate a scheduling policy of a block cluster, using systems and methods such as those described herein.

In at least one embodiment, set scheduling policy API 1202 causes a processor such as those described herein to execute one or more commands to verify block cluster scheduling policy attributes and attribute values 1210 and set block cluster scheduling policies of a kernel 1212, as identified by kernel identifier 1208. In at least one embodiment, set scheduling policy API 1202 causes a processor such as those described herein to execute one or more commands to launch a kernel 1214 using a block cluster as described herein. In at least one embodiment, not shown in FIG. 12, one or more commands to launch a kernel 1214 are executed at a different time and/or by a different API.

In at least one embodiment, set scheduling policy API 1202 returns success of failure 1216 using return value 1218. In at least one embodiment, set scheduling policy API 1202 returns success using return value 1218 when set scheduling policy API 1202 sets a block cluster scheduling policy successfully, as described herein. In at least one embodiment, set scheduling policy API 1202 returns failure using return value 1218 when set scheduling policy API 1202 does not set a block cluster scheduling policy successfully, as described herein.

In at least one embodiment, set scheduling policy API 1202 returns success or failure 1216 using return value 1218 to a calling process such as example process 600 described herein at least in connection with FIG. 6. In at least one embodiment, set scheduling policy API 1202 returns success or failure 1216 using return value 1218 to a calling process using integer value, or using a Boolean value, or using an enumerated value, or using a flag, or using a signal, or using a semaphore, or using an event, or using a combination of these and/or other such return value types including, but not limited to, those described herein.

Figure 13:
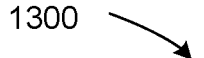
FIG. 13 illustrates an example application programming interface to obtain a scheduling policy of a block cluster, in accordance with at least one embodiment.

FIG. 13 illustrates an example application programming interface 1300 to obtain a scheduling policy of a block cluster, in accordance with at least one embodiment In at least one embodiment, example application programming interface 1300 to obtain a scheduling policy of a block cluster is a get scheduling policy API 1302. In at least one embodiment, an API such as get scheduling policy API 1302 is performed by a processor, such as those described herein. In at least one embodiment, an API such as get scheduling policy API 1302 is performed as one or more steps of a computer-implemented method, as described herein. In at least one embodiment, an API such as get scheduling policy API 1302 is performed by one or more processors of a computer system, as described herein. In at least one embodiment, an API such as get scheduling policy API 1302 is stored as instructions on a machine-readable medium, which can be performed using one or more processors, as described herein. In at least one embodiment, an API such as get scheduling policy API 1302, when performed, is to indicate a scheduling policy of one or more blocks of one or more threads.

In at least one embodiment, get scheduling policy API 1302 is an API comprising one or more parameters to indicate a scheduling policy of one or more blocks of one or more threads. In at least one embodiment, get scheduling policy API 1302 is an API to obtain a scheduling policy of one or more clusters of one or more groups of instructions. In at least one embodiment, get scheduling policy API 1302 is an API to is an API to get a scheduling policy such as spread scheduling policy 1004, described herein at least in connection with FIG. 10. In at least one embodiment, get scheduling policy API 1302 is an API to is an API to get a scheduling policy such as balance scheduling policy 1104, described herein at least in connection with FIG. 11. In at least one embodiment, get scheduling policy API 1302 receives one or more parameters including, but not limited to, a cluster identifier 1304. In at least one embodiment, get scheduling policy API 1302 returns a return value 1312.

In at least one embodiment, cluster identifier 1304 of get scheduling policy API 1302 is an identifier used to identify a cluster using systems and methods such as those described herein. In at least one embodiment, for example, cluster identifier 1304 is an indexed value of a cluster that is based on a total number of clusters of a compute unit. In at least one embodiment, cluster identifier 1304 is a location of a cluster within a group of clusters.

In at least one embodiment, not shown in FIG. 13, get scheduling policy API 1302 receives one or more additional parameters and/or of flags that specify how cluster identifier 1304 will be used to obtain a scheduling policy of a block cluster. In at least one embodiment, when additional parameters and/or of flags that specify how cluster identifier 1304 will be used to obtain a scheduling policy of a block cluster are not received, one or more default parameters and/or flags may be used by get scheduling policy API 1302 to obtain a scheduling policy of a block cluster, using systems and methods such as those described herein.

In at least one embodiment, get scheduling policy API 1302 causes a processor such as those described herein to execute one or more commands to determine 1306 whether a scheduling policy of a cluster is set. In at least one embodiment, if it is determined that a scheduling policy is not set ("NO" branch), a default return value 1308 may be returned (e.g., a spread scheduling policy). In at least one embodiment, if it is determined that a scheduling policy is set ("YES" branch), a scheduling policy of cluster is returned. In at least one embodiment, get scheduling policy API 1302 returns a scheduling policy 1310 using return value 1312.

In at least one embodiment, get scheduling policy API 1302 returns a scheduling policy 1310 using return value 1312 to a calling process such as example process 600 described herein at least in connection with FIG. 6. In at least one embodiment, get scheduling policy API 1302 returns a scheduling policy 1310 using return value 1312 to a calling process using integer value, or using a Boolean value, or using an enumerated value, or using a flag, or using a signal, or using a semaphore, or using an event, or using a combination of these and/or other such return value types including, but not limited to, those described herein.

FIG. 14 illustrates an example computer system 1400 where a maximum number of clusters supported by hardware is obtained, in accordance with at least one embodiment. In at least one embodiment, a processor 1402 (which is a processor such as processor 102, described herein at least in connection with FIG. 1), executes or otherwise performs one or more commands to request a number of clusters supported 1404 that can be used to execute a kernel, as described herein. In at least one embodiment, processor 1402 executes or otherwise performs one or more commands to request a number of clusters supported 1404 that can be used to execute a kernel based, at least in part, on a configuration (not shown in FIG. 14). In at least one embodiment, processor 1402 executes or otherwise performs one or more commands to request a number of clusters supported 1404 that can be used to execute a kernel based using number of blocks supported API 1502, described herein at least in connection with FIG. 15.

In at least one embodiment, a graphics processor 1406 (which is a graphics processor such as graphics processor 108, described herein at least in connection with FIG. 1), determines a maximum number of clusters 1408 that can be used to execute a kernel. In at least one embodiment, graphics processor 1406 determines a maximum number of clusters 1408 that can be used to execute a kernel based at least on kernel parameters, a kernel configuration, hardware capabilities of graphics processor 1406, available resources, and/or other such factors. In at least one embodiment, graphics processor 1406 returns a determined maximum number of clusters 1410 to processor 1402 using methods such as those described herein.

In at least one embodiment, not illustrated in FIG. 14, a processor such as processor 1402 determines information such as, for example, a maximum number of clusters supported by hardware, without executing or otherwise performing one or more commands to request a number of clusters supported 1404 that can be used to execute a kernel. In such an embodiment, processor 1402 may store information such as maximum number of clusters 1408 in memory associated with processor 1402.

FIG. 15 illustrates an example application programming interface 1500 to obtain a maximum number of clusters supported by hardware, in accordance with at least one embodiment. In at least one embodiment, example application programming interface 1500 to obtain a maximum number of clusters supported by hardware is a number of blocks supported API 1502. In at least one embodiment, an API such as number of blocks supported API 1502 is performed by a processor, such as those described herein. In at least one embodiment, an API such as number of blocks supported API 1502 is performed as one or more steps of a computer-implemented method, as described herein. In at least one embodiment, an API such as number of blocks supported API 1502 is performed by one or more processors of a computer system, as described herein. In at least one embodiment, an API such as number of blocks supported API 1502 is stored as instructions on a machine-readable medium, which can be performed using one or more processors, as described herein. In at least one embodiment, an API such as number of blocks supported API 1502, when performed, is to indicate a maximum number of blocks of threads capable of being scheduled in parallel.

In at least one embodiment, number of blocks supported API 1502 is an API to indicate a maximum number of blocks of threads capable of being scheduled in parallel. In at least one embodiment, number of blocks supported API 1502 is an API to obtain a limit of a number of allowable clusters of one or more groups of instructions. In at least one embodiment, number of blocks supported API 1502 is an API to request a maximum number of clusters supported 1404, as described herein at least in connection with FIG. 14. In at least one embodiment, number of blocks supported API 1502 receives one or more parameters including, but not limited to, a stored number of clusters 1504, a kernel 1506, and/or a launch configuration 1508. In at least one embodiment, number of blocks supported API 1502 returns a return value 1516.

In at least one embodiment, stored number of clusters 1504 is a location that is used by get of number of blocks supported API 1502 to return a number of clusters supported by hardware. In at least one embodiment, kernel 1506 is a kernel that will be executed by graphics hardware using systems and methods such as those described herein. In at least one embodiment, launch configuration 1508 includes one or more parameters such as those described herein that may be used to launch kernel 1506 using block clusters, as described herein.

In at least one embodiment, not shown in FIG. 15, number of blocks supported API 1502 receives one or more additional parameters and/or of flags that specify how kernel 1506 and/or launch configuration 1508 will be used to obtain a maximum number of clusters supported by hardware. In at least one embodiment, when additional parameters and/or of flags that specify how kernel 1506 and/or launch configuration 1508 will be used to obtain a maximum number of clusters supported by hardware are not received, one or more default parameters and/or flags may be used by number of blocks supported API 1502 to obtain a maximum number of clusters supported by hardware, using systems and methods such as those described herein.

In at least one embodiment, number of blocks supported API 1502 causes a processor such as those described herein to execute one or more commands to determine number of clusters 1510 using systems and methods such as those described herein at least in connection with FIG. 14 and stores a determined value 1512 in stored number of clusters 1504. In at least one embodiment, number of blocks supported API 1502 returns success or failure 1514 using return value 1516. In at least one embodiment, number of blocks supported API 1502 returns success using return value 1516 when a number of clusters is determined. In at least one embodiment, number of blocks supported API 1502 returns failure using return value 1516 when a number of clusters is not determined or when a sufficient number of clusters is not available.

In at least one embodiment, number of blocks supported API 1502 returns success or failure 1514 using return value 1516 to a calling process such as example process 600 described herein at least in connection with FIG. 6. In at least one embodiment, number of blocks supported API 1502 returns success or failure 1514 using return value 1516 to a calling process using integer value, or using a Boolean value, or using an enumerated value, or using a flag, or using a signal, or using a semaphore, or using an event, or using a combination of these and/or other such return value types including, but not limited to, those described herein.

Figure 16:
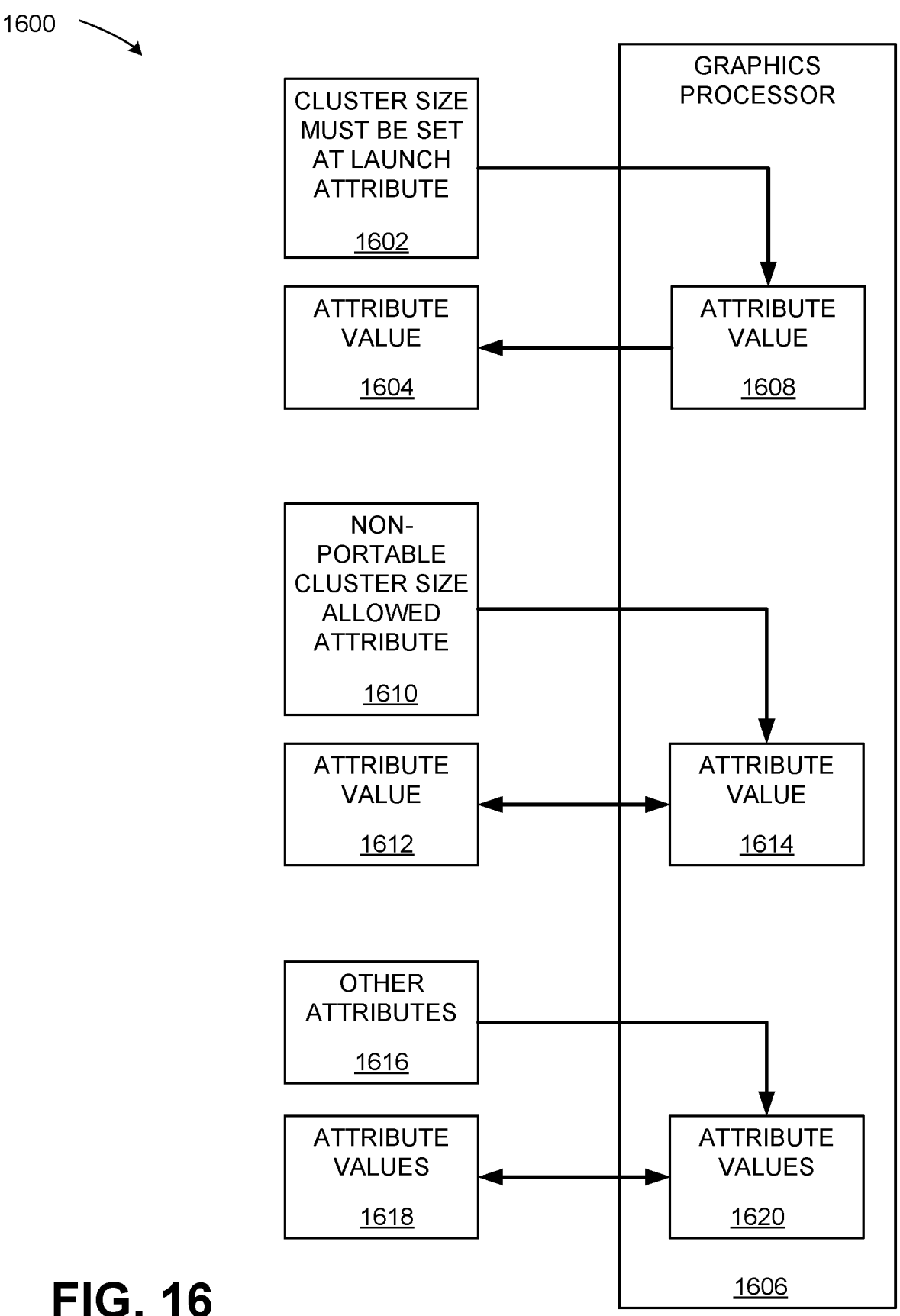
FIG. 16 illustrates an example diagram where block cluster attributes are indicated and obtained, in accordance with at least one embodiment.

FIG. 16 illustrates an example diagram 1600 where block cluster attributes are indicated and obtained, in accordance with at least one embodiment. In at least one embodiment, a cluster size must be set at launch attribute 1602 is used to determine whether a cluster size must be sent at launch of a cluster. In at least one embodiment, cluster size must be set at launch attribute 1602 is used by indicate cluster parameters API 1702, described herein at least in connection with FIG. 17, to determine whether a cluster size must be sent at launch of a cluster. In at least one embodiment, cluster size must be set at launch attribute 1602 that is false indicates that a block cluster such as those described herein can be launched without a set cluster size and, in such an embodiment, a block cluster can be launched without a set cluster size. In at least one embodiment, cluster size must be set at launch attribute 1602 that is true indicates that a block cluster such as those described herein cannot be launched without a set cluster size and, in such an embodiment, a block cluster cannot be launched without a set cluster size. In at least one embodiment, a graphics processor 1606 (which is a graphics processor such as graphics processor 108, described herein at least in connection with FIG. 1) determines an attribute value 1608 of a cluster size must be set at launch attribute 1602 and returns an attribute value 1604 to a calling thread or process (e.g., a calling thread or process that performs indicate cluster parameters API 1702, described herein at least in connection with FIG. 17). In at least one embodiment, as illustrated in FIG. 16, cluster size must be set at launch attribute 1602 is read-only (e.g., cannot be set by a calling process). In at least one embodiment, not illustrated in FIG. 16, cluster size must be set at launch attribute 1602 is writable (e.g., can be set by a calling process).

In at least one embodiment, a non-portable cluster size allowed attribute 1610 is used to determine whether a non-portable (e.g., not forward compatible) cluster size can be used to launch of a cluster. In at least one embodiment, non-portable cluster size allowed attribute 1610 is used by indicate cluster parameters API 1702, described herein at least in connection with FIG. 17, to determine whether a non-portable (e.g., not forward compatible) cluster size can be used to launch of a cluster. In at least one embodiment, a non-portable cluster size is a cluster size that may not be supported in other hardware configurations of graphics processor 1606 but is supported by a current hardware configuration of graphics processor 1606. In at least one embodiment, non-portable cluster size allowed attribute 1610 that is true indicates that a block cluster such as those described herein can be launched with a non-portable cluster size and, in such an embodiment, a block cluster can be launched with a non-portable cluster size. In at least one embodiment, non-portable cluster size allowed attribute

1610 that is false indicates that a block cluster such as those described herein cannot be launched with a non-portable cluster size and, in such an embodiment, a block cluster cannot be launched with a non-portable cluster size. In at least one embodiment, a graphics processor 1606 determines an attribute value 1614 of a non-portable cluster size allowed attribute 1610 and returns an attribute value 1612 to a calling thread or process (e.g., a calling thread or process that performs indicate cluster parameters API 1702, described herein at least in connection with FIG. 17). In at least one embodiment, as illustrated in FIG. 16, non-portable cluster size allowed attribute 1610 is read-write (e.g., can be set by a calling process). In at least one embodiment, not illustrated in FIG. 16, non-portable cluster size allowed attribute 1610 is read-only (e.g., cannot be set by a calling process).

In at least one embodiment, one or more other attributes 1616 of a block cluster can be indicated and/or obtained including, but not limited, those described herein such as, for example, cluster size, cluster dimension, cluster scheduling policies, etc. In at least one embodiment, one or more other attributes 1616 of a block cluster are used by indicate cluster parameters API 1702, described herein at least in connection with FIG. 17, to determine one or more other attributes of a cluster. In at least one embodiment, graphics processor 1606 determined attribute values 1620 of one or more other attributes 1616 and returns one or more attribute values 1618 to a calling process. In at least one embodiment, at least one of one or more other attributes 1616 is read-write (e.g., can be set by a calling process). In at least one embodiment, at least one of one or more other attributes 1616 is read-only (e.g., cannot be set by a calling process).

Figure 17:
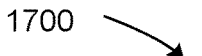
FIG. 17 illustrates an example application programming interface to indicate and obtain attributes of block clusters, in accordance with at least one embodiment.

FIG. 17 illustrates an example application programming interface 1700 to indicate and obtain attributes of block clusters, in accordance with at least one embodiment. In at least one embodiment, example application programming interface 1700 to indicate and obtain attributes of block clusters is an indicate cluster parameters API 1702. In at least one embodiment, an API such as indicate cluster parameters API 1702 is performed by a processor, such as those described herein. In at least one embodiment, an API such as indicate cluster parameters API 1702 is performed as one or more steps of a computer-implemented method, as described herein. In at least one embodiment, an API such as indicate cluster parameters API 1702 is performed by one or more processors of a computer system, as described herein. In at least one embodiment, an API such as indicate cluster parameters API 1702 is stored as instructions on a machine-readable medium, which can be performed using one or more processors, as described herein. In at least one embodiment, an API such as indicate cluster parameters API 1702, when performed, is to indicate one or more attributes of one or more groups of blocks of one or more threads.

In at least one embodiment, indicate cluster parameters API 1702 is an API comprising one or more parameters to indicate one or more attributes of one or more groups of blocks of one or more threads. In at least one embodiment, indicate cluster parameters API 1702 is an API to obtain one or more attributes of one or more clusters of one or more groups of instructions. In at least one embodiment, indicate cluster parameters API 1702 is an API to get or set cluster attributes as described herein at least in connection with FIG. 16. In at least one embodiment, indicate cluster parameters API 1702 receives one or more parameters including, but not limited to, an attribute 1704, an attribute value 1706, and an indicator 1708 as to whether to set or get an attribute.

In at least one embodiment, indicate cluster parameters API 1702 returns return value 1728.

In at least one embodiment, attribute 1704 of indicate cluster parameters API 1702 is an attribute such as those described herein that indicates one or more parameters of one or more block clusters. In at least one embodiment, attribute value 1706 of indicate cluster parameters API 1702 is a value of attribute 1704. In at least one embodiment, indicator 1708 of indicate cluster parameters API 1702 is used to determine whether a value stored in attribute value 1706 is used to set an attribute 1704 or is used to store a value of an attribute 1704.

In at least one embodiment, not shown in FIG. 17, indicate cluster parameters API 1702 receives one or more additional parameters and/or of flags that specify how attribute 1704, attribute value 1706, and/or indicator 1708 will be used to indicate and/or obtain attributes of block clusters. In at least one embodiment, when additional parameters and/or of flags that specify how attribute 1704, attribute value 1706, and/or indicator 1708 will be used to indicate and/or obtain attributes of block clusters are not received, one or more default parameters and/or flags may be used by indicate cluster parameters API 1702 to indicate and/or obtain attributes of block clusters, using systems and methods such as those described herein.

In at least one embodiment, indicate cluster parameters API 1702 causes a processor such as those described herein to execute one or more commands to determine 1712 whether indicator 1708 is to get or to set a value of an attribute. In at least one embodiment, if it is determined that indicator 1708 is to get an attribute ("GET" branch), indicate cluster parameters API 1702 causes a processor such as those described herein to execute one or more commands to get an attribute 1714, store an attribute 1716 (e.g., using storage in attribute value 1706), and return success 1718 using return value 1728.

In at least one embodiment, if it is determined that indicator 1708 is to set an attribute ("SET" branch), indicate cluster parameters API 1702 causes a processor such as those described herein to execute one or more commands to determine 1720 whether an attribute is settable. In at least one embodiment, if it is determined that an attribute is not settable ("NO" branch), indicate cluster parameters API 1702 causes a processor such as those described herein to execute one or more commands to return failure 1722 using return value 1728. In at least one embodiment, if it is determined that an attribute is settable ("YES" branch), indicate cluster parameters API 1702 causes a processor such as those described herein to execute one or more commands to set an attribute 1724 using attribute value 1706 and to return success 1726 using return value 1728.

In at least one embodiment, indicate cluster parameters API 1702 returns success 1718, returns failure 1722, or returns success 1726 using return value 1728 to a calling process such as example process 600 described herein at least in connection with FIG. 6. In at least one embodiment, indicate cluster parameters API 1702 returns success 1718, returns failure 1722, or returns success 1726 using return value 1728 to a calling process using integer value, or using a Boolean value, or using an enumerated value, or using a flag, or using a signal, or using a semaphore, or using an event, or using a combination of these and/or other such return value types including, but not limited to, those described herein.

FIG. 18 illustrates an example computer system 1800 where a maximum cluster size that can be simultaneously performed is obtained, in accordance with at least one embodiment. In at least one embodiment, a processor 1802 (which is a processor such as processor 102, described herein at least in connection with FIG. 1), executes or otherwise performs one or more commands to request a maximum cluster size that can be supported by graphics hardware 1804, as described herein. In at least one embodiment, processor 1802 executes or otherwise performs one or more commands to request a maximum cluster size that can be supported by graphics hardware 1804 to execute a kernel based, at least in part, on a configuration (not shown in FIG. 18). In at least one embodiment, processor 1802 executes or otherwise performs one or more commands to request a maximum cluster size that can be concurrently executed by graphics hardware.

In at least one embodiment, a graphics processor 1806 (which is a graphics processor such as graphics processor 108, described herein at least in connection with FIG. 1), determines a maximum cluster size 1808 that can be used to execute a kernel. In at least one embodiment, graphics processor 1806 determines a maximum cluster size 1808 that can be used to execute a kernel based at least on kernel parameters, a kernel configuration, hardware capabilities of graphics processor 1806, available resources, and/or other such factors. In at least one embodiment, graphics processor 1806 returns a determined maximum cluster size 1810 to processor 1802 using methods such as those described herein.

In at least one embodiment, not illustrated in FIG. 18, a processor such as processor 1802 determines information such as, for example, a maximum cluster size that can be simultaneously performed, without executing or otherwise performing one or more commands to request a maximum cluster size that can be supported by graphics hardware 1804 to execute a kernel. In such an embodiment, processor 1802 may store information such as maximum cluster size 1808 in memory associated with processor 1802.

FIG. 19 illustrates an example application programming interface 1900 to obtain a maximum cluster size that can be simultaneously performed by hardware, in accordance with at least one embodiment. In at least one embodiment, example application programming interface 1900 to obtain a maximum cluster size that can be simultaneously performed by hardware is a maximum cluster size supported API 1902. In at least one embodiment, an API such as maximum cluster size supported API 1902 is performed by a processor, such as those described herein. In at least one embodiment, an API such as maximum cluster size supported API 1902 is performed as one or more steps of a computer-implemented method, as described herein. In at least one embodiment, an API such as maximum cluster size supported API 1902 is performed by one or more processors of a computer system, as described herein. In at least one embodiment, an API such as maximum cluster size supported API 1902 is stored as instructions on a machine-readable medium, which can be performed using one or more processors, as described herein. In at least one embodiment, an API such as maximum cluster size supported API 1902, when performed, is to indicate a maximum number of blocks of threads to be scheduled in parallel.

In at least one embodiment, maximum cluster size supported API 1902 is an API to indicate a maximum number of blocks of threads to be scheduled in parallel. In at least one embodiment, maximum cluster size supported API 1902 is an API to obtain a limit of a number of concurrently performable clusters of one or more groups of instructions. In at least one embodiment, maximum cluster size supported API 1902 is an API to determine a request a maximum cluster size that can be supported by graphics hardware 1804, as described herein at least in connection with FIG. 18. In at least one embodiment, maximum cluster size supported API 1902 receives one or more parameters including, but not limited to, a stored maximum cluster size 1904, a kernel 1906, and/or a launch configuration 1908. In at least one embodiment, maximum cluster size supported API 1902 returns a return value 1916.

In at least one embodiment, stored maximum cluster size 1904 is a location that is used by maximum cluster size supported API 1902 to return a maximum cluster size that can be simultaneously performed by hardware. In at least one embodiment, kernel 1906 is a kernel that will be executed by graphics hardware using systems and methods such as those described herein. In at least one embodiment, launch configuration 1908 includes one or more parameters such as those described herein that may be used to launch kernel 1906 using block clusters, as described herein.

In at least one embodiment, not shown in FIG. 19, maximum cluster size supported API 1902 receives one or more additional parameters and/or of flags that specify kernel 1906 and/or launch configuration 1908 will be used to obtain a maximum cluster size that can be simultaneously performed by hardware. In at least one embodiment, when additional parameters and/or of flags that specify how kernel 1906 and/or launch configuration 1908 will be used to obtain a maximum cluster size that can be simultaneously performed by hardware are not received, one or more default parameters and/or flags may be used by maximum cluster size supported API 1902 to obtain a maximum cluster size that can be simultaneously performed by hardware, using systems and methods such as those described herein.

In at least one embodiment, maximum cluster size supported API 1902 causes a processor such as those described herein to execute one or more commands to determine maximum cluster size 1910 using systems and methods such as those described herein at least in connection with FIG. 18 and stores a determined value 1912 in stored maximum cluster size 1904. In at least one embodiment, maximum cluster size supported API 1902 returns success or failure 1914 using return value 1916. In at least one embodiment, maximum cluster size supported API 1902 returns success using return value 1916 when a maximum cluster size is determined. In at least one embodiment, maximum cluster size supported API 1902 returns failure using return value 1916 when a maximum cluster size is not determined.

In at least one embodiment, maximum cluster size supported API 1902 returns success or failure 1914 using return value 1916 to a calling process such as example process 600 described herein at least in connection with FIG. 6. In at least one embodiment, maximum cluster size supported API 1902 returns success or failure 1914 using return value 1916 to a calling process using integer value, or using a Boolean value, or using an enumerated value, or using a flag, or using a signal, or using a semaphore, or using an event, or using a combination of these and/or other such return value types including, but not limited to, those described herein.

Figure 20:
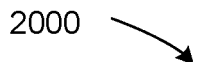
FIG. 20 illustrates an example computer system where a software kernel is executed using block clusters, in accordance with at least one embodiment.

FIG. 20 illustrates an example computer system 2000 where a software kernel is executed using block clusters, in accordance with at least one embodiment. In at least one embodiment, a processor 2002 (which is a processor such as processor 102, described herein at least in connection with FIG. 1) executes or otherwise performs one or more commends to receive cluster parameters 2004, generate a kernel 2006, and launch a kernel 2008 using block clusters, based at least in part on cluster parameters 2004, using systems and methods such as those described herein.

In at least one embodiment, when cluster parameters 2004 indicate a spread scheduling policy as described herein, processor 2002 launches kernel 2008 using a first block cluster 2014 on compute unit 2014 using graphics processor 2010 (which is a graphics processor such as graphics processor 108, described herein at least in connection with FIG. 1) and using a second block cluster 2018 on compute unit 2016 using graphics processor 2010. In at least one embodiment, not illustrated in FIG. 20, when cluster parameters 2004 indicate a balance scheduling policy as described herein, processor 2002 may launch kernel 2008 using a first block cluster 2014 on compute unit 2014 and may also launch second block cluster 2018 on compute unit 2014 or may launch kernel 2008 using a first block cluster 2014 on compute unit 2016 and may also launch second block cluster 2018 on compute unit 2016, or may launch kernel 2008 using some other distribution of block clusters, based at least in part on cluster parameters 2004.

FIG. 21 illustrates an example application programming interface 2100 to execute a software kernel using block clusters, in accordance with at least one embodiment. In at least one embodiment, example application programming interface 2100 to execute a software kernel using block clusters is a launch kernel with block clusters API 2102. In at least one embodiment, an API such as launch kernel with block clusters API 2102 is performed by a processor, such as those described herein. In at least one embodiment, an API such as launch kernel with block clusters API 2102 is performed as one or more steps of a computer-implemented method, as described herein. In at least one embodiment, an API such as launch kernel with block clusters API 2102 is performed by one or more processors of a computer system, as described herein. In at least one embodiment, an API such as launch kernel with block clusters API 2102 is stored as instructions on a machine-readable medium, which can be performed using one or more processors, as described herein. In at least one embodiment, an API such as launch kernel with block clusters API 2102, when performed, is to cause a kernel to be generated to cause two or more blocks of two or more threads to be scheduled in parallel.

In at least one embodiment, launch kernel with block clusters API 2102 is an API to cause a kernel to be generated to cause two or more blocks of two or more threads to be scheduled in parallel. In at least one embodiment, launch kernel with block clusters API 2102 is an API to cause a software kernel to be performed using one or more clusters of one or more groups of instructions. In at least one embodiment, launch kernel with block clusters API 2102 is an API to launch a kernel using block clusters as described herein at least in connection with FIG. 20. In at least one embodiment, launch kernel with block clusters API 2102 receives one or more parameters including, but not limited to, a kernel 2104 and one or more cluster parameters 2106 such as those described herein (e.g., cluster dimensions, cluster scheduling policy, etc.). In at least one embodiment, launch kernel with block clusters API 2102 returns a return value 2114.

In at least one embodiment, kernel 2104 of launch kernel with block clusters API 2102 is an identifier of a kernel to launch using block clusters, using systems and methods such as those described herein and cluster parameters 2116 are parameters such as those described herein that are used to specify how a kernel 2104 is to be launched using block clusters. In at least one embodiment, not shown in FIG. 21, launch kernel with block clusters API 2102 receives one or more additional parameters and/or of flags that specify how kernel 2104 and/or cluster parameters 2106 will be used to execute a software kernel using block clusters. In at least one embodiment, when additional parameters and/or of flags that specify how kernel 2104 and/or cluster parameters 2106 will be used to execute a software kernel using block clusters are not received, one or more default parameters and/or flags may be used by launch kernel with block clusters API 2102 to execute a software kernel using block clusters, using systems and methods such as those described herein.

In at least one embodiment, launch kernel with block clusters API 2102 causes a processor such as those described herein to execute one or more commands to validate one or more cluster parameters 2108 as described herein, to launch a kernel using block clusters 2110, and to return success or failure 2112 using return value 2114. In at least one embodiment, launch kernel with block clusters API 2102 returns success using return value 2114 when launch kernel with block clusters API 2102 does successfully launch a kernel using block clusters 2110. In at least one embodiment, launch kernel with block clusters API 2102 returns failure using return value 2114 when launch kernel with block clusters API 2102 does not successfully launch a kernel using block clusters 2110.

In at least one embodiment, launch kernel with block clusters API 2102 returns success or failure 2112 using return value 2114 to a calling process such as example process 600 described herein at least in connection with FIG. 6. In at least one embodiment, launch kernel with block clusters API 2102 returns success or failure 2112 using return value 2114 to a calling process using integer value, or using a Boolean value, or using an enumerated value, or using a flag, or using a signal, or using a semaphore, or using an event, or using a combination of these and/or other such return value types including, but not limited to, those described herein.

Figure 22:
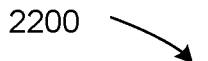
FIG. 22 illustrates an example diagram where a hierarchy of threads, thread blocks, block clusters, compute units, and graphics processors is shown, in accordance with at least one embodiment.

FIG. 22 illustrates an example diagram 2200 where a hierarchy of threads, thread blocks, block clusters, compute units, and graphics processors is shown, in accordance with at least one embodiment. In at least one embodiment, a graphics processor 2202 (which is a graphics processor such as graphics processor 102, described herein at least in connection with FIG. 1) includes one or more compute units. In at least one embodiment, graphics processor 2202 includes a first compute unit 2204 (which is a compute unit such as compute unit 110, described herein at least in connection with FIG. 1). In at least one embodiment, compute unit 2204 includes one or more block clusters. In at least one embodiment, compute unit 2204 includes a first block cluster 2208 (which is a block cluster such as block cluster 112, block cluster 118, and/or block cluster 120, all described herein at least in connection with FIG. 1). In at least one embodiment, block cluster 2208 includes one or more thread blocks. In at least one embodiment, block cluster 2208 includes a first thread block 2212 (which is a thread block such as thread block 202, described herein at least in connection with FIG. 2). In at least one embodiment, thread block 2212 includes one or more threads (e.g., thread 2216, thread 2218, etc.), which are threads such as those described herein.

In at least one embodiment, graphics processor 2202 includes one or more additional compute units (e.g., compute unit 2206). In at least one embodiment, a compute unit such as compute unit 2206 can include one or more block clusters, not illustrated in FIG. 22. In at least one embodiment, compute unit 2204 includes one or more additional block clusters (e.g., block cluster 2210). In at least one embodiment, block clusters such as block cluster 2210 can include one or more thread blocks, not illustrated in FIG. 22.

In at least one embodiment, block cluster 2208 includes one or more additional thread blocks (e.g., thread block 2214). In at least one embodiment, a thread block such as thread block 2214 can include one or more threads, not illustrated in FIG. 22.

In at least one embodiment, a block cluster such as block cluster 2208 executes on multiple compute units, as described herein. In at least one embodiment, a block cluster such as block cluster 2208 executes on a portion of compute units of a graphics processor such as graphics processor 2202. In at least one embodiment, a block cluster such as block cluster 2208 executes on all compute units of a graphics processor such as graphics processor 2202. In at least one embodiment, a block cluster such as block cluster 2208 executes on a plurality of graphics processors such as graphics processor 2202 so that, for example, a first set of thread blocks of a block cluster execute on a first compute unit of a first graphics processor, a second set of thread blocks of a block cluster execute on a second compute unit of a first graphics processor, a third set of thread blocks of a block cluster execute on a first compute unit of a second graphics processor, a fourth set of thread blocks of a block cluster execute on a second compute unit of a second graphics processor, etc. In at least one embodiment, a plurality of graphics processors are graphics processors of a compute cluster of graphics processors that are connected using one or more technologies such as those described herein. In at least one embodiment, a graphics processor such as graphics processor 2202 is a virtual graphics processor that spans (or includes) a plurality of physical graphics processors such as those described herein.

Figure 23:
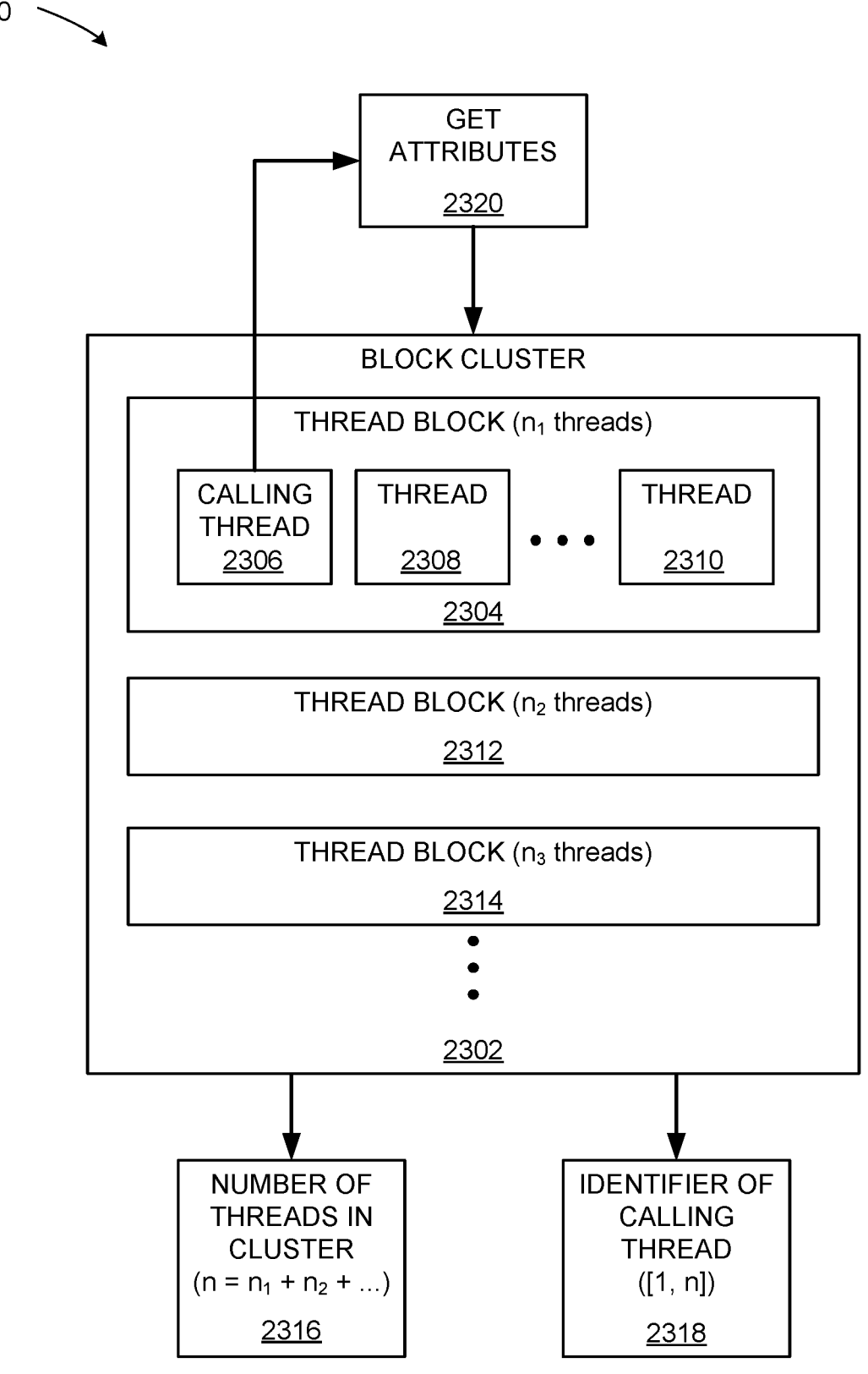
FIG. 23 illustrates an example diagram where thread attributes of a calling thread are obtained, in accordance with at least one embodiment.

FIG. 23 illustrates an example diagram 2300 where thread attributes of a calling thread are obtained, in accordance with at least one embodiment. In at least one embodiment, a calling thread 2306 executes or otherwise performs one or more commands to get thread block and/or block cluster attributes 2320 associated with calling thread 2306. In at least one embodiment, calling thread 2306 executes or otherwise performs one or more commands to get thread block and/or block cluster attributes 2320 associated with calling thread 2306 using get attributes API 2602, described herein at least in connection with FIG. 26. In at least one embodiment, some other process or processor executes or otherwise performs one or more commands to get thread block and/or block cluster attributes 2320 associated with calling thread 2306 using get attributes API 2602 such as, for example, a process operating on a CPU or a GPU, such as those described herein. In at least one embodiment, calling thread 2306 is a thread of thread block 2304 (e.g., a thread block such as those described herein), which has $n_1$ threads (e.g., calling thread 2306 and $n_1 - 1$ other threads such as thread 2308 to thread 2310). In at least one embodiment, thread block 2304 is a thread block of block cluster 2302 (e.g., a block cluster such as those described herein), which has thread block 2312 with $n_2$ threads, thread block 2314 with $n_3$ threads, etc.

In at least one embodiment, calling thread 2306 executes or otherwise performs one or more commands to get thread block and/or block cluster attributes 2320 including, for example, a number of threads in a cluster 2316, which returns a total number of threads in block cluster 2302 (e.g., $n = n_1 + n_2 + n_3 + \ldots$). In at least one embodiment, an attribute such as number of threads in a cluster 2316 is referred to as thread-level information. In at least one embodiment, an attribute such as number of threads in a cluster 2316 is referred to as cluster-level information. In at least one embodiment, calling thread 2306 executes or otherwise performs one or more commands to get thread block and/or block cluster attributes 2320 including, for example, an identifier 2318 of calling thread 2306, which returns an index (or rank) from [1, n] where n is a total number of threads in block cluster 2302. In at least one embodiment, an attribute such as identifier 2318 of calling thread 2306 is referred to as thread-level information.

Figure 24:
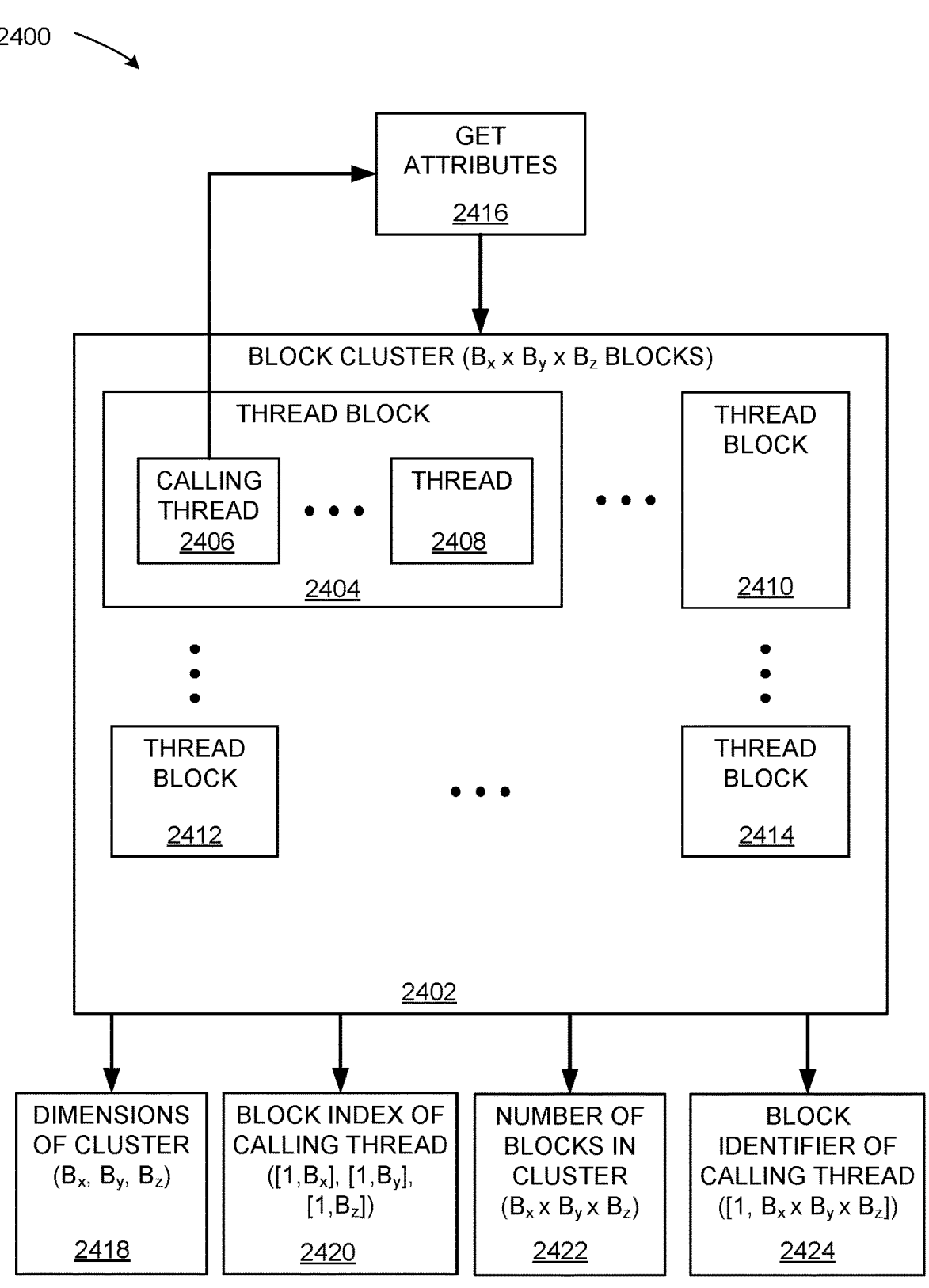
FIG. 24 illustrates an example diagram where block cluster attributes of a calling thread are obtained, in accordance with at least one embodiment.

FIG. 24 illustrates an example diagram 2400 where block cluster attributes of a calling thread are obtained, in accordance with at least one embodiment. In at least one embodiment, a calling thread 2406 executes or otherwise performs one or more commands to get thread block and/or block cluster attributes 2416 associated with calling thread 2406. In at least one embodiment, calling thread 2406 executes or otherwise performs one or more commands to get thread block and/or block cluster attributes 2416 associated with calling thread 2406 using get attributes API 2602, described herein at least in connection with FIG. 26. In at least one embodiment, some other process or processor executes or otherwise performs one or more commands to get thread block and/or block cluster attributes 2416 associated with calling thread 2406 using get attributes API 2602 such as, for example, a process operating on a CPU or a GPU, such as those described herein. In at least one embodiment, calling thread 2406 is a thread of thread block 2404, which may include one or more other threads (e.g., thread 2408). In at least one embodiment, thread block 2404 is a thread block of block cluster 2402, which includes $B_x \times B_y \times B_z$ thread blocks (e.g., thread block 2410, thread block 2412, thread block 2414, etc.).

In at least one embodiment, calling thread 2406 executes or otherwise performs one or more commands to get thread block and/or block cluster attributes 2416 including, for example, dimensions of a cluster 2418, which returns a three-dimensional size of block cluster 2402 (e.g., $(B_x, B_y, B_z)$). In at least one embodiment, an attribute such as dimensions of a cluster 2418 is referred to as cluster-level information. In at least one embodiment, calling thread 2406 executes or otherwise performs one or more commands to get thread block and/or block cluster attributes 2416 including, for example, a block index 2420 of thread block 2404 of calling thread 2406, which returns a three-dimensional index of thread block 2404 (e.g., an index from $([1,B_x], [1,B_y], [1,B_z])$). In at least one embodiment, an attribute such as block index 2420 of thread block 2404 of calling thread 2406 is referred to as block-level information. In at least one embodiment, calling thread 2406 executes or otherwise performs one or more commands to get thread block and/or block cluster attributes 2416 including, for example, a number of blocks in a cluster 2422, which returns a total number of blocks in block cluster 2402 (e.g., $B_x \times B_y \times B_z$) (e.g., cluster-level information) In at least one embodiment, calling thread 2406 executes or otherwise performs one or more commands to get thread block and/or block cluster attributes 2416 including, for example, a block identifier 2424 of a thread block 2404 of calling thread 2406, which returns an index of thread block 2404 (e.g., from [1, $B_x \times B_y \times B_z$]) (e.g., block-level information).

Figure 25:
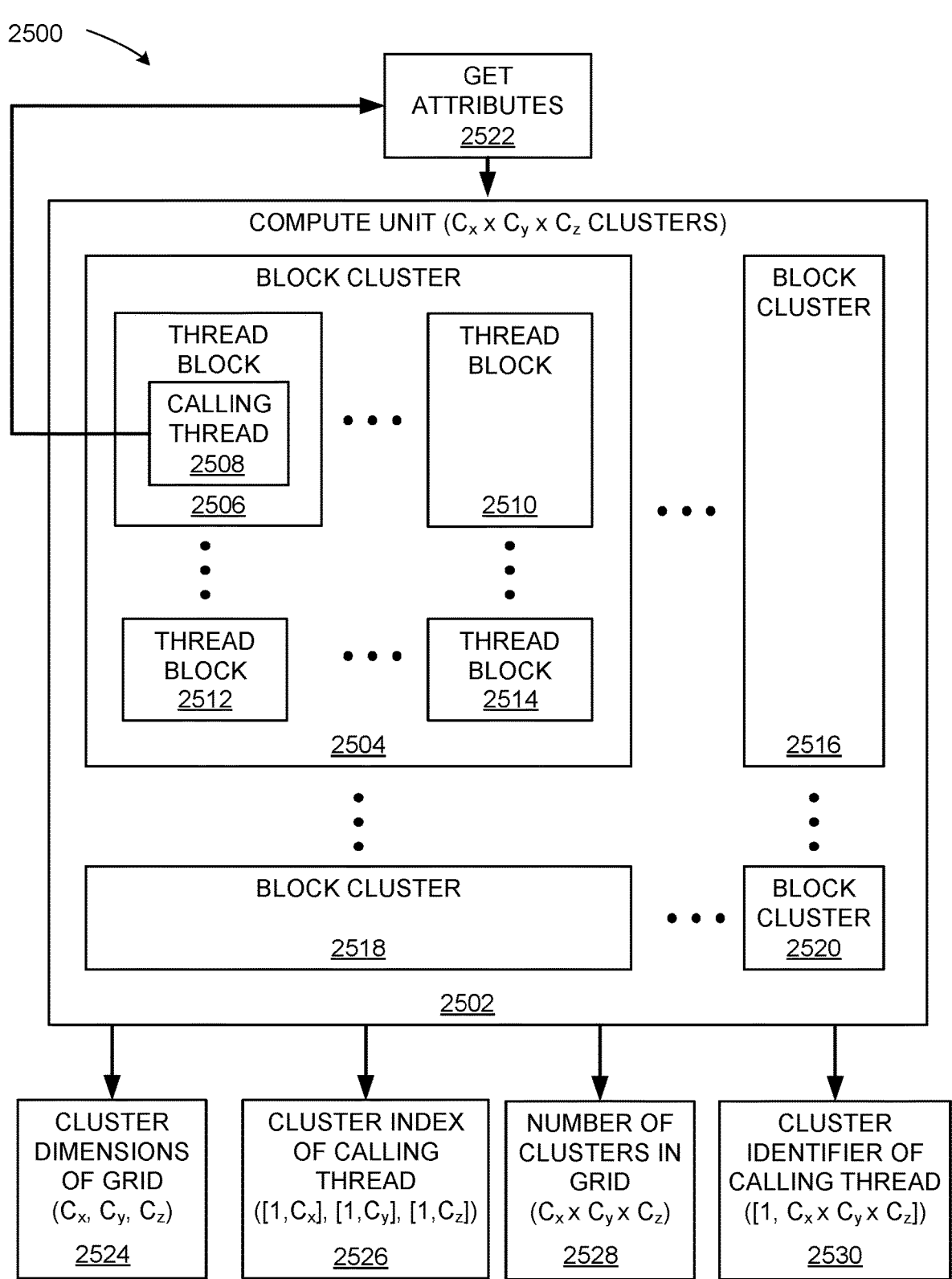
FIG. 25 illustrates an example diagram where block cluster group attributes of a calling thread are obtained, in accordance with at least one embodiment.

FIG. 25 illustrates an example diagram 2500 where block cluster group attributes of a calling thread are obtained, in accordance with at least one embodiment. In at least one embodiment, a calling thread 2508 executes or otherwise performs one or more commands to get thread block, block cluster, and/or compute unit attributes 2522 associated with calling thread 2508. In at least one embodiment, calling thread 2508 executes or otherwise performs one or more commands to get thread block, block cluster, and/or compute unit attributes 2522 associated with calling thread 2508 using get attributes API 2602, described herein at least in connection with FIG. 26. In at least one embodiment, some other process or processor executes or otherwise performs one or more commands to get thread block, block cluster, and/or compute unit attributes 2522 associated with calling thread 2508 using get attributes API 2602 such as, for example, a process operating on a CPU or a GPU, such as those described herein. In at least one embodiment, calling thread 2508 is a thread of thread block 2506. In at least one embodiment, thread block 2506 is a thread block of block cluster 2504. In at least one embodiment, block cluster 2504 includes one or more additional thread blocks (e.g., thread block 2510, thread block 2512, thread block 2514, etc.). In at least one embodiment, block cluster 2504 is a block cluster of compute unit 2502. In at least one embodiment, compute unit 2502 includes $C_x \times C_y \times C_z$ block clusters (e.g., block cluster 2516, block cluster 2518, block cluster 2520, etc.).

In at least one embodiment, calling thread 2508 executes or otherwise performs one or more commands to get thread block, block cluster, and/or compute unit attributes 2522 including, for example, cluster dimensions of a grid 2524, which returns a three-dimensional size of block clusters in compute unit 2502 (e.g., $(C_x, C_y, C_z)$). In at least one embodiment, calling thread 2508 executes or otherwise performs one or more commands to get thread block, block cluster, and/or compute unit attributes 2522 including, for example, a cluster index 2526 of block cluster 2504 of thread block 2506 of calling thread 2508, which returns a three-dimensional index of block cluster 2504 (e.g., an index from $([1,C_x], [1,C_y], [1,C_z])$). In at least one embodiment, calling thread 2508 executes or otherwise performs one or more commands to get thread block, block cluster, and/or compute unit attributes 2522 including, for example, a number of block clusters of grid 2528, which returns a total number of block clusters of compute unit 2502 (e.g., $C_x \times C_y \times C_z$). In at least one embodiment, calling thread 2508 executes or otherwise performs one or more commands to get thread block, block cluster, and/or compute unit attributes 2522 including, for example, a block cluster identifier 2530 of block cluster 2504 of thread block 2506 of calling thread 2508, which returns an index of block cluster 2504 (e.g., from [1, $C_x \times C_y \times C_z$]).

Figure 26:
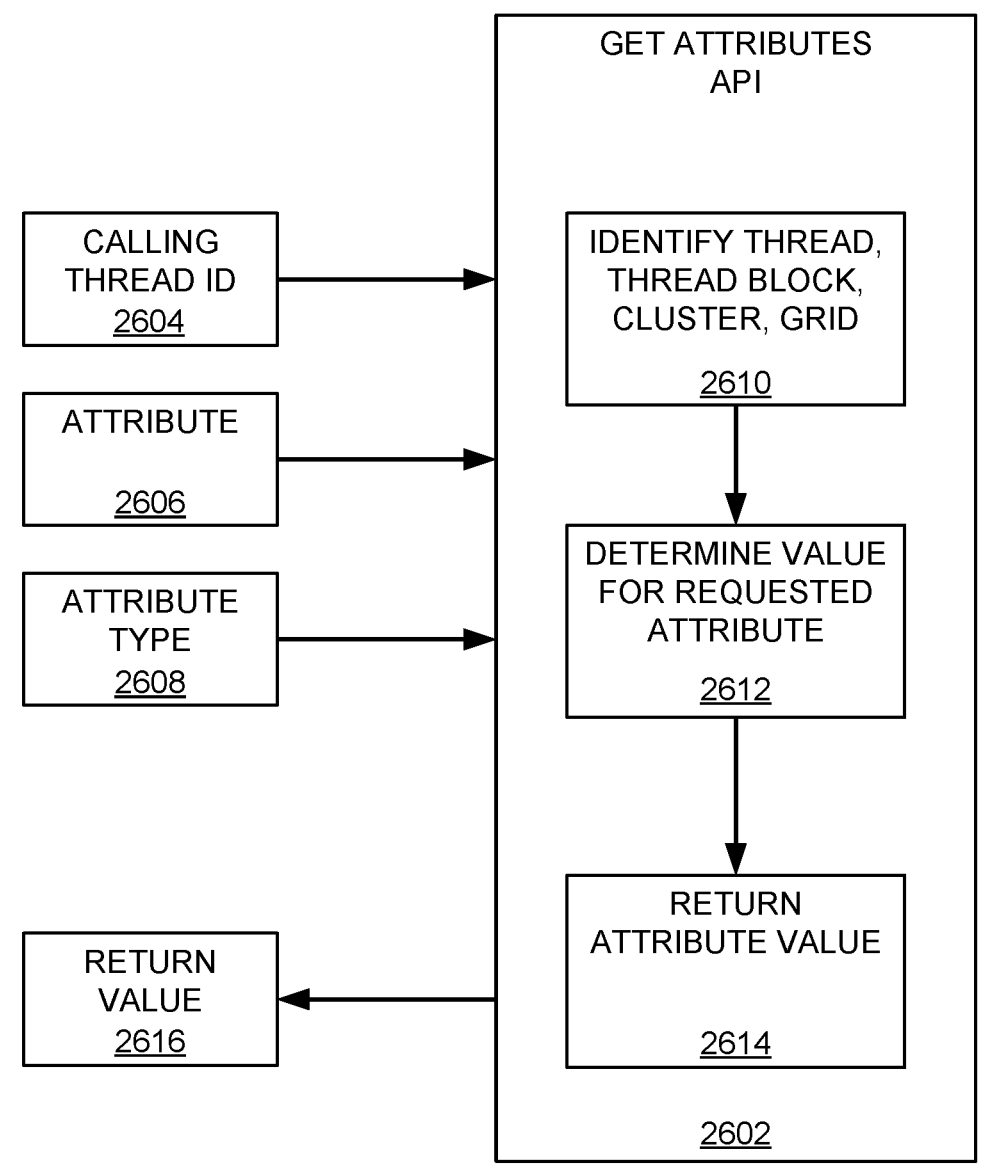
FIG. 26 illustrates an example application programming interface to obtain thread, thread block, block cluster, and block cluster group attributes of a calling thread, in accordance with at least one embodiment.

FIG. 26 illustrates an example application programming interface 2600 to obtain thread, thread block, block cluster, and block cluster group attributes of a calling thread, in accordance with at least one embodiment. In at least one embodiment, example application programming interface 2600 to obtain thread, thread block, block cluster, and block cluster group attributes of a calling thread is a get attributes API 2602. In at least one embodiment, an API such as get attributes API 2602 is performed by a processor, such as those described herein. In at least one embodiment, an API such as get attributes API 2602 is performed as one or more steps of a computer-implemented method, as described herein. In at least one embodiment, an API such as get attributes API 2602 is performed by one or more processors of a computer system, as described herein. In at least one embodiment, an API such as get attributes API 2602 is stored as instructions on a machine-readable medium, which can be performed using one or more processors, as described herein. In at least one embodiment, an API such as get attributes API 2602, when performed, is to indicate one or more limitations of one or more attributes of one or more groups of blocks of one or more threads.

In at least one embodiment, get attributes API 2602 is an API comprising one or more parameters to indicate one or more limitations of one or more attributes of one or more groups of blocks of one or more threads. In at least one embodiment, get attributes API 2602 is an API to obtain one or more parameters of one or more clusters of one or more groups of instructions of a set of one or more clusters of one or more groups of instructions. In at least one embodiment, get attributes API 2602 is an API to obtain thread block, block cluster, and/or compute unit attributes of a calling thread as described herein at least in connection with FIGS. 23-25. In at least one embodiment, get attributes API 2602 receives one or more parameters including, but not limited to, a calling thread ID 2604, an attribute 2606, and/or an attribute type 2608. In at least one embodiment, get attributes API 2602 returns a return value 2616.

In at least one embodiment, calling thread ID 2604 of get attributes API 2602 is an identifier of a calling thread that calls get attributes API 2602 and attribute 2606 of get attributes API 2602 is an attribute of calling thread identified by calling thread ID 2604 such as those described herein at least in connection with FIGS. 23-25. In at least one embodiment, attribute type 2608 of get attributes API 2602 is a return type of attribute 2606 (e.g., a value, or a three-dimensional value, etc.).

In at least one embodiment, not shown in FIG. 26, get attributes API 2602 receives one or more additional parameters and/or of flags that specify how attribute 2606 and/or attribute type 2608 will be used to obtain thread, thread block, block cluster, and block cluster group attributes of a calling thread identified by calling thread ID 2604 (e.g., attributes of a thread hierarchy of which a calling thread identified by calling thread ID 2604 is a member). In at least one embodiment, when additional parameters and/or of flags that specify how attribute 2606 and/or attribute type 2608 will be used to obtain thread, thread block, block cluster, and block cluster group attributes of a calling thread identified by calling thread ID 2604 (e.g., attributes of a thread hierarchy of which a calling thread identified by calling thread ID 2604 is a member) are not received, one or more default parameters and/or flags may be used by get attributes API 2602 to obtain thread, thread block, block cluster, and block cluster group attributes of a calling thread, using systems and methods such as those described herein.

In at least one embodiment, get attributes API 2602 causes a processor such as those described herein to execute one or more commands to identify 2610 a thread, thread block, block cluster, and/or grid of a calling thread identified by calling thread ID 2604 and to determine 2612 a value of a requested attribute 2606, as described herein. In at least one embodiment, get attributes API 2602 returns a determined attribute 2614 using return value 2616.

In at least one embodiment, get attributes API 2602 returns a determined attribute 2614 using return value 2616 to a calling process such as example process 600 described herein at least in connection with FIG. 6. In at least one embodiment, get attributes API 2602 returns a determined attribute 2614 using return value 2616 to a calling process using integer value, or using a Boolean value, or using an enumerated value, or using a flag, or using a signal, or using a semaphore, or using an event, or using a combination of these and/or other such return value types including, but not limited to, those described herein.

Figure 27:
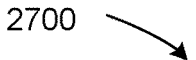
FIG. 27 illustrates an example diagram where threads of a block cluster are waiting on other threads to perform a barrier instruction, in accordance with at least one embodiment.

FIG. 27 illustrates an example diagram 2700 where threads of a block cluster are waiting on other threads to perform a barrier instruction, in accordance with at least one embodiment. In at least one embodiment, a first thread 2706 of a thread block 2704 of a block cluster 2702 is being performed and first thread 2706 has not reached a barrier instruction 2708, as described herein. In at least one embodiment, a second thread 2710 of thread block 2704 of block cluster 2702 is waiting and second thread 2710 has reached barrier instruction 2708, as described herein. In at least one embodiment, second thread 2710 is waiting because second thread 2710 has performed barrier instruction 2708.

In at least one embodiment, a third thread 2714 of a thread block 2712 of block cluster 2702 is waiting and third thread 2714 has reached barrier instruction 2708, as described herein. In at least one embodiment, third thread 2714 is waiting because third thread 2714 has performed barrier instruction 2708. In at least one embodiment, a fourth thread 2716 of thread block 2712 of block cluster 2702 is waiting and fourth thread 2716 has reached barrier instruction 2708, as described herein. In at least one embodiment, fourth thread 2716 is waiting because fourth thread 2716 has performed barrier instruction 2708.

Figure 28:
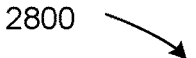
FIG. 28 illustrates an example diagram where threads of a block cluster have performed a barrier instruction, in accordance with at least one embodiment.

FIG. 28 illustrates an example diagram 2800 where threads of a block cluster have performed a barrier instruction, in accordance with at least one embodiment. In at least one embodiment, threads illustrated in example diagram 2800 are identical to threads illustrated in example diagram 2700 where example diagram 2800 follows after first thread 2806 has arrived at barrier instruction 2808. In at least one embodiment, a first thread 2806 (which is first thread 2706 of example diagram 2700) of a thread block 2804 (e.g., thread block 2704 of example diagram 2700) of a block cluster 2802 (e.g., block cluster 2702 of example diagram 2700) has reached a barrier instruction 2808 (e.g., barrier instruction 2708 of example diagram 2700). In at least one embodiment, first thread 2806 is waiting because first thread 2806 has performed barrier instruction 2808. In at least one embodiment, a second thread 2810 (e.g., second thread 2710 of example diagram 2700) of thread block 2804 of block cluster 2802 is waiting, as described herein.

In at least one embodiment, a third thread 2814 (e.g., third thread 2714 of example diagram 2700) of a thread block 2812 (e.g., thread block 2712 of example diagram 2700) of block cluster 2802 is waiting, as described herein. In at least one embodiment, a fourth thread 2816 (e.g., fourth thread 2716 of example diagram 2700) of thread block 2812 of block cluster 2802 is waiting, as described herein.

Figure 29:
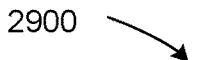
FIG. 29 illustrates an example diagram where threads of a block cluster resume after performing a barrier instruction, in accordance with at least one embodiment.

FIG. 29 illustrates an example diagram 2900 where threads of a block cluster resume after performing a barrier instruction, in accordance with at least one embodiment. In at least one embodiment, threads illustrated in example diagram 2800 are identical to threads illustrated in example diagram 2800 where example diagram 2800 follows after first thread 2906 has arrived at barrier instruction 2908 and all threads have resumed execution. In at least one embodiment, all threads illustrated in example diagram 2900 have resumed as all threads illustrated in example diagram 2900 have performed barrier instruction 2908 and may thus resume execution.

In at least one embodiment, a first thread 2906 (which is first thread 2806 of example diagram 2800) of a thread block 2904 (e.g., thread block 2804 of example diagram 2800) of a block cluster 2902 (e.g., block cluster 2802 of example diagram 2800) has reached a barrier instruction 2908 (e.g., barrier instruction 2808 of example diagram 2800) and has resumed execution beyond barrier instruction 2908. In at least one embodiment, a second thread 2910 (e.g., second thread 2810 of example diagram 2800) of thread block 2904 is has resumed execution beyond barrier instruction 2908, a third thread 2914 (e.g., third thread 2814 of example diagram 2800) of a thread block 2912 (e.g., thread block 2812 of example diagram 2800) has resumed execution beyond barrier instruction 2908, and a fourth thread 2916 (e.g., fourth thread 2818 of example diagram 2800) of thread block 2912 has resumed execution beyond barrier instruction 2908.

FIG. 30 illustrates an example application programming interface 3000 to determine if threads of a block cluster have performed a barrier instruction, in accordance with at least one embodiment. In at least one embodiment, example application programming interface 3000 to determine if threads of a block cluster have performed a barrier instruction is a kernel barrier arrive API 3002. In at least one embodiment, an API such as kernel barrier arrive API 3002 is performed by a processor, such as those described herein. In at least one embodiment, an API such as kernel barrier arrive API 3002 is performed as one or more steps of a computer-implemented method, as described herein. In at least one embodiment, an API such as kernel barrier arrive API 3002 is performed by one or more processors of a computer system, as described herein. In at least one embodiment, an API such as kernel barrier arrive API 3002 is stored as instructions on a machine-readable medium, which can be performed using one or more processors, as described herein. In at least one embodiment, an API such as kernel barrier arrive API 3002, when performed, is to indicate whether one or more threads within two or more blocks of threads have performed a barrier instruction.

In at least one embodiment, kernel barrier arrive API 3002 is an API to indicate whether one or more threads within two or more blocks of threads have performed a barrier instruction. In at least one embodiment, kernel barrier arrive API 3002 is an API to indicate arrival at a barrier instruction of a cluster of one or more groups of instructions. In at least one embodiment, kernel barrier arrive API 3002 is an API to manage synchronization of one or more threads of block clusters, as described herein at least in connection with FIGS. 27-29. In at least one embodiment, kernel barrier arrive API 3002 receives one or more parameters including, but not limited to, a calling thread ID 3004. In at least one embodiment, kernel barrier arrive API 3002 returns a return value 3014.

In at least one embodiment, calling thread ID 3004 of kernel barrier arrive API 3002 is an identifier of a thread that executes or otherwise performs one or more commands to perform kernel barrier arrive API 3002. In at least one embodiment, not shown in FIG. 30, kernel barrier arrive API 3002 receives one or more additional parameters and/or of flags that specify how calling thread ID 3004 will be used to determine if threads of a block cluster have performed a barrier instruction. In at least one embodiment, when additional parameters and/or of flags that specify how calling thread ID 3004 will be used to determine if threads of a block cluster have performed a barrier instruction are not received, one or more default parameters and/or flags may be used by kernel barrier arrive API 3002 to determine if threads of a block cluster have performed a barrier instruction, using systems and methods such as those described herein.

In at least one embodiment, kernel barrier arrive API 3002 causes a processor such as those described herein to execute one or more commands to identify 3006 a thread, thread block, block cluster, and/or compute group of a calling thread identified by calling thread ID 3004, determine 3008 whether a barrier instruction has been reached by a calling thread identified by calling thread ID 3004, and determine 3010 whether to wait or proceed with thread execution based, at least in part, on determining whether a barrier instruction has been reached by a calling thread identified by calling thread ID 3004. In at least one embodiment, a determination of whether a barrier instruction has been reached by a calling thread identified by calling thread ID 3004 may be a determination of whether a barrier instruction has not been reach by a calling thread identified by calling thread ID 3004. In at least one embodiment, for example, kernel barrier arrive API 3002 may determine 3008 that no threads, including a calling thread identified by calling thread ID 3004, have reached a barrier instruction. In at least one embodiment, kernel barrier arrive API 3002 causes a processor such as those described herein to execute one or more commands to report a barrier arrival status 3012 based, at least in part, on determining whether a barrier instruction has been reached by a calling thread identified by calling thread ID 3004.

In at least one embodiment, kernel barrier arrive API 3002 reports barrier arrival status 3012 using return value 3014. In at least one embodiment, kernel barrier arrive API 3002 reports barrier arrival status 3012 using return value 3014 to a calling process such as example process 600 described herein at least in connection with FIG. 6. In at least one embodiment, kernel barrier arrive API 3002 reports barrier arrival status 3012 using return value 3014 to a calling process using integer value, or using a Boolean value, or using an enumerated value, or using a flag, or using a signal, or using a semaphore, or using an event, or using a combination of these and/or other such return value types including, but not limited to, those described herein.

Figure 31:
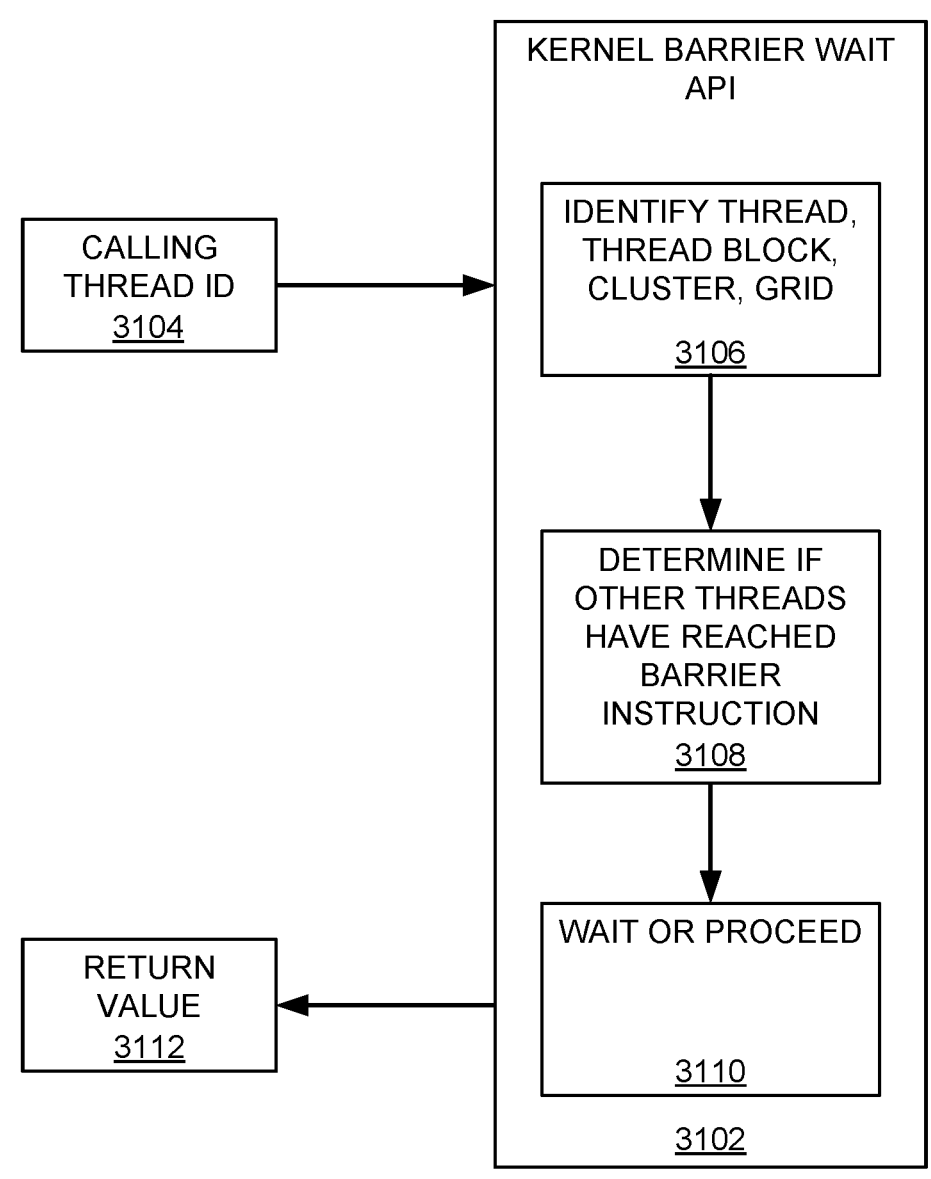
FIG. 31 illustrates an example application programming interface to determine if a thread should stop until all other threads of a block cluster have performed a barrier instruction, in accordance with at least one embodiment.

FIG. 31 illustrates an example application programming interface 3100 to determine if a thread should stop until all other threads of a block cluster have performed a barrier instruction, in accordance with at least one embodiment. In at least one embodiment, example application programming interface 3100 to determine if a thread should stop until all other threads of a block cluster have performed a barrier instruction is a kernel barrier wait API 3102. In at least one embodiment, an API such as kernel barrier wait API 3102 is performed by a processor, such as those described herein. In at least one embodiment, an API such as kernel barrier wait API 3102 is performed as one or more steps of a computer-implemented method, as described herein. In at least one embodiment, an API such as kernel barrier wait API 3102 is performed by one or more processors of a computer system, as described herein. In at least one embodiment, an API such as kernel barrier wait API 3102 is stored as instructions on a machine-readable medium, which can be performed using one or more processors, as described herein. In at least one embodiment, an API such as kernel barrier wait API 3102, when performed, is to cause performance of one or more threads within a group of blocks of threads to stop at least until all threads within the group of blocks have performed a barrier instruction.

In at least one embodiment, kernel barrier wait API 3102 is an API to cause performance of one or more threads within a group of blocks of threads to stop at least until all threads within the group of blocks have performed a barrier instruction. In at least one embodiment, kernel barrier wait API 3102 is an API to cause one or more first instructions to be prevented from being performed until a cluster of one or more groups of instructions have performed one or more second instructions. In at least one embodiment, kernel barrier wait API 3102 is an API to manage synchronization of one or more threads of block clusters, as described herein at least in connection with FIGS. 27-29. In at least one embodiment, kernel barrier wait API 3102 receives one or more parameters including, but not limited to, a calling thread ID 3104. In at least one embodiment, kernel barrier wait API 3102 returns a return value 3112.

In at least one embodiment, calling thread ID 3104 of kernel barrier wait API 3102 is an identifier of a calling thread that executes or otherwise performs one or more commands to perform kernel barrier wait API 3102. In at least one embodiment, not shown in FIG. 31, kernel barrier wait API 3102 receives one or more additional parameters and/or of flags that specify how calling thread ID 3104 will be used to determine if a calling thread identified by calling thread ID 3104 should stop until all other threads of a block cluster have performed a barrier instruction. In at least one embodiment, when additional parameters and/or of flags that specify how calling thread ID 3104 will be used to determine if a calling thread identified by calling thread ID 3104 should stop until all other threads of a block cluster have performed a barrier instruction are not received, one or more default parameters and/or flags may be used by kernel barrier wait API 3102 to determine if a thread should stop until all other threads of a block cluster have performed a barrier instruction, using systems and methods such as those described herein.

In at least one embodiment, kernel barrier wait API 3102 causes a processor such as those described herein to execute one or more commands to identify 3106 a thread, thread block, block cluster, and/or compute group of a calling thread identified by calling thread ID 3104 and determine 3108 whether a barrier instruction has been reached one or more other threads associated with a block cluster of a calling thread identified by calling thread ID 3104. In at least one embodiment, a determination of whether a barrier instruction has been reached one or more other threads associated with a block cluster of a calling thread identified by calling thread ID 3104 may be a determination of whether a barrier instruction has not been reached one or more other threads associated with a block cluster of a calling thread identified by calling thread ID 3104. In at least one embodiment, for example, kernel barrier wait API 3102 may determine 3108 that no threads, including a calling thread identified by calling thread ID 3104, have reached a barrier instruction. In at least one embodiment, kernel barrier wait API 3102 causes a processor such as those described herein to execute one or more commands to report a determination of whether a calling thread identified by calling thread ID 3104 should wait or proceed 3110 based, at least in part, on whether a barrier instruction has been reached one or more other threads associated with a block cluster of a calling thread identified by calling thread ID 3104.

In at least one embodiment, kernel barrier wait API 3102 returns a determination whether to wait or proceed 3110 using return value 3112. In at least one embodiment, kernel barrier wait API 3102 returns determination whether to wait or proceed 3110 using return value 3112 to a calling process such as example process 600 described herein at least in connection with FIG. 6. In at least one embodiment, kernel barrier wait API 3102 returns determination whether to wait or proceed 3110 using return value 3112 to a calling process using integer value, or using a Boolean value, or using an enumerated value, or using a flag, or using a signal, or using a semaphore, or using an event, or using a combination of these and/or other such return value types including, but not limited to, those described herein.

Figure 32:
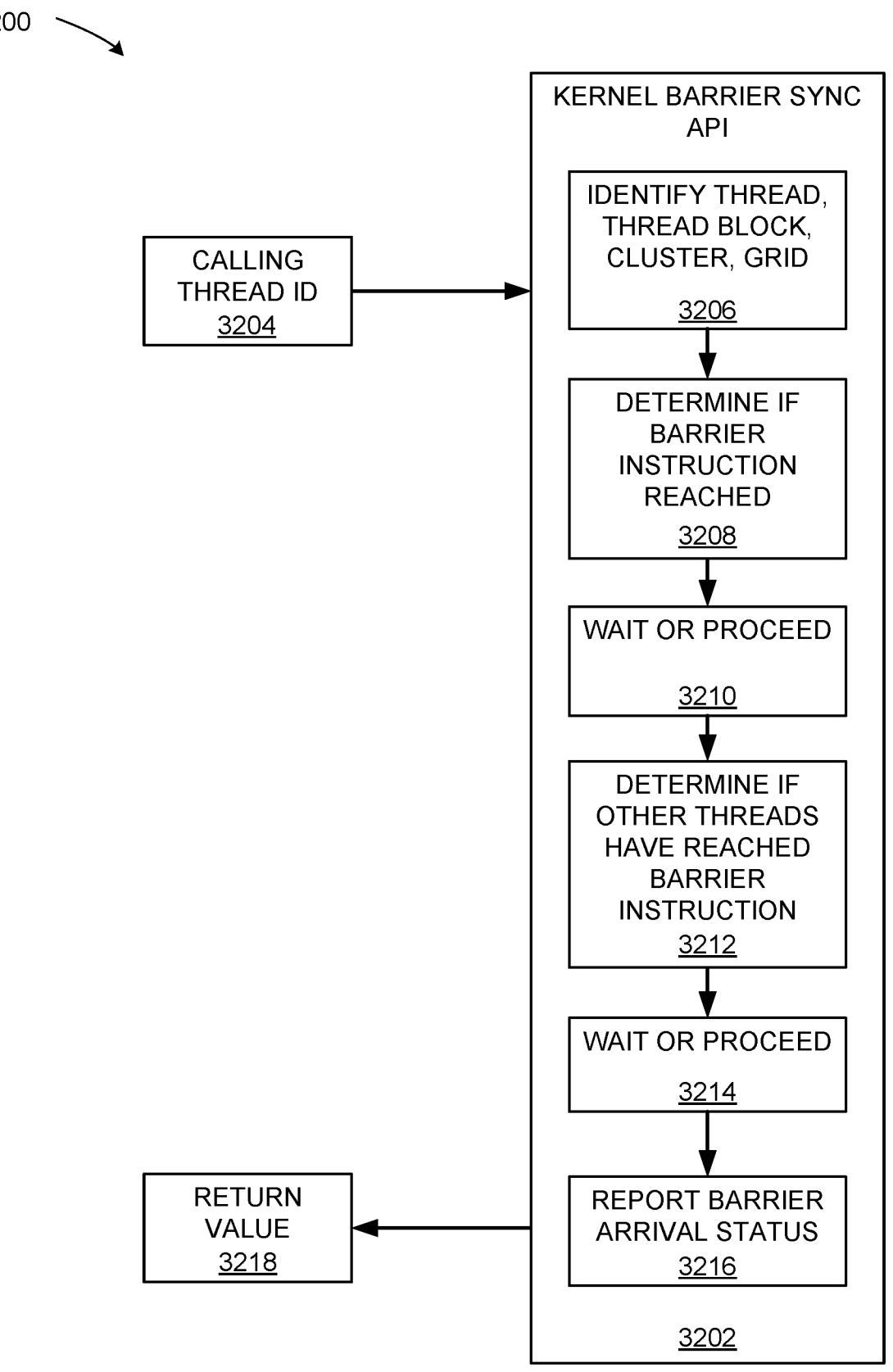
FIG. 32 illustrates an example application programming interface to determine if threads of a block cluster have performed a barrier instruction and to stop until all other threads of a block cluster have performed a barrier instruction, in accordance with at least one embodiment.

FIG. 32 illustrates an example application programming interface 3200 to determine if threads of a block cluster have performed a barrier instruction and to stop until all other threads of a block cluster have performed a barrier instruction, in accordance with at least one embodiment. In at least one embodiment, example application programming interface 3200 to determine if threads of a block cluster have performed a barrier instruction and to stop until all other threads of a block cluster have performed a barrier instruction is a kernel barrier sync API 3202. In at least one embodiment, an API such as kernel barrier sync API 3202 is performed by a processor, such as those described herein. In at least one embodiment, an API such as kernel barrier sync API 3202 is performed as one or more steps of a computer-implemented method, as described herein. In at least one embodiment, an API such as kernel barrier sync API 3202 is performed by one or more processors of a computer system, as described herein. In at least one embodiment, an API such as kernel barrier sync API 3202 is stored as instructions on a machine-readable medium, which can be performed using one or more processors, as described herein. In at least one embodiment, an API such as kernel barrier sync API 3202, when performed, is to indicate whether one or more threads within a group of blocks of threads have performed a barrier instruction and to cause performance of one or more threads within the group of blocks of threads to stop at least until all threads within the group of blocks have performed the barrier instruction.

In at least one embodiment, kernel barrier sync API 3202 is an API to indicate whether one or more threads within two or more blocks of threads have performed a barrier instruction and to cause performance of one or more threads within the group of blocks of threads to stop at least until all threads within the group of blocks have performed the barrier instruction. In at least one embodiment, kernel barrier sync API 3202 is an API to cause one or more first instructions to be prevented from being performed until a cluster of one or more groups of instructions have performed one or more second instructions. In at least one embodiment, kernel barrier synch API 3202 is an API to manage synchronization of one or more threads of block clusters, as described herein at least in connection with FIGS. 27-29. In at least one embodiment, kernel barrier sync API 3202 receives one or more parameters including, but not limited to, a calling thread ID 3204. In at least one embodiment, kernel barrier sync API 3202 returns a return value 3218.

In at least one embodiment, calling thread ID 3204 of kernel barrier sync API 3202 is an identifier of a calling thread that executes or otherwise performs one or more commands to perform kernel barrier sync API 3202. In at least one embodiment, not shown in FIG. 32, kernel barrier sync API 3202 receives one or more additional parameters and/or of flags that specify how calling thread ID 3204 will be used to determine if threads of a block cluster have performed a barrier instruction and to stop until all other threads of a block cluster have performed a barrier instruction. In at least one embodiment, when additional parameters and/or of flags that specify how calling thread ID 3204 will be used to determine if threads of a block cluster have performed a barrier instruction and to stop until all other threads of a block cluster have performed a barrier instruction are not received, one or more default parameters and/or flags may be used by kernel barrier sync API 3202 to determine if threads of a block cluster have performed a barrier instruction and to stop until all other threads of a block cluster have performed a barrier instruction, using systems and methods such as those described herein.

In at least one embodiment, kernel barrier sync API 3202 causes a processor such as those described herein to execute one or more commands to identify 3206 a thread, thread block, block cluster, and/or compute group of a calling thread identified by calling thread ID 3204, determine 3208 whether a barrier instruction has been reached by a calling thread identified by calling thread ID 3204 and determine 3210 whether to wait or proceed with thread execution based, at least in part, on determining whether a barrier instruction has been reached by a calling thread identified by calling thread ID 3204. In at least one embodiment, as described herein, a determination of whether a barrier instruction has been reached by a calling thread identified by calling thread ID 3204 may be a determination that a barrier instruction has not been reached by a calling thread identified by calling thread ID 3204 or a determination that no threads have reached a barrier instruction.

In at least one embodiment, kernel barrier sync API 3202 causes a processor such as those described herein to execute one or more commands to determine 3212 whether a barrier instruction has been reached one or more other threads associated with a block cluster of a calling thread identified by calling thread ID 3204 and determine 3214 whether to wait or proceed with thread execution based, at least in part, on whether a barrier instruction has been reached one or more other threads associated with a block cluster of a calling thread identified by calling thread ID 3204. In at least one embodiment, a determination of whether to wait or proceed with thread execution based, at least in part, on determining whether a barrier instruction has been reached by a calling thread identified by calling thread ID 3204 may be combined with a determination of whether to wait or proceed with thread execution based, at least in part, on whether a barrier instruction has been reached one or more other threads associated with a block cluster of a calling thread identified by calling thread ID 3204. In at least one embodiment, kernel barrier sync API 3202 causes a processor such as those described herein to execute one or more commands to report a barrier arrival status 3216 based, at least in part, on determining whether a barrier instruction has been reached by a calling thread identified by calling thread ID 3204.

In at least one embodiment, kernel barrier sync API 3202 returns barrier arrival status 3216 using return value 3218. In at least one embodiment, kernel barrier sync API 3202 returns barrier arrival status 3216 using return value 3218 to a calling process such as example process 600 described herein in at least in connection with FIG. 6. In at least one embodiment, kernel barrier sync API 3202 returns barrier arrival status 3216 using return value 3218 to a calling process using integer value, or using a Boolean value, or using an enumerated value, or using a flag, or using a signal, or using a semaphore, or using an event, or using a combination of these and/or other such return value types including, but not limited to, those described herein.

FIG. 33 illustrates an example diagram 3300 where shared memory of a compute unit is mapped between threads of a block cluster, in accordance with at least one embodiment. In at least one embodiment, a block cluster 3306 of a compute unit 3302 has thread block 3308 and thread block 3318, as described herein. In at least one embodiment, shared memory 3304 includes thread memory 3314 of a thread 3310 of thread block 3308 and thread memory 3316 of a thread 3312 of thread block 3308. In at least one embodiment, shared memory 3304 also includes thread memory 3322 of thread 3320 of thread block 3318.

In at least one embodiment, a thread such as thread 3320 causes execution of one or more commands to execute an API such as map shared memory API 3402, described herein at least in connection with FIG. 34 to map 3324 thread memory 3316 of thread 3312 to thread 3320 so that thread

3320 can access thread memory 3316. In at least one embodiment, thread 3320 executes or otherwise performs one or more commands to map 3324 thread memory 3316 read-only, so that thread 3320 can read from thread memory 3316 but cannot write to thread memory 3316. In at least one embodiment, thread 3320 executes or otherwise performs one or more commands to map 3324 thread memory 3316 as writable, so that thread 3320 can write to thread memory 3316.

In at least one embodiment, not shown in FIG. 33, a thread such as thread 3320 is part of a first thread block of a first block cluster of a first compute unit of a graphics processor such as those described herein and thread memory 3316 of thread 3312 is of a second (e.g., different) compute unit of a graphics processor so that thread 3320 accesses thread memory in shared memory of a different compute unit. In at least one embodiment, not shown in FIG. 33, a thread such as thread 3320 is part of a first thread block of a first block cluster of a first compute unit of a first graphics processor such as those described herein and thread memory 3316 of thread 3312 is of a different compute unit of a second (e.g., different) graphics processor so that thread 3320 accesses thread memory in shared memory of a different compute unit of a different graphics processor, as described herein.

FIG. 34 illustrates an example application programming interface 3400 to map memory between threads of a block cluster, in accordance with at least one embodiment. In at least one embodiment, example application programming interface 3400 to map memory between threads of a block cluster is a map shared memory API 3402. In at least one embodiment, an API such as map shared memory API 3402 is performed by a processor, such as those described herein. In at least one embodiment, an API such as map shared memory API 3402 is performed as one or more steps of a computer-implemented method, as described herein. In at least one embodiment, an API such as map shared memory API 3402 is performed by one or more processors of a computer system, as described herein. In at least one embodiment, an API such as map shared memory API 3402 is stored as instructions on a machine-readable medium, which can be performed using one or more processors, as described herein. In at least one embodiment, an API such as map shared memory API 3402], when performed, is to cause memory to be shared between two or more groups of blocks of threads.

In at least one embodiment, map shared memory API 3402 is an API to cause memory to be shared between two or more groups of blocks of threads. In at least one embodiment, map shared memory API 3402 is an API to cause one or more memory locations of first cluster of one or more groups of instructions to be accessible to a second cluster of one or more groups of instructions. In at least one embodiment, map shared memory API 3402 is an API to map thread memory between threads of a block cluster, as described herein at least in connection with FIG. 33. In at least one embodiment, map shared memory API 3402 receives one or more parameters including, but not limited to, a calling thread 3404, a memory address 3406, and/or a block rank 3408. In at least one embodiment, map shared memory API 3402 returns a return value 3418.

In at least one embodiment, calling thread 3404 of map shared memory API 3402 is an identifier of a thread that executes or otherwise performs one or more commands to perform map shared memory API 3402. In at least one embodiment, memory address 3406 is a memory address that is used to generate a translated memory address. In at least one embodiment, block rank 3408 is a rank of a block within a block cluster that is determined as described herein.

In at least one embodiment, not shown in FIG. 34, map shared memory API 3402 receives one or more additional parameters and/or of flags that specify how calling thread 3404, memory address 3406, and/or block rank 3408 will be used to map memory between threads of a block cluster. In at least one embodiment, when additional parameters and/or of flags that specify how calling thread 3404, memory address 3406, and/or block rank 3408 will be used to map memory between threads of a block cluster are not received, one or more default parameters and/or flags may be used by map shared memory API 3402 to map memory between threads of a block cluster, using systems and methods such as those described herein.

In at least one embodiment, map shared memory API 3402 causes a processor such as those described herein to execute one or more commands to identify 3410 a thread, thread block, block cluster, and/or compute group of calling thread 3404, translate 3412 memory address 3406 based at least in part on a thread block, block cluster, and/or compute group of calling thread 3404 and/or based at least in part on block rank 3408. In at least one embodiment, map shared memory API 3402 causes a processor such as those described herein to execute one or more commands to store 3414 and/or to return 3416 a translated address to that calling thread 3404 can map memory using a translated address. In at least one embodiment, map shared memory API 3402 returns a translated address using return value 3418. In at least one embodiment, not shown in FIG. 34, map shared memory API 3402 returns success and/or failure as described herein.

In at least one embodiment, map shared memory API 3402 returns a translated address using return value 3418 to a calling process such as example process 600 described herein at least in connection with FIG. 6. In at least one embodiment, map shared memory API 3402 returns a translated address using return value 3418 to a calling process using integer value, or using a Boolean value, or using an enumerated value, or using a flag, or using a signal, or using a semaphore, or using an event, or using a combination of these and/or other such return value types including, but not limited to, those described herein.

FIG. 35 illustrates an example software stack 3500 where application programming interface calls associated with block clusters are processed, in accordance with at least one embodiment. In at least one embodiment, example software stack 3500 is at least a part of a software stack such as those described herein. In at least one embodiment, an application 3502 executes a command to determine if a feature 3504 is supported. In at least one embodiment, an application 3502 executes a command to determine if feature 3504 to perform an API such as those described herein is supported.

In at least one embodiment, application 3502 uses 3506 one or more runtime APIs 3508 to determine if feature 3504 is supported. In at least one embodiment, runtime APIs 3508 use 3510 one or more driver APIs 3512 to determine if feature 3504 is supported. In at least one embodiment, not shown in FIG. 35, application 3502 uses one or more driver APIs 3512 to determine if feature 3504 is supported. In at least one embodiment, driver APIs 3512 query 3514 computer system hardware 3516 to determine if feature 3504 is supported.

In at least one embodiment, computer system hardware 3516 determines if feature 3504 is supported by a processor 3534, by querying a set of capabilities associated with processor 3534. In at least one embodiment, processor 3534 is a processor such as processor 102, described herein at least in connection with FIG. 1. In at least one embodiment, computer system hardware 3516 determines if a feature 3504 is supported by processor 3534, using an operating system of processor 3534. In at least one embodiment, computer system hardware 3516 determines if feature is supported by a graphics processor 3536 by querying a set of capabilities associated with graphics processor 3536. In at least one embodiment, graphics processor 3536 is a graphics processor such as graphics processor 108, described herein at least in connection with FIG. 1. In at least one embodiment, computer system hardware 3516 determines if feature 3504 is supported by graphics processor 3536 using an operating system of processor 3534. In at least one embodiment, computer system hardware 3516 determines if feature 3504 is supported by graphics processor 3536, using an operating system of graphics processor 3536.

In at least one embodiment, after computer system hardware 3516 determines whether feature 3504 is supported, computer system hardware 3516 returns 3518 a determination result using driver APIs 3512, which may return 3520 a determination result using runtime APIs 3508, which may return 3522 a determination result to application 3502. In at least one embodiment, if application 3502 receives a determination result that indicates that feature 3504 is supported 3524, application 3502 performs a feature 3526 using one or more APIs such as those described herein at least in connection with FIGS. 7-34 (e.g., set block cluster dimension API 802, get cluster dimension API 902, set scheduling policy API 1202, get scheduling policy API 1302, number of blocks supported API 1502, indicate cluster parameters API 1702, maximum cluster size supported API 1902, launch kernel with block clusters API 2102, get attributes API 2602, kernel barrier arrive API 3002, kernel barrier wait API 3102, kernel barrier sync API 3202, and/or map shared memory API 3402). In at least one embodiment, application 3502 performs feature 3526 using systems and methods such as those described herein.

In at least one embodiment, application 3502 performs feature 3526 using 3528 runtime APIs 3508 including, but not limited to, runtime versions of APIs such as those described herein at least in connection with FIGS. 7-34 (e.g., set block cluster dimension API 802, get cluster dimension API 902, set scheduling policy API 1202, get scheduling policy API 1302, number of blocks supported API 1502, indicate cluster parameters API 1702, maximum cluster size supported API 1902, launch kernel with block clusters API 2102, get attributes API 2602, kernel barrier arrive API 3002, kernel barrier wait API 3102, kernel barrier sync API 3202, and/or map shared memory API 3402).

In at least one embodiment, runtime APIs 3508 perform feature 3526 using 3530 driver APIs 3512 including, but not limited to, driver versions of APIs such as those described herein at least in connection with FIGS. 7-34 (e.g., set block cluster dimension API 802, get cluster dimension API 902, set scheduling policy API 1202, get scheduling policy API 1302, number of blocks supported API 1502, indicate cluster parameters API 1702, maximum cluster size supported API 1902, launch kernel with block clusters API 2102, get attributes API 2602, kernel barrier arrive API 3002, kernel barrier wait API 3102, kernel barrier sync API 3202, and/or map shared memory API 3402). In at least one embodiment, not shown in FIG. 35, application 3502 performs feature 3526 using 3530 driver APIs 3512. In at least one embodiment, driver APIs 3512 perform feature 3526 using 3532 computer system hardware 3516.

In the following description, numerous specific details are set forth to provide a more thorough understanding of at least one embodiment. However, it will be apparent to one skilled in the art that the inventive concepts may be practiced without one or more of these specific details.

Data Center

Figure 36:
FIG. 36 illustrates an exemplary data center, in accordance with at least one embodiment.

FIG. 36 illustrates an exemplary data center 3600, in accordance with at least one embodiment. In at least one embodiment, data center 3600 includes, without limitation, a data center infrastructure layer 3610, a framework layer 3620, a software layer 3630 and an application layer 3640.

In at least one embodiment, as shown in FIG. 36, data center infrastructure layer 3610 may include a resource orchestrator 3612, grouped computing resources 3614, and node computing resources ("node C.R.s") 3616(1)-3616(N), where "N" represents any whole, positive integer. In at least one embodiment, node C.R.s 3616(1)-3616(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 3616(1)-3616(N) may be a server having one or more of above-mentioned computing resources.

In at least one embodiment, grouped computing resources 3614 may include separate groupings of node C.R.s housed within one or more racks (not shown), or many racks housed in data centers at various geographical locations (also not shown). Separate groupings of node C.R.s within grouped computing resources 3614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 3612 may configure or otherwise control one or more node C.R.s 3616(1)-3616(N) and/or grouped computing resources 3614. In at least one embodiment, resource orchestrator 3612 may include a software design infrastructure ("SDI") management entity for data center 3600. In at least one embodiment, resource orchestrator 3612 may include hardware, software or some combination thereof.

In at least one embodiment, as shown in FIG. 36, framework layer 3620 includes, without limitation, a job scheduler 3632, a configuration manager 3634, a resource manager 3636 and a distributed file system 3638. In at least one embodiment, framework layer 3620 may include a framework to support software 3652 of software layer 3630 and/or one or more application(s) 3642 of application layer 3640. In at least one embodiment, software 3652 or application(s) 3642 may respectively include web-based service software or applications, such as those provided by Amazon Web Services, Google Cloud and Microsoft Azure. In at least one embodiment, framework layer 3620 may be, but is not limited to, a type of free and open-source software web application framework such as Apache Spark™ (hereinafter "Spark") that may utilize distributed file system 3638 for large-scale data processing (e.g., "big data"). In at least one embodiment, job scheduler 3632 may include a Spark driver to facilitate scheduling of workloads supported by various layers of data center 3600. In at least one embodiment, configuration manager 3634 may be capable of configuring different layers such as software layer 3630 and framework layer 3620, including Spark and distributed file system 3638 for supporting large-scale data processing. In at least one embodiment, resource manager 3636 may be capable of managing clustered or grouped computing resources mapped to or allocated for support of distributed file system 3638 and job scheduler 3632. In at least one embodiment, clustered or grouped computing resources may include grouped computing resource 3614 at data center infrastructure layer 3610. In at least one embodiment, resource manager 3636 may coordinate with resource orchestrator 3612 to manage these mapped or allocated computing resources.

In at least one embodiment, software 3652 included in software layer 3630 may include software used by at least portions of node C.R.s 3616(1)-3616(N), grouped computing resources 3614, and/or distributed file system 3638 of framework layer 3620. One or more types of software may include, but are not limited to, Internet web page search software, e-mail virus scan software, database software, and streaming video content software.

In at least one embodiment, application(s) 3642 included in application layer 3640 may include one or more types of applications used by at least portions of node C.R.s 3616(1)-3616(N), grouped computing resources 3614, and/or distributed file system 3638 of framework layer 3620. In at least one or more types of applications may include, without limitation, CUDA applications.

In at least one embodiment, any of configuration manager 3634, resource manager 3636, and resource orchestrator 3612 may implement any number and type of self-modifying actions based on any amount and type of data acquired in any technically feasible fashion. In at least one embodiment, self-modifying actions may relieve a data center operator of data center 3600 from making possibly bad configuration decisions and possibly avoiding underutilized and/or poor performing portions of a data center.

In at least one embodiment, at least one component shown or described with respect to FIG. 36 is used to implement techniques and/or functions described in connection with FIGS. 1-35. In at least one embodiment, at least one of grouped computing resources 3614 and node C.R. 3616(1-N) is used to perform an application programming interface to indicate two or more blocks of threads to be scheduled in parallel. In at least one embodiment, at least one of grouped computing resources 3614 and node C.R. 3616(1-N) is used to perform an application programming interface to determine which of two or more blocks of threads to be scheduled in parallel. In at least one embodiment, at least one of grouped computing resources 3614 and node C.R. 3616(1-N) is used to perform an application programming interface comprising one or more parameters to cause a scheduling policy of one or more blocks of one or more threads to be performed. In at least one embodiment, at least one of grouped computing resources 3614 and node C.R. 3616(1-N) is used to perform an application programming interface comprising one or more parameters to indicate a scheduling policy of one or more blocks of one or more threads. In at least one embodiment, at least one of grouped computing resources 3614 and node C.R. 3616(1-N) is used to perform an application programming interface to indicate a maximum number of blocks of threads capable of being scheduled in parallel. In at least one embodiment, at least one of grouped computing resources 3614 and node C.R. 3616(1-N) is used to perform an application programming interface comprising one or more parameters to indicate one or more attributes of one or more groups of blocks of one or more threads. In at least one embodiment, at least one of grouped computing resources 3614 and node C.R. 3616(1-N) is used to perform an application programming interface to indicate a maximum number of blocks of threads to be scheduled in parallel. In at least one embodiment, at least one of grouped computing resources 3614 and node C.R. 3616(1-N) is used to perform an application programming interface to cause a kernel to be generated to cause two or more blocks of two or more threads to be scheduled in parallel. In at least one embodiment, at least one of grouped computing resources 3614 and node C.R. 3616(1-N) is used to perform an application programming interface comprising one or more parameters to indicate one or more limitations of one or more attributes of one or more groups of blocks of one or more threads. In at least one embodiment, at least one of grouped computing resources 3614 and node C.R. 3616(1-N) is used to perform an application programming interface to indicate whether one or more threads within two or more blocks of threads have performed a barrier instruction. In at least one embodiment, at least one of grouped computing resources 3614 and node C.R. 3616(1-N) is used to perform an application programming interface to cause performance of one or more threads within a group of blocks of threads to stop at least until all threads within the group of blocks have performed a barrier instruction. In at least one embodiment, at least one of grouped computing resources 3614 and node C.R. 3616(1-N) is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one of grouped computing resources 3614 and node C.R. 3616(1-N) is used to perform an application programming interface to cause memory to be shared between two or more groups of blocks of threads. In at least one embodiment, at least one of grouped computing resources 3614 and node C.R. 3616(1-N) is used to perform at least one aspect described with respect to example computer system 100, example diagram 200, diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Computer-Based Systems

The following figures set forth, without limitation, exemplary computer-based systems that can be used to implement at least one embodiment.

Figure 37:
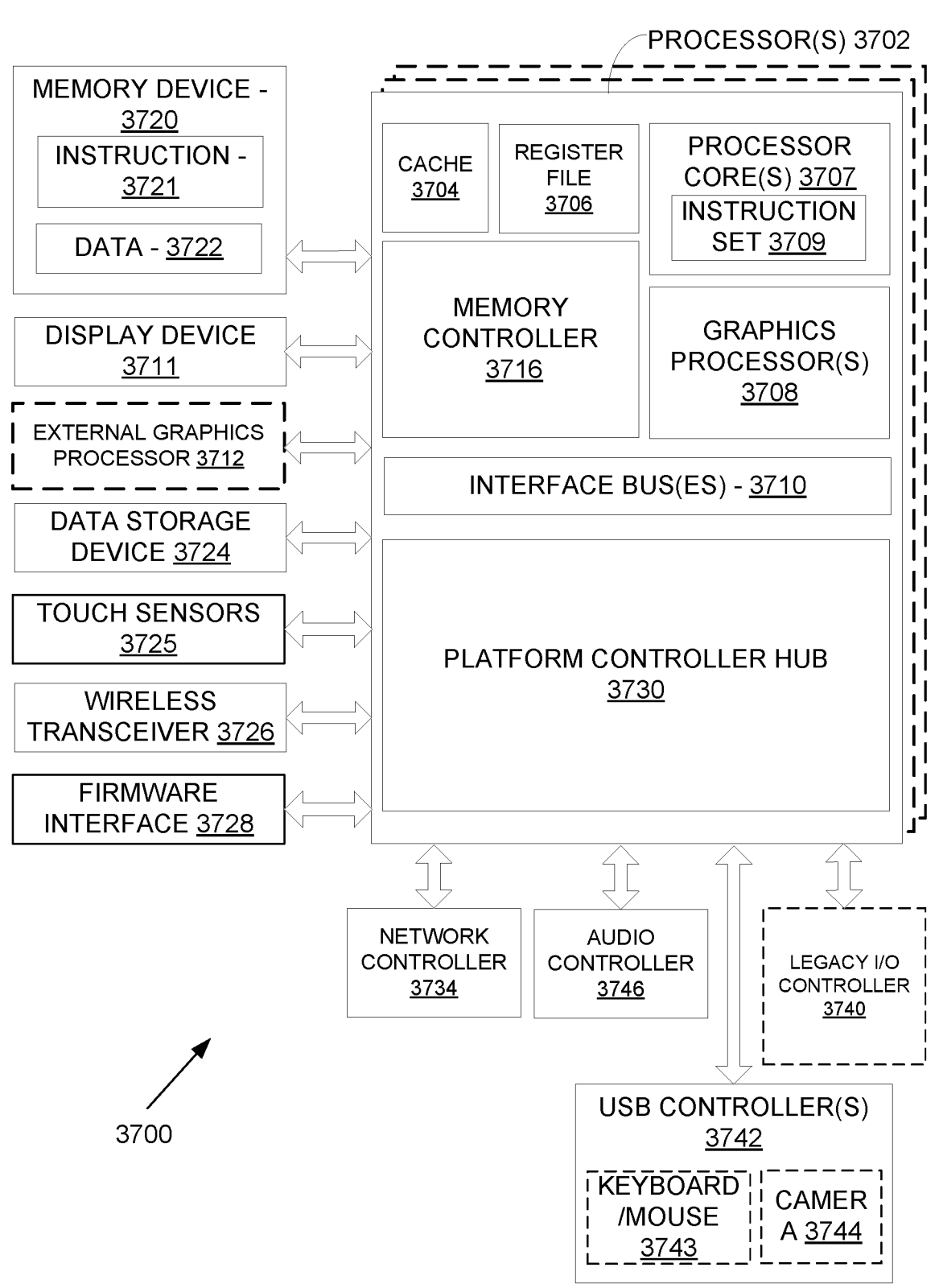
FIG. 37 illustrates a processing system, in accordance with at least one embodiment.

FIG. 37 illustrates a processing system 3700, in accordance with at least one embodiment. In at least one embodiment, processing system 3700 includes one or more processors 3702 and one or more graphics processors 3708, and may be a single processor desktop system, a multiprocessor workstation system, or a server system having a large number of processors 3702 or processor cores 3707. In at least one embodiment, processing system 3700 is a processing platform incorporated within a system-on-a-chip ("SoC") integrated circuit for use in mobile, handheld, or embedded devices.

In at least one embodiment, processing system 3700 can include, or be incorporated within a server-based gaming platform, a game console, a media console, a mobile gaming console, a handheld game console, or an online game console. In at least one embodiment, processing system 3700 is a mobile phone, smart phone, tablet computing device or mobile Internet device. In at least one embodiment, processing system 3700 can also include, couple with, or be integrated within a wearable device, such as a smart watch wearable device, smart eyewear device, augmented reality device, or virtual reality device. In at least one embodiment, processing system 3700 is a television or set top box device having one or more processors 3702 and a graphical interface generated by one or more graphics processors 3708.

In at least one embodiment, one or more processors 3702 each include one or more processor cores 3707 to process instructions which, when executed, perform operations for system and user software. In at least one embodiment, each of one or more processor cores 3707 is configured to process a specific instruction set 3709. In at least one embodiment, instruction set 3709 may facilitate Complex Instruction Set Computing ("CISC"), Reduced Instruction Set Computing ("RISC"), or computing via a Very Long Instruction Word ("VLIW"). In at least one embodiment, processor cores 3707 may each process a different instruction set 3709, which may include instructions to facilitate emulation of other instruction sets. In at least one embodiment, processor core 3707 may also include other processing devices, such as a digital signal processor ("DSP").

In at least one embodiment, processor 3702 includes cache memory ('cache") 3704. In at least one embodiment, processor 3702 can have a single internal cache or multiple levels of internal cache. In at least one embodiment, cache memory is shared among various components of processor 3702. In at least one embodiment, processor 3702 also uses an external cache (e.g., a Level 3 ("L3") cache or Last Level Cache ("LLC")) (not shown), which may be shared among processor cores 3707 using known cache coherency techniques. In at least one embodiment, register file 3706 is additionally included in processor 3702 which may include different types of registers for storing different types of data (e.g., integer registers, floating point registers, status registers, and an instruction pointer register). In at least one embodiment, register file 3706 may include general-purpose registers or other registers.

In at least one embodiment, one or more processor(s) 3702 are coupled with one or more interface bus(es) 3710 to transmit communication signals such as address, data, or control signals between processor 3702 and other components in processing system 3700. In at least one embodiment interface bus 3710, in one embodiment, can be a processor bus, such as a version of a Direct Media Interface ("DMI") bus. In at least one embodiment, interface bus 3710 is not limited to a DMI bus, and may include one or more Peripheral Component Interconnect buses (e.g., "PCI," PCI Express ("PCIe")), memory buses, or other types of interface buses. In at least one embodiment processor(s) 3702 include an integrated memory controller 3716 and a platform controller hub 3730. In at least one embodiment, memory controller 3716 facilitates communication between a memory device and other components of processing system 3700, while platform controller hub ("PCH") 3730 provides connections to Input/Output ("I/O") devices via a local I/O bus.

In at least one embodiment, memory device 3720 can be a dynamic random access memory ("DRAM") device, a static random access memory ("SRAM") device, flash memory device, phase-change memory device, or some other memory device having suitable performance to serve as processor memory. In at least one embodiment memory device 3720 can operate as system memory for processing system 3700, to store data 3722 and instructions 3721 for use when one or more processors 3702 executes an application or process. In at least one embodiment, memory controller 3716 also couples with an optional external graphics processor 3712, which may communicate with one or more graphics processors 3708 in processors 3702 to perform graphics and media operations. In at least one embodiment, a display device 3711 can connect to processor(s) 3702. In at least one embodiment display device 3711 can include one or more of an internal display device, as in a mobile electronic device or a laptop device or an external display device attached via a display interface (e.g., DisplayPort, etc.). In at least one embodiment, display device 3711 can include a head mounted display ("HMD") such as a stereoscopic display device for use in virtual reality ("VR") applications or augmented reality ("AR") applications.

In at least one embodiment, platform controller hub 3730 enables peripherals to connect to memory device 3720 and processor 3702 via a high-speed I/O bus. In at least one embodiment, I/O peripherals include, but are not limited to, an audio controller 3746, a network controller 3734, a firmware interface 3728, a wireless transceiver 3726, touch sensors 3725, a data storage device 3724 (e.g., hard disk drive, flash memory, etc.). In at least one embodiment, data storage device 3724 can connect via a storage interface (e.g., SATA) or via a peripheral bus, such as PCI, or PCIe. In at least one embodiment, touch sensors 3725 can include touch screen sensors, pressure sensors, or fingerprint sensors. In at least one embodiment, wireless transceiver 3726 can be a Wi-Fi transceiver, a Bluetooth transceiver, or a mobile network transceiver such as a 3G, 4G, or Long Term Evolution ("LTE") transceiver. In at least one embodiment, firmware interface 3728 enables communication with system firmware, and can be, for example, a unified extensible firmware interface ("UEFI"). In at least one embodiment, network controller 3734 can enable a network connection to a wired network. In at least one embodiment, a high-performance network controller (not shown) couples with interface bus 3710. In at least one embodiment, audio controller 3746 is a multi-channel high definition audio controller. In at least one embodiment, processing system 3700 includes an optional legacy I/O controller 3740 for coupling legacy (e.g., Personal System 2 ("PS/2")) devices to processing system 3700. In at least one embodiment, platform controller hub 3730 can also connect to one or more Universal Serial Bus ("USB") controllers 3742 connect input devices, such as keyboard and mouse 3743 combinations, a camera 3744, or other USB input devices.

In at least one embodiment, an instance of memory controller 3716 and platform controller hub 3730 may be integrated into a discreet external graphics processor, such as external graphics processor 3712. In at least one embodiment, platform controller hub 3730 and/or memory controller 3716 may be external to one or more processor(s) 3702. For example, in at least one embodiment, processing system 3700 can include an external memory controller 3716 and platform controller hub 3730, which may be configured as a memory controller hub and peripheral controller hub within a system chipset that is in communication with processor(s) 3702.

In at least one embodiment, at least one component shown or described with respect to FIG. 37 is used to implement techniques and/or functions described in connection with FIGS. 1-35. In at least one embodiment, at least one of processor(s) 3702 or external graphics processor 3712 is used to perform an application programming interface to indicate two or more blocks of threads to be scheduled in parallel. In at least one embodiment, at least one of processor(s) 3702 or external graphics processor 3712 is used to perform an application programming interface to determine which of two or more blocks of threads to be scheduled in parallel. In at least one embodiment, at least one of processor(s) 3702 or external graphics processor 3712 is used to perform an application programming interface comprising one or more parameters to cause a scheduling policy of one or more blocks of one or more threads to be performed. In at least one embodiment, at least one of processor(s) 3702 or external graphics processor 3712 is used to perform an application programming interface comprising one or more parameters to indicate a scheduling policy of one or more blocks of one or more threads. In at least one embodiment, at least one of processor(s) 3702 or external graphics processor 3712 is used to perform an application programming interface to indicate a maximum number of blocks of threads capable of being scheduled in parallel. In at least one embodiment, at least one of processor(s) 3702 or external graphics processor 3712 is used to perform an application programming interface comprising one or more parameters to indicate one or more attributes of one or more groups of blocks of one or more threads. In at least one embodiment, at least one of processor(s) 3702 or external graphics processor 3712 is used to perform an application programming interface to indicate a maximum number of blocks of threads to be scheduled in parallel. In at least one embodiment, at least one of processor(s) 3702 or external graphics processor 3712 is used to perform an application programming interface to cause a kernel to be generated to cause two or more blocks of two or more threads to be scheduled in parallel. In at least one embodiment, at least one of processor(s) 3702 or external graphics processor 3712 is used to perform an application programming interface comprising one or more parameters to indicate one or more limitations of one or more attributes of one or more groups of blocks of one or more threads. In at least one embodiment, at least one of processor(s) 3702 or external graphics processor 3712 is used to perform an application programming interface to indicate whether one or more threads within two or more blocks of threads have performed a barrier instruction. In at least one embodiment, at least one of processor(s) 3702 or external graphics processor 3712 is used to perform an application programming interface to cause performance of one or more threads within a group of blocks of threads to stop at least until all threads within the group of blocks have performed a barrier instruction. In at least one embodiment, at least one of processor(s) 3702 or external graphics processor 3712 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one of processor(s) 3702 or external graphics processor 3712 is used to perform an application programming interface to cause memory to be shared between two or more groups of blocks of threads.

In at least one embodiment, at least one of processor(s) 3702 or external graphics processor 3712 is used to perform at least one aspect described with respect to example computer system 100, example diagram 200, diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 38:
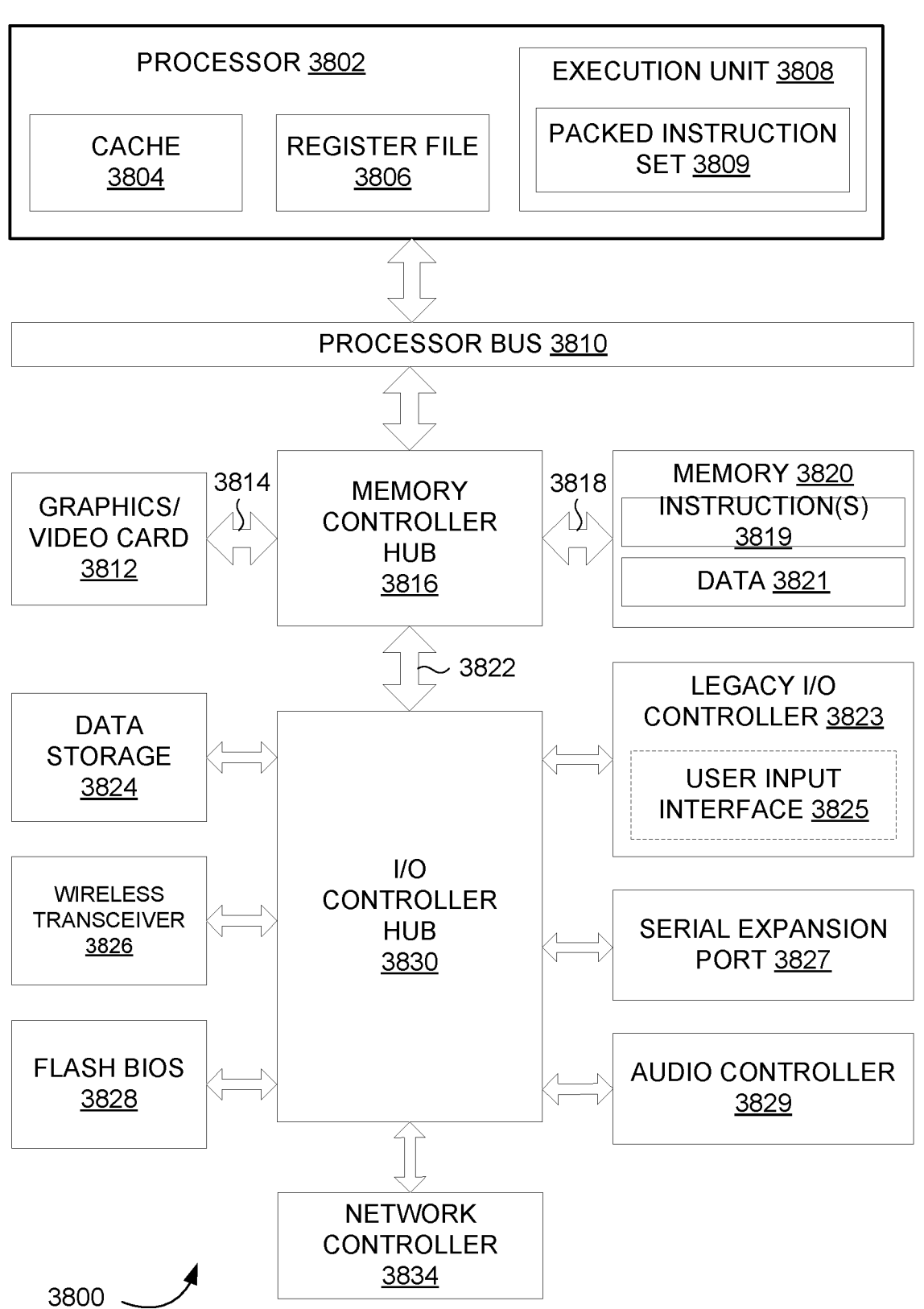
FIG. 38 illustrates a computer system, in accordance with at least one embodiment.

FIG. 38 illustrates a computer system 3800, in accordance with at least one embodiment. In at least one embodiment, computer system 3800 may be a system with interconnected devices and components, an SOC, or some combination. In at least on embodiment, computer system 3800 is formed with a processor 3802 that may include execution units to execute an instruction. In at least one embodiment, computer system 3800 may include, without limitation, a component, such as processor 3802 to employ execution units including logic to perform algorithms for processing data. In at least one embodiment, computer system 3800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3800 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 3800 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 3800 may include, without limitation, processor 3802 that may include, without limitation, one or more execution units 3808 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 3800 is a single processor desktop or server system. In at least one embodiment, computer system 3800 may be a multiprocessor system. In at least one embodiment, processor 3802 may include, without limitation, a CISC microprocessor, a RISC microprocessor, a VLIW microprocessor, a processor implementing a combination of instruction sets, or any other processor device, such as a digital signal processor, for example. In at least one embodiment, processor 3802 may be coupled to a processor bus 3810 that may transmit data signals between processor 3802 and other components in computer system 3800.

In at least one embodiment, processor 3802 may include, without limitation, a Level 1 ("L1") internal cache memory ("cache") 3804. In at least one embodiment, processor 3802 may have a single internal cache or multiple levels of internal cache. In at least one embodiment, cache memory may reside external to processor 3802. In at least one embodiment, processor 3802 may also include a combination of both internal and external caches. In at least one embodiment, a register file 3806 may store different types of data in various registers including, without limitation, integer registers, floating point registers, status registers, and instruction pointer register.

In at least one embodiment, execution unit 3808, including, without limitation, logic to perform integer and floating point operations, also resides in processor 3802. Processor 3802 may also include a microcode ("ucode") read only memory ("ROM") that stores microcode for certain macro instructions. In at least one embodiment, execution unit 3808 may include logic to handle a packed instruction set 3809. In at least one embodiment, by including packed instruction set 3809 in an instruction set of a general-purpose processor 3802, along with associated circuitry to execute instructions, operations used by many multimedia applications may be performed using packed data in a general-purpose processor 3802. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 3808 may also be used in microcontrollers, embedded processors, graphics devices, DSPs, and other types of logic circuits. In at least one embodiment, computer system 3800 may include, without limitation, a memory 3820. In at least one embodiment, memory 3820 may be implemented as a DRAM device, an SRAM device, flash memory device, or other memory device. Memory 3820 may store instruction(s) 3819 and/or data 3821 represented by data signals that may be executed by processor 3802.

In at least one embodiment, a system logic chip may be coupled to processor bus 3810 and memory 3820. In at least one embodiment, the system logic chip may include, without limitation, a memory controller hub ("MCH") 3816, and processor 3802 may communicate with MCH 3816 via processor bus 3810. In at least one embodiment, MCH 3816 may provide a high bandwidth memory path 3818 to memory 3820 for instruction and data storage and for storage of graphics commands, data and textures. In at least one embodiment, MCH 3816 may direct data signals between processor 3802, memory 3820, and other components in computer system 3800 and to bridge data signals between processor bus 3810, memory 3820, and a system I/O 3822. In at least one embodiment, system logic chip may provide a graphics port for coupling to a graphics controller. In at least one embodiment, MCH 3816 may be coupled to memory 3820 through high bandwidth memory path 3818 and graphics/video card 3812 may be coupled to MCH 3816 through an Accelerated Graphics Port ("AGP") interconnect 3814.

In at least one embodiment, computer system 3800 may use system I/O 3822 that is a proprietary hub interface bus to couple MCH 3816 to I/O controller hub ("ICH") 3830. In at least one embodiment, ICH 3830 may provide direct connections to some I/O devices via a local I/O bus. In at least one embodiment, local I/O bus may include, without limitation, a high-speed I/O bus for connecting peripherals to memory 3820, a chipset, and processor 3802. Examples may include, without limitation, an audio controller 3829, a firmware hub ("flash BIOS") 3828, a wireless transceiver 3826, a data storage 3824, a legacy I/O controller 3823 containing a user input interface 3825 and a keyboard interface, a serial expansion port 3827, such as a USB, and a network controller 3834. Data storage 3824 may comprise a hard disk drive, a floppy disk drive, a CD-ROM device, a flash memory device, or other mass storage device.

In at least one embodiment, FIG. 38 illustrates a system, which includes interconnected hardware devices or "chips." In at least one embodiment, FIG. 38 may illustrate an exemplary SoC. In at least one embodiment, devices illustrated in FIG. 38 may be interconnected with proprietary interconnects, standardized interconnects (e.g., PCIe), or some combination thereof. In at least one embodiment, one or more components of system 3800 are interconnected using compute express link ("CXL") interconnects.

In at least one embodiment, at least one component shown or described with respect to FIG. 38 is used to implement techniques and/or functions described in connection with FIGS. 1-35. In at least one embodiment, processor 3802 is used to perform an application programming interface to indicate two or more blocks of threads to be scheduled in parallel. In at least one embodiment, processor 3802 is used to perform an application programming interface to determine which of two or more blocks of threads to be scheduled in parallel. In at least one embodiment, processor 3802 is used to perform an application programming interface comprising one or more parameters to cause a scheduling policy of one or more blocks of one or more threads to be performed. In at least one embodiment, processor 3802 is used to perform an application programming interface comprising one or more parameters to indicate a scheduling policy of one or more blocks of one or more threads. In at least one embodiment, processor 3802 is used to perform an application programming interface to indicate a maximum number of blocks of threads capable of being scheduled in parallel. In at least one embodiment, processor 3802 is used to perform an application programming interface comprising one or more parameters to indicate one or more attributes of one or more groups of blocks of one or more threads. In at least one embodiment, processor 3802 is used to perform an application programming interface to indicate a maximum number of blocks of threads to be scheduled in parallel. In at least one embodiment, processor 3802 is used to perform an application programming interface to cause a kernel to be generated to cause two or more blocks of two or more threads to be scheduled in parallel. In at least one embodiment, processor 3802 is used to perform an application programming interface comprising one or more parameters to indicate one or more limitations of one or more attributes of one or more groups of blocks of one or more threads. In at least one embodiment, processor 3802 is used to perform an application programming interface to indicate whether one or more threads within two or more blocks of threads have performed a barrier instruction. In at least one embodiment, processor 3802 is used to perform an application programming interface to cause performance of one or more threads within a group of blocks of threads to stop at least until all threads within the group of blocks have performed a barrier instruction. In at least one embodiment, processor 3802 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, processor 3802 is used to perform an application programming interface to cause memory to be shared between two or more groups of blocks of threads.

In at least one embodiment, processor 3802 is used to perform at least one aspect described with respect to example computer system 100, example diagram 200, diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 39:
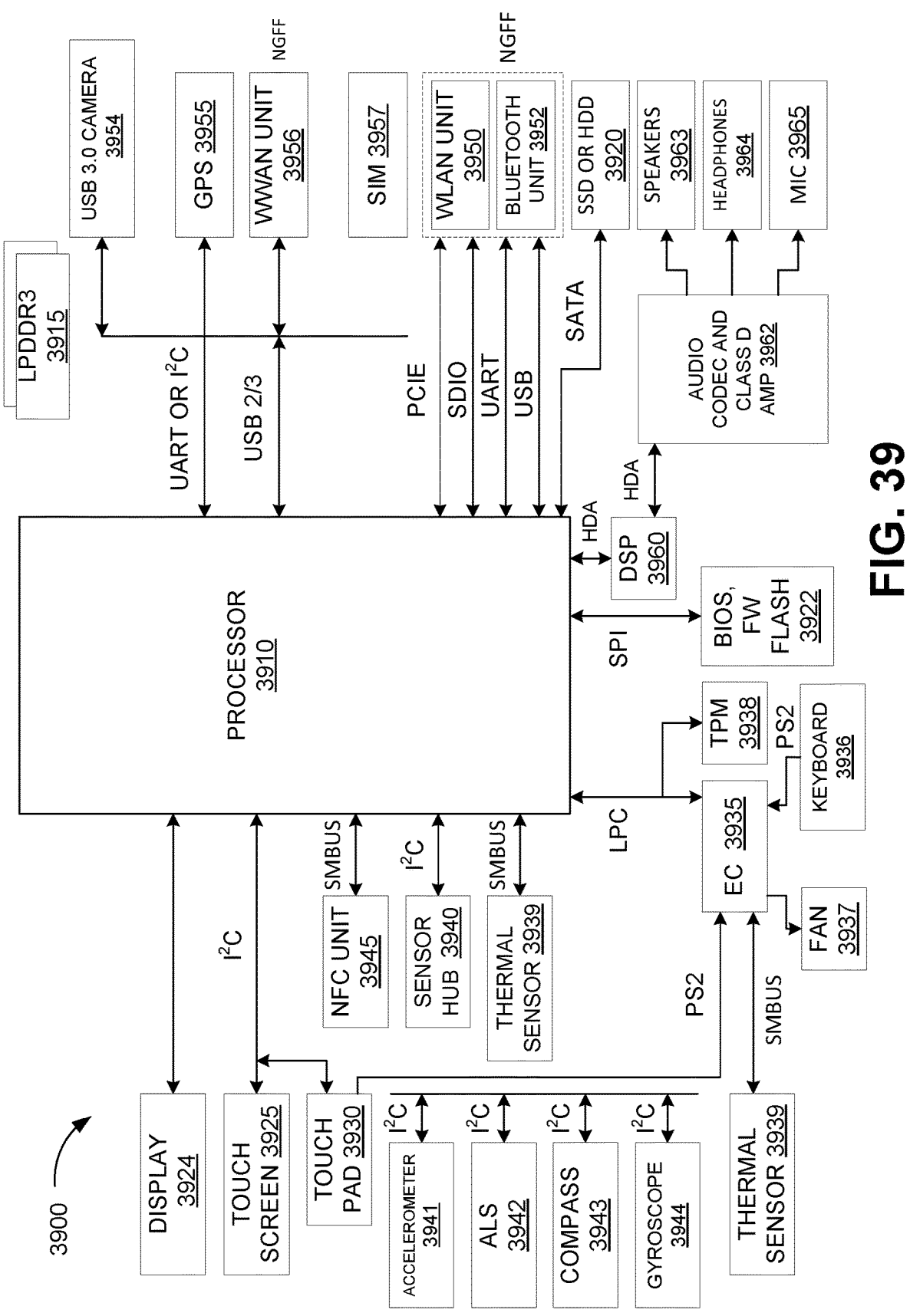
FIG. 39 illustrates a system, in accordance with at least one embodiment.

FIG. 39 illustrates a system 3900, in accordance with at least one embodiment. In at least one embodiment, system 3900 is an electronic device that utilizes a processor 3910. In at least one embodiment, system 3900 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 3900 may include, without limitation, processor 3910 communicatively coupled to any suitable number or kind of components, peripherals, modules, or devices. In at least one embodiment, processor 3910 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 39 illustrates a system which includes interconnected hardware devices or "chips." In at least one embodiment, FIG. 39 may illustrate an exemplary SoC. In at least one embodiment, devices illustrated in FIG. 39 may be interconnected with proprietary interconnects, standardized interconnects (e.g., PCIe) or some combination thereof. In at least one embodiment, one or more components of FIG. 39 are interconnected using CXL interconnects.

In at least one embodiment, FIG. 39 may include a display 3924, a touch screen 3925, a touch pad 3930, a Near Field Communications unit ("NFC") 3945, a sensor hub 3940, a thermal sensor 3946, an Express Chipset ("EC") 3935, a Trusted Platform Module ("TPM") 3938, BIOS/firmware/flash memory ("BIOS, FW Flash") 3922, a DSP 3960, a Solid State Disk ("SSD") or Hard Disk Drive ("HDD") 3920, a wireless local area network unit ("WLAN") 3950, a Bluetooth unit 3952, a Wireless Wide Area Network unit ("WWAN") 3956, a Global Positioning System ("GPS") 3955, a camera ("USB 3.0 camera") 3954 such as a USB 3.0 camera, or a Low Power Double Data Rate ("LPDDR") memory unit ("LPDDR3") 3915 implemented in, for example, LPDDR3 standard. These components may each be implemented in any suitable manner.

In at least one embodiment, other components may be communicatively coupled to processor 3910 through components discussed above. In at least one embodiment, an accelerometer 3941, an Ambient Light Sensor ("ALS") 3942, a compass 3943, and a gyroscope 3944 may be communicatively coupled to sensor hub 3940. In at least one embodiment, a thermal sensor 3939, a fan 3937, a keyboard 3936, and a touch pad 3930 may be communicatively coupled to EC 3935. In at least one embodiment, a speaker 3963, a headphones 3964, and a microphone ("mic") 3965 may be communicatively coupled to an audio unit ("audio codec and class d amp") 3962, which may in turn be communicatively coupled to DSP 3960. In at least one embodiment, audio unit 3962 may include, for example and without limitation, an audio coder/decoder ("codec") and a class D amplifier. In at least one embodiment, a SIM card ("SIM") 3957 may be communicatively coupled to WWAN unit 3956. In at least one embodiment, components such as WLAN unit 3950 and Bluetooth unit 3952, as well as WWAN unit 3956 may be implemented in a Next Generation Form Factor ("NGFF").

In at least one embodiment, at least one component shown or described with respect to FIG. 39 is used to implement techniques and/or functions described in connection with FIGS. 1-35. In at least one embodiment, processor 3910 is used to perform an application programming interface to indicate two or more blocks of threads to be scheduled in parallel. In at least one embodiment, processor 3910 is used to determine which of two or more blocks of threads to be scheduled in parallel. In at least one embodiment, processor 3910 is used to perform an application programming interface comprising one or more parameters to cause a scheduling policy of one or more blocks of one or more threads to be performed. In at least one embodiment, processor 3910 is used to perform an application programming interface comprising one or more parameters to indicate a scheduling policy of one or more blocks of one or more threads. In at least one embodiment, processor 3910 is used to perform an application programming interface to indicate a maximum number of blocks of threads capable of being scheduled in parallel. In at least one embodiment, processor 3910 is used to perform an application programming interface comprising one or more parameters to indicate one or more attributes of one or more groups of blocks of one or more threads. In at least one embodiment, processor 3910 is used to perform an application programming interface to indicate a maximum number of blocks of threads to be scheduled in parallel. In at least one embodiment, processor 3910 is used to perform an application programming interface to cause a kernel to be generated to cause two or more blocks of two or more threads to be scheduled in parallel. In at least one embodiment, processor 3910 is used to perform an application programming interface comprising one or more parameters to indicate one or more limitations of one or more attributes of one or more groups of blocks of one or more threads. In at least one embodiment, processor 3910 is used to perform an application programming interface to indicate whether one or more threads within two or more blocks of threads have performed a barrier instruction. In at least one embodiment, processor 3910 is used to perform an application programming interface to cause performance of one or more threads within a group of blocks of threads to stop at least until all threads within the group of blocks have performed a barrier instruction. In at least one embodiment, processor 3910 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, processor 3910 is used to perform an application programming interface to cause memory to be shared between two or more groups of blocks of threads.

In at least one embodiment, processor 3910 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 40:
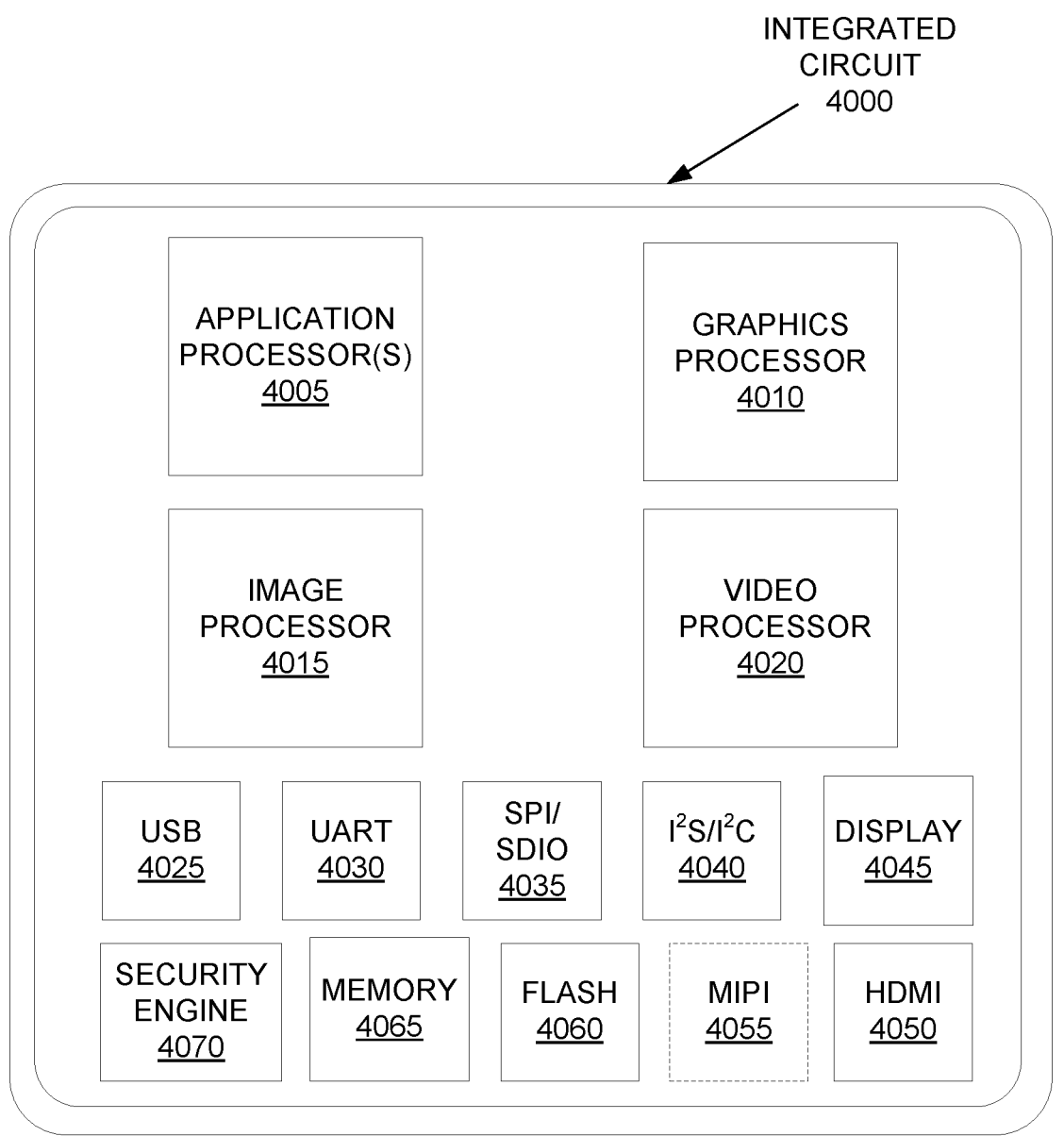
FIG. 40 illustrates an exemplary integrated circuit, in accordance with at least one embodiment.

FIG. 40 illustrates an exemplary integrated circuit 4000, in accordance with at least one embodiment. In at least one embodiment, exemplary integrated circuit 4000 is an SoC that may be fabricated using one or more IP cores. In at least one embodiment, integrated circuit 4000 includes one or more application processor(s) 4005 (e.g., CPUs, DPUs), at least one graphics processor 4010, and may additionally include an image processor 4015 and/or a video processor 4020, any of which may be a modular IP core. In at least one embodiment, integrated circuit 4000 includes peripheral or bus logic including a USB controller 4025, a UART controller 4030, an SPI/SDIO controller 4035, and an I²S/I²C controller 4040. In at least one embodiment, integrated circuit 4000 can include a display device 4045 coupled to one or more of a high-definition multimedia interface ("HDMI") controller 4050 and a mobile industry processor interface ("MIPI") display interface 4055. In at least one embodiment, storage may be provided by a flash memory subsystem 4060 including flash memory and a flash memory controller. In at least one embodiment, a memory interface may be provided via a memory controller 4065 for access to SDRAM or SRAM memory devices. In at least one embodiment, some integrated circuits additionally include an embedded security engine 4070.

In at least one embodiment, at least one component shown or described with respect to FIG. 40 is used to implement techniques and/or functions described in connection with FIGS. 1-35. In at least one embodiment, at least one of application processor 40 05, graphics processor 40 10, image processor 40 15, or video processor 40 20 is used to perform an application programming interface to indicate two or more blocks of threads to be scheduled in parallel. In at least one embodiment, at least one of application processor 40 05, graphics processor 40 10, image processor 40 15, or video processor 40 20 is used to perform an application programming interface to determine which of two or more blocks of threads to be scheduled in parallel. In at least one embodiment, at least one of application processor 40 05, graphics processor 40 10, image processor 40 15, or video processor 40 20 is used to perform an application programming interface comprising one or more parameters to cause a scheduling policy of one or more blocks of one or more threads to be performed. In at least one embodiment, at least one of application processor 40 05, graphics processor 40 10, image processor 40 15, or video processor 40 20 is used to perform an application programming interface comprising one or more parameters to indicate a scheduling policy of one or more blocks of one or more threads. In at least one embodiment, at least one of application processor 40 05, graphics processor 40 10, image processor 40 15, or video processor 40 20 is used to perform an application programming interface to indicate a maximum number of blocks of threads capable of being scheduled in parallel. In at least one embodiment, at least one of application processor 40 05, graphics processor 40 10, image processor 40 15, or video processor 40 20 is used to perform an application programming interface comprising one or more parameters to indicate one or more attributes of one or more groups of blocks of one or more threads. In at least one embodiment, at least one of application processor 40 05, graphics processor 40

10, image processor 40 15, or video processor 40 20 is used to perform an application programming interface to indicate a maximum number of blocks of threads to be scheduled in parallel. In at least one embodiment, at least one of application processor 40 05, graphics processor 40 10, image processor 40 15, or video processor 40 20 is used to perform an application programming interface to cause a kernel to be generated to cause two or more blocks of two or more threads to be scheduled in parallel. In at least one embodiment, at least one of application processor 40 05, graphics processor 40 10, image processor 40 15, or video processor 40 20 is used to perform an application programming interface comprising one or more parameters to indicate one or more limitations of one or more attributes of one or more groups of blocks of one or more threads. In at least one embodiment, at least one of application processor 40 05, graphics processor 40 10, image processor 40 15, or video processor 40 20 is used to perform an application programming interface to indicate whether one or more threads within two or more blocks of threads have performed a barrier instruction. In at least one embodiment, at least one of application processor 40 05, graphics processor 40 10, image processor 40 15, or video processor 40 20 is used to perform an application programming interface to cause performance of one or more threads within a group of blocks of threads to stop at least until all threads within the group of blocks have performed a barrier instruction. In at least one embodiment, at least one of application processor 40 05, graphics processor 40 10, image processor 40 15, or video processor 40 20 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one of application processor 40 05, graphics processor 40 10, image processor 40 15, or video processor 40 20 is used to perform an application programming interface to cause memory to be shared between two or more groups of blocks of threads.

In at least one embodiment, at least one of application processor 40 05, graphics processor 40 10, image processor 40 15, or video processor 40 20 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 41:
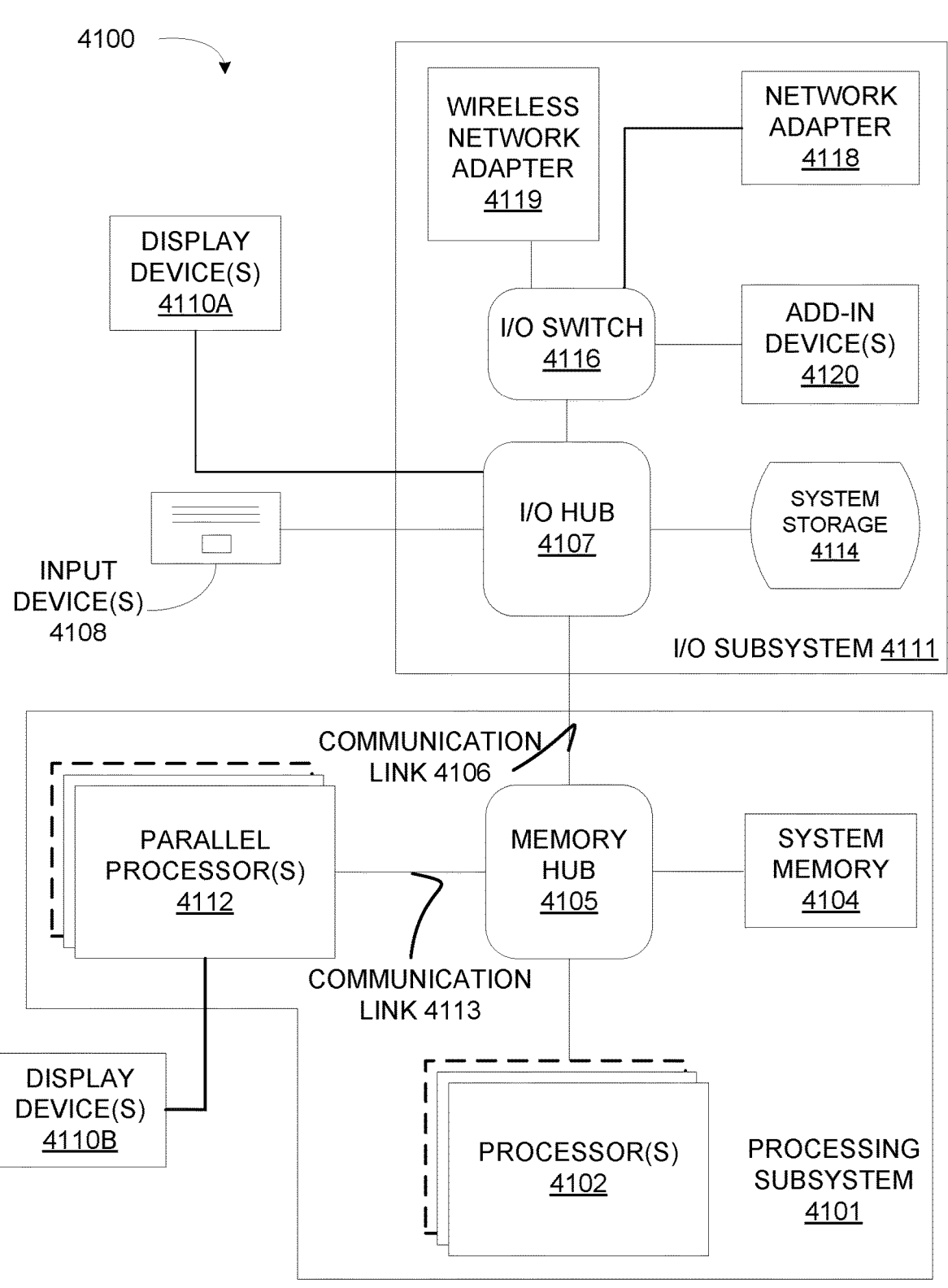
FIG. 41 illustrates a computing system, according to at least one embodiment.

FIG. 41 illustrates a computing system 4100, according to at least one embodiment; In at least one embodiment, computing system 4100 includes a processing subsystem 4101 having one or more processor(s) 4102 and a system memory 4104 communicating via an interconnection path that may include a memory hub 4105. In at least one embodiment, memory hub 4105 may be a separate component within a chipset component or may be integrated within one or more processor(s) 4102. In at least one embodiment, memory hub 4105 couples with an I/O subsystem 4111 via a communication link 4106. In at least one embodiment, I/O subsystem 4111 includes an I/O hub 4107 that can enable computing system 4100 to receive input from one or more input device(s) 4108. In at least one embodiment, I/O hub 4107 can enable a display controller, which may be included in one or more processor(s) 4102, to provide outputs to one or more display device(s) 4110A. In at least one embodiment, one or more display device(s) 4110A coupled with I/O hub 4107 can include a local, internal, or embedded display device.

In at least one embodiment, processing subsystem 4101 includes one or more parallel processor(s) 4112 coupled to memory hub 4105 via a bus or other communication link 4113. In at least one embodiment, communication link 4113 may be one of any number of standards based communication link technologies or protocols, such as, but not limited to PCIe, or may be a vendor specific communications interface or communications fabric. In at least one embodiment, one or more parallel processor(s) 4112 form a computationally focused parallel or vector processing system that can include a large number of processing cores and/or processing clusters, such as a many integrated core processor. In at least one embodiment, one or more parallel processor(s) 4112 form a graphics processing subsystem that can output pixels to one of one or more display device(s) 4110A coupled via I/O Hub 4107. In at least one embodiment, one or more parallel processor(s) 4112 can also include a display controller and display interface (not shown) to enable a direct connection to one or more display device(s) 4110B.

In at least one embodiment, a system storage unit 4114 can connect to I/O hub 4107 to provide a storage mechanism for computing system 4100. In at least one embodiment, an I/O switch 4116 can be used to provide an interface mechanism to enable connections between I/O hub 4107 and other components, such as a network adapter 4118 and/or wireless network adapter 4119 that may be integrated into a platform, and various other devices that can be added via one or more add-in device(s) 4120. In at least one embodiment, network adapter 4118 can be an Ethernet adapter or another wired network adapter. In at least one embodiment, wireless network adapter 4119 can include one or more of a Wi-Fi, Bluetooth, NFC, or other network device that includes one or more wireless radios.

In at least one embodiment, computing system 4100 can include other components not explicitly shown, including USB or other port connections, optical storage drives, video capture devices, and the like, that may also be connected to I/O hub 4107. In at least one embodiment, communication paths interconnecting various components in FIG. 41 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 4112 incorporate circuitry optimized for graphics and video processing, including, for example, video output circuitry, and constitutes a graphics processing unit ("GPU"). In at least one embodiment, one or more parallel processor(s) 4112 incorporate circuitry optimized for general purpose processing. In at least embodiment, components of computing system 4100 may be integrated with one or more other system elements on a single integrated circuit. For example, in at least one embodiment, one or more parallel processor(s) 4112, memory hub 4105, processor(s) 4102, and I/O hub 4107 can be integrated into an SoC integrated circuit. In at least one embodiment, components of computing system 4100 can be integrated into a single package to form a system in package ("SIP") configuration. In at least one embodiment, at least a portion of the components of computing system 4100 can be integrated into a multi-chip module ("MCM"), which can be interconnected with other multi-chip modules into a modular computing system. In at least one embodiment, I/O subsystem 4111 and display devices 4110B are omitted from computing system 4100.

In at least one embodiment, at least one component shown or described with respect to FIG. 41 is used to implement techniques and/or functions described in connection with FIGS. 1-35. In at least one embodiment, at least one of processor(s) 4102 or parallel processor(s) 4112 is used to perform an application programming interface to indicate two or more blocks of threads to be scheduled in parallel. In at least one embodiment, at least one of processor(s) 4102 or parallel processor(s) 4112 is used to perform an application programming interface to determine which of two or more blocks of threads to be scheduled in parallel. In at least one embodiment, at least one of processor(s) 4102 or parallel processor(s) 4112 is used to perform an application programming interface comprising one or more parameters to cause a scheduling policy of one or more blocks of one or more threads to be performed. In at least one embodiment, at least one of processor(s) 4102 or parallel processor(s) 4112 is used to perform an application programming interface comprising one or more parameters to indicate a scheduling policy of one or more blocks of one or more threads. In at least one embodiment, at least one of processor(s) 4102 or parallel processor(s) 4112 is used to perform an application programming interface to indicate a maximum number of blocks of threads capable of being scheduled in parallel. In at least one embodiment, at least one of processor(s) 4102 or parallel processor(s) 4112 is used to perform an application programming interface comprising one or more parameters to indicate one or more attributes of one or more groups of blocks of one or more threads. In at least one embodiment, at least one of processor(s) 4102 or parallel processor(s) 4112 is used to perform an application programming interface to indicate a maximum number of blocks of threads to be scheduled in parallel. In at least one embodiment, at least one of processor(s) 4102 or parallel processor(s) 4112 is used to perform an application programming interface to cause a kernel to be generated to cause two or more blocks of two or more threads to be scheduled in parallel. In at least one embodiment, at least one of processor(s) 4102 or parallel processor(s) 4112 is used to perform an application programming interface comprising one or more parameters to indicate one or more limitations of one or more attributes of one or more groups of blocks of one or more threads. In at least one embodiment, at least one of processor(s) 4102 or parallel processor(s) 4112 is used to perform an application programming interface to indicate whether one or more threads within two or more blocks of threads have performed a barrier instruction. In at least one embodiment, at least one of processor(s) 4102 or parallel processor(s) 4112 is used to perform an application programming interface to cause performance of one or more threads within a group of blocks of threads to stop at least until all threads within the group of blocks have performed a barrier instruction. In at least one embodiment, at least one of processor(s) 4102 or parallel processor(s) 4112 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one of processor(s) 4102 or parallel processor(s) 4112 is used to perform an application programming interface to cause memory to be shared between two or more groups of blocks of threads.

In at least one embodiment, at least one of processor(s) 4102 or parallel processor(s) 4112 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Processing Systems

The following figures set forth, without limitation, exemplary processing systems that can be used to implement at least one embodiment.

Figure 42:
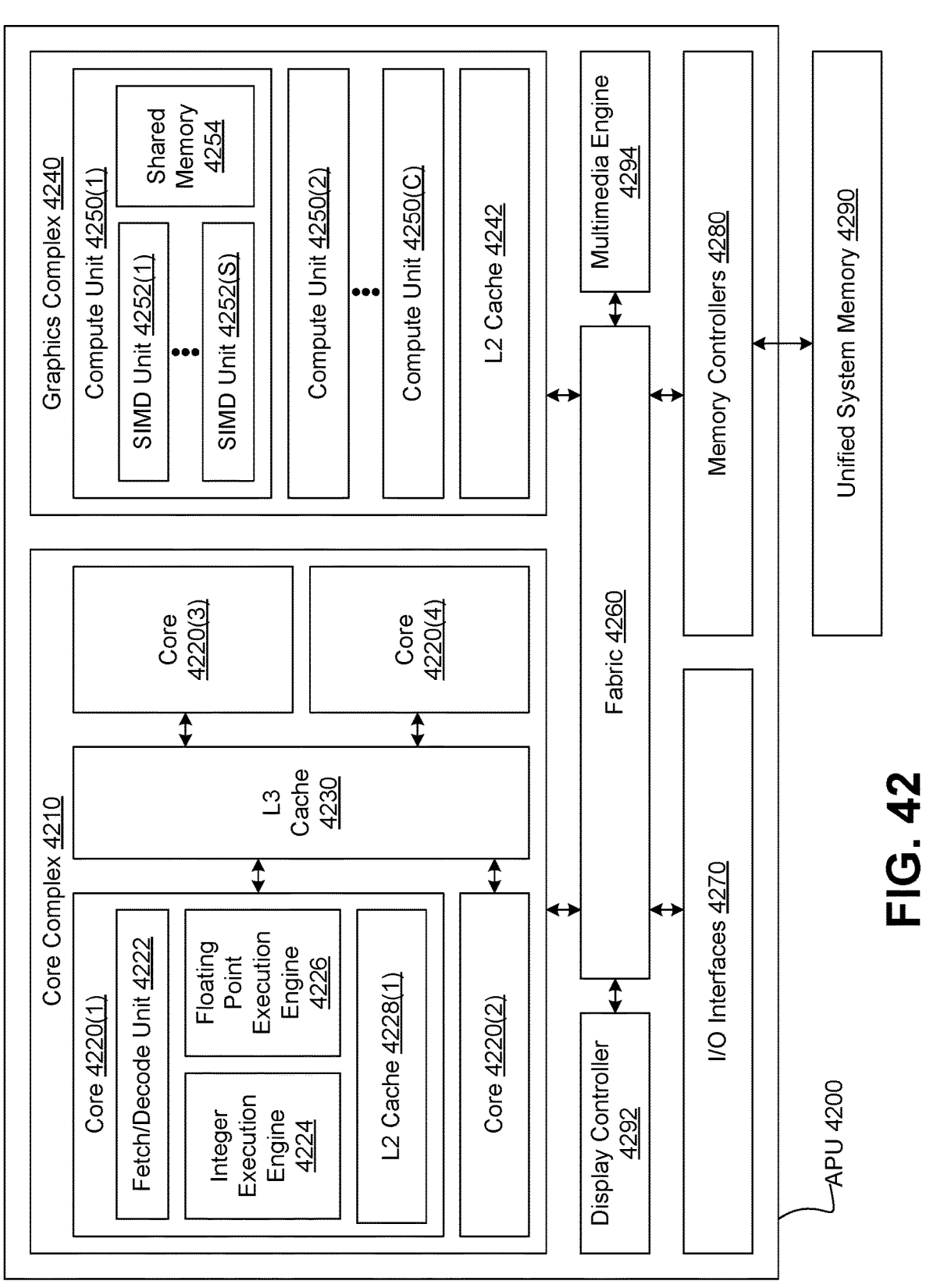
FIG. 42 illustrates an APU, in accordance with at least one embodiment.

FIG. 42 illustrates an accelerated processing unit ("APU") 4200, in accordance with at least one embodiment. In at least one embodiment, APU 4200 is developed by AN/ID Corporation of Santa Clara, CA. In at least one embodiment, APU 4200 can be configured to execute an application program, such as a CUDA program. In at least one embodiment, APU 4200 includes, without limitation, a core complex 4210, a graphics complex 4240, fabric 4260, I/O interfaces 4270, memory controllers 4280, a display controller 4292, and a multimedia engine 4294. In at least one embodiment, APU 4200 may include, without limitation, any number of core complexes 4210, any number of graphics complexes 4250, any number of display controllers 4292, and any number of multimedia engines 4294 in any combination. For explanatory purposes, multiple instances of like objects are denoted herein with reference numbers identifying the object and parenthetical numbers identifying the instance where needed.

In at least one embodiment, core complex 4210 is a CPU, graphics complex 4240 is a GPU, and APU 4200 is a processing unit that integrates, without limitation, 4210 and 4240 onto a single chip. In at least one embodiment, some tasks may be assigned to core complex 4210 and other tasks may be assigned to graphics complex 4240. In at least one embodiment, core complex 4210 is configured to execute main control software associated with APU 4200, such as an operating system. In at least one embodiment, core complex 4210 is the master processor of APU 4200, controlling and coordinating operations of other processors. In at least one embodiment, core complex 4210 issues commands that control the operation of graphics complex 4240. In at least one embodiment, core complex 4210 can be configured to execute host executable code derived from CUDA source code, and graphics complex 4240 can be configured to execute device executable code derived from CUDA source code.

In at least one embodiment, core complex 4210 includes, without limitation, cores 4220(1)-4220(4) and an L3 cache 4230. In at least one embodiment, core complex 4210 may include, without limitation, any number of cores 4220 and any number and type of caches in any combination. In at least one embodiment, cores 4220 are configured to execute instructions of a particular instruction set architecture ("ISA"). In at least one embodiment, each core 4220 is a CPU core.

In at least one embodiment, each core 4220 includes, without limitation, a fetch/decode unit 4222, an integer execution engine 4224, a floating point execution engine 4226, and an L2 cache 4228. In at least one embodiment, fetch/decode unit 4222 fetches instructions, decodes such instructions, generates micro-operations, and dispatches separate micro-instructions to integer execution engine 4224 and floating point execution engine 4226. In at least one embodiment, fetch/decode unit 4222 can concurrently dispatch one micro-instruction to integer execution engine 4224 and another micro-instruction to floating point execution engine 4226. In at least one embodiment, integer execution engine 4224 executes, without limitation, integer and memory operations. In at least one embodiment, floating point engine 4226 executes, without limitation, floating point and vector operations. In at least one embodiment, fetch-decode unit 4222 dispatches micro-instructions to a single execution engine that replaces both integer execution engine 4224 and floating point execution engine 4226.

In at least one embodiment, each core 4220(*i*), where i is an integer representing a particular instance of core 4220, may access L2 cache 4228(*i*) included in core 4220(*i*). In at least one embodiment, each core 4220 included in core complex 4210(*j*), where j is an integer representing a particular instance of core complex 4210, is connected to other cores 4220 included in core complex 4210(*j*) via L3 cache 4230(*j*) included in core complex 4210(*j*). In at least one embodiment, cores 4220 included in core complex 4210(*j*), where j is an integer representing a particular instance of core complex 4210, can access all of L3 cache 4230(*j*) included in core complex 4210(*j*). In at least one embodiment, L3 cache 4230 may include, without limitation, any number of slices.

In at least one embodiment, graphics complex 4240 can be configured to perform compute operations in a highly-parallel fashion. In at least one embodiment, graphics complex 4240 is configured to execute graphics pipeline operations such as draw commands, pixel operations, geometric computations, and other operations associated with rendering an image to a display. In at least one embodiment, graphics complex 4240 is configured to execute operations unrelated to graphics. In at least one embodiment, graphics complex 4240 is configured to execute both operations related to graphics and operations unrelated to graphics.

In at least one embodiment, graphics complex 4240 includes, without limitation, any number of compute units 4250 and an L2 cache 4242. In at least one embodiment, compute units 4250 share L2 cache 4242. In at least one embodiment, L2 cache 4242 is partitioned. In at least one embodiment, graphics complex 4240 includes, without limitation, any number of compute units 4250 and any number (including zero) and type of caches. In at least one embodiment, graphics complex 4240 includes, without limitation, any amount of dedicated graphics hardware.

In at least one embodiment, each compute unit 4250 includes, without limitation, any number of SIMD units 4252 and a shared memory 4254. In at least one embodiment, each SIMD unit 4252 implements a SIMD architecture and is configured to perform operations in parallel. In at least one embodiment, each compute unit 4250 may execute any number of thread blocks, but each thread block executes on a single compute unit 4250. In at least one embodiment, a thread block includes, without limitation, any number of threads of execution. In at least one embodiment, a work-group is a thread block. In at least one embodiment, each SIMD unit 4252 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 4254.

In at least one embodiment, fabric 4260 is a system interconnect that facilitates data and control transmissions across core complex 4210, graphics complex 4240, I/O interfaces 4270, memory controllers 4280, display controller 4292, and multimedia engine 4294. In at least one embodiment, APU 4200 may include, without limitation, any amount and type of system interconnect in addition to or instead of fabric 4260 that facilitates data and control transmissions across any number and type of directly or indirectly linked components that may be internal or external to APU 4200. In at least one embodiment, I/O interfaces 4270 are representative of any number and type of I/O interfaces (e.g., PCI, PCI-Extended ("PCI-X"), PCIe, giga-bit Ethernet ("GBE"), USB, etc.). In at least one embodiment, various types of peripheral devices are coupled to I/O interfaces 4270 In at least one embodiment, peripheral devices that are coupled to I/O interfaces 4270 may include, without limitation, keyboards, mice, printers, scanners, joy-sticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 4294 includes, without limitation, any amount and type of circuitry that is related to multimedia, such as a video decoder, a video encoder, an image signal processor, etc. In at least one embodiment, memory controllers 4280 facilitate data transfers between APU 4200 and a unified system memory 4290. In at least one embodiment, core complex 4210 and graphics complex 4240 share unified system memory 4290.

In at least one embodiment, APU 4200 implements a memory subsystem that includes, without limitation, any amount and type of memory controllers 4280 and memory devices (e.g., shared memory 4254) that may be dedicated to one component or shared among multiple components. In at least one embodiment, APU 4200 implements a cache subsystem that includes, without limitation, one or more cache memories (e.g., L2 caches 4328, L3 cache 4230, and L2 cache 4242) that may each be private to or shared between any number of components (e.g., cores 4220, core complex 4210, SIMD units 4252, compute units 4250, and graphics complex 4240).

In at least one embodiment, at least one component shown or described with respect to FIG. 42 is used to implement techniques and/or functions described in connection with FIGS. 1-35. In at least one embodiment, at least one element of core complex 4210 or graphics complex 4240 is used to perform an application programming interface to indicate two or more blocks of threads to be scheduled in parallel. In at least one embodiment, at least one element of core complex 4210 or graphics complex 4240 is used to perform an application programming interface to determine which of two or more blocks of threads to be scheduled in parallel. In at least one embodiment, at least one element of core complex 4210 or graphics complex 4240 is used to perform an application programming interface comprising one or more parameters to cause a scheduling policy of one or more blocks of one or more threads to be performed. In at least one embodiment, at least one element of core complex 4210 or graphics complex 4240 is used to perform an application programming interface comprising one or more parameters to indicate a scheduling policy of one or more blocks of one or more threads. In at least one embodiment, at least one element of core complex 4210 or graphics complex 4240 is used to perform an application programming interface to indicate a maximum number of blocks of threads capable of being scheduled in parallel. In at least one embodiment, at least one element of core complex 4210 or graphics complex 4240 is used to perform an application programming interface comprising one or more parameters to indicate one or more attributes of one or more groups of blocks of one or more threads. In at least one embodiment, at least one element of core complex 4210 or graphics complex 4240 is used to perform an application programming interface to indicate a maximum number of blocks of threads to be scheduled in parallel. In at least one embodiment, at least one element of core complex 4210 or graphics complex 4240 is used to perform an application programming interface to cause a kernel to be generated to cause two or more blocks of two or more threads to be scheduled in parallel. In at least one embodiment, at least one element of core complex 4210 or graphics complex 4240 is used to perform an application programming interface comprising one or more parameters to indicate one or more limitations of one or more attributes of one or more groups of blocks of one or more threads. In at least one embodiment, at least one element of core complex 4210 or graphics complex 4240 is used to perform an application programming interface to indicate whether one or more threads within two or more blocks of threads have performed a barrier instruction. In at least one embodiment, at least one element of core complex 4210 or graphics complex 4240 is used to perform an application programming interface to cause performance of one or more threads within a group of blocks of threads to stop at least until all threads within the group of blocks have performed a barrier instruction. In at least one embodiment, at least one element of core complex 4210 or graphics complex 4240 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one element of core complex 4210 or graphics complex 4240 is used to perform an application programming interface to cause memory to be shared between two or more groups of blocks of threads.

In at least one embodiment, at least one element of core complex 4210 or graphics complex 4240 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 43:
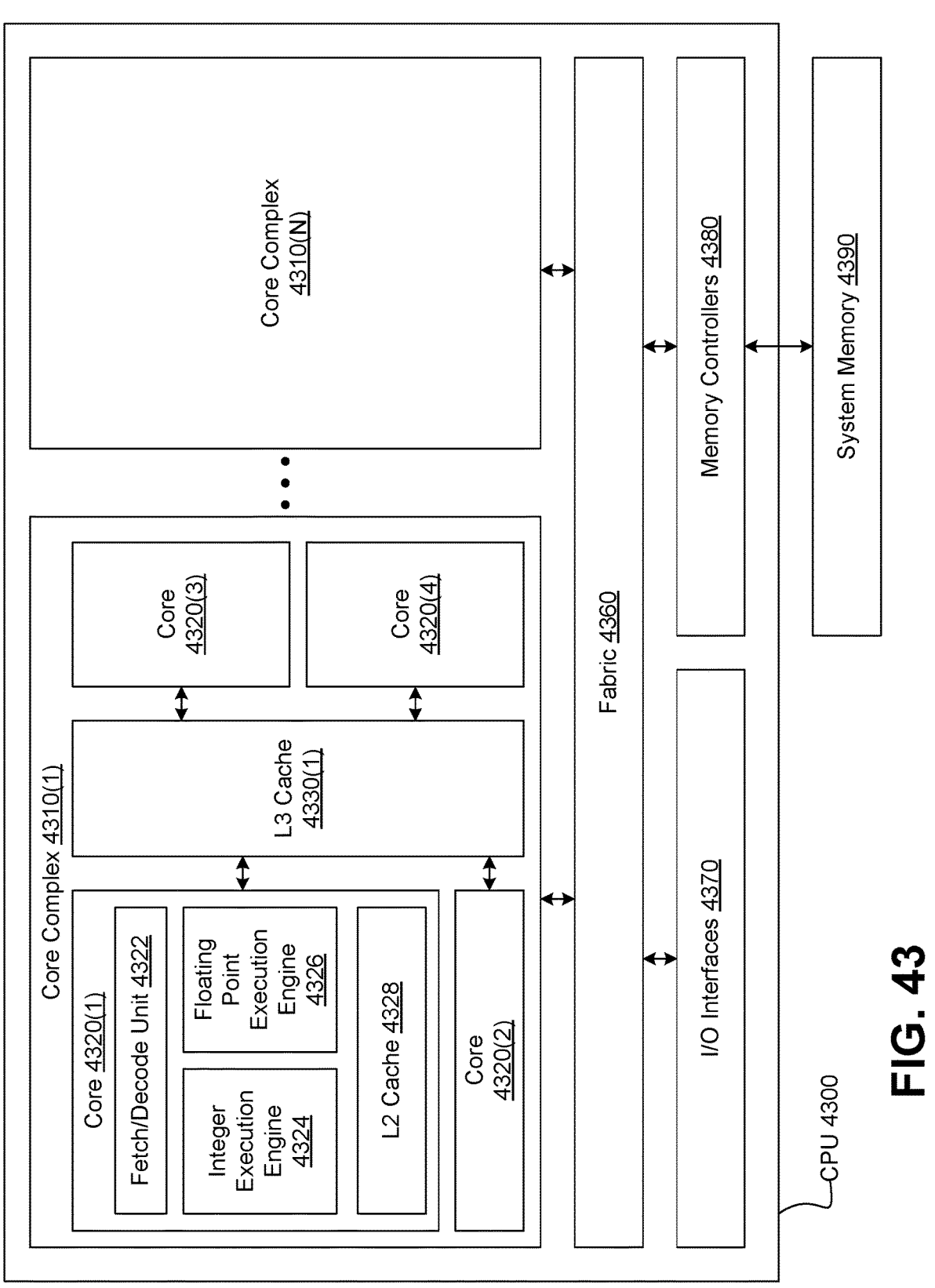
FIG. 43 illustrates a CPU, in accordance with at least one embodiment.

FIG. 43 illustrates a CPU 4300, in accordance with at least one embodiment. In at least one embodiment, CPU 4300 is developed by AMD Corporation of Santa Clara, CA. In at least one embodiment, CPU 4300 can be configured to execute an application program. In at least one embodiment, CPU 4300 is configured to execute main control software, such as an operating system. In at least one embodiment, CPU 4300 issues commands that control the operation of an external GPU (not shown). In at least one embodiment, CPU 4300 can be configured to execute host executable code derived from CUDA source code, and an external GPU can be configured to execute device executable code derived from such CUDA source code. In at least one embodiment, CPU 4300 includes, without limitation, any number of core complexes 4310, fabric 4360, I/O interfaces 4370, and memory controllers 4380.

In at least one embodiment, core complex 4310 includes, without limitation, cores 4320(1)-4320(4) and an L3 cache 4330. In at least one embodiment, core complex 4310 may include, without limitation, any number of cores 4320 and any number and type of caches in any combination. In at least one embodiment, cores 4320 are configured to execute instructions of a particular ISA. In at least one embodiment, each core 4320 is a CPU core.

In at least one embodiment, each core 4320 includes, without limitation, a fetch/decode unit 4322, an integer execution engine 4324, a floating point execution engine 4326, and an L2 cache 4328. In at least one embodiment, fetch/decode unit 4322 fetches instructions, decodes such instructions, generates micro-operations, and dispatches separate micro-instructions to integer execution engine 4324 and floating point execution engine 4326. In at least one embodiment, fetch/decode unit 4322 can concurrently dispatch one micro-instruction to integer execution engine 4324 and another micro-instruction to floating point execution engine 4326. In at least one embodiment, integer execution engine 4324 executes, without limitation, integer and memory operations. In at least one embodiment, floating point engine 4326 executes, without limitation, floating point and vector operations. In at least one embodiment, fetch-decode unit 4322 dispatches micro-instructions to a single execution engine that replaces both integer execution engine 4324 and floating point execution engine 4326.

In at least one embodiment, each core 4320(i), where i is an integer representing a particular instance of core 4320, may access L2 cache 4328(i) included in core 4320(i). In at least one embodiment, each core 4320 included in core complex 4310(j), where j is an integer representing a particular instance of core complex 4310, is connected to other cores 4320 in core complex 4310(j) via L3 cache 4330(j) included in core complex 4310(j). In at least one embodiment, cores 4320 included in core complex 4310(j), where j is an integer representing a particular instance of core complex 4310, can access all of L3 cache 4330(j) included in core complex 4310(j). In at least one embodiment, L3 cache 4330 may include, without limitation, any number of slices.

In at least one embodiment, fabric 4360 is a system interconnect that facilitates data and control transmissions across core complexes 4310(1)-4310(N) (where N is an integer greater than zero), I/O interfaces 4370, and memory controllers 4380. In at least one embodiment, CPU 4300 may include, without limitation, any amount and type of system interconnect in addition to or instead of fabric 4360 that facilitates data and control transmissions across any number and type of directly or indirectly linked components that may be internal or external to CPU 4300. In at least one embodiment, I/O interfaces 4370 are representative of any number and type of I/O interfaces (e.g., PCI, PCI-X, PCIe, GBE, USB, etc.). In at least one embodiment, various types of peripheral devices are coupled to I/O interfaces 4370 In at least one embodiment, peripheral devices that are coupled to I/O interfaces 4370 may include, without limitation, displays, keyboards, mice, printers, scanners, joysticks or other types of game controllers, media recording devices, external storage devices, network interface cards, and so forth.

In at least one embodiment, memory controllers 4380 facilitate data transfers between CPU 4300 and a system memory 4390. In at least one embodiment, core complex 4310 and graphics complex 4340 share system memory 4390. In at least one embodiment, CPU 4300 implements a memory subsystem that includes, without limitation, any amount and type of memory controllers 4380 and memory devices that may be dedicated to one component or shared among multiple components. In at least one embodiment, CPU 4300 implements a cache subsystem that includes, without limitation, one or more cache memories (e.g., L2 caches 4328 and L3 caches 4330) that may each be private to or shared between any number of components (e.g., cores 4320 and core complexes 4310).

In at least one embodiment, at least one component shown or described with respect to FIG. 43 is used to implement techniques and/or functions described in connection with FIGS. 1-35. In at least one embodiment, at least one element of core complex 4310(1)-4310(n) is used to perform an application programming interface to indicate two or more blocks of threads to be scheduled in parallel. In at least one embodiment, at least one element of core complex 4310(1)-4310(n) is used to perform an application programming interface to determine which of two or more blocks of threads to be scheduled in parallel. In at least one embodiment, at least one element of core complex 4310(1)-4310(n) is used to perform an application programming interface comprising one or more parameters to cause a scheduling policy of one or more blocks of one or more threads to be performed. In at least one embodiment, at least one element of core complex 4310(1)-4310(n) is used to perform an application programming interface comprising one or more parameters to indicate a scheduling policy of one or more blocks of one or more threads. In at least one embodiment, at least one element of core complex 4310(1)-4310(n) is used to perform an application programming interface to indicate a maximum number of blocks of threads capable of being scheduled in parallel. In at least one embodiment, at least one element of core complex 4310(1)-4310(n) is used to perform an application programming interface comprising one or more parameters to indicate one or more attributes of one or more groups of blocks of one or more threads. In at least one embodiment, at least one element of core complex 4310(1)-4310(n) is used to perform an application programming interface to indicate a maximum number of blocks of threads to be scheduled in parallel. In at least one embodiment, at least one element of core complex 4310(1)-4310(n) is used to perform an application programming interface to cause a kernel to be generated to cause two or more blocks of two or more threads to be scheduled in parallel. In at least one embodiment, at least one element of core complex 4310(1)-4310(n) is used to perform an application programming interface comprising one or more parameters to indicate one or more limitations of one or more attributes of one or more groups of blocks of one or more threads. In at least one embodiment, at least one element of core complex 4310(1)-4310(n) is used to perform an application programming interface to indicate whether one or more threads within two or more blocks of threads have performed a barrier instruction. In at least one embodiment, at least one element of core complex 4310(1)-4310(n) is used to perform an application programming interface to cause performance of one or more threads within a group of blocks of threads to stop at least until all threads within the group of blocks have performed a barrier instruction. In at least one embodiment, at least one element of core complex 4310(1)-4310(n) is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one element of core complex 4310(1)-4310(n) is used to perform an application programming interface to cause memory to be shared between two or more groups of blocks of threads.

In at least one embodiment, at least one element of core complex 4310(1)-4310(n) is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 44:
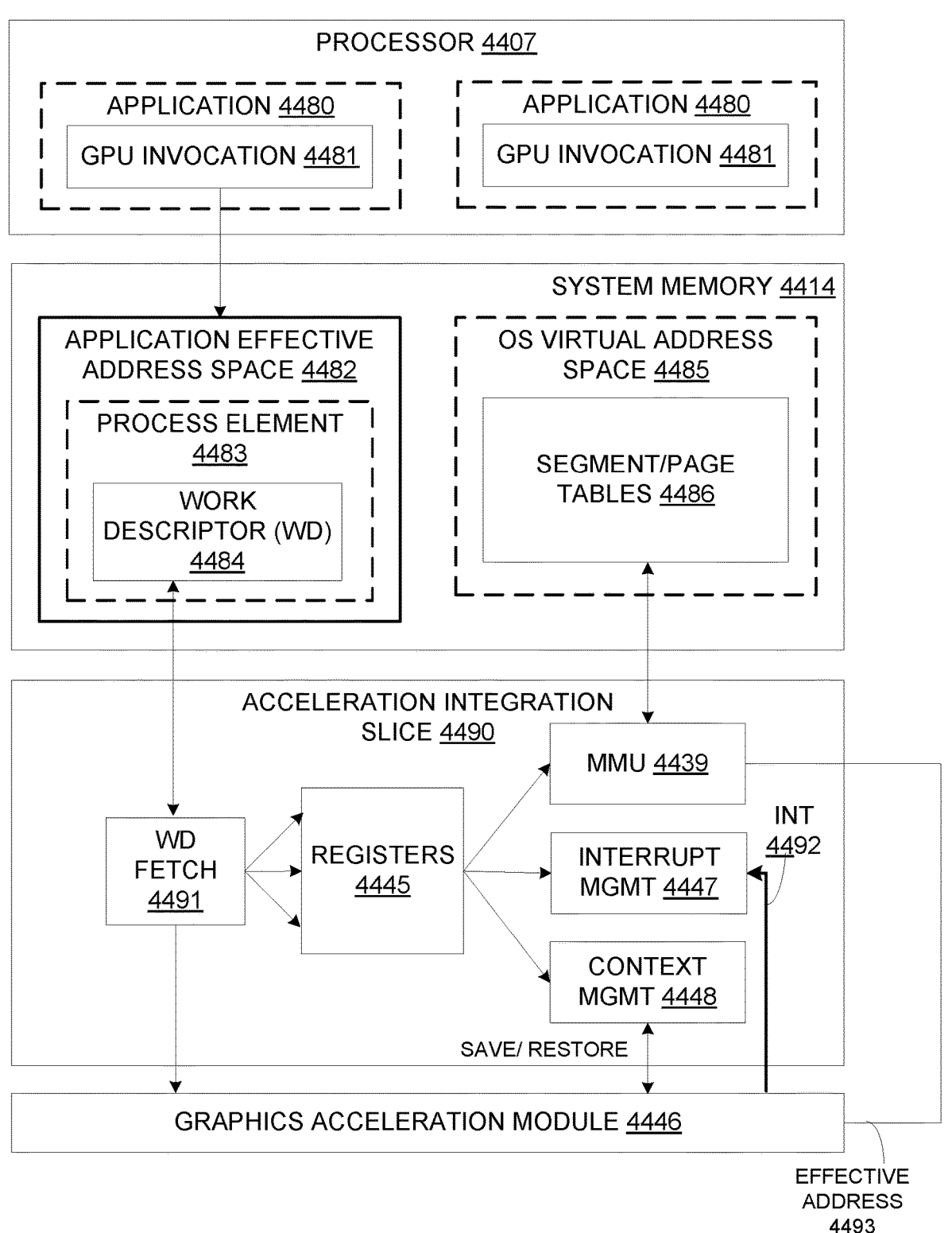
FIG. 44 illustrates an exemplary accelerator integration slice, in accordance with at least one embodiment.

FIG. 44 illustrates an exemplary accelerator integration slice 4490, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 4482 within system memory 4414 stores process elements 4483. In one embodiment, process elements 4483 are stored in response to GPU invocations 4481 from applications 4480 executed on processor 4407. A process element 4483 contains process state for corresponding application 4480. A work descriptor ("WD") 4484 contained in process element 4483 can be a single job requested by an application or may contain a pointer to a queue of jobs. In at least one embodiment, WD 4484 is a pointer to a job request queue in application effective address space 4482.

Graphics acceleration module 4446 and/or individual graphics processing engines can be shared by all or a subset of processes in a system. In at least one embodiment, an infrastructure for setting up process state and sending WD 4484 to graphics acceleration module 4446 to start a job in a virtualized environment may be included.

In at least one embodiment, a dedicated-process programming model is implementation-specific. In this model, a single process owns graphics acceleration module 4446 or an individual graphics processing engine. Because graphics acceleration module 4446 is owned by a single process, a hypervisor initializes an accelerator integration circuit for an owning partition and an operating system initializes accelerator integration circuit for an owning process when graphics acceleration module 4446 is assigned.

In operation, a WD fetch unit 4491 in accelerator integration slice 4490 fetches next WD 4484 which includes an indication of work to be done by one or more graphics processing engines of graphics acceleration module 4446. Data from WD 4484 may be stored in registers 4445 and used by a memory management unit ("MMU") 4439, interrupt management circuit 4447 and/or context management circuit 4448 as illustrated. For example, one embodiment of MMU 4439 includes segment/page walk circuitry for accessing segment/page tables 4486 within OS virtual address space 4485. Interrupt management circuit 4447 may process interrupt events ("INT") 4492 received from graphics acceleration module 4446. When performing graphics operations, an effective address 4493 generated by a graphics processing engine is translated to a real address by MMU 4439.

In one embodiment, a same set of registers 4445 are duplicated for each graphics processing engine and/or graphics acceleration module 4446 and may be initialized by a hypervisor or operating system. Each of these duplicated registers may be included in accelerator integration slice 4490. Exemplary registers that may be initialized by a hypervisor are shown in Table 1.

TABLE 1

| Hypervisor Initialized Registers |
| --- |
| 1  Slice Control Register |
| 2  Real Address (RA) Scheduled Processes Area Pointer |
| 3  Authority Mask Override Register |
| 4  Interrupt Vector Table Entry Offset |
| 5  Interrupt Vector Table Entry Limit |
| 6  State Register |
| 7  Logical Partition ID |
| 8  Real address (RA) Hypervisor Accelerator Utilization Record Pointer |
| 9  Storage Description Register |

Exemplary registers that may be initialized by an operating system are shown in Table 2.

TABLE 2

| Operating System Initialized Registers |
| --- |
| 1    Process and Thread Identification |
| 2    Effective Address (EA) Context Save/Restore Pointer |
| 3    Virtual Address (VA) Accelerator Utilization Record Pointer |
| 4    Virtual Address (VA) Storage Segment Table Pointer |
| 5    Authority Mask |
| 6    Work descriptor |

In one embodiment, each WD 4484 is specific to a particular graphics acceleration module 4446 and/or a particular graphics processing engine. It contains all information required by a graphics processing engine to do work or it can be a pointer to a memory location where an application has set up a command queue of work to be completed.

In at least one embodiment, at least one component shown or described with respect to FIG. 44 is used to implement techniques and/or functions described in connection with FIGS. 1-35. In at least one embodiment, processor 4407 is used to perform an application programming interface to indicate two or more blocks of threads to be scheduled in parallel. In at least one embodiment, processor 4407 is used to perform an application programming interface to determine which of two or more blocks of threads to be scheduled in parallel. In at least one embodiment, processor 4407 is used to perform an application programming interface comprising one or more parameters to cause a scheduling policy of one or more blocks of one or more threads to be performed. In at least one embodiment, processor 4407 is used to perform an application programming interface comprising one or more parameters to indicate a scheduling policy of one or more blocks of one or more threads. In at least one embodiment, processor 4407 is used to perform an application programming interface to indicate a maximum number of blocks of threads capable of being scheduled in parallel. In at least one embodiment, processor 4407 is used to perform an application programming interface comprising one or more parameters to indicate one or more attributes of one or more groups of blocks of one or more threads. In at least one embodiment, processor 4407 is used to perform an application programming interface to indicate a maximum number of blocks of threads to be scheduled in parallel. In at least one embodiment, processor 4407 is used to perform an application programming interface to cause a kernel to be generated to cause two or more blocks of two or more threads to be scheduled in parallel. In at least one embodiment, processor 4407 is used to perform an application programming interface comprising one or more parameters to indicate one or more limitations of one or more attributes of one or more groups of blocks of one or more threads. In at least one embodiment, processor 4407 is used to perform an application programming interface to indicate whether one or more threads within two or more blocks of threads have performed a barrier instruction. In at least one embodiment, processor 4407 is used to perform an application programming interface to cause performance of one or more threads within a group of blocks of threads to stop at least until all threads within the group of blocks have performed a barrier instruction. In at least one embodiment, processor 4407 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, processor 4407 is used to perform an application programming interface to cause memory to be shared between two or more groups of blocks of threads.

In at least one embodiment, processor 4407 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 45A:
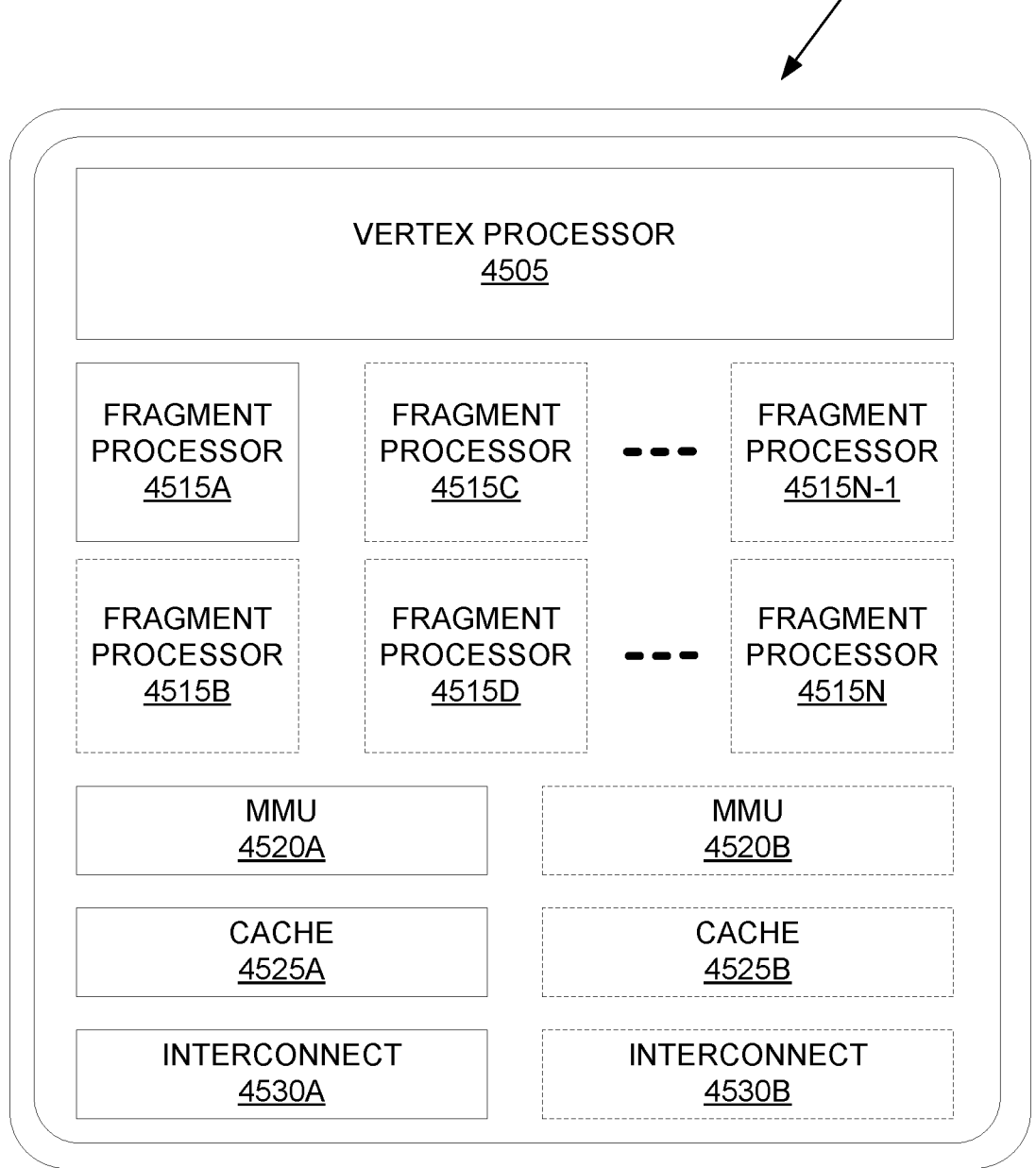
FIGS. 45A and 45B illustrate exemplary graphics processors, in accordance with at least one embodiment.
Figure 45B:
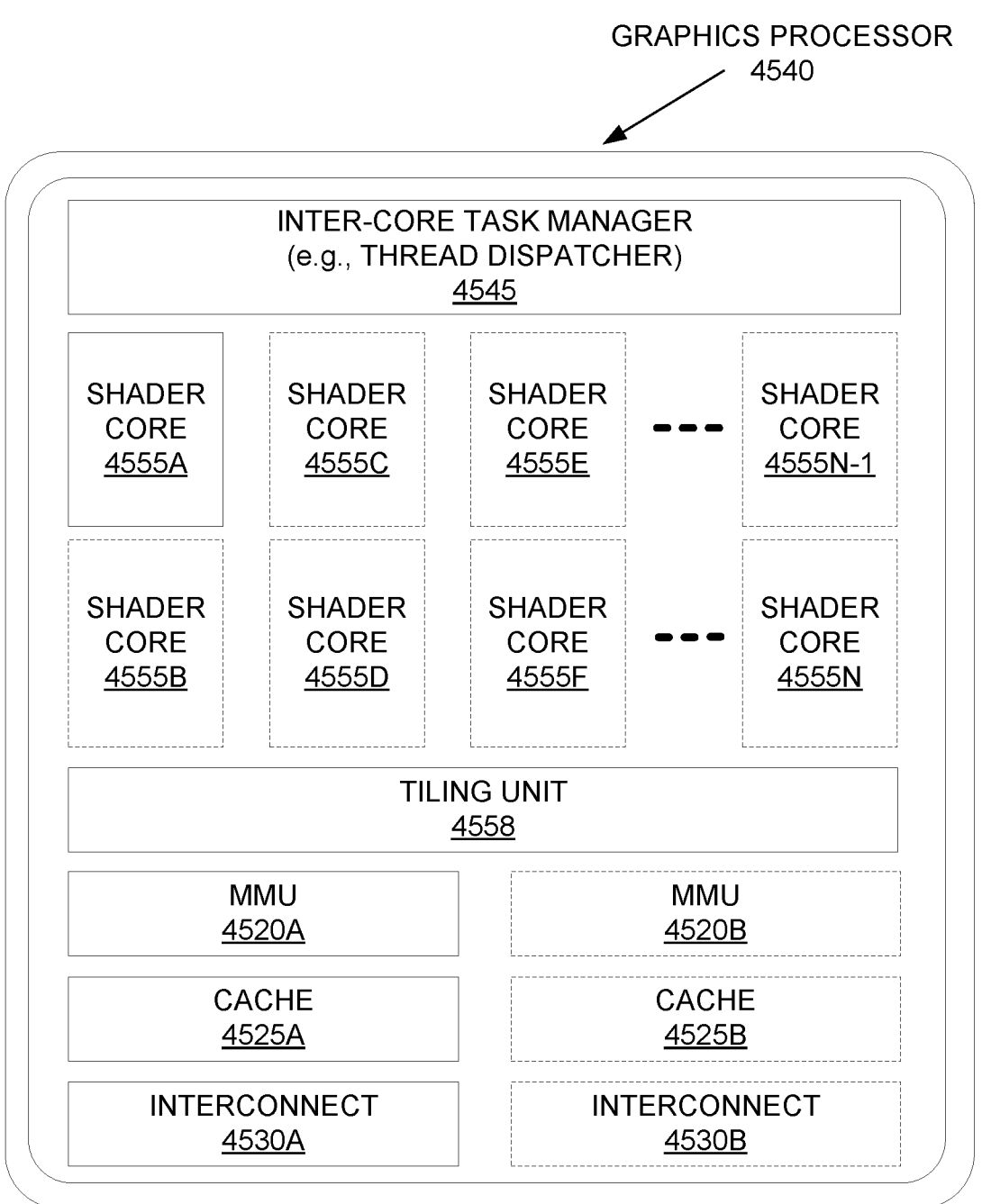

FIGS. 45A-45B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 45A illustrates an exemplary graphics processor 4510 of an SoC integrated circuit that may be fabricated using one or more IP cores, in accordance with at least one embodiment. FIG. 45B illustrates an additional exemplary graphics processor 4540 of an SoC integrated circuit that may be fabricated using one or more IP cores, in accordance with at least one embodiment. In at least one embodiment, graphics processor 4510 of FIG. 45A is a low power graphics processor core. In at least one embodiment, graphics processor 4540 of FIG. 45B is a higher performance graphics processor core. In at least one embodiment, each of graphics processors 4510, 4540 can be variants of graphics processor 4010 of FIG. 40.

In at least one embodiment, graphics processor 4510 includes a vertex processor 4505 and one or more fragment processor(s) 4515A-4515N (e.g., 4515A, 4515B, 4515C, 4515D, through 4515N-1, and 4515N). In at least one embodiment, graphics processor 4510 can execute different shader programs via separate logic, such that vertex processor 4505 is optimized to execute operations for vertex shader programs, while one or more fragment processor(s) 4515A-4515N execute fragment (e.g., pixel) shading operations for fragment or pixel shader programs. In at least one embodiment, vertex processor 4505 performs a vertex processing stage of a 3D graphics pipeline and generates primitives and vertex data. In at least one embodiment, fragment processor(s) 4515A-4515N use primitive and vertex data generated by vertex processor 4505 to produce a framebuffer that is displayed on a display device. In at least one embodiment, fragment processor(s) 4515A-4515N are optimized to execute fragment shader programs as provided for in an OpenGL API, which may be used to perform similar operations as a pixel shader program as provided for in a Direct 3D API.

In at least one embodiment, graphics processor 4510 additionally includes one or more MMU(s) 4520A-4520B, cache(s) 4525A-4525B, and circuit interconnect(s) 4530A-4530B. In at least one embodiment, one or more MMU(s) 4520A-4520B provide for virtual to physical address mapping for graphics processor 4510, including for vertex processor 4505 and/or fragment processor(s) 4515A-4515N, which may reference vertex or image/texture data stored in memory, in addition to vertex or image/texture data stored in one or more cache(s) 4525A-4525B. In at least one embodiment, one or more MMU(s) 4520A-4520B may be synchronized with other MMUs within a system, including one or more MMUs associated with one or more application processor(s) 4005, image processors 4015, and/or video processors 4020 of FIG. 40, such that each processor 4005-4020 can participate in a shared or unified virtual memory system. In at least one embodiment, one or more circuit interconnect(s) 4530A-4530B enable graphics processor 4510 to interface with other IP cores within an SoC, either via an internal bus of the SoC or via a direct connection.

In at least one embodiment, graphics processor 4540 includes one or more MMU(s) 4520A-4520B, caches 4525A-4525B, and circuit interconnects 4530A-4530B of graphics processor 4510 of FIG. 45A. In at least one embodiment, graphics processor 4540 includes one or more shader core(s) 4555A-4555N (e.g., 4555A, 4555B, 4555C, 4555D, 4555E, 4555F, through 4555N-1, and 4555N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 4540 includes an inter-core task manager 4545, which acts as a thread dispatcher to dispatch execution threads to one or more shader cores 4555A-4555N and a tiling unit 4558 to accelerate tiling operations for tile-based rendering, in which rendering operations for a scene are subdivided in image space, for example to exploit local spatial coherence within a scene or to optimize use of internal caches.

In at least one embodiment, at least one component shown or described with respect to FIG. 45A and FIG. 45B is used to implement techniques and/or functions described in connection with FIGS. 1-35. In at least one embodiment, at least one of graphics processor 4510 or graphics processor 4540 is used to perform an application programming interface to indicate two or more blocks of threads to be scheduled in parallel. In at least one embodiment, at least one of graphics processor 4510 or graphics processor 4540 is used to perform an application programming interface to determine which of two or more blocks of threads to be scheduled in parallel. In at least one embodiment, at least one of graphics processor 4510 or graphics processor 4540 is used to perform an application programming interface comprising one or more parameters to cause a scheduling policy of one or more blocks of one or more threads to be performed. In at least one embodiment, at least one of graphics processor 4510 or graphics processor 4540 is used to perform an application programming interface comprising one or more parameters to indicate a scheduling policy of one or more blocks of one or more threads. In at least one embodiment, at least one of graphics processor 4510 or graphics processor 4540 is used to perform an application programming interface to indicate a maximum number of blocks of threads capable of being scheduled in parallel. In at least one embodiment, at least one of graphics processor 4510 or graphics processor 4540 is used to perform an application programming interface comprising one or more parameters to indicate one or more attributes of one or more groups of blocks of one or more threads. In at least one embodiment, at least one of graphics processor 4510 or graphics processor 4540 is used to perform an application programming interface to indicate a maximum number of blocks of threads to be scheduled in parallel. In at least one embodiment, at least one of graphics processor 4510 or graphics processor 4540 is used to perform an application programming interface to cause a kernel to be generated to cause two or more blocks of two or more threads to be scheduled in parallel. In at least one embodiment, at least one of graphics processor 4510 or graphics processor 4540 is used to perform an application programming interface comprising one or more parameters to indicate one or more limitations of one or more attributes of one or more groups of blocks of one or more threads. In at least one embodiment, at least one of graphics processor 4510 or graphics processor 4540 is used to perform an application programming interface to indicate whether one or more threads within two or more blocks of threads have performed a barrier instruction. In at least one embodiment, at least one of graphics processor 4510 or graphics processor 4540 is used to perform an application programming interface to cause performance of one or more threads within a group of blocks of threads to stop at least until all threads within the group of blocks have performed a barrier instruction. In at least one embodiment, at least one of graphics processor 4510 or graphics processor 4540 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one of graphics processor 4510 or graphics processor 4540 is used to perform an application programming interface to cause memory to be shared between two or more groups of blocks of threads.

In at least one embodiment, at least one of graphics processor 4510 or graphics processor 4540 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 46A:
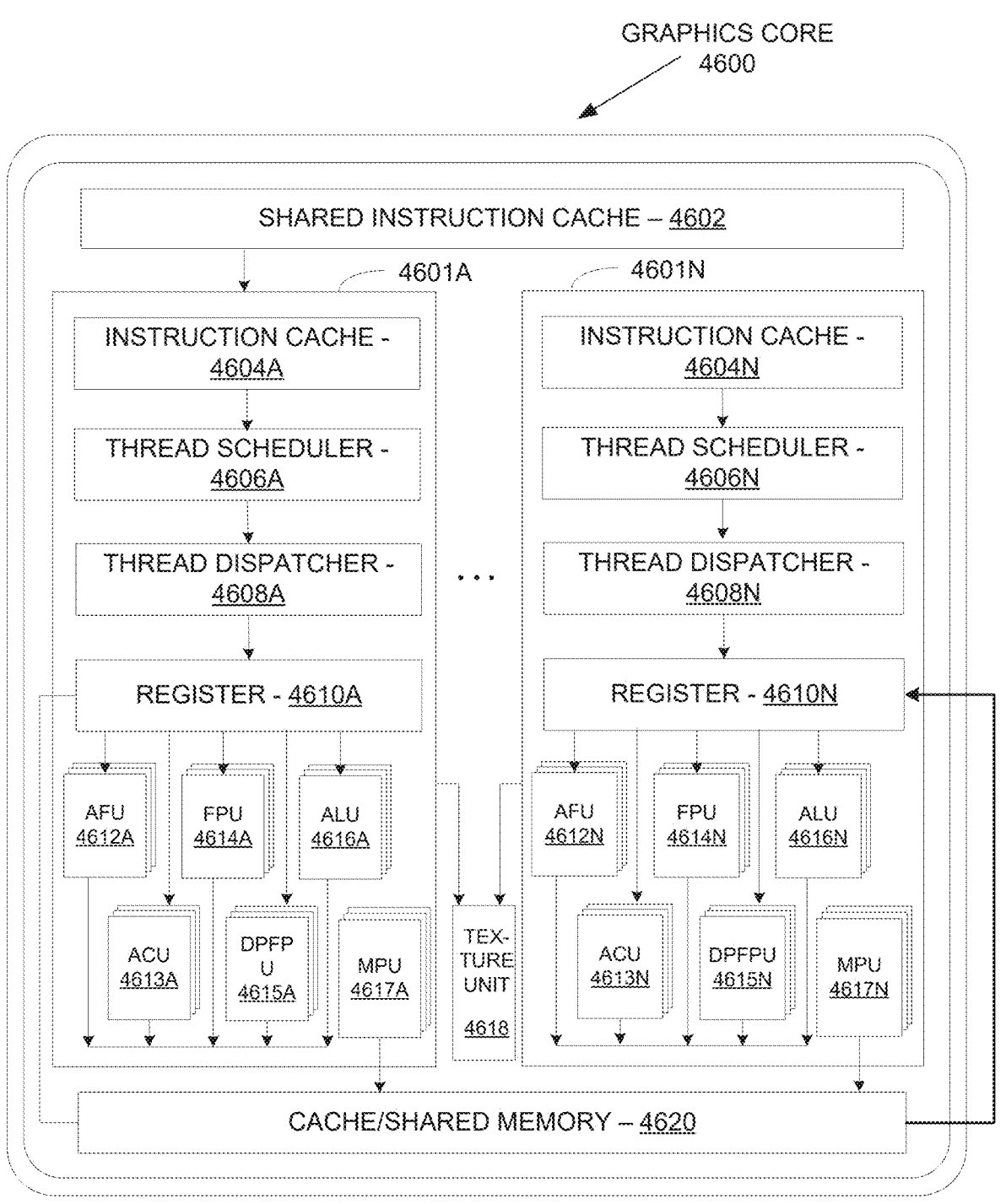
FIG. 46A illustrates a graphics core, in accordance with at least one embodiment.

FIG. 46A illustrates a graphics core 4600, in accordance with at least one embodiment. In at least one embodiment, graphics core 4600 may be included within graphics processor 4010 of FIG. 40. In at least one embodiment, graphics core 4600 may be a unified shader core 4555A-4555N as in FIG. 45B. In at least one embodiment, graphics core 4600 includes a shared instruction cache 4602, a texture unit 4618, and a cache/shared memory 4620 that are common to execution resources within graphics core 4600. In at least one embodiment, graphics core 4600 can include multiple slices 4601A-4601N or partition for each core, and a graphics processor can include multiple instances of graphics core 4600. Slices 4601A-4601N can include support logic including a local instruction cache 4604A-4604N, a thread scheduler 4606A-4606N, a thread dispatcher 4608A-4608N, and a set of registers 4610A-4610N. In at least one embodiment, slices 4601A-4601N can include a set of additional function units ("AFUs") 4612A-4612N, floating-point units ("FPUs") 4614A-4614N, integer arithmetic logic units ("ALUs") 4616-4616N, address computational units ("ACUs") 4613A-4613N, double-precision floating-point units ("DPFPUs") 4615A-4615N, and matrix processing units ("MPUs") 4617A-4617N.

In at least one embodiment, FPUs 4614A-4614N can perform single-precision (32-bit) and half-precision (16-bit) floating point operations, while DPFPUs 4615A-4615N perform double precision (64-bit) floating point operations. In at least one embodiment, ALUs 4616A-4616N can perform variable precision integer operations at 8-bit, 16-bit, and 32-bit precision, and can be configured for mixed precision operations. In at least one embodiment, MPUs 4617A-4617N can also be configured for mixed precision matrix operations, including half-precision floating point and 8-bit integer operations. In at least one embodiment, MPUs 4617-4617N can perform a variety of matrix operations to accelerate CUDA programs, including enabling support for accelerated general matrix to matrix multiplication ("GEMM"). In at least one embodiment, AFUs 4612A-4612N can perform additional logic operations not supported by floating-point or integer units, including trigonometric operations (e.g., Sine, Cosine, etc.).

In at least one embodiment, at least one component shown or described with respect to FIG. 46A is used to implement techniques and/or functions described in connection with FIGS. 1-35. In at least one embodiment, graphics core 4600 is used to perform an application programming interface to indicate two or more blocks of threads to be scheduled in parallel. In at least one embodiment, graphics core 4600 is used to perform an application programming interface to determine which of two or more blocks of threads to be scheduled in parallel. In at least one embodiment, graphics core 4600 is used to perform an application programming interface comprising one or more parameters to cause a scheduling policy of one or more blocks of one or more threads to be performed. In at least one embodiment, graphics core 4600 is used to perform an application programming interface comprising one or more parameters to indicate a scheduling policy of one or more blocks of one or more threads. In at least one embodiment, graphics core 4600 is used to perform an application programming interface to indicate a maximum number of blocks of threads capable of being scheduled in parallel. In at least one embodiment, graphics core 4600 is used to perform an application programming interface comprising one or more parameters to indicate one or more attributes of one or more groups of blocks of one or more threads. In at least one embodiment, graphics core 4600 is used to perform an application programming interface to indicate a maximum number of blocks of threads to be scheduled in parallel. In at least one embodiment, graphics core 4600 is used to perform an application programming interface to cause a kernel to be generated to cause two or more blocks of two or more threads to be scheduled in parallel. In at least one embodiment, graphics core 4600 is used to perform an application programming interface comprising one or more parameters to indicate one or more limitations of one or more attributes of one or more groups of blocks of one or more threads. In at least one embodiment, graphics core 4600 is used to perform an application programming interface to indicate whether one or more threads within two or more blocks of threads have performed a barrier instruction. In at least one embodiment, graphics core 4600 is used to perform an application programming interface to cause performance of one or more threads within a group of blocks of threads to stop at least until all threads within the group of blocks have performed a barrier instruction. In at least one embodiment, graphics core 4600 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, graphics core 4600 is used to perform an application programming interface to cause memory to be shared between two or more groups of blocks of threads.

In at least one embodiment, graphics core 4600 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 46B:
FIG. 46B illustrates a GPGPU, in accordance with at least one embodiment.

FIG. 46B illustrates a general-purpose graphics processing unit ("GPGPU") 4630, in accordance with at least one embodiment. In at least one embodiment, GPGPU 4630 is highly-parallel and suitable for deployment on a multi-chip module. In at least one embodiment, GPGPU 4630 can be configured to enable highly-parallel compute operations to be performed by an array of GPUs. In at least one embodiment, GPGPU 4630 can be linked directly to other instances of GPGPU 4630 to create a multi-GPU cluster to improve execution time for CUDA programs. In at least one embodiment, GPGPU 4630 includes a host interface 4632 to enable a connection with a host processor. In at least one embodiment, host interface 4632 is a PCIe interface. In at least one embodiment, host interface 4632 can be a vendor specific communications interface or communications fabric. In at least one embodiment, GPGPU 4630 receives commands from a host processor and uses a global scheduler 4634 to distribute execution threads associated with those commands to a set of compute clusters 4636A-4636H. In at least one embodiment, compute clusters 4636A-4636H share a cache memory 4638. In at least one embodiment, cache memory 4638 can serve as a higher-level cache for cache memories within compute clusters 4636A-4636H.

In at least one embodiment, GPGPU 4630 includes memory 4644A-4644B coupled with compute clusters 4636A-4636H via a set of memory controllers 4642A-4642B. In at least one embodiment, memory 4644A-4644B can include various types of memory devices including DRAM or graphics random access memory, such as synchronous graphics random access memory ("SGRAM"), including graphics double data rate ("GDDR") memory.

In at least one embodiment, compute clusters 4636A-4636H each include a set of graphics cores, such as graphics core 4600 of FIG. 46A, which can include multiple types of integer and floating point logic units that can perform computational operations at a range of precisions including suited for computations associated with CUDA programs. For example, in at least one embodiment, at least a subset of floating point units in each of compute clusters 4636A-4636H can be configured to perform 16-bit or 32-bit floating point operations, while a different subset of floating point units can be configured to perform 64-bit floating point operations.

In at least one embodiment, multiple instances of GPGPU 4630 can be configured to operate as a compute cluster. Compute clusters 4636A-4636H may implement any technically feasible communication techniques for synchronization and data exchange. In at least one embodiment, multiple instances of GPGPU 4630 communicate over host interface 4632. In at least one embodiment, GPGPU 4630 includes an I/O hub 4639 that couples GPGPU 4630 with a GPU link 4640 that enables a direct connection to other instances of GPGPU 4630. In at least one embodiment, GPU link 4640 is coupled to a dedicated GPU-to-GPU bridge that enables communication and synchronization between multiple instances of GPGPU 4630. In at least one embodiment GPU link 4640 couples with a high speed interconnect to transmit and receive data to other GPGPUs 4630 or parallel processors. In at least one embodiment, multiple instances of GPGPU 4630 are located in separate data processing systems and communicate via a network device that is accessible via host interface 4632. In at least one embodiment GPU link 4640 can be configured to enable a connection to a host processor in addition to or as an alternative to host interface 4632. In at least one embodiment, GPGPU 4630 can be configured to execute a CUDA program.

In at least one embodiment, at least one component shown or described with respect to FIG. 46B is used to implement techniques and/or functions described in connection with FIGS. 1-35. In at least one embodiment, GPGPU 4630 is used to perform an application programming interface to indicate two or more blocks of threads to be scheduled in parallel. In at least one embodiment, GPGPU 4630 is used to perform an application programming interface to determine which of two or more blocks of threads to be scheduled in parallel. In at least one embodiment, GPGPU 4630 is used to perform an application programming interface comprising one or more parameters to cause a scheduling policy of one or more blocks of one or more threads to be performed. In at least one embodiment, GPGPU 4630 is used to perform an application programming interface comprising one or more parameters to indicate a scheduling policy of one or more blocks of one or more threads. In at least one embodiment, GPGPU 4630 is used to perform an application programming interface to indicate a maximum number of blocks of threads capable of being scheduled in parallel. In at least one embodiment, GPGPU 4630 is used to perform an application programming interface comprising one or more parameters to indicate one or more attributes of one or more groups of blocks of one or more threads. In at least one embodiment, GPGPU 4630 is used to perform an application programming interface to indicate a maximum number of blocks of threads to be scheduled in parallel. In at least one embodiment, GPGPU 4630 is used to perform an application programming interface to cause a kernel to be generated to cause two or more blocks of two or more threads to be scheduled in parallel. In at least one embodiment, GPGPU 4630 is used to perform an application programming interface comprising one or more parameters to indicate one or more limitations of one or more attributes of one or more groups of blocks of one or more threads. In at least one embodiment, GPGPU 4630 is used to perform an application programming interface to indicate whether one or more threads within two or more blocks of threads have performed a barrier instruction. In at least one embodiment, GPGPU 4630 is used to perform an application programming interface to cause performance of one or more threads within a group of blocks of threads to stop at least until all threads within the group of blocks have performed a barrier instruction. In at least one embodiment, GPGPU 4630 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, GPGPU 4630 is used to perform an application programming interface to cause memory to be shared between two or more groups of blocks of threads.

In at least one embodiment, GPGPU 4630 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 47A:
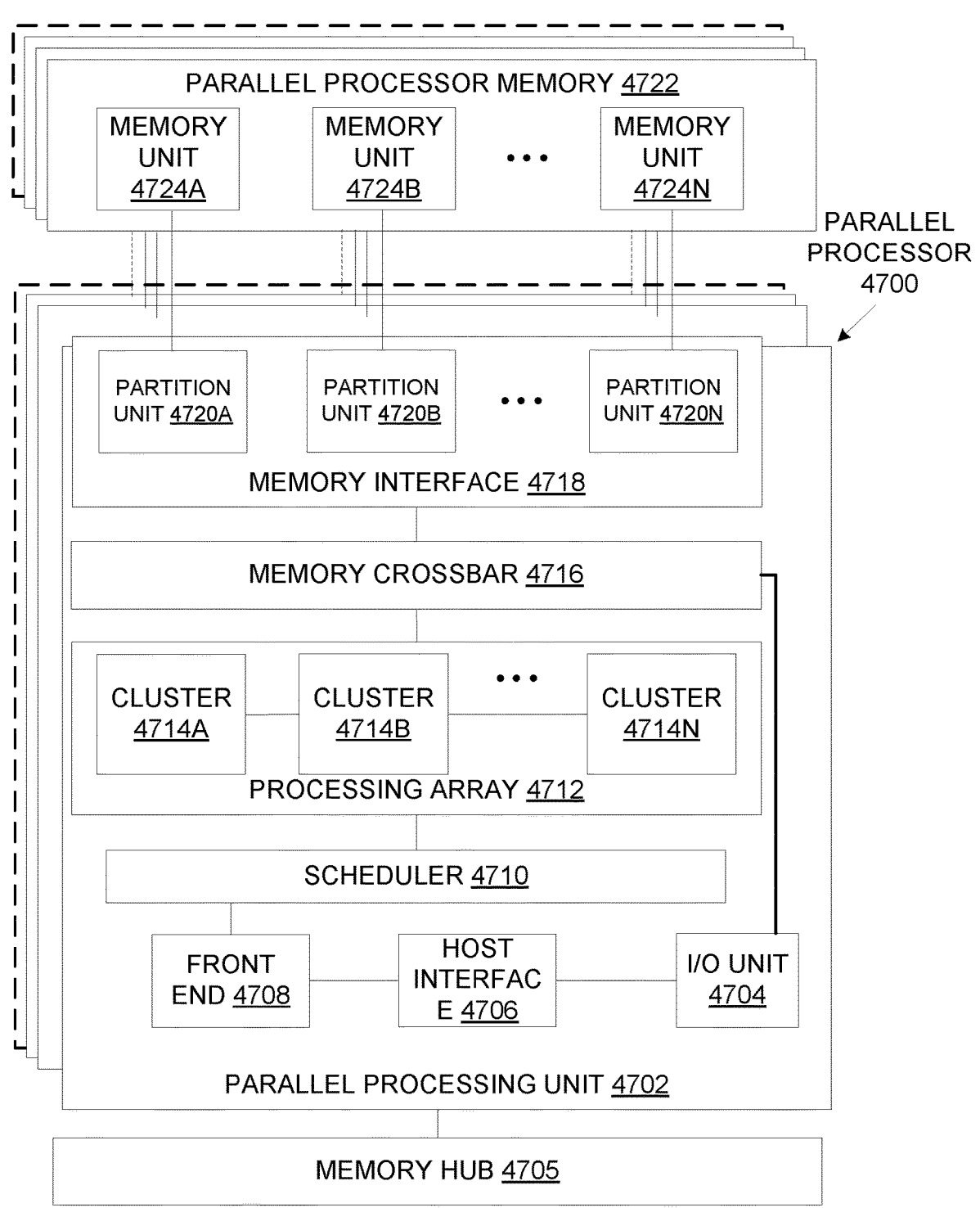
FIG. 47A illustrates a parallel processor, in accordance with at least one embodiment.

FIG. 47A illustrates a parallel processor 4700, in accordance with at least one embodiment. In at least one embodiment, various components of parallel processor 4700 may be implemented using one or more integrated circuit devices, such as programmable processors, application specific integrated circuits ("ASICs"), or FPGAs.

In at least one embodiment, parallel processor 4700 includes a parallel processing unit 4702. In at least one embodiment, parallel processing unit 4702 includes an I/O unit 4704 that enables communication with other devices, including other instances of parallel processing unit 4702. In at least one embodiment, I/O unit 4704 may be directly connected to other devices. In at least one embodiment, I/O unit 4704 connects with other devices via use of a hub or switch interface, such as memory hub 4705. In at least one embodiment, connections between memory hub 4705 and I/O unit 4704 form a communication link. In at least one embodiment, I/O unit 4704 connects with a host interface 4706 and a memory crossbar 4716, where host interface 4706 receives commands directed to performing processing operations and memory crossbar 4716 receives commands directed to performing memory operations.

In at least one embodiment, when host interface 4706 receives a command buffer via I/O unit 4704, host interface 4706 can direct work operations to perform those commands to a front end 4708. In at least one embodiment, front end 4708 couples with a scheduler 4710, which is configured to distribute commands or other work items to a processing array 4712. In at least one embodiment, scheduler 4710 ensures that processing array 4712 is properly configured and in a valid state before tasks are distributed to processing array 4712. In at least one embodiment, scheduler 4710 is implemented via firmware logic executing on a microcontroller. In at least one embodiment, microcontroller implemented scheduler 4710 is configurable to perform complex scheduling and work distribution operations at coarse and fine granularity, enabling rapid preemption and context switching of threads executing on processing array 4712. In at least one embodiment, host software can prove workloads for scheduling on processing array 4712 via one of multiple graphics processing doorbells. In at least one embodiment, workloads can then be automatically distributed across processing array 4712 by scheduler 4710 logic within a microcontroller including scheduler 4710.

In at least one embodiment, processing array 4712 can include up to "N" clusters (e.g., cluster 4714A, cluster 4714B, through cluster 4714N). In at least one embodiment, each cluster 4714A-4714N of processing array 4712 can execute a large number of concurrent threads. In at least one embodiment, scheduler 4710 can allocate work to clusters 4714A-4714N of processing array 4712 using various scheduling and/or work distribution algorithms, which may vary depending on the workload arising for each type of program or computation. In at least one embodiment, scheduling can be handled dynamically by scheduler 4710, or can be assisted in part by compiler logic during compilation of program logic configured for execution by processing array 4712. In at least one embodiment, different clusters 4714A-4714N of processing array 4712 can be allocated for processing different types of programs or for performing different types of computations.

In at least one embodiment, processing array 4712 can be configured to perform various types of parallel processing operations. In at least one embodiment, processing array 4712 is configured to perform general-purpose parallel compute operations. For example, in at least one embodiment, processing array 4712 can include logic to execute processing tasks including filtering of video and/or audio data, performing modeling operations, including physics operations, and performing data transformations.

In at least one embodiment, processing array 4712 is configured to perform parallel graphics processing operations. In at least one embodiment, processing array 4712 can include additional logic to support execution of such graphics processing operations, including, but not limited to texture sampling logic to perform texture operations, as well as tessellation logic and other vertex processing logic. In at least one embodiment, processing array 4712 can be configured to execute graphics processing related shader programs such as, but not limited to vertex shaders, tessellation shaders, geometry shaders, and pixel shaders. In at least one embodiment, parallel processing unit 4702 can transfer data from system memory via I/O unit 4704 for processing. In at least one embodiment, during processing, transferred data can be stored to on-chip memory (e.g., a parallel processor memory 4722) during processing, then written back to system memory.

In at least one embodiment, when parallel processing unit 4702 is used to perform graphics processing, scheduler 4710 can be configured to divide a processing workload into approximately equal sized tasks, to better enable distribution of graphics processing operations to multiple clusters 4714A-4714N of processing array 4712. In at least one embodiment, portions of processing array 4712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 4714A-4714N may be stored in buffers to allow intermediate data to be transmitted between clusters 4714A-4714N for further processing.

In at least one embodiment, processing array 4712 can receive processing tasks to be executed via scheduler 4710, which receives commands defining processing tasks from front end 4708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 4710 may be configured to fetch indices corresponding to tasks or may receive indices from front end 4708. In at least one embodiment, front end 4708 can be configured to ensure processing array 4712 is configured to a valid state before a workload specified by incoming command buffers (e.g., batch-buffers, push buffers, etc.) is initiated.

In at least one embodiment, each of one or more instances of parallel processing unit 4702 can couple with parallel processor memory 4722. In at least one embodiment, parallel processor memory 4722 can be accessed via memory crossbar 4716, which can receive memory requests from processing array 4712 as well as I/O unit 4704. In at least one embodiment, memory crossbar 4716 can access parallel processor memory 4722 via a memory interface 4718. In at least one embodiment, memory interface 4718 can include multiple partition units (e.g., a partition unit 4720A, partition unit 4720B, through partition unit 4720N) that can each couple to a portion (e.g., memory unit) of parallel processor memory 4722. In at least one embodiment, a number of partition units 4720A-4720N is configured to be equal to a number of memory units, such that a first partition unit 4720A has a corresponding first memory unit 4724A, a second partition unit 4720B has a corresponding memory unit 4724B, and an Nth partition unit 4720N has a corresponding Nth memory unit 4724N. In at least one embodiment, a number of partition units 4720A-4720N may not be equal to a number of memory devices.

In at least one embodiment, memory units 4724A-4724N can include various types of memory devices, including DRAM or graphics random access memory, such as SGRAM, including GDDR memory. In at least one embodiment, memory units 4724A-4724N may also include 3D stacked memory, including but not limited to high bandwidth memory ("HBM"). In at least one embodiment, render targets, such as frame buffers or texture maps may be stored across memory units 4724A-4724N, allowing partition units 4720A-4720N to write portions of each render target in parallel to efficiently use available bandwidth of parallel processor memory 4722. In at least one embodiment, a local instance of parallel processor memory 4722 may be excluded in favor of a unified memory design that utilizes system memory in conjunction with local cache memory.

In at least one embodiment, any one of clusters 4714A-4714N of processing array 4712 can process data that will be written to any of memory units 4724A-4724N within parallel processor memory 4722. In at least one embodiment, memory crossbar 4716 can be configured to transfer an output of each cluster 4714A-4714N to any partition unit 4720A-4720N or to another cluster 4714A-4714N, which can perform additional processing operations on an output. In at least one embodiment, each cluster 4714A-4714N can communicate with memory interface 4718 through memory crossbar 4716 to read from or write to various external memory devices. In at least one embodiment, memory crossbar 4716 has a connection to memory interface 4718 to communicate with I/O unit 4704, as well as a connection to a local instance of parallel processor memory 4722, enabling processing units within different clusters 4714A-4714N to communicate with system memory or other memory that is not local to parallel processing unit 4702. In at least one embodiment, memory crossbar 4716 can use virtual channels to separate traffic streams between clusters 4714A-4714N and partition units 4720A-4720N.

In at least one embodiment, multiple instances of parallel processing unit 4702 can be provided on a single add-in card, or multiple add-in cards can be interconnected. In at least one embodiment, different instances of parallel processing unit 4702 can be configured to inter-operate even if different instances have different numbers of processing cores, different amounts of local parallel processor memory, and/or other configuration differences. For example, in at least one embodiment, some instances of parallel processing unit 4702 can include higher precision floating point units relative to other instances. In at least one embodiment, systems incorporating one or more instances of parallel processing unit 4702 or parallel processor 4700 can be implemented in a variety of configurations and form factors, including but not limited to desktop, laptop, or handheld personal computers, servers, workstations, game consoles, and/or embedded systems.

In at least one embodiment, at least one component shown or described with respect to FIG. 47A is used to implement techniques and/or functions described in connection with FIGS. 1-35. In at least one embodiment, parallel processor 4700 is used to perform an application programming interface to indicate two or more blocks of threads to be scheduled in parallel. In at least one embodiment, parallel processor 4700 is used to perform an application programming interface to determine which of two or more blocks of threads to be scheduled in parallel. In at least one embodiment, parallel processor 4700 is used to perform an application programming interface comprising one or more parameters to cause a scheduling policy of one or more blocks of one or more threads to be performed. In at least one embodiment, parallel processor 4700 is used to perform an application programming interface comprising one or more parameters to indicate a scheduling policy of one or more blocks of one or more threads. In at least one embodiment, parallel processor 4700 is used to perform an application programming interface to indicate a maximum number of blocks of threads capable of being scheduled in parallel. In at least one embodiment, parallel processor 4700 is used to perform an application programming interface comprising one or more parameters to indicate one or more attributes of one or more groups of blocks of one or more threads. In at least one embodiment, parallel processor 4700 is used to perform an application programming interface to indicate a maximum number of blocks of threads to be scheduled in parallel. In at least one embodiment, parallel processor 4700 is used to perform an application programming interface to cause a kernel to be generated to cause two or more blocks of two or more threads to be scheduled in parallel. In at least one embodiment, parallel processor 4700 is used to perform an application programming interface comprising one or more parameters to indicate one or more limitations of one or more attributes of one or more groups of blocks of one or more threads. In at least one embodiment, parallel processor 4700 is used to perform an application programming interface to indicate whether one or more threads within two or more blocks of threads have performed a barrier instruction. In at least one embodiment, parallel processor 4700 is used to perform an application programming interface to cause performance of one or more threads within a group of blocks of threads to stop at least until all threads within the group of blocks have performed a barrier instruction. In at least one embodiment, parallel processor 4700 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, parallel processor 4700 is used to perform an application programming interface to cause memory to be shared between two or more groups of blocks of threads.

In at least one embodiment, parallel processor 4700 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 47B:
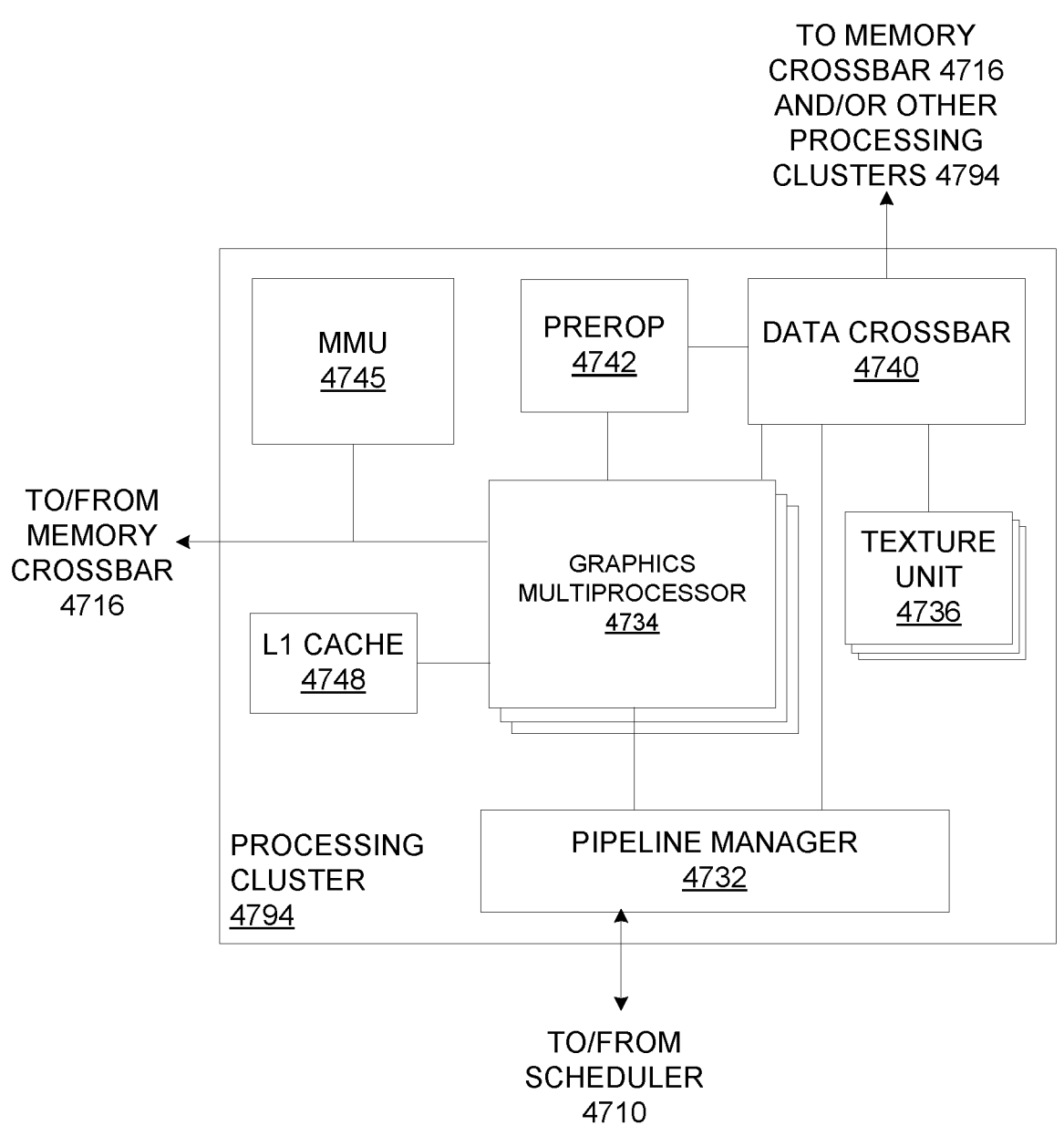
FIG. 47B illustrates a processing cluster, in accordance with at least one embodiment.

FIG. 47B illustrates a processing cluster 4794, in accordance with at least one embodiment. In at least one embodiment, processing cluster 4794 is included within a parallel processing unit. In at least one embodiment, processing cluster 4794 is one of processing clusters 4714A-4714N of FIG. 47. In at least one embodiment, processing cluster 4794 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 4794.

In at least one embodiment, operation of processing cluster 4794 can be controlled via a pipeline manager 4732 that distributes processing tasks to SIMT parallel processors. In at least one embodiment, pipeline manager 4732 receives instructions from scheduler 4710 of FIG. 47 and manages execution of those instructions via a graphics multiprocessor 4734 and/or a texture unit 4736. In at least one embodiment, graphics multiprocessor 4734 is an exemplary instance of a SIMT parallel processor. However, in at least one embodiment, various types of SIMT parallel processors of differing architectures may be included within processing cluster 4794. In at least one embodiment, one or more instances of graphics multiprocessor 4734 can be included within processing cluster 4794. In at least one embodiment, graphics multiprocessor 4734 can process data and a data crossbar 4740 can be used to distribute processed data to one of multiple possible destinations, including other shader units. In at least one embodiment, pipeline manager 4732 can facilitate distribution of processed data by specifying destinations for processed data to be distributed via data crossbar 4740.

In at least one embodiment, each graphics multiprocessor 4734 within processing cluster 4794 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 4794 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 4734. In at least one embodiment, a thread group may include fewer threads than a number of processing engines within graphics multiprocessor 4734. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 4734. In at least one embodiment, when a thread group includes more threads than the number of processing engines within graphics multiprocessor 4734, processing can be performed over consecutive clock cycles. In at least one embodiment, multiple thread groups can be executed concurrently on graphics multiprocessor 4734.

In at least one embodiment, graphics multiprocessor 4734 includes an internal cache memory to perform load and store operations. In at least one embodiment, graphics multiprocessor 4734 can forego an internal cache and use a cache memory (e.g., L1 cache 4748) within processing cluster 4794. In at least one embodiment, each graphics multiprocessor 4734 also has access to Level 2 ("L2") caches within partition units (e.g., partition units 4720A-4720N of FIG. 47A) that are shared among all processing clusters 4794 and may be used to transfer data between threads. In at least one embodiment, graphics multiprocessor 4734 may also access off-chip global memory, which can include one or more of local parallel processor memory and/or system memory. In at least one embodiment, any memory external to parallel processing unit 4702 may be used as global memory. In at least one embodiment, processing cluster 4794 includes multiple instances of graphics multiprocessor 4734 that can share common instructions and data, which may be stored in L1 cache 4748.

In at least one embodiment, each processing cluster 4794 may include an MMU 4745 that is configured to map virtual addresses into physical addresses. In at least one embodiment, one or more instances of MMU 4745 may reside within memory interface 4718 of FIG. 47. In at least one embodiment, MMU 4745 includes a set of page table entries ("PTEs") used to map a virtual address to a physical address of a tile and optionally a cache line index. In at least one embodiment, MMU 4745 may include address translation lookaside buffers ("TLBs") or caches that may reside within graphics multiprocessor 4734 or L1 cache 4748 or processing cluster 4794. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 4794 may be configured such that each graphics multiprocessor 4734 is coupled to a texture unit 4736 for performing texture mapping operations, e.g., determining texture sample positions, reading texture data, and filtering texture data. In at least one embodiment, texture data is read from an internal texture L1 cache (not shown) or from an L1 cache within graphics multiprocessor 4734 and is fetched from an L2 cache, local parallel processor memory, or system memory, as needed. In at least one embodiment, each graphics multiprocessor 4734 outputs a processed task to data crossbar 4740 to provide the processed task to another processing cluster 4794 for further processing or to store the processed task in an L2 cache, a local parallel processor memory, or a system memory via memory crossbar 4716. In at least one embodiment, a pre-raster operations unit ("preROP") 4742 is configured to receive data from graphics multiprocessor 4734, direct data to ROP units, which may be located with partition units as described herein (e.g., partition units 4720A-4720N of FIG. 47). In at least one embodiment, PreROP 4742 can perform optimizations for color blending, organize pixel color data, and perform address translations.

In at least one embodiment, at least one component shown or described with respect to FIG. 47B is used to implement techniques and/or functions described in connection with FIGS. 1-35. In at least one embodiment, graphics multiprocessor 4734 is used to perform an application programming interface to indicate two or more blocks of threads to be scheduled in parallel. In at least one embodiment, graphics multiprocessor 4734 is used to perform an application programming interface to determine which of two or more blocks of threads to be scheduled in parallel. In at least one embodiment, graphics multiprocessor 4734 is used to perform an application programming interface comprising one or more parameters to cause a scheduling policy of one or more blocks of one or more threads to be performed. In at least one embodiment, graphics multiprocessor 4734 is used to perform an application programming interface comprising one or more parameters to indicate a scheduling policy of one or more blocks of one or more threads. In at least one embodiment, graphics multiprocessor 4734 is used to perform an application programming interface to indicate a maximum number of blocks of threads capable of being scheduled in parallel. In at least one embodiment, graphics multiprocessor 4734 is used to perform an application programming interface comprising one or more parameters to indicate one or more attributes of one or more groups of blocks of one or more threads. In at least one embodiment, graphics multiprocessor 4734 is used to perform an application programming interface to indicate a maximum number of blocks of threads to be scheduled in parallel. In at least one embodiment, graphics multiprocessor 4734 is used to perform an application programming interface to cause a kernel to be generated to cause two or more blocks of two or more threads to be scheduled in parallel. In at least one embodiment, graphics multiprocessor 4734 is used to perform an application programming interface comprising one or more parameters to indicate one or more limitations of one or more attributes of one or more groups of blocks of one or more threads. In at least one embodiment, graphics multiprocessor 4734 is used to perform an application programming interface to indicate whether one or more threads within two or more blocks of threads have performed a barrier instruction. In at least one embodiment, graphics multiprocessor 4734 is used to perform an application programming interface to cause performance of one or more threads within a group of blocks of threads to stop at least until all threads within the group of blocks have performed a barrier instruction. In at least one embodiment, graphics multiprocessor 4734 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, graphics multiprocessor 4734 is used to perform an application programming interface to cause memory to be shared between two or more groups of blocks of threads.

In at least one embodiment, graphics multiprocessor 4734 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 47C:
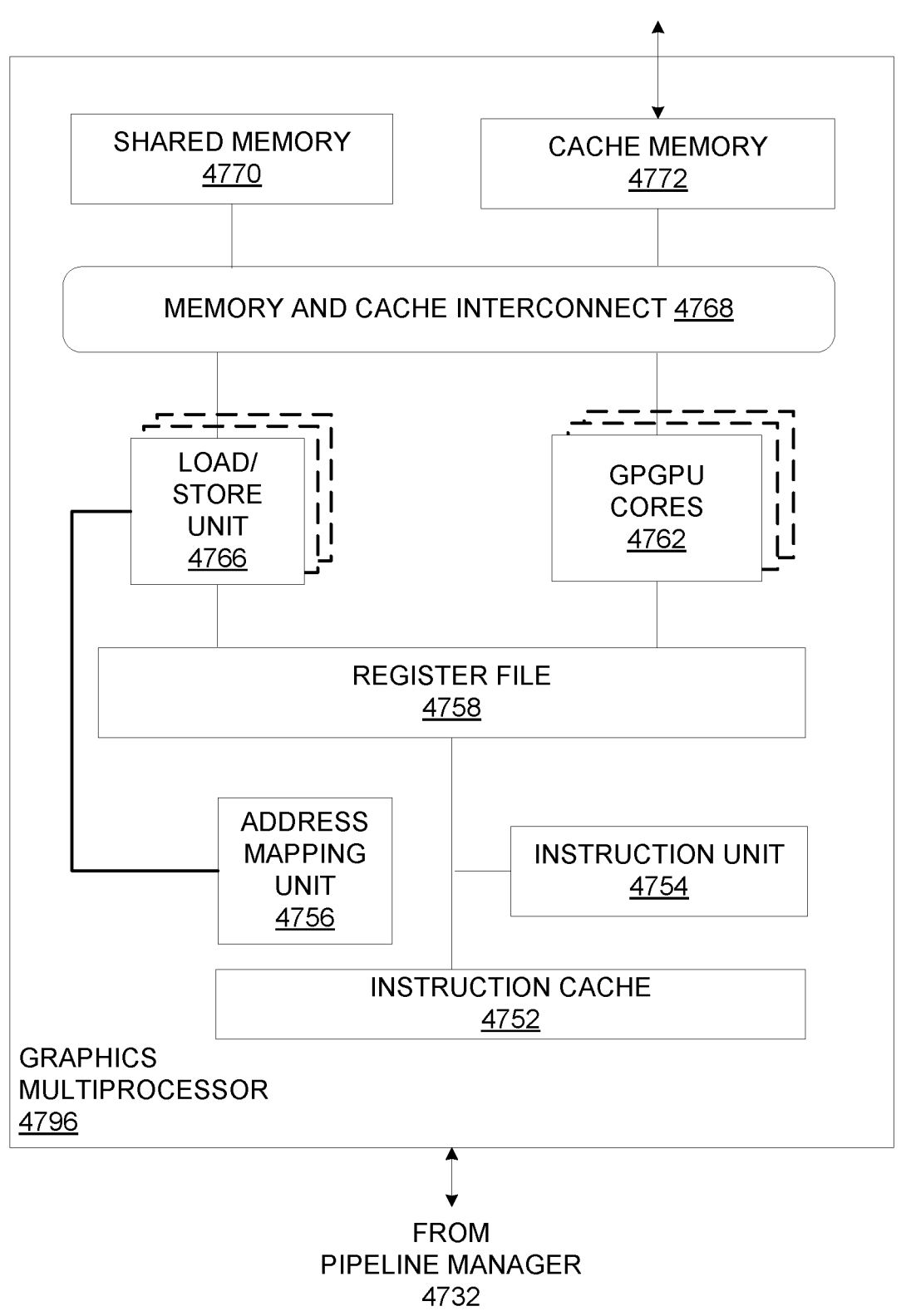
FIG. 47C illustrates a graphics multiprocessor, in accordance with at least one embodiment.

FIG. 47C illustrates a graphics multiprocessor 4796, in accordance with at least one embodiment. In at least one embodiment, graphics multiprocessor 4796 is graphics multiprocessor 4734 of FIG. 47B. In at least one embodiment, graphics multiprocessor 4796 couples with pipeline manager 4732 of processing cluster 4794. In at least one embodiment, graphics multiprocessor 4796 has an execution pipeline including but not limited to an instruction cache 4752, an instruction unit 4754, an address mapping unit 4756, a register file 4758, one or more GPGPU cores 4762, and one or more LSUs 4766. GPGPU cores 4762 and LSUs 4766 are coupled with cache memory 4772 and shared memory 4770 via a memory and cache interconnect 4768.

In at least one embodiment, instruction cache 4752 receives a stream of instructions to execute from pipeline manager 4732. In at least one embodiment, instructions are cached in instruction cache 4752 and dispatched for execution by instruction unit 4754. In at least one embodiment, instruction unit 4754 can dispatch instructions as thread groups (e.g., warps), with each thread of a thread group assigned to a different execution unit within GPGPU core 4762. In at least one embodiment, an instruction can access any of a local, shared, or global address space by specifying an address within a unified address space. In at least one embodiment, address mapping unit 4756 can be used to translate addresses in a unified address space into a distinct memory address that can be accessed by LSUs 4766.

In at least one embodiment, register file 4758 provides a set of registers for functional units of graphics multiprocessor 4796. In at least one embodiment, register file 4758 provides temporary storage for operands connected to data paths of functional units (e.g., GPGPU cores 4762, LSUs 4766) of graphics multiprocessor 4796. In at least one embodiment, register file 4758 is divided between each of functional units such that each functional unit is allocated a dedicated portion of register file 4758. In at least one embodiment, register file 4758 is divided between different thread groups being executed by graphics multiprocessor 4796.

In at least one embodiment, GPGPU cores 4762 can each include FPUs and/or integer ALUs that are used to execute instructions of graphics multiprocessor 4796. GPGPU cores 4762 can be similar in architecture or can differ in architecture. In at least one embodiment, a first portion of GPGPU cores 4762 include a single precision FPU and an integer ALU while a second portion of GPGPU cores 4762 include a double precision FPU. In at least one embodiment, FPUs can implement IEEE 754-2008 standard for floating point arithmetic or enable variable precision floating point arithmetic. In at least one embodiment, graphics multiprocessor 4796 can additionally include one or more fixed function or special function units to perform specific functions such as copy rectangle or pixel blending operations. In at least one embodiment one or more of GPGPU cores 4762 can also include fixed or special function logic.

In at least one embodiment, GPGPU cores 4762 include SIMD logic capable of performing a single instruction on multiple sets of data. In at least one embodiment GPGPU cores 4762 can physically execute SIMD4, SIMD8, and SIMD16 instructions and logically execute SIMD1, SIMD2, and SIMD32 instructions. In at least one embodiment, SIMD instructions for GPGPU cores 4762 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 4768 is an interconnect network that connects each functional unit of graphics multiprocessor 4796 to register file 4758 and to shared memory 4770. In at least one embodiment, memory and cache interconnect 4768 is a crossbar interconnect that allows LSU 4766 to implement load and store operations between shared memory 4770 and register file 4758. In at least one embodiment, register file 4758 can operate at a same frequency as GPGPU cores

4762, thus data transfer between GPGPU cores 4762 and register file 4758 is very low latency. In at least one embodiment, shared memory 4770 can be used to enable communication between threads that execute on functional units within graphics multiprocessor 4796. In at least one embodiment, cache memory 4772 can be used as a data cache for example, to cache texture data communicated between functional units and texture unit 4736. In at least one embodiment, shared memory 4770 can also be used as a program managed cached. In at least one embodiment, threads executing on GPGPU cores 4762 can programmatically store data within shared memory in addition to automatically cached data that is stored within cache memory 4772.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

In at least one embodiment, at least one component shown or described with respect to FIG. 47C is used to implement techniques and/or functions described in connection with FIGS. 1-35. In at least one embodiment, graphics multiprocessor 4796 is used to perform an application programming interface to indicate two or more blocks of threads to be scheduled in parallel. In at least one embodiment, graphics multiprocessor 4796 is used to perform an application programming interface to determine which of two or more blocks of threads to be scheduled in parallel. In at least one embodiment, graphics multiprocessor 4796 is used to perform an application programming interface comprising one or more parameters to cause a scheduling policy of one or more blocks of one or more threads to be performed. In at least one embodiment, graphics multiprocessor 4796 is used to perform an application programming interface comprising one or more parameters to indicate a scheduling policy of one or more blocks of one or more threads. In at least one embodiment, graphics multiprocessor 4796 is used to perform an application programming interface to indicate a maximum number of blocks of threads capable of being scheduled in parallel. In at least one embodiment, graphics multiprocessor 4796 is used to perform an application programming interface comprising one or more parameters to indicate one or more attributes of one or more groups of blocks of one or more threads. In at least one embodiment, graphics multiprocessor 4796 is used to perform an application programming interface to indicate a maximum number of blocks of threads to be scheduled in parallel. In at least one embodiment, graphics multiprocessor 4796 is used to perform an application programming interface to cause a kernel to be generated to cause two or more blocks of two or more threads to be scheduled in parallel. In at least one embodiment, graphics multiprocessor 4796 is used to perform an application programming interface comprising one or more parameters to indicate one or more limitations of one or more attributes of one or more groups of blocks of one or more threads. In at least one embodiment, graphics multiprocessor 4796 is used to perform an application programming interface to indicate whether one or more threads within two or more blocks of threads have performed a barrier instruction. In at least one embodiment, graphics multiprocessor 4796 is used to perform an application programming interface to cause performance of one or more threads within a group of blocks of threads to stop at least until all threads within the group of blocks have performed a barrier instruction. In at least one embodiment, graphics multiprocessor 4796 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, graphics multiprocessor 4796 is used to perform an application programming interface to cause memory to be shared between two or more groups of blocks of threads.

In at least one embodiment, graphics multiprocessor 4796 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 48:
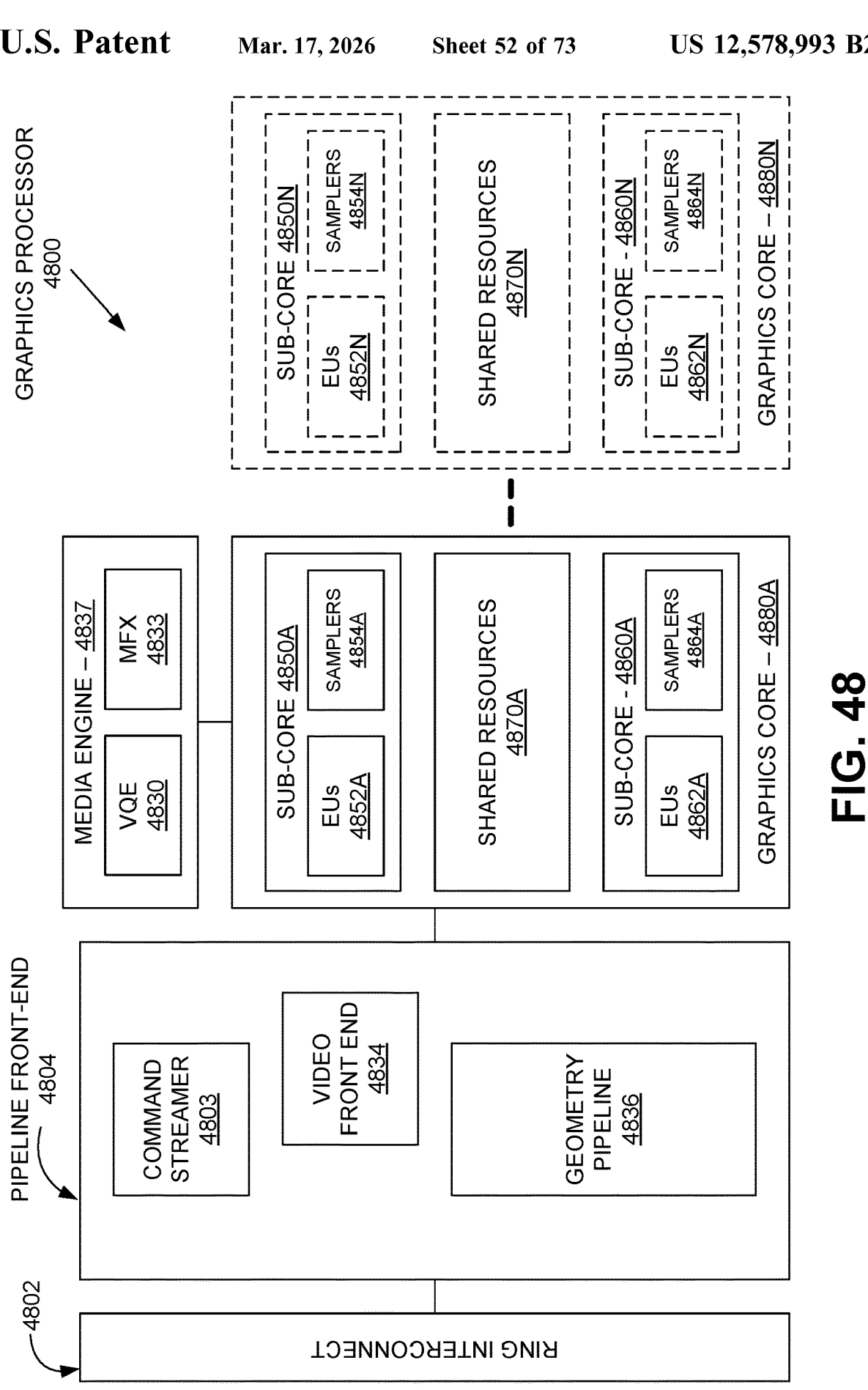
FIG. 48 illustrates a graphics processor, in accordance with at least one embodiment.

FIG. 48 illustrates a graphics processor 4800, in accordance with at least one embodiment. In at least one embodiment, graphics processor 4800 includes a ring interconnect 4802, a pipeline front-end 4804, a media engine 4837, and graphics cores 4880A-4880N. In at least one embodiment, ring interconnect 4802 couples graphics processor 4800 to other processing units, including other graphics processors or one or more general-purpose processor cores. In at least one embodiment, graphics processor 4800 is one of many processors integrated within a multi-core processing system.

In at least one embodiment, graphics processor 4800 receives batches of commands via ring interconnect 4802. In at least one embodiment, incoming commands are interpreted by a command streamer 4803 in pipeline front-end 4804. In at least one embodiment, graphics processor 4800 includes scalable execution logic to perform 3D geometry processing and media processing via graphics core(s) 4880A-4880N. In at least one embodiment, for 3D geometry processing commands, command streamer 4803 supplies commands to geometry pipeline 4836. In at least one embodiment, for at least some media processing commands, command streamer 4803 supplies commands to a video front end 4834, which couples with a media engine 4837. In at least one embodiment, media engine 4837 includes a Video Quality Engine ("VQE") 4830 for video and image post-processing and a multi-format encode/decode ("MFX") engine 4833 to provide hardware-accelerated media data encode and decode. In at least one embodiment, geometry pipeline 4836 and media engine 4837 each generate execution threads for thread execution resources provided by at least one graphics core 4880A.

In at least one embodiment, graphics processor 4800 includes scalable thread execution resources featuring modular graphics cores 4880A-4880N (sometimes referred to as core slices), each having multiple sub-cores 4850A-550N, 4860A-4860N (sometimes referred to as core sub-slices). In at least one embodiment, graphics processor 4800 can have any number of graphics cores 4880A through 4880N. In at least one embodiment, graphics processor 4800 includes a graphics core 4880A having at least a first sub-core 4850A and a second sub-core 4860A. In at least one embodiment, graphics processor 4800 is a low power processor with a single sub-core (e.g., sub-core 4850A). In at least one embodiment, graphics processor 4800 includes multiple graphics cores 4880A-4880N, each including a set of first sub-cores 4850A-4850N and a set of second sub-cores 4860A-4860N. In at least one embodiment, each sub-core in first sub-cores 4850A-4850N includes at least a first set of execution units ("EUs") 4852A-4852N and media/texture samplers 4854A-4854N. In at least one embodiment, each sub-core in second sub-cores 4860A-4860N includes at least a second set of execution units 4862A-4862N and samplers 4864A-4864N. In at least one embodiment, each sub-core 4850A-4850N, 4860A-4860N shares a set of shared resources 4870A-4870N. In at least one embodiment, shared resources 4870 include shared cache memory and pixel operation logic.

In at least one embodiment, at least one component shown or described with respect to FIG. 48 is used to implement techniques and/or functions described in connection with FIGS. 1-35. In at least one embodiment, graphics processor 4800 is used to perform an application programming interface to indicate two or more blocks of threads to be scheduled in parallel. In at least one embodiment, graphics processor 4800 is used to perform an application programming interface to determine which of two or more blocks of threads to be scheduled in parallel. In at least one embodiment, graphics processor 4800 is used to perform an application programming interface comprising one or more parameters to cause a scheduling policy of one or more blocks of one or more threads to be performed. In at least one embodiment, graphics processor 4800 is used to perform an application programming interface comprising one or more parameters to indicate a scheduling policy of one or more blocks of one or more threads. In at least one embodiment, graphics processor 4800 is used to perform an application programming interface to indicate a maximum number of blocks of threads capable of being scheduled in parallel. In at least one embodiment, graphics processor 4800 is used to perform an application programming interface comprising one or more parameters to indicate one or more attributes of one or more groups of blocks of one or more threads. In at least one embodiment, graphics processor 4800 is used to perform an application programming interface to indicate a maximum number of blocks of threads to be scheduled in parallel. In at least one embodiment, graphics processor 4800 is used to perform an application programming interface to cause a kernel to be generated to cause two or more blocks of two or more threads to be scheduled in parallel. In at least one embodiment, graphics processor 4800 is used to perform an application programming interface comprising one or more parameters to indicate one or more limitations of one or more attributes of one or more groups of blocks of one or more threads. In at least one embodiment, graphics processor 4800 is used to perform an application programming interface to indicate whether one or more threads within two or more blocks of threads have performed a barrier instruction. In at least one embodiment, graphics processor 4800 is used to perform an application programming interface to cause performance of one or more threads within a group of blocks of threads to stop at least until all threads within the group of blocks have performed a barrier instruction. In at least one embodiment, graphics processor 4800 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, graphics processor 4800 is used to perform an application programming interface to cause memory to be shared between two or more groups of blocks of threads.

In at least one embodiment, graphics processor 4800 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 49:
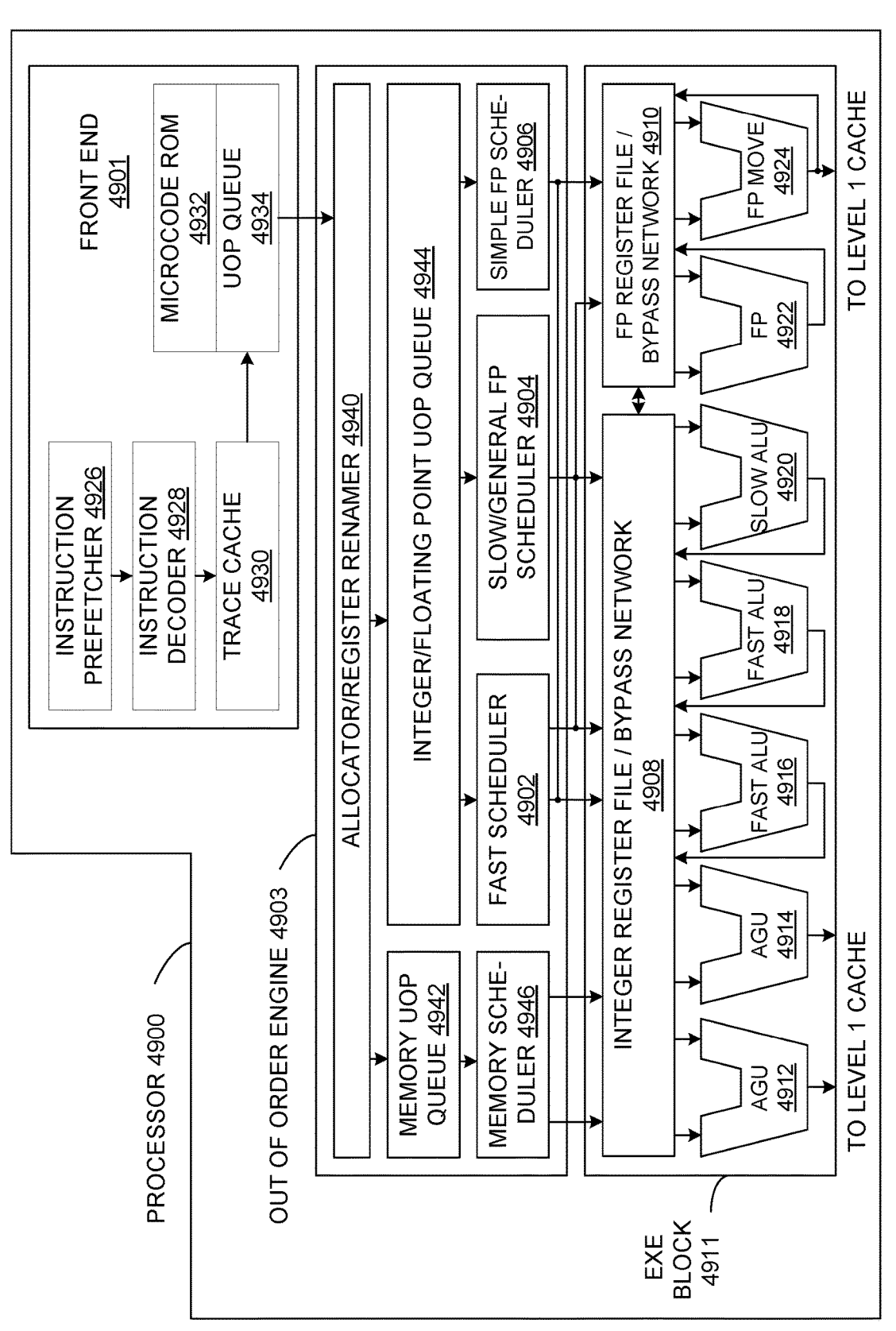
FIG. 49 illustrates a processor, in accordance with at least one embodiment.

FIG. 49 illustrates a processor 4900, in accordance with at least one embodiment. In at least one embodiment, processor 4900 may include, without limitation, logic circuits to perform instructions. In at least one embodiment, processor 4900 may perform instructions, including ×86 instructions, ARM instructions, specialized instructions for ASICs, etc. In at least one embodiment, processor 4910 may include registers to store packed data, such as 64-bit wide MMX™ registers in microprocessors enabled with MMX technology from Intel Corporation of Santa Clara, Calif In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 4910 may perform instructions to accelerate CUDA programs.

In at least one embodiment, processor 4900 includes an in-order front end ("front end") 4901 to fetch instructions to be executed and prepare instructions to be used later in processor pipeline. In at least one embodiment, front end 4901 may include several units. In at least one embodiment, an instruction prefetcher 4926 fetches instructions from memory and feeds instructions to an instruction decoder 4928 which in turn decodes or interprets instructions. For example, in at least one embodiment, instruction decoder 4928 decodes a received instruction into one or more operations called "micro-instructions" or "micro-operations" (also called "micro ops" or "uops") for execution. In at least one embodiment, instruction decoder 4928 parses instruction into an opcode and corresponding data and control fields that may be used by micro-architecture to perform operations. In at least one embodiment, a trace cache 4930 may assemble decoded uops into program ordered sequences or traces in a uop queue 4934 for execution. In at least one embodiment, when trace cache 4930 encounters a complex instruction, a microcode ROM 4932 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 4928 may access microcode ROM 4932 to perform instruction. In at least one embodiment, an instruction may be decoded into a small number of micro-ops for processing at instruction decoder 4928. In at least one embodiment, an instruction may be stored within microcode ROM 4932 should a number of micro-ops be needed to accomplish operation. In at least one embodiment, trace cache 4930 refers to an entry point programmable logic array ("PLA") to determine a correct micro-instruction pointer for reading microcode sequences to complete one or more instructions from microcode ROM 4932. In at least one embodiment, after microcode ROM 4932 finishes sequencing micro-ops for an instruction, front end 4901 of machine may resume fetching micro-ops from trace cache 4930.

In at least one embodiment, out-of-order execution engine ("out of order engine") 4903 may prepare instructions for execution. In at least one embodiment, out-of-order execution logic has a number of buffers to smooth out and re-order the flow of instructions to optimize performance as they go down a pipeline and get scheduled for execution. Out-of-order execution engine 4903 includes, without limitation, an allocator/register renamer 4940, a memory uop queue 4942, an integer/floating point uop queue 4944, a memory scheduler 4946, a fast scheduler 4902, a slow/general floating point scheduler ("slow/general FP scheduler") 4904, and a simple floating point scheduler ("simple FP scheduler") 4906. In at least one embodiment, fast schedule 4902, slow/general floating point scheduler 4904, and simple floating point scheduler 4906 are also collectively referred to herein as "uop schedulers 4902, 4904, 4906." Allocator/register renamer 4940 allocates machine buffers and resources that each uop needs in order to execute. In at least one embodiment, allocator/register renamer 4940 renames logic registers onto entries in a register file. In at least one embodiment, allocator/register renamer 4940 also allocates an entry for each uop in one of two uop queues, memory uop queue 4942 for memory operations and integer/floating point uop queue 4944 for non-memory operations, in front of memory scheduler 4946 and uop schedulers 4902, 4904, 4906. In at least one embodiment, uop schedulers 4902, 4904, 4906, determine when a uop is ready to execute based on readiness of their dependent input register operand sources and availability of execution resources uops need to complete their operation. In at least one embodiment, fast scheduler 4902 of at least one embodiment may schedule on each half of main clock cycle while slow/general floating point scheduler 4904 and simple floating point scheduler 4906 may schedule once per main processor clock cycle. In at least one embodiment, uop schedulers 4902, 4904, 4906 arbitrate for dispatch ports to schedule uops for execution.

In at least one embodiment, execution block 4911 includes, without limitation, an integer register file/bypass network 4908, a floating point register file/bypass network ("FP register file/bypass network") 4910, address generation units ("AGUs") 4912 and 4914, fast ALUs 4916 and 4918, a slow ALU 4920, a floating point ALU ("FP") 4922, and a floating point move unit ("FP move") 4924. In at least one embodiment, integer register file/bypass network 4908 and floating point register file/bypass network 4910 are also referred to herein as "register files 4908, 4910." In at least one embodiment, AGUSs 4912 and 4914, fast ALUs 4916 and 4918, slow ALU 4920, floating point ALU 4922, and floating point move unit 4924 are also referred to herein as "execution units 4912, 4914, 4916, 4918, 4920, 4922, and 4924." In at least one embodiment, an execution block may include, without limitation, any number (including zero) and type of register files, bypass networks, address generation units, and execution units, in any combination.

In at least one embodiment, register files 4908, 4910 may be arranged between uop schedulers 4902, 4904, 4906, and execution units 4912, 4914, 4916, 4918, 4920, 4922, and 4924. In at least one embodiment, integer register file/bypass network 4908 performs integer operations. In at least one embodiment, floating point register file/bypass network 4910 performs floating point operations. In at least one embodiment, each of register files 4908, 4910 may include, without limitation, a bypass network that may bypass or forward just completed results that have not yet been written into register file to new dependent uops. In at least one embodiment, register files 4908, 4910 may communicate data with each other. In at least one embodiment, integer register file/bypass network 4908 may include, without limitation, two separate register files, one register file for low-order thirty-two bits of data and a second register file for high order thirty-two bits of data. In at least one embodiment, floating point register file/bypass network 4910 may include, without limitation, 128-bit wide entries because floating point instructions typically have operands from 64 to 128 bits in width.

In at least one embodiment, execution units 4912, 4914, 4916, 4918, 4920, 4922, 4924 may execute instructions. In at least one embodiment, register files 4908, 4910 store integer and floating point data operand values that micro-instructions need to execute. In at least one embodiment, processor 4900 may include, without limitation, any number and combination of execution units 4912, 4914, 4916, 4918, 4920, 4922, 4924. In at least one embodiment, floating point ALU 4922 and floating point move unit 4924 may execute floating point, MMX, SIMD, AVX and SSE, or other operations. In at least one embodiment, floating point ALU 4922 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 4916, 4918. In at least one embodiment, fast ALUS 4916, 4918 may execute fast operations with an effective latency of half a clock cycle. In at least one embodiment, most complex integer operations go to slow ALU 4920 as slow ALU 4920 may include, without limitation, integer execution hardware for long-latency type of operations, such as a multiplier, shifts, flag logic, and branch processing. In at least one embodiment, memory load/store operations may be executed by AGUs 4912, 4914. In at least one embodiment, fast ALU 4916, fast ALU 4918, and slow ALU 4920 may perform integer operations on 64-bit data operands. In at least one embodiment, fast ALU 4916, fast ALU 4918, and slow ALU 4920 may be implemented to support a variety of data bit sizes including sixteen, thirty-two, 128, 256, etc. In at least one embodiment, floating point ALU 4922 and floating point move unit 4924 may be implemented to support a range of operands having bits of various widths. In at least one embodiment, floating point ALU 4922 and floating point move unit 4924 may operate on 128-bit wide packed data operands in conjunction with SIMD and multimedia instructions.

In at least one embodiment, uop schedulers 4902, 4904, 4906 dispatch dependent operations before parent load has finished executing. In at least one embodiment, as uops may be speculatively scheduled and executed in processor 4900, processor 4900 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

In at least one embodiment, at least one component shown or described with respect to FIG. 49 is used to implement techniques and/or functions described in connection with FIGS. 1-35. In at least one embodiment, processor 4900 is used to perform an application programming interface to indicate two or more blocks of threads to be scheduled in parallel. In at least one embodiment, processor 4900 is used to perform an application programming interface to determine which of two or more blocks of threads to be scheduled in parallel. In at least one embodiment, processor 4900 is used to perform an application programming interface comprising one or more parameters to cause a scheduling policy of one or more blocks of one or more threads to be performed. In at least one embodiment, processor 4900 is used to perform an application programming interface comprising one or more parameters to indicate a scheduling policy of one or more blocks of one or more threads. In at least one embodiment, processor 4900 is used to perform an application programming interface to indicate a maximum number of blocks of threads capable of being scheduled in parallel. In at least one embodiment, processor 4900 is used to perform an application programming interface comprising one or more parameters to indicate one or more attributes of one or more groups of blocks of one or more threads. In at least one embodiment, processor 4900 is used to perform an application programming interface to indicate a maximum number of blocks of threads to be scheduled in parallel. In at least one embodiment, processor 4900 is used to perform an application programming interface to cause a kernel to be generated to cause two or more blocks of two or more threads to be scheduled in parallel. In at least one embodiment, processor 4900 is used to perform an application programming interface comprising one or more parameters to indicate one or more limitations of one or more attributes of one or more groups of blocks of one or more threads. In at least one embodiment, processor 4900 is used to perform an application programming interface to indicate whether one or more threads within two or more blocks of threads have performed a barrier instruction. In at least one embodiment, processor 4900 is used to perform an application programming interface to cause performance of one or more threads within a group of blocks of threads to stop at least until all threads within the group of blocks have performed a barrier instruction. In at least one embodiment, processor 4900 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, processor 4900 is used to perform an application programming interface to cause memory to be shared between two or more groups of blocks of threads.

In at least one embodiment, processor 4900 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 50:
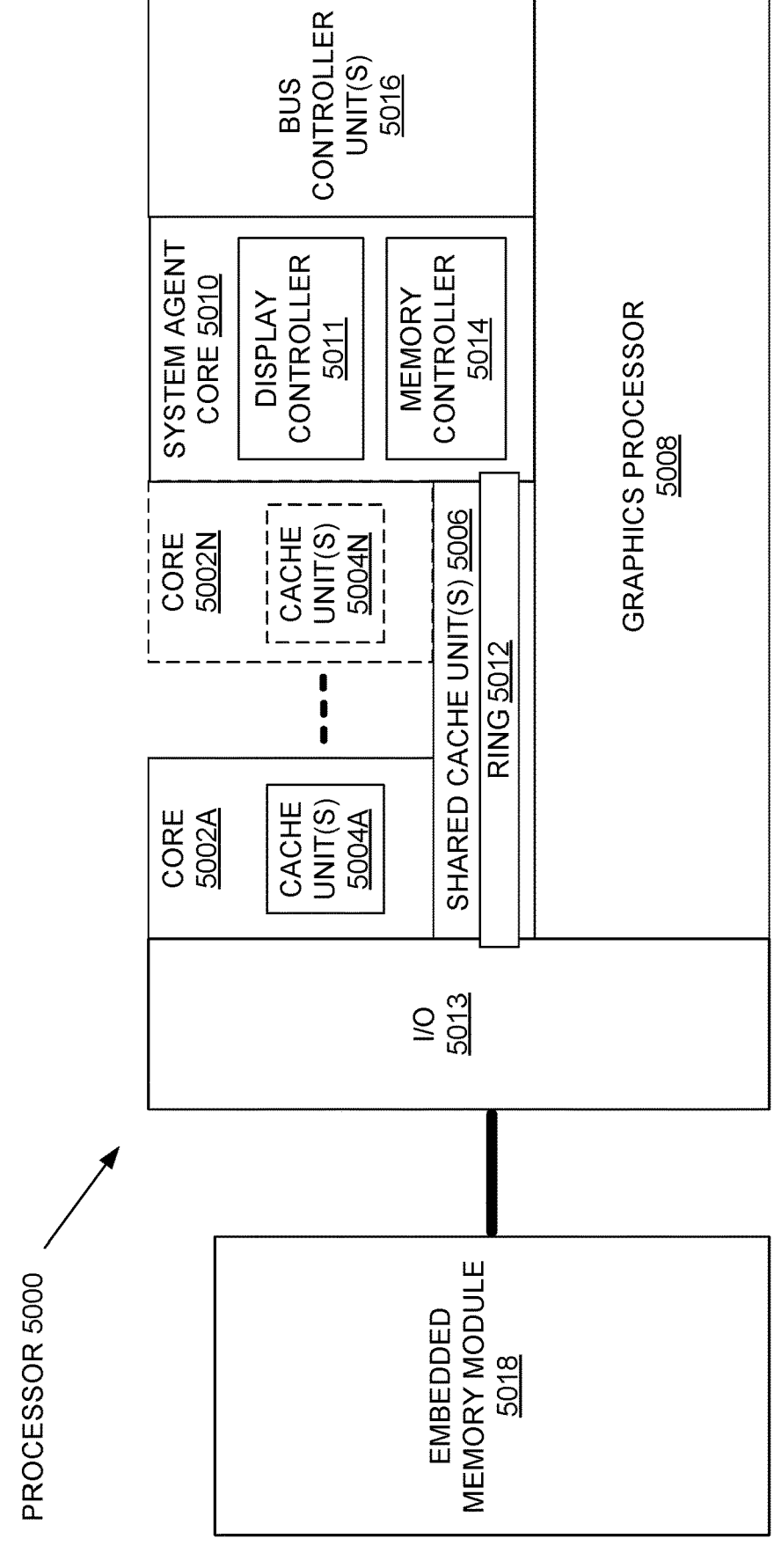
FIG. 50 illustrates a processor, in accordance with at least one embodiment.

FIG. 50 illustrates a processor 5000, in accordance with at least one embodiment. In at least one embodiment, processor 5000 includes, without limitation, one or more processor cores ("cores") 5002A-5002N, an integrated memory controller 5014, and an integrated graphics processor 5008. In at least one embodiment, processor 5000 can include additional cores up to and including additional processor core 5002N represented by dashed lined boxes. In at least one embodiment, each of processor cores 5002A-5002N includes one or more internal cache units 5004A-5004N. In at least one embodiment, each processor core also has access to one or more shared cached units 5006.

In at least one embodiment, internal cache units 5004A-5004N and shared cache units 5006 represent a cache memory hierarchy within processor 5000. In at least one embodiment, cache memory units 5004A-5004N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 5006 and 5004A-5004N.

In at least one embodiment, processor 5000 may also include a set of one or more bus controller units 5016 and a system agent core 5010. In at least one embodiment, one or more bus controller units 5016 manage a set of peripheral buses, such as one or more PCI or PCI express buses. In at least one embodiment, system agent core 5010 provides management functionality for various processor components. In at least one embodiment, system agent core 5010 includes one or more integrated memory controllers 5014 to manage access to various external memory devices (not shown).

In at least one embodiment, one or more of processor cores 5002A-5002N include support for simultaneous multi-threading. In at least one embodiment, system agent core 5010 includes components for coordinating and operating processor cores 5002A-5002N during multi-threaded processing. In at least one embodiment, system agent core 5010 may additionally include a power control unit ("PCU"), which includes logic and components to regulate one or more power states of processor cores 5002A-5002N and graphics processor 5008.

In at least one embodiment, processor 5000 additionally includes graphics processor 5008 to execute graphics processing operations. In at least one embodiment, graphics processor 5008 couples with shared cache units 5006, and system agent core 5010, including one or more integrated memory controllers 5014. In at least one embodiment, system agent core 5010 also includes a display controller 5011 to drive graphics processor output to one or more coupled displays. In at least one embodiment, display controller 5011 may also be a separate module coupled with graphics processor 5008 via at least one interconnect, or may be integrated within graphics processor 5008.

In at least one embodiment, a ring based interconnect unit 5012 is used to couple internal components of processor 5000. In at least one embodiment, an alternative interconnect unit may be used, such as a point-to-point interconnect, a switched interconnect, or other techniques. In at least one embodiment, graphics processor 5008 couples with ring interconnect 5012 via an I/O link 5013.

In at least one embodiment, I/O link 5013 represents at least one of multiple varieties of I/O interconnects, including an on package I/O interconnect which facilitates communication between various processor components and a high-performance embedded memory module 5018, such as an eDRAM module. In at least one embodiment, each of processor cores 5002A-5002N and graphics processor 5008 use embedded memory modules 5018 as a shared LLC.

In at least one embodiment, processor cores 5002A-5002N are homogeneous cores executing a common instruction set architecture. In at least one embodiment, processor cores 5002A-5002N are heterogeneous in terms of ISA, where one or more of processor cores 5002A-5002N execute a common instruction set, while one or more other cores of processor cores 5002A-50-02N executes a subset of a common instruction set or a different instruction set. In at least one embodiment, processor cores 5002A-5002N are heterogeneous in terms of microarchitecture, where one or more cores having a relatively higher power consumption couple with one or more cores having a lower power consumption. In at least one embodiment, processor 5000 can be implemented on one or more chips or as an SoC integrated circuit.

In at least one embodiment, at least one component shown or described with respect to FIG. 50 is used to implement techniques and/or functions described in connection with FIGS. 1-35. In at least one embodiment, at least one of processor 5000 or graphics processor 5008 is used to perform an application programming interface to indicate two or more blocks of threads to be scheduled in parallel. In at least one embodiment, at least one of processor 5000 or graphics processor 5008 is used to perform an application programming interface to determine which of two or more blocks of threads to be scheduled in parallel. In at least one embodiment, at least one of processor 5000 or graphics processor 5008 is used to perform an application programming interface comprising one or more parameters to cause a scheduling policy of one or more blocks of one or more threads to be performed. In at least one embodiment, at least one of processor 5000 or graphics processor 5008 is used to perform an application programming interface comprising one or more parameters to indicate a scheduling policy of one or more blocks of one or more threads. In at least one embodiment, at least one of processor 5000 or graphics processor 5008 is used to perform an application programming interface to indicate a maximum number of blocks of threads capable of being scheduled in parallel. In at least one embodiment, at least one of processor 5000 or graphics processor 5008 is used to perform an application programming interface comprising one or more parameters to indicate one or more attributes of one or more groups of blocks of one or more threads. In at least one embodiment, at least one of processor 5000 or graphics processor 5008 is used to perform an application programming interface to indicate a maximum number of blocks of threads to be scheduled in parallel. In at least one embodiment, at least one of processor 5000 or graphics processor 5008 is used to perform an application programming interface to cause a kernel to be generated to cause two or more blocks of two or more threads to be scheduled in parallel. In at least one embodiment, at least one of processor 5000 or graphics processor 5008 is used to perform an application programming interface comprising one or more parameters to indicate one or more limitations of one or more attributes of one or more groups of blocks of one or more threads. In at least one embodiment, at least one of processor 5000 or graphics processor 5008 is used to perform an application programming interface to indicate whether one or more threads within two or more blocks of threads have performed a barrier instruction. In at least one embodiment, at least one of processor 5000 or graphics processor 5008 is used to perform an application programming interface to cause performance of one or more threads within a group of blocks of threads to stop at least until all threads within the group of blocks have performed a barrier instruction. In at least one embodiment, at least one of processor 5000 or graphics processor 5008 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one of processor 5000 or graphics processor 5008 is used to perform an application programming interface to cause memory to be shared between two or more groups of blocks of threads.

In at least one embodiment, at least one of processor 5000 or graphics processor 5008 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 51:
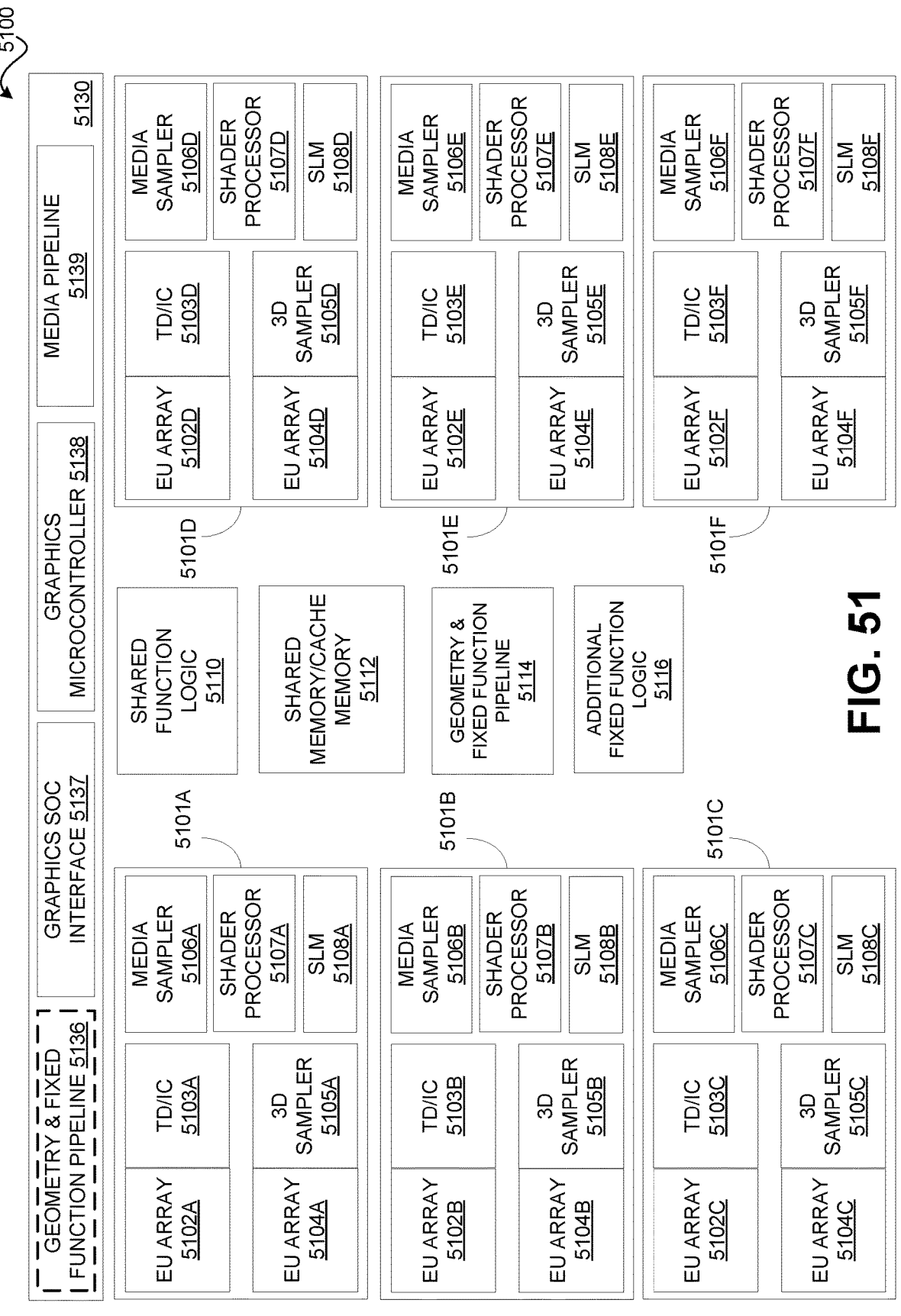
FIG. 51 illustrates a graphics processor core, in accordance with at least one embodiment.

FIG. 51 illustrates a graphics processor core 5100, in accordance with at least one embodiment described. In at least one embodiment, graphics processor core 5100 is included within a graphics core array. In at least one embodiment, graphics processor core 5100, sometimes referred to as a core slice, can be one or multiple graphics cores within a modular graphics processor. In at least one embodiment, graphics processor core 5100 is exemplary of one graphics core slice, and a graphics processor as described herein may include multiple graphics core slices based on target power and performance envelopes. In at least one embodiment, each graphics core 5100 can include a fixed function block 5130 coupled with multiple sub-cores 5101A-5101F, also referred to as sub-slices, that include modular blocks of general-purpose and fixed function logic.

In at least one embodiment, fixed function block 5130 includes a geometry/fixed function pipeline 5136 that can be shared by all sub-cores in graphics processor 5100, for example, in lower performance and/or lower power graphics processor implementations. In at least one embodiment, geometry/fixed function pipeline 5136 includes a 3D fixed function pipeline, a video front-end unit, a thread spawner and thread dispatcher, and a unified return buffer manager, which manages unified return buffers.

In at least one embodiment, fixed function block 5130 also includes a graphics SoC interface 5137, a graphics microcontroller 5138, and a media pipeline 5139. Graphics SoC interface 5137 provides an interface between graphics core 5100 and other processor cores within an SoC integrated circuit. In at least one embodiment, graphics microcontroller 5138 is a programmable sub-processor that is configurable to manage various functions of graphics processor 5100, including thread dispatch, scheduling, and pre-emption. In at least one embodiment, media pipeline 5139 includes logic to facilitate decoding, encoding, pre-processing, and/or post-processing of multimedia data, including image and video data. In at least one embodiment, media pipeline 5139 implements media operations via requests to compute or sampling logic within sub-cores 5101-5101F.

In at least one embodiment, SoC interface 5137 enables graphics core 5100 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 5137 can also enable communication with fixed function devices within an SoC, such as camera imaging pipelines, and enables use of and/or implements global memory atomics that may be shared between graphics core 5100 and CPUs within an SoC. In at least one embodiment, SoC interface 5137 can also implement power management controls for graphics core 5100 and enable an interface between a clock domain of graphic core 5100 and other clock domains within an SoC. In at least one embodiment, SoC interface 5137 enables receipt of command buffers from a command streamer and global thread dispatcher that are configured to provide commands and instructions to each of one or more graphics cores within a graphics processor. In at least one embodiment, commands and instructions can be dispatched to media pipeline 5139, when media operations are to be performed, or a geometry and fixed function pipeline (e.g., geometry and fixed function pipeline 5136, geometry and fixed function pipeline 5114) when graphics processing operations are to be performed.

In at least one embodiment, graphics microcontroller 5138 can be configured to perform various scheduling and management tasks for graphics core 5100. In at least one embodiment, graphics microcontroller 5138 can perform graphics and/or compute workload scheduling on various graphics parallel engines within execution unit (EU) arrays 5102A-5102F, 5104A-5104F within sub-cores 5101A-5101F. In at least one embodiment, host software executing on a CPU core of an SoC including graphics core 5100 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 5138 can also facilitate low-power or idle states for graphics core 5100, providing graphics core 5100 with an ability to save and restore registers within graphics core 5100 across low-power state transitions independently from an operating system and/or graphics driver software on a system.

In at least one embodiment, graphics core 5100 may have greater than or fewer than illustrated sub-cores 5101A-5101F, up to N modular sub-cores. For each set of N sub-cores, in at least one embodiment, graphics core 5100 can also include shared function logic 5110, shared and/or cache memory 5112, a geometry/fixed function pipeline 5114, as well as additional fixed function logic 5116 to accelerate various graphics and compute processing operations. In at least one embodiment, shared function logic 5110 can include logic units (e.g., sampler, math, and/or inter-thread communication logic) that can be shared by each N sub-cores within graphics core 5100. Shared and/or cache memory 5112 can be an LLC for N sub-cores 5101A-5101F within graphics core 5100 and can also serve as shared memory that is accessible by multiple sub-cores. In at least one embodiment, geometry/fixed function pipeline 5114 can be included instead of geometry/fixed function pipeline 5136 within fixed function block 5130 and can include same or similar logic units.

In at least one embodiment, graphics core 5100 includes additional fixed function logic 5116 that can include various fixed function acceleration logic for use by graphics core 5100. In at least one embodiment, additional fixed function logic 5116 includes an additional geometry pipeline for use in position only shading. In position-only shading, at least two geometry pipelines exist, whereas in a full geometry pipeline within geometry/fixed function pipeline 5116, 5136, and a cull pipeline, which is an additional geometry pipeline which may be included within additional fixed function logic 5116. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 5116 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 5116 can also include general purpose processing acceleration logic, such as fixed function matrix multiplication logic, for accelerating CUDA programs.

In at least one embodiment, each graphics sub-core 5101A-5101F includes a set of execution resources that may be used to perform graphics, media, and compute operations in response to requests by graphics pipeline, media pipeline, or shader programs. In at least one embodiment, graphics sub-cores 5101A-5101F include multiple EU arrays 5102A-5102F, 5104A-5104F, thread dispatch and inter-thread communication ("TD/IC") logic 5103A-5103F, a 3D (e.g., texture) sampler 5105A-5105F, a media sampler 5106A-5106F, a shader processor 5107A-5107F, and shared local memory ("SLM") 5108A-5108F. EU arrays 5102A-5102F, 5104A-5104F each include multiple execution units, which are GPGPUs capable of performing floating-point and integer/fixed-point logic operations in service of a graphics, media, or compute operation, including graphics, media, or compute shader programs. In at least one embodiment, TD/IC logic 5103A-5103F performs local thread dispatch and thread control operations for execution units within a sub-core and facilitate communication between threads executing on execution units of a sub-core. In at least one embodiment, 3D sampler 5105A-5105F can read texture or other 3D graphics related data into memory. In at least one embodiment, 3D sampler can read texture data differently based on a configured sample state and texture format associated with a given texture. In at least one embodiment, media sampler 5106A-5106F can perform similar read operations based on a type and format associated with media data. In at least one embodiment, each graphics sub-core 5101A-5101F can alternately include a unified 3D and media sampler. In at least one embodiment, threads executing on execution units within each of sub-cores 5101A-5101F can make use of shared local memory 5108A-5108F within each sub-core, to enable threads executing within a thread group to execute using a common pool of on-chip memory.

In at least one embodiment, at least one component shown or described with respect to FIG. 51 is used to implement techniques and/or functions described in connection with FIGS. 1-35. In at least one embodiment, graphics processor core 5100 is used to perform an application programming interface to indicate two or more blocks of threads to be scheduled in parallel. In at least one embodiment, graphics processor core 5100 is used to perform an application programming interface to determine which of two or more blocks of threads to be scheduled in parallel. In at least one embodiment, graphics processor core 5100 is used to perform an application programming interface comprising one or more parameters to cause a scheduling policy of one or more blocks of one or more threads to be performed. In at least one embodiment, graphics processor core 5100 is used to perform an application programming interface comprising one or more parameters to indicate a scheduling policy of one or more blocks of one or more threads. In at least one embodiment, graphics processor core 5100 is used to perform an application programming interface to indicate a maximum number of blocks of threads capable of being scheduled in parallel. In at least one embodiment, graphics processor core 5100 is used to perform an application programming interface comprising one or more parameters to indicate one or more attributes of one or more groups of blocks of one or more threads. In at least one embodiment, graphics processor core 5100 is used to perform an application programming interface to indicate a maximum number of blocks of threads to be scheduled in parallel. In at least one embodiment, graphics processor core 5100 is used to perform an application programming interface to cause a kernel to be generated to cause two or more blocks of two or more threads to be scheduled in parallel. In at least one embodiment, graphics processor core 5100 is used to perform an application programming interface comprising one or more parameters to indicate one or more limitations of one or more attributes of one or more groups of blocks of one or more threads. In at least one embodiment, graphics processor core 5100 is used to perform an application programming interface to indicate whether one or more threads within two or more blocks of threads have performed a barrier instruction. In at least one embodiment, graphics processor core 5100 is used to perform an application programming interface to cause performance of one or more threads within a group of blocks of threads to stop at least until all threads within the group of blocks have performed a barrier instruction. In at least one embodiment, graphics processor core 5100 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, graphics processor core 5100 is used to perform an application programming interface to cause memory to be shared between two or more groups of blocks of threads.

In at least one embodiment, graphics processor core 5100 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 52:
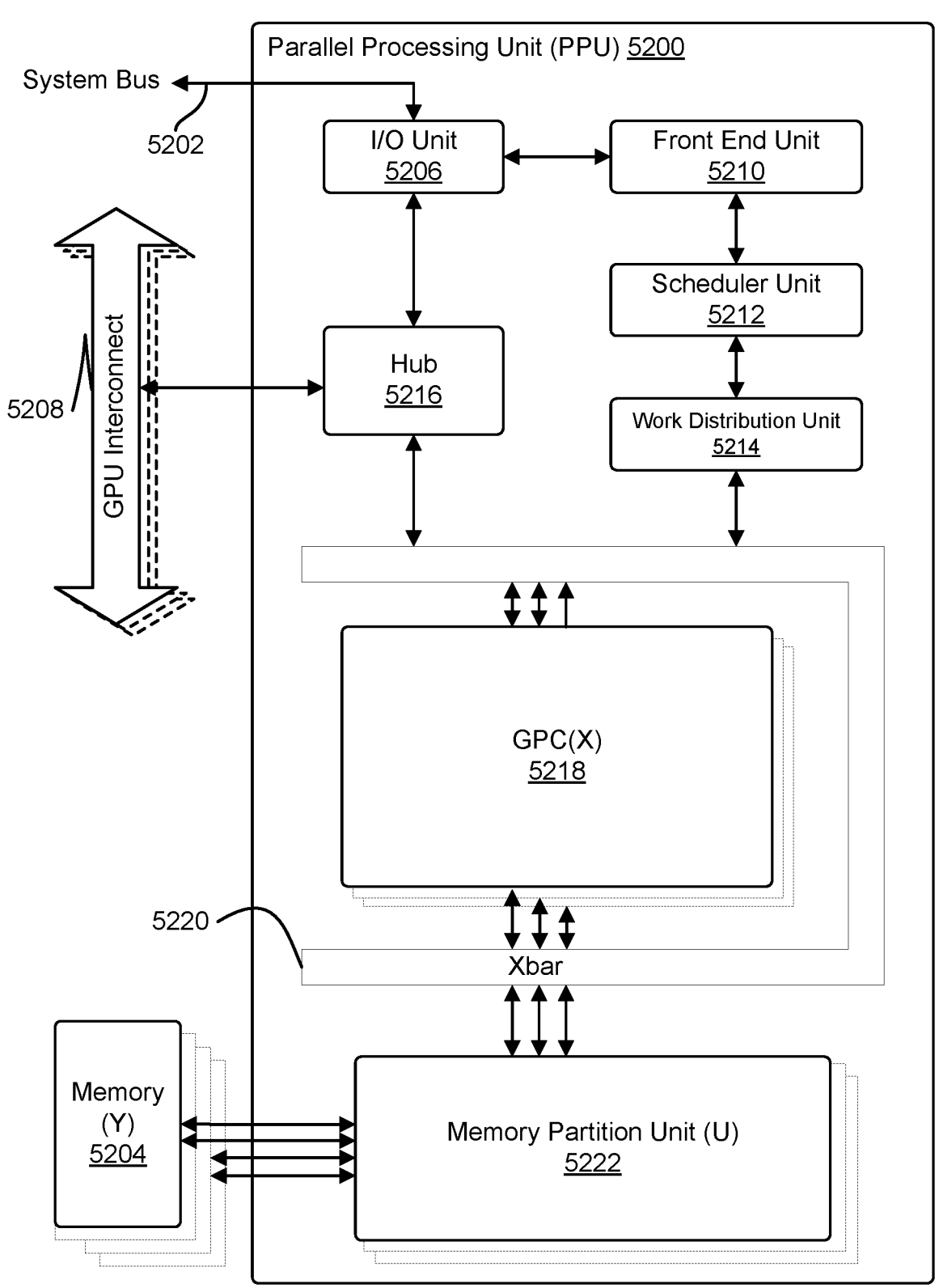
FIG. 52 illustrates a PPU, in accordance with at least one embodiment.

FIG. 52 illustrates a parallel processing unit ("PPU") 5200, in accordance with at least one embodiment. In at least one embodiment, PPU 5200 is configured with machine-readable code that, if executed by PPU 5200, causes PPU 5200 to perform some or all of processes and techniques described herein. In at least one embodiment, PPU 5200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 5200. In at least one embodiment, PPU 5200 is a GPU configured to implement a graphics rendering pipeline for processing three-dimensional ("3D") graphics data in order to generate two-dimensional ("2D") image data for display on a display device such as an LCD device. In at least one embodiment, PPU 5200 is utilized to perform computations such as linear algebra operations and machine-learning operations. FIG. 52 illustrates an example parallel processor for illustrative purposes only and should be construed as a non-limiting example of a processor architecture that may be implemented in at least one embodiment.

In at least one embodiment, one or more PPUs 5200 are configured to accelerate High Performance Computing ("HPC"), data center, and machine learning applications. In at least one embodiment, one or more PPUs 5200 are configured to accelerate CUDA programs. In at least one embodiment, PPU 5200 includes, without limitation, an I/O unit 5206, a front-end unit 5210, a scheduler unit 5212, a work distribution unit 5214, a hub 5216, a crossbar ("Xbar") 5220, one or more general processing clusters ("GPCs") 5218, and one or more partition units ("memory partition units") 5222. In at least one embodiment, PPU 5200 is connected to a host processor or other PPUs 5200 via one or more high-speed GPU interconnects ("GPU interconnects") 5208. In at least one embodiment, PPU 5200 is connected to a host processor or other peripheral devices via a system bus or interconnect 5202. In at least one embodiment, PPU 5200 is connected to a local memory comprising one or more memory devices ("memory") 5204. In at least one embodiment, memory devices 5204 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 5208 may refer to a wire-based multi-lane communications link that is used by systems to scale and include one or more PPUs 5200 combined with one or more CPUs, supports cache coherence between PPUs 5200 and CPUs, and CPU mastering. In at least one embodiment, data and/or commands are transmitted by high-speed GPU interconnect 5208 through hub 5216 to/from other units of PPU 5200 such as one or more copy engines, video encoders, video decoders, power management units, and other components which may not be explicitly illustrated in FIG. 52.

In at least one embodiment, I/O unit 5206 is configured to transmit and receive communications (e.g., commands, data) from a host processor (not illustrated in FIG. 52) over system bus 5202. In at least one embodiment, I/O unit 5206 communicates with host processor directly via system bus 5202 or through one or more intermediate devices such as a memory bridge. In at least one embodiment, I/O unit 5206 may communicate with one or more other processors, such as one or more of PPUs 5200 via system bus 5202. In at least one embodiment, I/O unit 5206 implements a PCIe interface for communications over a PCIe bus. In at least one embodiment, I/O unit 5206 implements interfaces for communicating with external devices.

In at least one embodiment, I/O unit 5206 decodes packets received via system bus 5202. In at least one embodiment, at least some packets represent commands configured to cause PPU 5200 to perform various operations. In at least one embodiment, I/O unit 5206 transmits decoded commands to various other units of PPU 5200 as specified by commands. In at least one embodiment, commands are transmitted to front-end unit 5210 and/or transmitted to hub 5216 or other units of PPU 5200 such as one or more copy engines, a video encoder, a video decoder, a power management unit, etc. (not explicitly illustrated in FIG. 52). In at least one embodiment, I/O unit 5206 is configured to route communications between and among various logical units of PPU 5200.

In at least one embodiment, a program executed by host processor encodes a command stream in a buffer that provides workloads to PPU 5200 for processing. In at least one embodiment, a workload comprises instructions and data to be processed by those instructions. In at least one embodiment, buffer is a region in a memory that is accessible (e.g., read/write) by both a host processor and PPU 5200—a host interface unit may be configured to access buffer in a system memory connected to system bus 5202 via memory requests transmitted over system bus 5202 by I/O unit 5206. In at least one embodiment, a host processor writes a command stream to a buffer and then transmits a pointer to the start of the command stream to PPU 5200 such that front-end unit 5210 receives pointers to one or more command streams and manages one or more command streams, reading commands from command streams and forwarding commands to various units of PPU 5200.

In at least one embodiment, front-end unit 5210 is coupled to scheduler unit 5212 that configures various GPCs 5218 to process tasks defined by one or more command streams. In at least one embodiment, scheduler unit 5212 is configured to track state information related to various tasks managed by scheduler unit 5212 where state information may indicate which of GPCs 5218 a task is assigned to, whether task is active or inactive, a priority level associated with task, and so forth. In at least one embodiment, scheduler unit 5212 manages execution of a plurality of tasks on one or more of GPCs 5218.

In at least one embodiment, scheduler unit 5212 is coupled to work distribution unit 5214 that is configured to dispatch tasks for execution on GPCs 5218. In at least one embodiment, work distribution unit 5214 tracks a number of scheduled tasks received from scheduler unit 5212 and work distribution unit 5214 manages a pending task pool and an active task pool for each of GPCs 5218. In at least one embodiment, pending task pool comprises a number of slots (e.g., 32 slots) that contain tasks assigned to be processed by a particular GPC 5218; active task pool may comprise a number of slots (e.g., 4 slots) for tasks that are actively being processed by GPCs 5218 such that as one of GPCs 5218 completes execution of a task, that task is evicted from active task pool for GPC 5218 and one of other tasks from pending task pool is selected and scheduled for execution on GPC 5218. In at least one embodiment, if an active task is idle on GPC 5218, such as while waiting for a data dependency to be resolved, then the active task is evicted from GPC 5218 and returned to a pending task pool while another task in the pending task pool is selected and scheduled for execution on GPC 5218.

In at least one embodiment, work distribution unit 5214 communicates with one or more GPCs 5218 via XBar 5220. In at least one embodiment, XBar 5220 is an interconnect network that couples many units of PPU 5200 to other units of PPU 5200 and can be configured to couple work distribution unit 5214 to a particular GPC 5218. In at least one embodiment, one or more other units of PPU 5200 may also be connected to XBar 5220 via hub 5216.

In at least one embodiment, tasks are managed by scheduler unit 5212 and dispatched to one of GPCs 5218 by work distribution unit 5214. GPC 5218 is configured to process task and generate results. In at least one embodiment, results may be consumed by other tasks within GPC 5218, routed to a different GPC 5218 via XBar 5220, or stored in memory 5204. In at least one embodiment, results can be written to memory 5204 via partition units 5222, which implement a memory interface for reading and writing data to/from memory 5204. In at least one embodiment, results can be transmitted to another PPU 5204 or CPU via high-speed GPU interconnect 5208. In at least one embodiment, PPU 5200 includes, without limitation, a number U of partition units 5222 that is equal to number of separate and distinct memory devices 5204 coupled to PPU 5200.

In at least one embodiment, a host processor executes a driver kernel that implements an application programming interface ("API") that enables one or more applications executing on host processor to schedule operations for execution on PPU 5200. In at least one embodiment, multiple compute applications are simultaneously executed by PPU 5200 and PPU 5200 provides isolation, quality of service ("QoS"), and independent address spaces for multiple compute applications. In at least one embodiment, an application generates instructions (e.g., in the form of API calls) that cause a driver kernel to generate one or more tasks for execution by PPU 5200 and the driver kernel outputs tasks to one or more streams being processed by PPU 5200. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

In at least one embodiment, at least one component shown or described with respect to FIG. 52 is used to implement techniques and/or functions described in connection with FIGS. 1-35. In at least one embodiment, parallel processing unit 5200 is used to perform an application programming interface to indicate two or more blocks of threads to be scheduled in parallel. In at least one embodiment, parallel processing unit 5200 is used to perform an application programming interface to determine which of two or more blocks of threads to be scheduled in parallel. In at least one embodiment, parallel processing unit 5200 is used to perform an application programming interface comprising one or more parameters to cause a scheduling policy of one or more blocks of one or more threads to be performed. In at least one embodiment, parallel processing unit 5200 is used to perform an application programming interface comprising one or more parameters to indicate a scheduling policy of one or more blocks of one or more threads. In at least one embodiment, parallel processing unit 5200 is used to perform an application programming interface to indicate a maximum number of blocks of threads capable of being scheduled in parallel. In at least one embodiment, parallel processing unit 5200 is used to perform an application programming interface comprising one or more parameters to indicate one or more attributes of one or more groups of blocks of one or more threads. In at least one embodiment, parallel processing unit 5200 is used to perform an application programming interface to indicate a maximum number of blocks of threads to be scheduled in parallel. In at least one embodiment, parallel processing unit 5200 is used to perform an application programming interface to cause a kernel to be generated to cause two or more blocks of two or more threads to be scheduled in parallel. In at least one embodiment, parallel processing unit 5200 is used to perform an application programming interface comprising one or more parameters to indicate one or more limitations of one or more attributes of one or more groups of blocks of one or more threads. In at least one embodiment, parallel processing unit 5200 is used to perform an application programming interface to indicate whether one or more threads within two or more blocks of threads have performed a barrier instruction. In at least one embodiment, parallel processing unit 5200 is used to perform an application programming interface to cause performance of one or more threads within a group of blocks of threads to stop at least until all threads within the group of blocks have performed a barrier instruction. In at least one embodiment, parallel processing unit 5200 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, parallel processing unit 5200 is used to perform an application programming interface to cause memory to be shared between two or more groups of blocks of threads.

In at least one embodiment, parallel processing unit 5200 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 53:
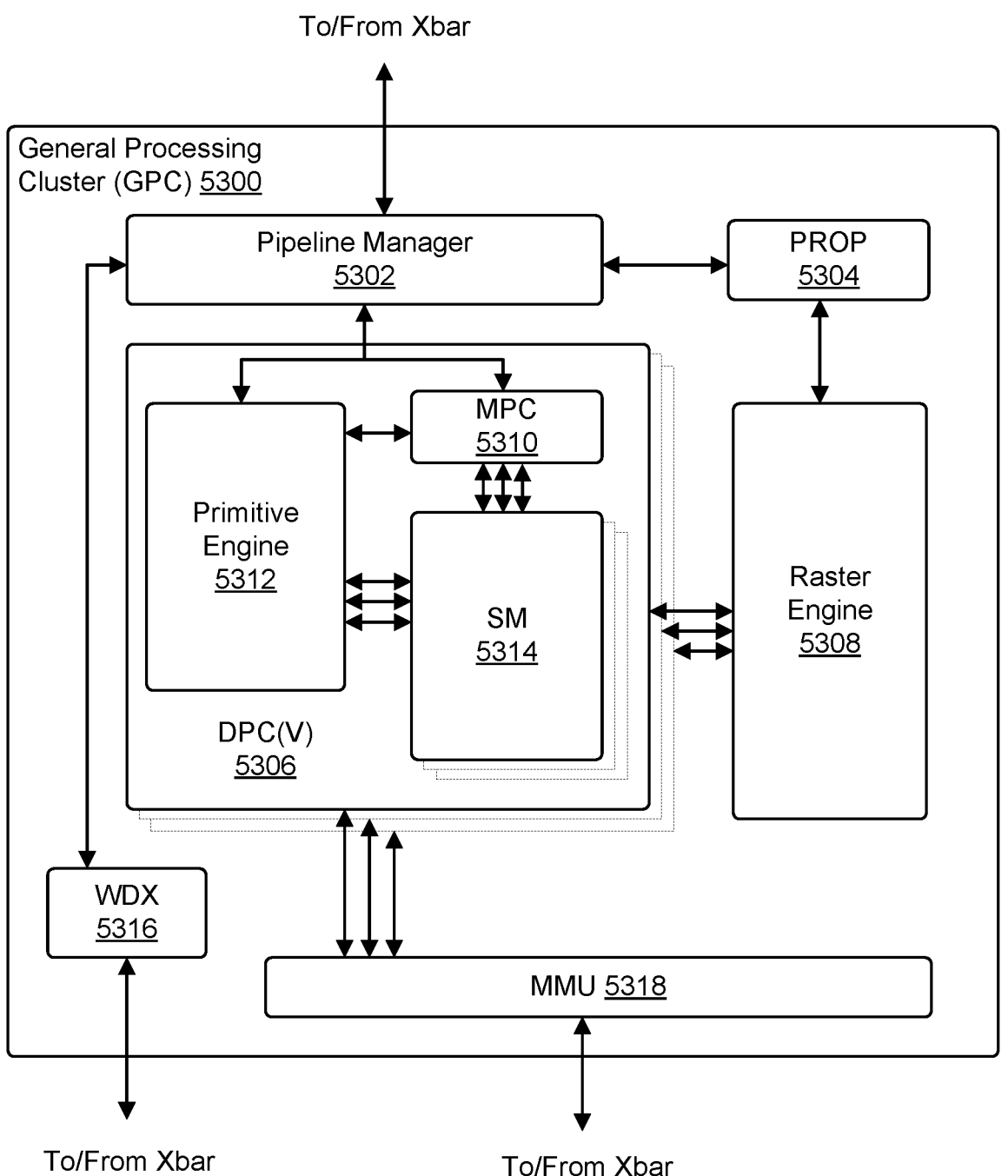
FIG. 53 illustrates a GPC, in accordance with at least one embodiment.

FIG. 53 illustrates a GPC 5300, in accordance with at least one embodiment. In at least one embodiment, GPC 5300 is GPC 5218 of FIG. 52. In at least one embodiment, each GPC 5300 includes, without limitation, a number of hardware units for processing tasks and each GPC 5300 includes, without limitation, a pipeline manager 5302, a pre-raster operations unit ("PROP") 5304, a raster engine 5308, a work distribution crossbar ("WDX") 5316, an MMU 5318, one or more Data Processing Clusters ("DPCs") 5306, and any suitable combination of parts.

In at least one embodiment, operation of GPC 5300 is controlled by pipeline manager 5302. In at least one embodiment, pipeline manager 5302 manages configuration of one or more DPCs 5306 for processing tasks allocated to GPC 5300. In at least one embodiment, pipeline manager 5302 configures at least one of one or more DPCs 5306 to implement at least a portion of a graphics rendering pipeline. In at least one embodiment, DPC 5306 is configured to execute a vertex shader program on a programmable streaming multiprocessor ("SM") 5314. In at least one embodiment, pipeline manager 5302 is configured to route packets received from a work distribution unit to appropriate logical units within GPC 5300 and, in at least one embodiment, some packets may be routed to fixed function hardware units in PROP 5304 and/or raster engine 5308 while other packets may be routed to DPCs 5306 for processing by a primitive engine 5312 or SM 5314. In at least one embodiment, pipeline manager 5302 configures at least one of DPCs 5306 to implement a computing pipeline. In at least one embodiment, pipeline manager 5302 configures at least one of DPCs 5306 to execute at least a portion of a CUDA program.

In at least one embodiment, PROP unit 5304 is configured to route data generated by raster engine 5308 and DPCs 5306 to a Raster Operations ("ROP") unit in a partition unit, such as memory partition unit 5222 described in more detail above in conjunction with FIG. 52. In at least one embodiment, PROP unit 5304 is configured to perform optimizations for color blending, organize pixel data, perform address translations, and more. In at least one embodiment, raster engine 5308 includes, without limitation, a number of fixed function hardware units configured to perform various raster operations and, in at least one embodiment, raster engine 5308 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 5308 comprises fragments to be processed by any suitable entity such as by a fragment shader implemented within DPC 5306.

In at least one embodiment, each DPC 5306 included in GPC 5300 comprise, without limitation, an M-Pipe Controller ("MPC") 5310; primitive engine 5312; one or more SMs 5314; and any suitable combination thereof. In at least one embodiment, MPC 5310 controls operation of DPC 5306, routing packets received from pipeline manager 5302 to appropriate units in DPC 5306. In at least one embodiment, packets associated with a vertex are routed to primitive engine 5312, which is configured to fetch vertex attributes associated with vertex from memory; in contrast, packets associated with a shader program may be transmitted to SM 5314.

In at least one embodiment, SM 5314 comprises, without limitation, a programmable streaming processor that is configured to process tasks represented by a number of threads. In at least one embodiment, SM 5314 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 5314 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 5314 is described in more detail in conjunction with FIG. 54.

In at least one embodiment, MMU 5318 provides an interface between GPC 5300 and a memory partition unit (e.g., partition unit 5222 of FIG. 52) and MMU 5318 provides translation of virtual addresses into physical addresses, memory protection, and arbitration of memory requests. In at least one embodiment, MMU 5318 provides one or more translation lookaside buffers (TLBs) for performing translation of virtual addresses into physical addresses in memory.

In at least one embodiment, at least one component shown or described with respect to FIG. 53 is used to implement techniques and/or functions described in connection with FIGS. 1-35. In at least one embodiment, general processing cluster 5300 is used to perform an application programming interface to indicate two or more blocks of threads to be scheduled in parallel. In at least one embodiment, general processing cluster 5300 is used to perform an application programming interface to determine which of two or more blocks of threads to be scheduled in parallel. In at least one embodiment, general processing cluster 5300 is used to perform an application programming interface comprising one or more parameters to cause a scheduling policy of one or more blocks of one or more threads to be performed. In at least one embodiment, general processing cluster 5300 is used to perform an application programming interface comprising one or more parameters to indicate a scheduling policy of one or more blocks of one or more threads. In at least one embodiment, general processing cluster 5300 is used to perform an application programming interface to indicate a maximum number of blocks of threads capable of being scheduled in parallel. In at least one embodiment, general processing cluster 5300 is used to perform an application programming interface comprising one or more parameters to indicate one or more attributes of one or more groups of blocks of one or more threads. In at least one embodiment, general processing cluster 5300 is used to perform an application programming interface to indicate a maximum number of blocks of threads to be scheduled in parallel. In at least one embodiment, general processing cluster 5300 is used to perform an application programming interface to cause a kernel to be generated to cause two or more blocks of two or more threads to be scheduled in parallel. In at least one embodiment, general processing cluster 5300 is used to perform an application programming interface comprising one or more parameters to indicate one or more limitations of one or more attributes of one or more groups of blocks of one or more threads. In at least one embodiment, general processing cluster 5300 is used to perform an application programming interface to indicate whether one or more threads within two or more blocks of threads have performed a barrier instruction. In at least one embodiment, general processing cluster 5300 is used to perform an application programming interface to cause performance of one or more threads within a group of blocks of threads to stop at least until all threads within the group of blocks have performed a barrier instruction. In at least one embodiment, general processing cluster 5300 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, general processing cluster 5300 is used to perform an application programming interface to cause memory to be shared between two or more groups of blocks of threads.

In at least one embodiment, general processing cluster 5300 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 54:
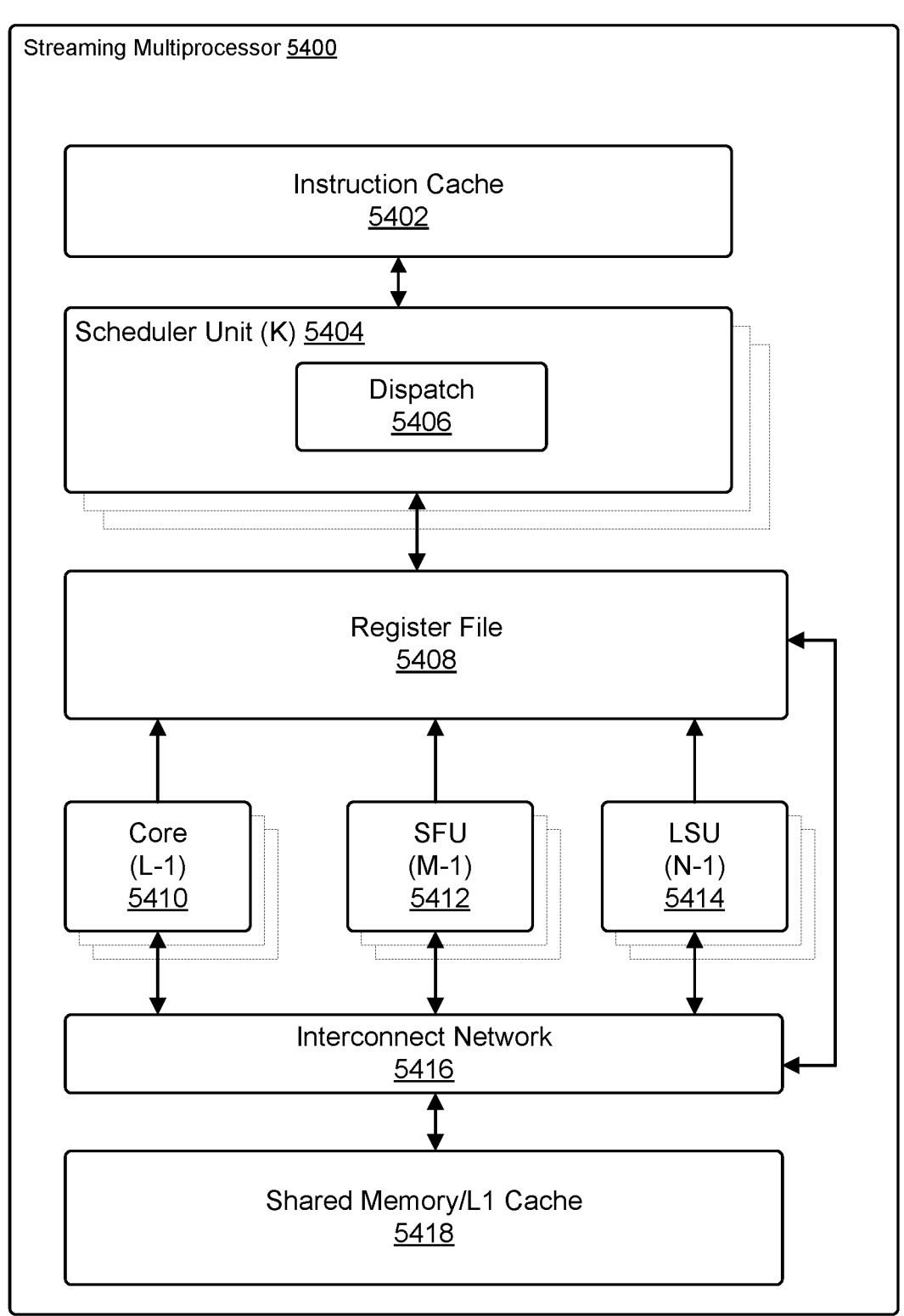
FIG. 54 illustrates a streaming multiprocessor, in accordance with at least one embodiment.

FIG. 54 illustrates a streaming multiprocessor ("SM") 5400, in accordance with at least one embodiment. In at least one embodiment, SM 5400 is SM 5314 of FIG. 53. In at least one embodiment, SM 5400 includes, without limitation, an instruction cache 5402; one or more scheduler units 5404; a register file 5408; one or more processing cores ("cores") 5410; one or more special function units ("SFUs") 5412; one or more LSUs 5414; an interconnect network 5416; a shared memory/L1 cache 5418; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 5400. In at least one embodiment, scheduler unit 5404 receives tasks from a work distribution unit and manages instruction scheduling for one or more thread blocks assigned to SM 5400. In at least one embodiment, scheduler unit 5404 schedules thread blocks for execution as warps of parallel threads, wherein each thread block is allocated at least one warp. In at least one embodiment, each warp executes threads. In at least one embodiment, scheduler unit 5404 manages a plurality of different thread blocks, allocating warps to different thread blocks and then dispatching instructions from a plurality of different cooperative groups to various functional units (e.g., processing cores 5410, SFUs 5412, and LSUs 5414) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collec-tive operations such as synchronization on threads in a cooperative group. In at least one embodiment, a sub-block granularity is as small as a single thread. In at least one embodiment, a programming model supports clean compo-sition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, oppor-tunistic parallelism, and global synchronization across an entire grid of thread blocks.

In at least one embodiment, a dispatch unit 5406 is configured to transmit instructions to one or more of func-tional units and scheduler unit 5404 includes, without limi-tation, two dispatch units 5406 that enable two different instructions from same warp to be dispatched during each clock cycle. In at least one embodiment, each scheduler unit 5404 includes a single dispatch unit 5406 or additional dispatch units 5406.

In at least one embodiment, each SM 5400, in at least one embodiment, includes, without limitation, register file 5408 that provides a set of registers for functional units of SM 5400. In at least one embodiment, register file 5408 is divided between each of the functional units such that each functional unit is allocated a dedicated portion of register file 5408. In at least one embodiment, register file 5408 is divided between different warps being executed by SM 5400 and register file 5408 provides temporary storage for oper-ands connected to data paths of functional units. In at least one embodiment, each SM 5400 comprises, without limita-tion, a plurality of L processing cores 5410. In at least one embodiment, SM 5400 includes, without limitation, a large number (e.g., 128 or more) of distinct processing cores 5410. In at least one embodiment, each processing core 5410 includes, without limitation, a fully-pipelined, single-preci-sion, double-precision, and/or mixed precision processing unit that includes, without limitation, a floating point arith-metic logic unit and an integer arithmetic logic unit. In at least one embodiment, floating point arithmetic logic units implement IEEE 754-2008 standard for floating point arith-metic. In at least one embodiment, processing cores 5410 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 5410. In at least one embodiment, tensor cores are configured to perform deep learning matrix arithmetic, such as convolu-tion operations for neural network training and inferencing. In at least one embodiment, each tensor core operates on a 4×4 matrix and performs a matrix multiply and accumulate operation D=A×B+C, where A, B, C, and D are 4×4 matri-ces.

In at least one embodiment, matrix multiply inputs A and B are 16-bit floating point matrices and accumulation matri-ces C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 5400 comprises, without limitation, M SFUs 5412 that perform special functions (e.g., attribute evaluation, reciprocal square root, and like). In at least one embodiment, SFUs 5412 include, without limitation, a tree traversal unit configured to traverse a hierarchical tree data structure. In at least one embodiment, SFUs 5412 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 5400. In at least one embodiment, texture maps are stored in shared memory/L1 cache 5418. In at least one embodiment, texture units implement texture operations such as filtering operations using mip-maps (e.g., texture maps of varying levels of detail). In at least one embodiment, each SM 5400 includes, without limitation, two texture units.

In at least one embodiment, each SM 5400 comprises, without limitation, N LSUs 5414 that implement load and store operations between shared memory/L1 cache 5418 and register file 5408. In at least one embodiment, each SM 5400 includes, without limitation, interconnect network 5416 that connects each of the functional units to register file 5408 and LSU 5414 to register file 5408 and shared memory/L1 cache 5418. In at least one embodiment, interconnect network 5416 is a crossbar that can be configured to connect any of the functional units to any of the registers in register file 5408 and connect LSUs 5414 to register file 5408 and memory locations in shared memory/L1 cache 5418.

In at least one embodiment, shared memory/L1 cache 5418 is an array of on-chip memory that allows for data storage and communication between SM 5400 and a primitive engine and between threads in SM 5400. In at least one embodiment, shared memory/L1 cache 5418 comprises, without limitation, 128 KB of storage capacity and is in a path from SM 5400 to a partition unit. In at least one embodiment, shared memory/L1 cache 5418 is used to cache reads and writes. In at least one embodiment, one or more of shared memory/L1 cache 5418, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 5418 enables shared memory/L1 cache 5418 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 5400 to execute a program and perform calculations, shared memory/L1 cache 5418 to communicate between threads, and LSU 5414 to read and write global memory through shared memory/L1 cache 5418 and a memory partition unit. In at least one embodiment, when configured for general purpose parallel computation, SM 5400 writes commands that scheduler unit 5404 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

In at least one embodiment, at least one component shown or described with respect to FIG. 54 is used to implement techniques and/or functions described in connection with FIGS. 1-35. In at least one embodiment, streaming multiprocessor 5400 is used to perform an application programming interface to indicate two or more blocks of threads to be scheduled in parallel. In at least one embodiment, streaming multiprocessor 5400 is used to perform an application programming interface to determine which of two or more blocks of threads to be scheduled in parallel. In at least one embodiment, streaming multiprocessor 5400 is used to perform an application programming interface comprising one or more parameters to cause a scheduling policy of one or more blocks of one or more threads to be performed. In at least one embodiment, streaming multiprocessor 5400 is used to perform an application programming interface comprising one or more parameters to indicate a scheduling policy of one or more blocks of one or more threads. In at least one embodiment, streaming multiprocessor 5400 is used to perform an application programming interface to indicate a maximum number of blocks of threads capable of being scheduled in parallel. In at least one embodiment, streaming multiprocessor 5400 is used to perform an application programming interface comprising one or more parameters to indicate one or more attributes of one or more groups of blocks of one or more threads. In at least one embodiment, streaming multiprocessor 5400 is used to perform an application programming interface to indicate a maximum number of blocks of threads to be scheduled in parallel. In at least one embodiment, streaming multiprocessor 5400 is used to perform an application programming interface to cause a kernel to be generated to cause two or more blocks of two or more threads to be scheduled in parallel. In at least one embodiment, streaming multiprocessor 5400 is used to perform an application programming interface comprising one or more parameters to indicate one or more limitations of one or more attributes of one or more groups of blocks of one or more threads. In at least one embodiment, streaming multiprocessor 5400 is used to perform an application programming interface to indicate whether one or more threads within two or more blocks of threads have performed a barrier instruction. In at least one embodiment, streaming multiprocessor 5400 is used to perform an application programming interface to cause performance of one or more threads within a group of blocks of threads to stop at least until all threads within the group of blocks have performed a barrier instruction. In at least one embodiment, streaming multiprocessor 5400 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, streaming multiprocessor 5400 is used to perform an application programming interface to cause memory to be shared between two or more groups of blocks of threads.

In at least one embodiment, streaming multiprocessor 5400 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Software Constructs for General-Purpose Computing

The following figures set forth, without limitation, exemplary software constructs for implementing at least one embodiment.

Figure 55:
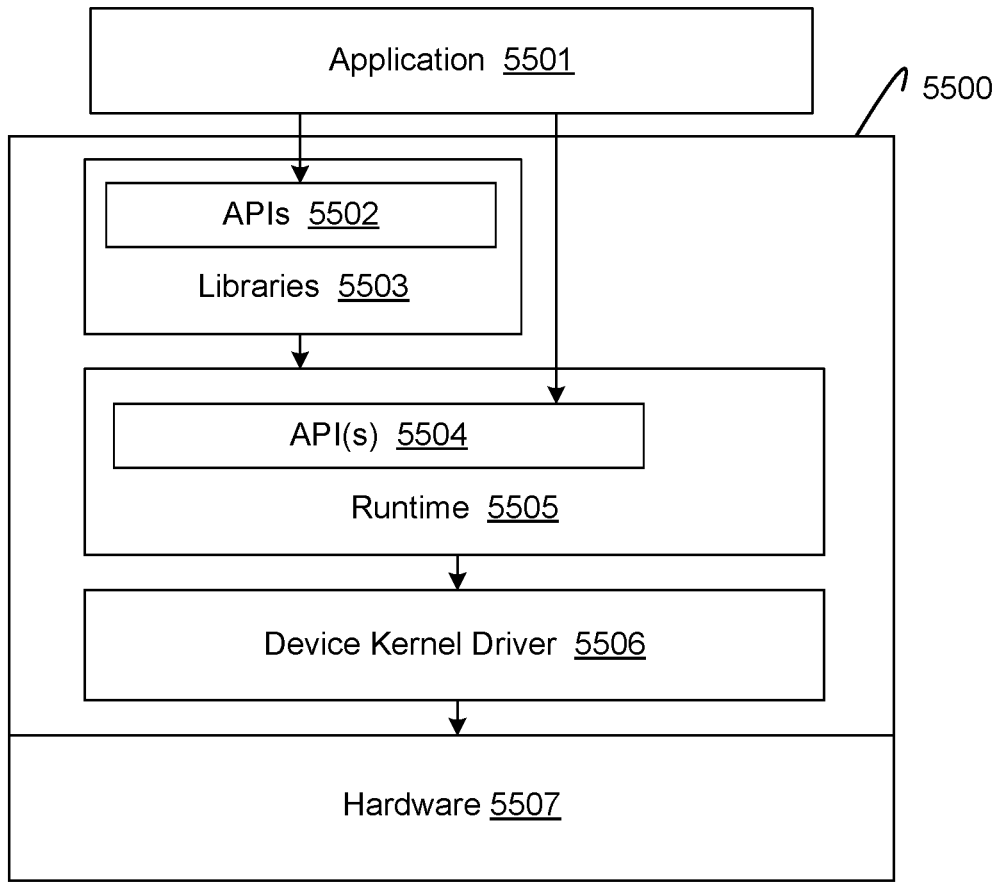
FIG. 55 illustrates a software stack of a programming platform, in accordance with at least one embodiment.

FIG. 55 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 5500 of a programming platform provides an execution environment for an application 5501. In at least one embodiment, application 5501 may include any computer software capable of being launched on software stack 5500. In at least one embodiment, application 5501 may include, but is not limited to, an artificial intelligence ("AI")/machine learning ("ML") application, a high performance computing ("HPC") application, a virtual desktop infrastructure ("VDI"), or a data center workload.

In at least one embodiment, application 5501 and software stack 5500 run on hardware 5507. Hardware 5507 may include one or more GPUs, CPUs, FPGAs, AI engines, and/or other types of compute devices that support a programming platform, in at least one embodiment. In at least one embodiment, such as with CUDA, software stack 5500 may be vendor specific and compatible with only devices from particular vendor(s). In at least one embodiment, such as in with OpenCL, software stack 5500 may be used with devices from different vendors. In at least one embodiment, hardware 5507 includes a host connected to one more devices that can be accessed to perform computational tasks via application programming interface ("API") calls. A device within hardware 5507 may include, but is not limited to, a GPU, FPGA, AI engine, or other compute device (but may also include a CPU) and its memory, as opposed to a host within hardware 5507 that may include, but is not limited to, a CPU (but may also include a compute device) and its memory, in at least one embodiment.

In at least one embodiment, software stack 5500 of a programming platform includes, without limitation, a number of libraries 5503, a runtime 5505, and a device kernel driver 5506. Each of libraries 5503 may include data and programming code that can be used by computer programs and leveraged during software development, in at least one embodiment. In at least one embodiment, libraries 5503 may include, but are not limited to, pre-written code and subroutines, classes, values, type specifications, configuration data, documentation, help data, and/or message templates. In at least one embodiment, libraries 5503 include functions that are optimized for execution on one or more types of devices. In at least one embodiment, libraries 5503 may include, but are not limited to, functions for performing mathematical, deep learning, and/or other types of operations on devices. In at least one embodiment, libraries 5503 are associated with corresponding APIs 5502, which may include one or more APIs, that expose functions implemented in libraries 5503.

In at least one embodiment, application 5501 is written as source code that is compiled into executable code, as discussed in greater detail below in conjunction with FIGS. 60-62. Executable code of application 5501 may run, at least in part, on an execution environment provided by software stack 5500, in at least one embodiment. In at least one embodiment, during execution of application 5501, code may be reached that needs to run on a device, as opposed to a host. In such a case, runtime 5505 may be called to load and launch requisite code on the device, in at least one embodiment. In at least one embodiment, runtime 5505 may include any technically feasible runtime system that is able to support execution of application S01.

In at least one embodiment, runtime 5505 is implemented as one or more runtime libraries associated with corresponding APIs, which are shown as API(s) 5504. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 5504 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 5506 is configured to facilitate communication with an underlying device. In at least one embodiment, device kernel driver 5506 may provide low-level functionalities upon which APIs, such as API(s) 5504, and/or other software relies. In at least one embodiment, device kernel driver 5506 may be configured to compile intermediate representation ("IR") code into binary code at runtime. For CUDA, device kernel driver 5506 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 5506 to compile IR code at runtime.

In at least one embodiment, at least one component shown or described with respect to FIG. 55 is used to implement techniques and/or functions described in connection with FIGS. 1-35. In at least one embodiment, at least one element of software stack 5500 of a programming platform is used to perform an application programming interface to indicate two or more blocks of threads to be scheduled in parallel. In at least one embodiment, at least one element of software stack 5500 of a programming platform is used to perform an application programming interface to determine which of two or more blocks of threads to be scheduled in parallel. In at least one embodiment, at least one element of software stack 5500 of a programming platform is used to perform an application programming interface comprising one or more parameters to cause a scheduling policy of one or more blocks of one or more threads to be performed. In at least one embodiment, at least one element of software stack 5500 of a programming platform is used to perform an application programming interface comprising one or more parameters to indicate a scheduling policy of one or more blocks of one or more threads. In at least one embodiment, at least one element of software stack 5500 of a programming platform is used to perform an application programming interface to indicate a maximum number of blocks of threads capable of being scheduled in parallel. In at least one embodiment, at least one element of software stack 5500 of a programming platform is used to perform an application programming interface comprising one or more parameters to indicate one or more attributes of one or more groups of blocks of one or more threads. In at least one embodiment, at least one element of software stack 5500 of a programming platform is used to perform an application programming interface to indicate a maximum number of blocks of threads to be scheduled in parallel. In at least one embodiment, at least one element of software stack 5500 of a programming platform is used to perform an application programming interface to cause a kernel to be generated to cause two or more blocks of two or more threads to be scheduled in parallel. In at least one embodiment, at least one element of software stack 5500 of a programming platform is used to perform an application programming interface comprising one or more parameters to indicate one or more limitations of one or more attributes of one or more groups of blocks of one or more threads. In at least one embodiment, at least one element of software stack 5500 of a programming platform is used to perform an application programming interface to indicate whether one or more threads within two or more blocks of threads have performed a barrier instruction. In at least one embodiment, at least one element of software stack 5500 of a programming platform is used to perform an application programming interface to cause performance of one or more threads within a group of blocks of threads to stop at least until all threads within the group of blocks have performed a barrier instruction. In at least one embodiment, at least one element of software stack 5500 of a programming platform is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one element of software stack 5500 of a programming platform is used to perform an application programming interface to cause memory to be shared between two or more groups of blocks of threads.

In at least one embodiment, at least one element of software stack 5500 of a programming platform is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 56:
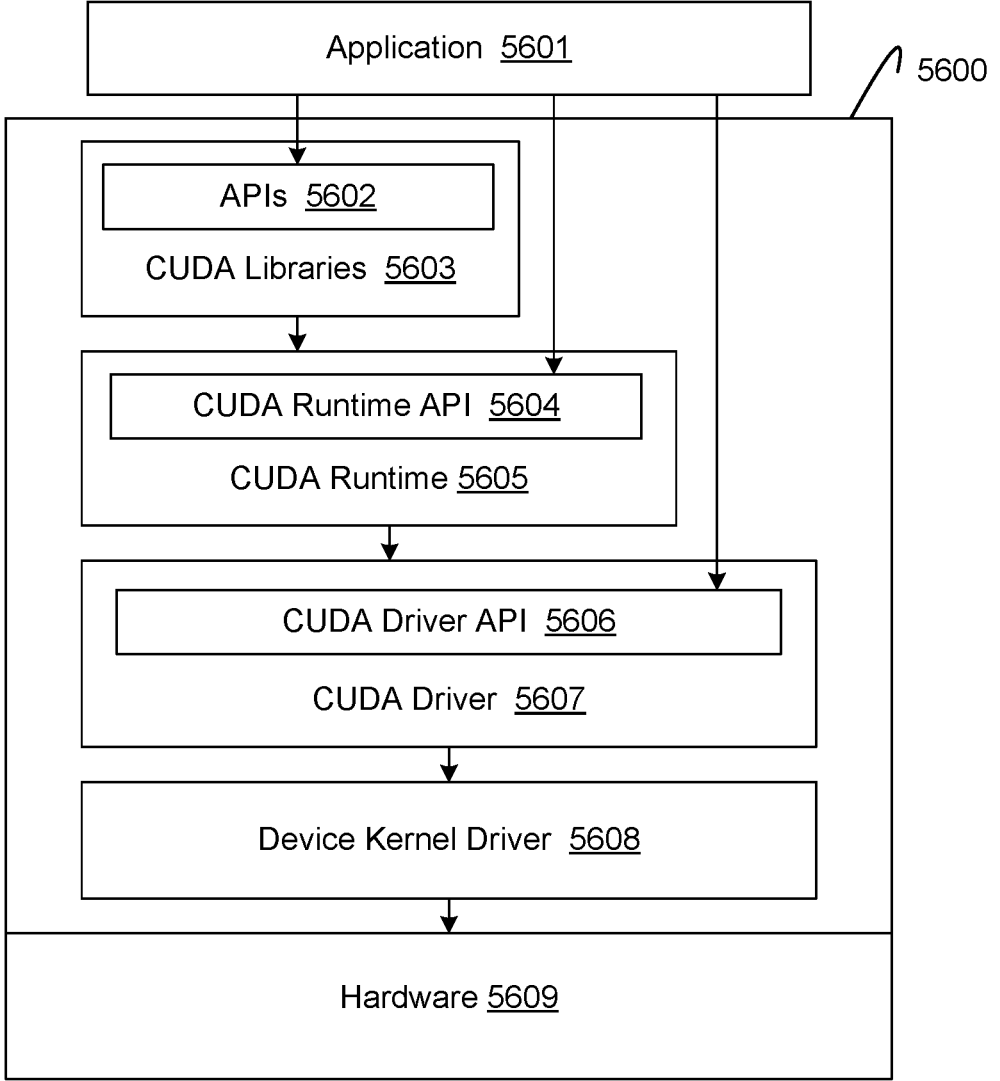
FIG. 56 illustrates a CUDA implementation of a software stack of FIG. 55, in accordance with at least one embodiment.

FIG. 56 illustrates a CUDA implementation of software stack 5500 of FIG. 55, in accordance with at least one embodiment. In at least one embodiment, a CUDA software stack 5600, on which an application 5601 may be launched, includes CUDA libraries 5603, a CUDA runtime 5605, a CUDA driver 5607, and a device kernel driver 5608. In at least one embodiment, CUDA software stack 5600 executes on hardware 5609, which may include a GPU that supports CUDA and is developed by NVIDIA Corporation of Santa Clara, CA.

In at least one embodiment, application 5601, CUDA runtime 5605, and device kernel driver 5608 may perform similar functionalities as application 5501, runtime 5505, and device kernel driver 5506, respectively, which are described above in conjunction with FIG. 55. In at least one embodiment, CUDA driver 5607 includes a library (libcuda.so) that implements a CUDA driver API 5606. Similar to a CUDA runtime API 5604 implemented by a CUDA runtime library (cudart), CUDA driver API 5606 may, without limitation, expose functions for memory management, execution control, device management, error handling, synchronization, and/or graphics interoperability, among other things, in at least one embodiment. In at least one embodiment, CUDA driver API 5606 differs from CUDA runtime API 5604 in that CUDA runtime API 5604 simplifies device code management by providing implicit initialization, context (analogous to a process) management, and module (analogous to dynamically loaded libraries) management. In contrast to high-level CUDA runtime API 5604, CUDA driver API 5606 is a low-level API providing more fine-grained control of the device, particularly with respect to contexts and module loading, in at least one embodiment. In at least one embodiment, CUDA driver API 5606 may expose functions for context management that are not exposed by CUDA runtime API 5604. In at least one embodiment, CUDA driver API 5606 is also language-independent and supports, e.g., OpenCL in addition to CUDA runtime API 5604. Further, in at least one embodiment, development libraries, including CUDA runtime 5605, may be considered as separate from driver components, including user-mode CUDA driver 5607 and kernel-mode device driver 5608 (also sometimes referred to as a "display" driver).

In at least one embodiment, CUDA libraries 5603 may include, but are not limited to, mathematical libraries, deep learning libraries, parallel algorithm libraries, and/or signal/image/video processing libraries, which parallel computing applications such as application 5601 may utilize. In at least one embodiment, CUDA libraries 5603 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 5603 may include deep learning libraries such as a cuDNN library of primitives for deep neural networks and a TensorRT platform for high-performance deep learning inference, among others.

In at least one embodiment, at least one component shown or described with respect to FIG. 56 is used to implement techniques and/or functions described in connection with FIGS. 1-35. In at least one embodiment, at least one element of CUDA software stack 5600 is used to perform an application programming interface to indicate two or more blocks of threads to be scheduled in parallel. In at least one embodiment, at least one element of CUDA software stack 5600 is used to perform an application programming interface to determine which of two or more blocks of threads to be scheduled in parallel. In at least one embodiment, at least one element of CUDA software stack 5600 is used to perform an application programming interface comprising one or more parameters to cause a scheduling policy of one or more blocks of one or more threads to be performed. In at least one embodiment, at least one element of CUDA software stack 5600 is used to perform an application programming interface comprising one or more parameters to indicate a scheduling policy of one or more blocks of one or more threads. In at least one embodiment, at least one element of CUDA software stack 5600 is used to perform an application programming interface to indicate a maximum number of blocks of threads capable of being scheduled in parallel. In at least one embodiment, at least one element of CUDA software stack 5600 is used to perform an application programming interface comprising one or more parameters to indicate one or more attributes of one or more groups of blocks of one or more threads. In at least one embodiment, at least one element of CUDA software stack 5600 is used to perform an application programming interface to indicate a maximum number of blocks of threads to be scheduled in parallel. In at least one embodiment, at least one element of CUDA software stack 5600 is used to perform an application programming interface to cause a kernel to be generated to cause two or more blocks of two or more threads to be scheduled in parallel. In at least one embodiment, at least one element of CUDA software stack 5600 is used to perform an application programming interface comprising one or more parameters to indicate one or more limitations of one or more attributes of one or more groups of blocks of one or more threads. In at least one embodiment, at least one element of CUDA software stack 5600 is used to perform an application programming interface to indicate whether one or more threads within two or more blocks of threads have performed a barrier instruction. In at least one embodiment, at least one element of CUDA software stack 5600 is used to perform an application programming interface to cause performance of one or more threads within a group of blocks of threads to stop at least until all threads within the group of blocks have performed a barrier instruction. In at least one embodiment, at least one element of CUDA software stack 5600 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one element of CUDA software stack 5600 is used to perform an application programming interface to cause memory to be shared between two or more groups of blocks of threads.

In at least one embodiment, at least one element of CUDA software stack 5600 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 57:
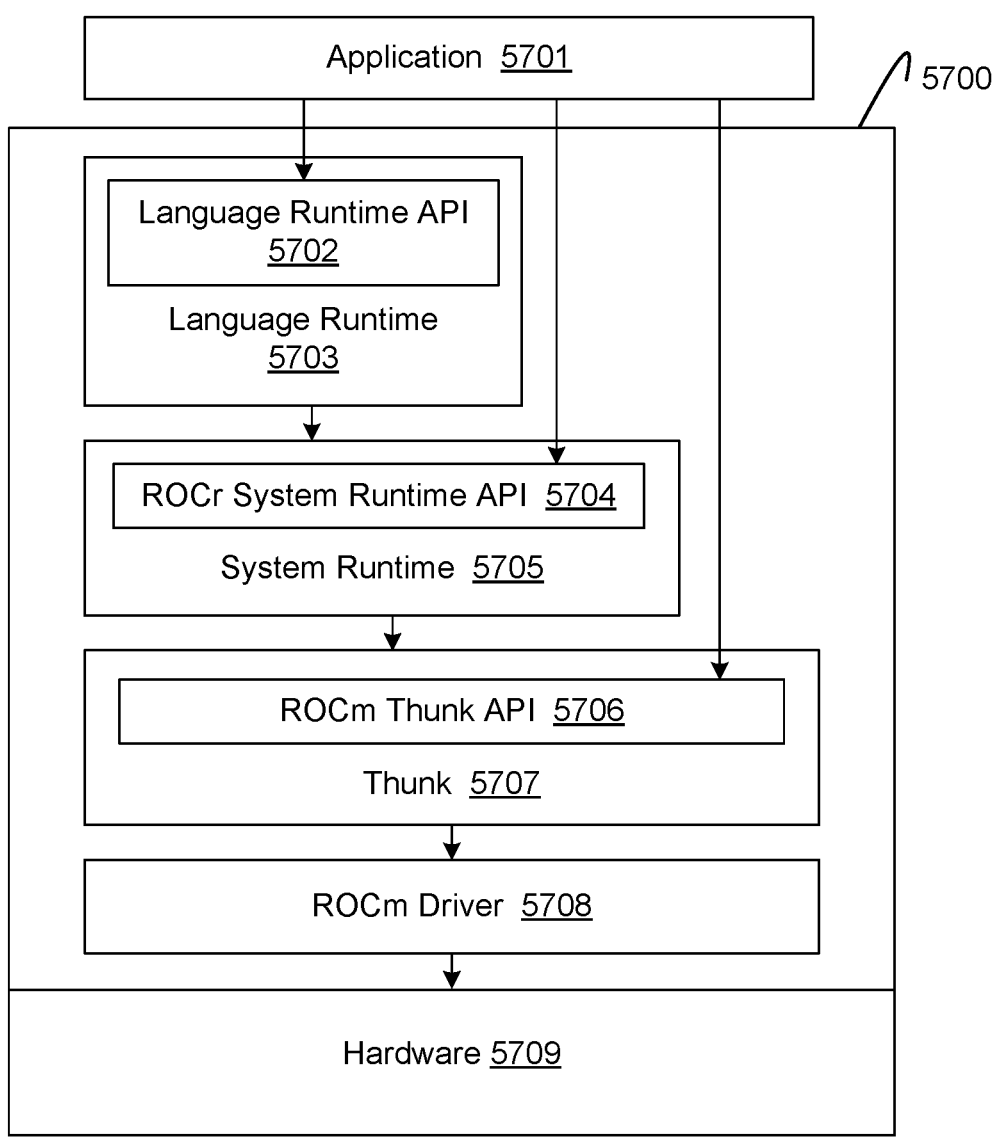
FIG. 57 illustrates a ROCm implementation of a software stack of FIG. 55, in accordance with at least one embodiment.

FIG. 57 illustrates a ROCm implementation of software stack 5500 of FIG. 55, in accordance with at least one embodiment. In at least one embodiment, a ROCm software stack 5700, on which an application 5701 may be launched, includes a language runtime 5703, a system runtime 5705, a thunk 5707, and a ROCm kernel driver 5708. In at least one embodiment, ROCm software stack 5700 executes on hardware 5709, which may include a GPU that supports ROCm and is developed by AMD Corporation of Santa Clara, CA.

In at least one embodiment, application 5701 may perform similar functionalities as application 5501 discussed above in conjunction with FIG. 55. In addition, language runtime 5703 and system runtime 5705 may perform similar functionalities as runtime 5505 discussed above in conjunction with FIG. 55, in at least one embodiment. In at least one embodiment, language runtime 5703 and system runtime 5705 differ in that system runtime 5705 is a language-independent runtime that implements a ROCr system runtime API 5704 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 5705, language runtime 5703 is an implementation of a language-specific runtime API 5702 layered on top of ROCr system runtime API 5704, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 5604 discussed above in conjunction with FIG. 56, such as functions for memory management, execution control, device management, error handling, and synchronization, among other things.

In at least one embodiment, thunk (ROCt) 5707 is an interface 5706 that can be used to interact with underlying ROCm driver 5708. In at least one embodiment, ROCm driver 5708 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 5506 discussed above in conjunction with FIG. 55. In at least one embodiment, HSA kernel driver is a driver permitting different types of processors to share system resources more effectively via hardware features.

In at least one embodiment, various libraries (not shown) may be included in ROCm software stack 5700 above language runtime 5703 and provide functionality similarity to CUDA libraries 5603, discussed above in conjunction with FIG. 56. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, at least one component shown or described with respect to FIG. 57 is used to implement techniques and/or functions described in connection with FIGS. 1-35. In at least one embodiment, at least one element of ROCm software stack 5700 is used to perform an application programming interface to indicate two or more blocks of threads to be scheduled in parallel. In at least one embodiment, at least one element of ROCm software stack 5700 is used to perform an application programming interface to determine which of two or more blocks of threads to be scheduled in parallel. In at least one embodiment, at least one element of ROCm software stack 5700 is used to perform an application programming interface comprising one or more parameters to cause a scheduling policy of one or more blocks of one or more threads to be performed. In at least one embodiment, at least one element of ROCm software stack 5700 is used to perform an application programming interface comprising one or more parameters to indicate a scheduling policy of one or more blocks of one or more threads. In at least one embodiment, at least one element of ROCm software stack 5700 is used to perform an application programming interface to indicate a maximum number of blocks of threads capable of being scheduled in parallel. In at least one embodiment, at least one element of ROCm software stack 5700 is used to perform an application programming interface comprising one or more parameters to indicate one or more attributes of one or more groups of blocks of one or more threads. In at least one embodiment, at least one element of ROCm software stack 5700 is used to perform an application programming interface to indicate a maximum number of blocks of threads to be scheduled in parallel. In at least one embodiment, at least one element of ROCm software stack 5700 is used to perform an application programming interface to cause a kernel to be generated to cause two or more blocks of two or more threads to be scheduled in parallel. In at least one embodiment, at least one element of ROCm software stack 5700 is used to perform an application programming interface comprising one or more parameters to indicate one or more limitations of one or more attributes of one or more groups of blocks of one or more threads. In at least one embodiment, at least one element of ROCm software stack 5700 is used to perform an application programming interface to indicate whether one or more threads within two or more blocks of threads have performed a barrier instruction. In at least one embodiment, at least one element of ROCm software stack 5700 is used to perform an application programming interface to cause performance of one or more threads within a group of blocks of threads to stop at least until all threads within the group of blocks have performed a barrier instruction. In at least one embodiment, at least one element of ROCm software stack 5700 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one element of ROCm software stack 5700 is used to perform an application programming interface to cause memory to be shared between two or more groups of blocks of threads.

In at least one embodiment, at least one element of ROCm software stack 5700 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 58:
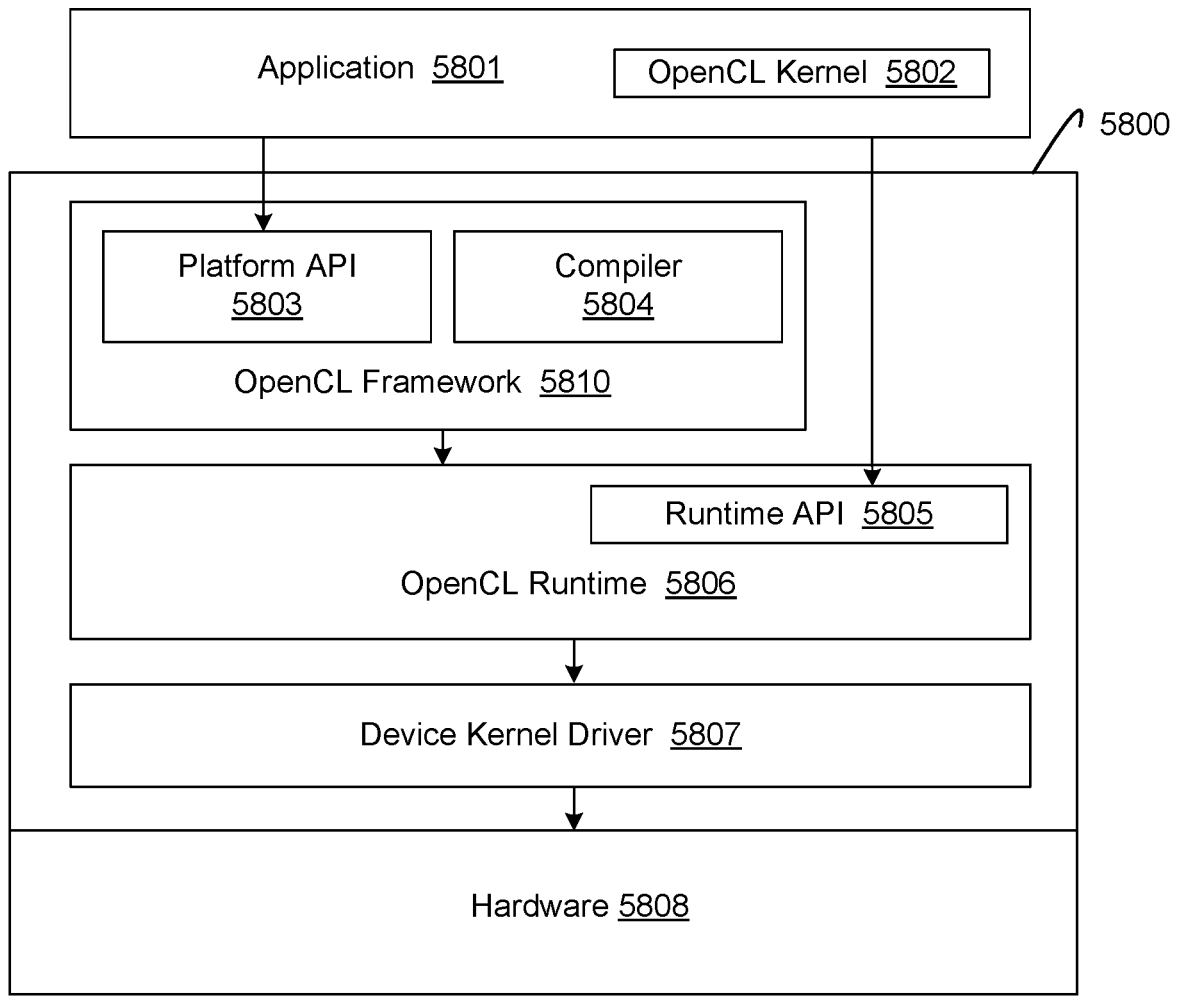
FIG. 58 illustrates an OpenCL implementation of a software stack of FIG. 55, in accordance with at least one embodiment.

FIG. 58 illustrates an OpenCL implementation of software stack 5500 of FIG. 55, in accordance with at least one embodiment. In at least one embodiment, an OpenCL software stack 5800, on which an application 5801 may be launched, includes an OpenCL framework 5810, an OpenCL runtime 5806, and a driver 5807. In at least one embodiment, OpenCL software stack 5800 executes on hardware 5609 that is not vendor-specific. As OpenCL is supported by devices developed by different vendors, specific OpenCL drivers may be required to interoperate with hardware from such vendors, in at least one embodiment.

In at least one embodiment, application 5801, OpenCL runtime 5806, device kernel driver 5807, and hardware 5808 may perform similar functionalities as application 5501, runtime 5505, device kernel driver 5506, and hardware 5507, respectively, that are discussed above in conjunction with FIG. 55. In at least one embodiment, application 5801 further includes an OpenCL kernel 5802 with code that is to be executed on a device.

In at least one embodiment, OpenCL defines a "platform" that allows a host to control devices connected to the host. In at least one embodiment, an OpenCL framework provides a platform layer API and a runtime API, shown as platform API 5803 and runtime API 5805. In at least one embodiment, runtime API 5805 uses contexts to manage execution of kernels on devices. In at least one embodiment, each identified device may be associated with a respective context, which runtime API 5805 may use to manage command queues, program objects, and kernel objects, share memory objects, among other things, for that device. In at least one embodiment, platform API 5803 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 5804 is also included in OpenCL frame-work 5810. Source code may be compiled offline prior to executing an application or online during execution of an application, in at least one embodiment. In contrast to CUDA and ROCm, OpenCL applications in at least one embodiment may be compiled online by compiler 5804, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

In at least one embodiment, at least one component shown or described with respect to FIG. 58 is used to implement techniques and/or functions described in connection with FIGS. 1-35. In at least one embodiment, at least one element of OpenCL software stack 5800 is used to perform an application programming interface to indicate two or more blocks of threads to be scheduled in parallel. In at least one embodiment, at least one element of OpenCL software stack 5800 is used to perform an application programming interface to determine which of two or more blocks of threads to be scheduled in parallel. In at least one embodiment, at least one element of OpenCL software stack 5800 is used to perform an application programming interface comprising one or more parameters to cause a scheduling policy of one or more blocks of one or more threads to be performed. In at least one embodiment, at least one element of OpenCL software stack 5800 is used to perform an application programming interface comprising one or more parameters to indicate a scheduling policy of one or more blocks of one or more threads. In at least one embodiment, at least one element of OpenCL software stack 5800 is used to perform an application programming interface to indicate a maximum number of blocks of threads capable of being scheduled in parallel. In at least one embodiment, at least one element of OpenCL software stack 5800 is used to perform an application programming interface comprising one or more parameters to indicate one or more attributes of one or more groups of blocks of one or more threads. In at least one embodiment, at least one element of OpenCL software stack 5800 is used to perform an application programming interface to indicate a maximum number of blocks of threads to be scheduled in parallel. In at least one embodiment, at least one element of OpenCL software stack 5800 is used to perform an application programming interface to cause a kernel to be generated to cause two or more blocks of two or more threads to be scheduled in parallel. In at least one embodiment, at least one element of OpenCL software stack 5800 is used to perform an application programming interface comprising one or more parameters to indicate one or more limitations of one or more attributes of one or more groups of blocks of one or more threads. In at least one embodiment, at least one element of OpenCL software stack 5800 is used to perform an application programming interface to indicate whether one or more threads within two or more blocks of threads have performed a barrier instruction. In at least one embodiment, at least one element of OpenCL software stack 5800 is used to perform an application programming interface to cause performance of one or more threads within a group of blocks of threads to stop at least until all threads within the group of blocks have performed a barrier instruction. In at least one embodiment, at least one element of OpenCL software stack 5800 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one element of OpenCL software stack 5800 is used to perform an application programming interface to cause memory to be shared between two or more groups of blocks of threads.

In at least one embodiment, at least one element of OpenCL software stack 5800 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 59:
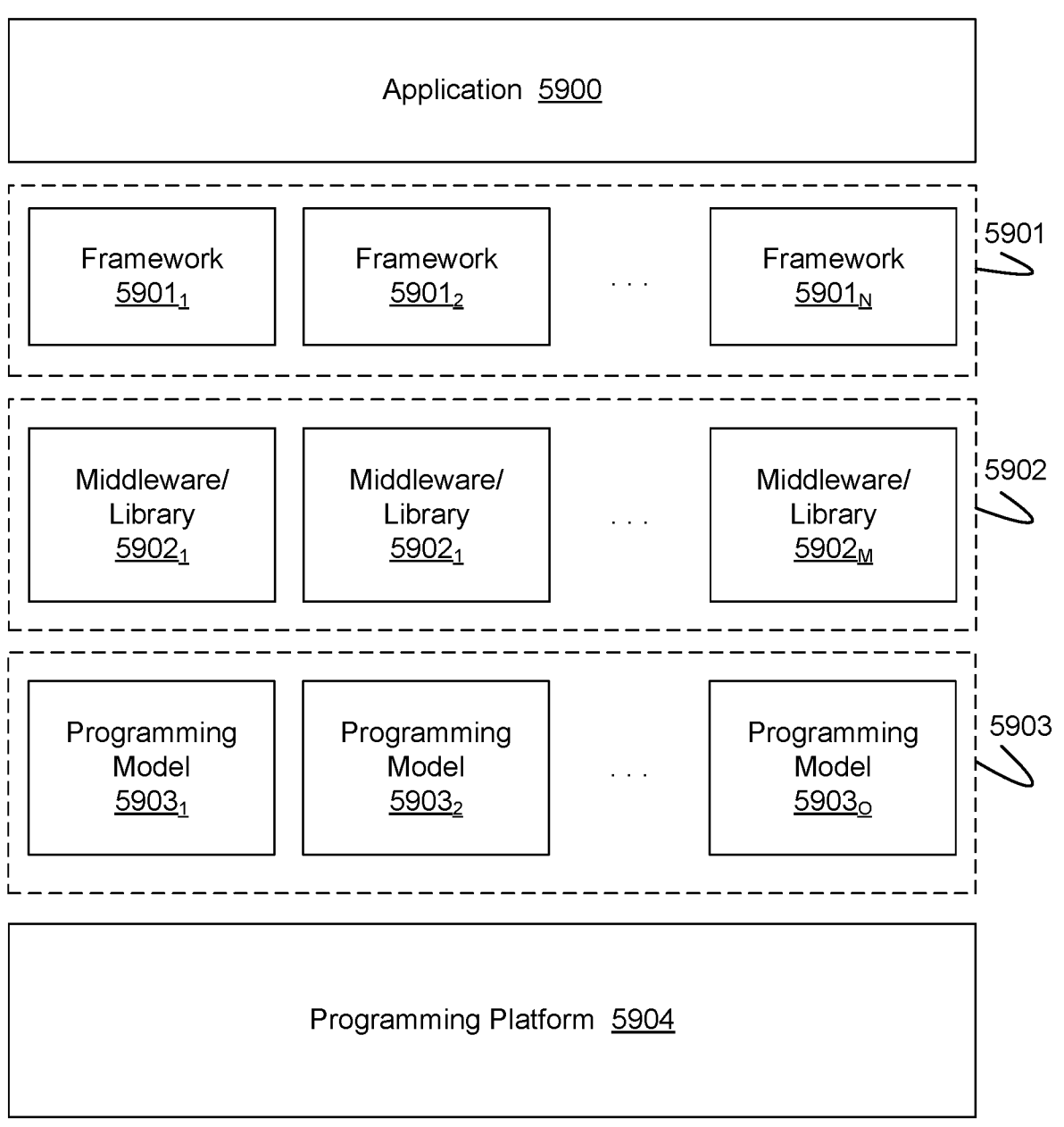
FIG. 59 illustrates software that is supported by a programming platform, in accordance with at least one embodiment.

FIG. 59 illustrates software that is supported by a programming platform, in accordance with at least one embodiment. In at least one embodiment, a programming platform 5904 is configured to support various programming models 5903, middlewares and/or libraries 5902, and frameworks 5901 that an application 5900 may rely upon. In at least one embodiment, application 5900 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 5904 may be one of a CUDA, ROCm, or OpenCL platform described above in conjunction with FIG. 56, FIG. 57, and FIG. 58, respectively. In at least one embodiment, programming platform 5904 supports multiple programming models 5903, which are abstractions of an underlying computing system permitting expressions of algorithms and data structures. Programming models 5903 may expose features of underlying hardware in order to improve performance, in at least one embodiment. In at least one embodiment, programming models 5903 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 5902 provide implementations of abstractions of programming models 5904. In at least one embodiment, such libraries include data and programming code that may be used by computer programs and leveraged during software development. In at least one embodiment, such middlewares include software that provides services to applications beyond those available from programming platform 5904. In at least one embodiment, libraries and/or middlewares 5902 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 5902 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 5901 depend on libraries and/or middlewares 5902. In at least one embodiment, each of application frameworks 5901 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

In at least one embodiment, at least one component shown or described with respect to FIG. 59 is used to implement techniques and/or functions described in connection with FIGS. 1-35. In at least one embodiment, application 5900 is used to perform an application programming interface to indicate two or more blocks of threads to be scheduled in parallel. In at least one embodiment, application 5900 is used to perform an application programming interface to determine which of two or more blocks of threads to be scheduled in parallel. In at least one embodiment, application 5900 is used to perform an application programming interface comprising one or more parameters to cause a scheduling policy of one or more blocks of one or more threads to be performed. In at least one embodiment, application 5900 is used to perform an application programming interface comprising one or more parameters to indicate a scheduling policy of one or more blocks of one or more threads. In at least one embodiment, application 5900 is used to perform an application programming interface to indicate a maximum number of blocks of threads capable of being scheduled in parallel. In at least one embodiment, application 5900 is used to perform an application programming interface comprising one or more parameters to indicate one or more attributes of one or more groups of blocks of one or more threads. In at least one embodiment, application 5900 is used to perform an application programming interface to indicate a maximum number of blocks of threads to be scheduled in parallel. In at least one embodiment, application 5900 is used to perform an application programming interface to cause a kernel to be generated to cause two or more blocks of two or more threads to be scheduled in parallel. In at least one embodiment, application 5900 is used to perform an application programming interface comprising one or more parameters to indicate one or more limitations of one or more attributes of one or more groups of blocks of one or more threads. In at least one embodiment, application 5900 is used to perform an application programming interface to indicate whether one or more threads within two or more blocks of threads have performed a barrier instruction. In at least one embodiment, application 5900 is used to perform an application programming interface to cause performance of one or more threads within a group of blocks of threads to stop at least until all threads within the group of blocks have performed a barrier instruction. In at least one embodiment, application 5900 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, application 5900 is used to perform an application programming interface to cause memory to be shared between two or more groups of blocks of threads.

In at least one embodiment, application 5900 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 60:
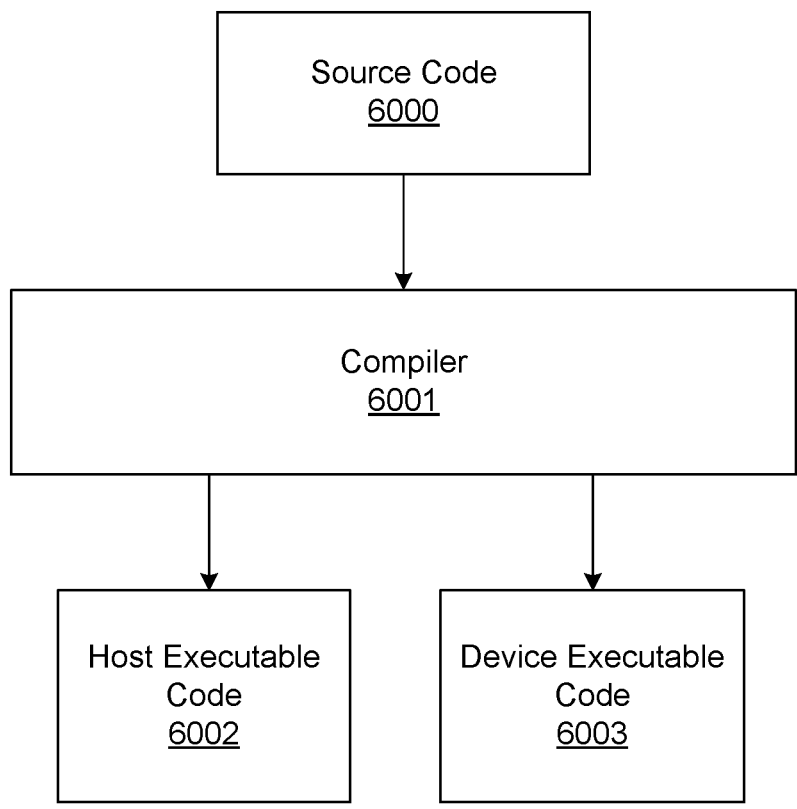
FIG. 60 illustrates compiling code to execute on programming platforms of FIGS. 55-58, in accordance with at least one embodiment.

FIG. 60 illustrates compiling code to execute on one of programming platforms of FIGS. 55-58, in accordance with at least one embodiment. In at least one embodiment, a compiler 6001 receives source code 6000 that includes both host code as well as device code. In at least one embodiment, complier 6001 is configured to convert source code 6000 into host executable code 6002 for execution on a host and device executable code 6003 for execution on a device. In at least one embodiment, source code 6000 may either be compiled offline prior to execution of an application, or online during execution of an application.

In at least one embodiment, source code 6000 may include code in any programming language supported by compiler 6001, such as C++, C, Fortran, etc. In at least one embodiment, source code 6000 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 6000 may include multiple source code files, rather than a single-source file, into which host code and device code are separated.

In at least one embodiment, compiler 6001 is configured to compile source code 6000 into host executable code 6002 for execution on a host and device executable code 6003 for execution on a device. In at least one embodiment, compiler 6001 performs operations including parsing source code 6000 into an abstract system tree (AST), performing optimizations, and generating executable code. In at least one embodiment in which source code 6000 includes a single-source file, compiler 6001 may separate device code from host code in such a single-source file, compile device code and host code into device executable code 6003 and host executable code 6002, respectively, and link device executable code 6003 and host executable code 6002 together in a single file, as discussed in greater detail below with respect to FIG. 61.

In at least one embodiment, host executable code 6002 and device executable code 6003 may be in any suitable format, such as binary code and/or IR code. In the case of CUDA, host executable code 6002 may include native object code and device executable code 6003 may include code in PTX intermediate representation, in at least one embodiment. In the case of ROCm, both host executable code 6002 and device executable code 6003 may include target binary code, in at least one embodiment.

In at least one embodiment, at least one component shown or described with respect to FIG. 60 is used to implement techniques and/or functions described in connection with FIGS. 1-35. In at least one embodiment, at least one of host executable code 6002 or device executable code 6003 specified in source code 6000 is used to perform an application programming interface to indicate two or more blocks of threads to be scheduled in parallel. In at least one embodiment, at least one of host executable code 6002 or device executable code 6003 specified in source code 6000 is used to perform an application programming interface to determine which of two or more blocks of threads to be scheduled in parallel. In at least one embodiment, at least one of host executable code 6002 or device executable code 6003 specified in source code 6000 is used to perform an application programming interface comprising one or more parameters to cause a scheduling policy of one or more blocks of one or more threads to be performed. In at least one embodiment, at least one of host executable code 6002 or device executable code 6003 specified in source code 6000 is used to perform an application programming interface comprising one or more parameters to indicate a scheduling policy of one or more blocks of one or more threads. In at least one embodiment, at least one of host executable code 6002 or device executable code 6003 specified in source code 6000 is used to perform an application programming interface to indicate a maximum number of blocks of threads capable of being scheduled in parallel. In at least one embodiment, at least one of host executable code 6002 or device executable code 6003 specified in source code 6000 is used to perform an application programming interface comprising one or more parameters to indicate one or more attributes of one or more groups of blocks of one or more threads. In at least one embodiment, at least one of host executable code 6002 or device executable code 6003 specified in source code 6000 is used to perform an application programming interface to indicate a maximum number of blocks of threads to be scheduled in parallel. In at least one embodiment, at least one of host executable code 6002 or device executable code 6003 specified in source code 6000 is used to perform an application programming interface to cause a kernel to be generated to cause two or more blocks of two or more threads to be scheduled in parallel. In at least one embodiment, at least one of host executable code 6002 or device executable code 6003 specified in source code 6000 is used to perform an application programming interface comprising one or more parameters to indicate one or more limitations of one or more attributes of one or more groups of blocks of one or more threads. In at least one embodiment, at least one of host executable code 6002 or device executable code 6003 specified in source code 6000 is used to perform an application programming interface to indicate whether one or more threads within two or more blocks of threads have performed a barrier instruction. In at least one embodiment, at least one of host executable code 6002 or device executable code 6003 specified in source code 6000 is used to perform an application programming interface to cause performance of one or more threads within a group of blocks of threads to stop at least until all threads within the group of blocks of threads have performed a barrier instruction. In at least one embodiment, at least one of host executable code 6002 or device executable code 6003 specified in source code 6000 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one of host executable code 6002 or device executable code 6003 specified in source code 6000 is used to perform an application programming interface to cause memory to be shared between two or more groups of blocks of threads.

In at least one embodiment, at least one of host executable code 6002 or device executable code 6003 specified in source code 6000 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 61:
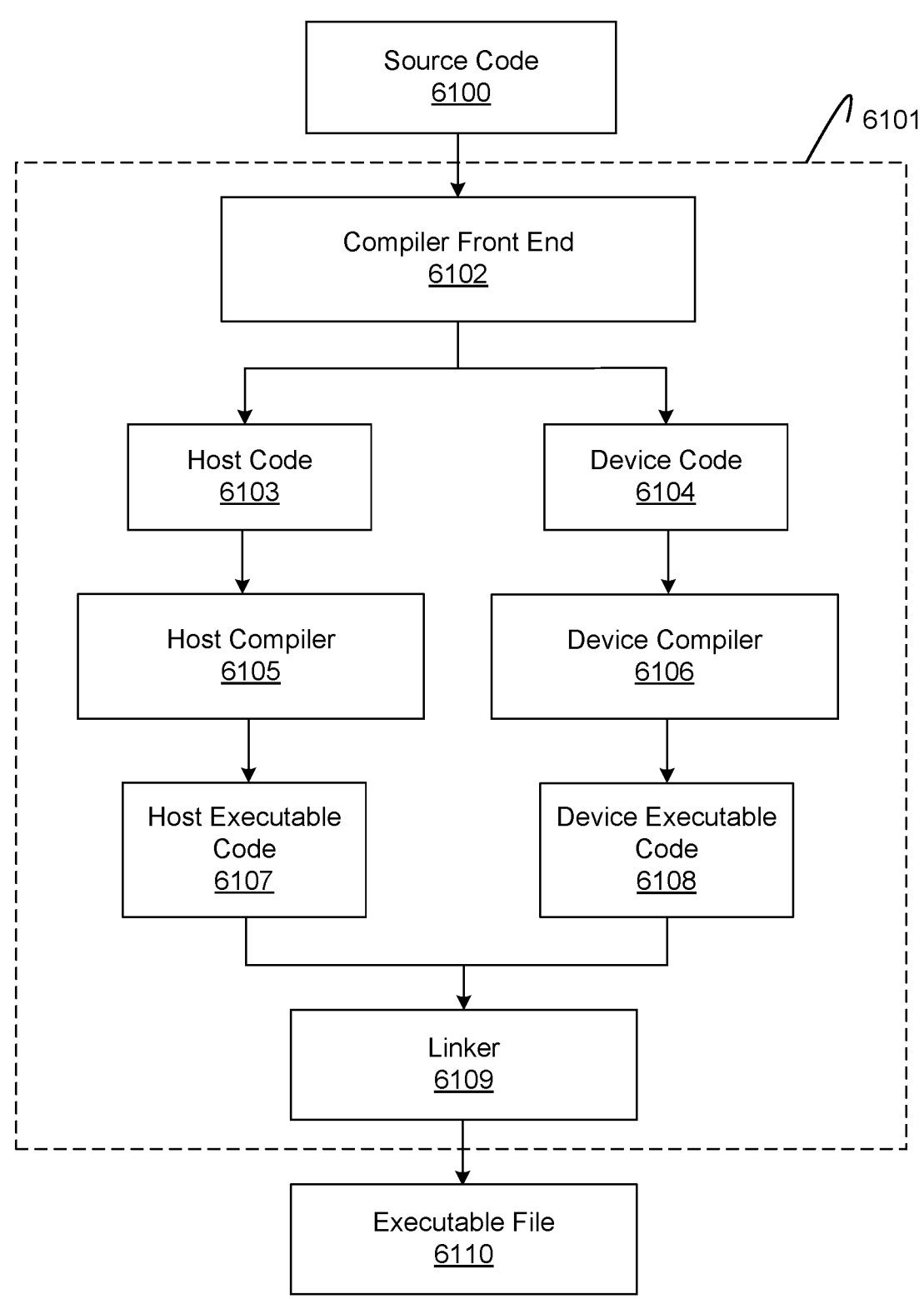
FIG. 61 illustrates in greater detail compiling code to execute on programming platforms of FIGS. 55-58, in accordance with at least one embodiment.

FIG. 61 is a more detailed illustration of compiling code to execute on one of programming platforms of FIGS. 55-58, in accordance with at least one embodiment. In at least one embodiment, a compiler 6101 is configured to receive source code 6100, compile source code 6100, and output an executable file 6110. In at least one embodiment, source code 6100 is a single-source file, such as a .cu file, a .hip.cpp file, or a file in another format, that includes both host and device code. In at least one embodiment, compiler 6101 may be, but is not limited to, an NVIDIA CUDA compiler ("NVCC") for compiling CUDA code in .cu files, or a HCC compiler for compiling HIP code in .hip.cpp files.

In at least one embodiment, compiler 6101 includes a compiler front end 6102, a host compiler 6105, a device compiler 6106, and a linker 6109. In at least one embodiment, compiler front end 6102 is configured to separate device code 6104 from host code 6103 in source code 6100. Device code 6104 is compiled by device compiler 6106 into device executable code 6108, which as described may include binary code or IR code, in at least one embodiment. Separately, host code 6103 is compiled by host compiler 6105 into host executable code 6107, in at least one embodiment. For NVCC, host compiler 6105 may be, but is not limited to, a general purpose C/C++ compiler that outputs native object code, while device compiler 6106 may be, but is not limited to, a Low Level Virtual Machine ("LLVM")-based compiler that forks a LLVM compiler infrastructure and outputs PTX code or binary code, in at least one embodiment. For HCC, both host compiler 6105 and device compiler 6106 may be, but are not limited to, LLVM-based compilers that output target binary code, in at least one embodiment.

Subsequent to compiling source code 6100 into host executable code 6107 and device executable code 6108, linker 6109 links host and device executable code 6107 and 6108 together in executable file 6110, in at least one embodiment. In at least one embodiment, native object code for a host and PTX or binary code for a device may be linked together in an Executable and Linkable Format ("ELF") file, which is a container format used to store object code.

In at least one embodiment, at least one component shown or described with respect to FIG. 61 is used to implement techniques and/or functions described in connection with FIGS. 1-35. In at least one embodiment, executable file 6110 implemented using source code 6100 is used to perform an application programming interface to indicate two or more blocks of threads to be scheduled in parallel. In at least one embodiment, executable file 6110 implemented using source code 6100 is used to perform an application programming interface to determine which of two or more blocks of threads to be scheduled in parallel. In at least one embodiment, executable file 6110 implemented using source code 6100 is used to perform an application programming interface comprising one or more parameters to cause a scheduling policy of one or more blocks of one or more threads to be performed. In at least one embodiment, executable file 6110 implemented using source code 6100 is used to perform an application programming interface comprising one or more parameters to indicate a scheduling policy of one or more blocks of one or more threads. In at least one embodiment, executable file 6110 implemented using source code 6100 is used to perform an application programming interface to indicate a maximum number of blocks of threads capable of being scheduled in parallel. In at least one embodiment, executable file 6110 implemented using source code 6100 is used to perform an application programming interface comprising one or more parameters to indicate one or more attributes of one or more groups of blocks of one or more threads. In at least one embodiment, executable file 6110 implemented using source code 6100 is used to perform an application programming interface to indicate a maximum number of blocks of threads to be scheduled in parallel. In at least one embodiment, executable file 6110 implemented using source code 6100 is used to perform an application programming interface to cause a kernel to be generated to cause two or more blocks of two or more threads to be scheduled in parallel. In at least one embodiment, executable file 6110 implemented using source code 6100 is used to perform an application programming interface comprising one or more parameters to indicate one or more limitations of one or more attributes of one or more groups of blocks of one or more threads. In at least one embodiment, executable file 6110 implemented using source code 6100 is used to perform an application programming interface to indicate whether one or more threads within two or more blocks of threads have performed a barrier instruction. In at least one embodiment, executable file 6110 implemented using source code 6100 is used to perform an application programming interface to cause performance of one or more threads within a group of blocks of threads to stop at least until all threads within the group of blocks have performed a barrier instruction. In at least one embodiment, executable file 6110 implemented using source code 6100 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, executable file 6110 implemented using source code 6100 is used to perform an application programming interface to cause memory to be shared between two or more groups of blocks of threads.

In at least one embodiment, executable file 6110 implemented using source code 6100 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 62:
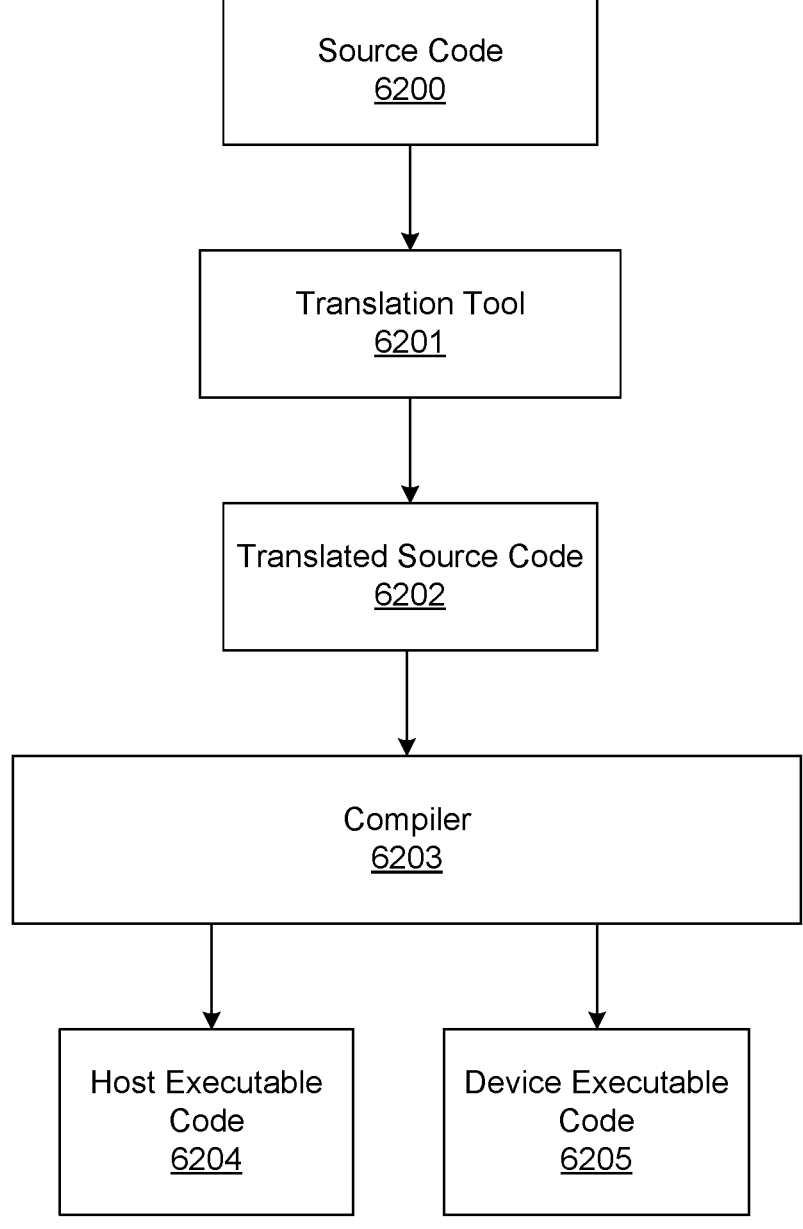
FIG. 62 illustrates translating source code prior to compiling source code, in accordance with at least one embodiment.

FIG. 62 illustrates translating source code prior to compiling source code, in accordance with at least one embodiment. In at least one embodiment, source code 6200 is passed through a translation tool 6201, which translates source code 6200 into translated source code 6202. In at least one embodiment, a compiler 6203 is used to compile translated source code 6202 into host executable code 6204 and device executable code 6205 in a process that is similar to compilation of source code 6000 by compiler 6001 into host executable code 6002 and device executable code 6003, as discussed above in conjunction with FIG. 60.

In at least one embodiment, a translation performed by translation tool 6201 is used to port source 6200 for execution in a different environment than that in which it was originally intended to run. In at least one embodiment, translation tool 6201 may include, but is not limited to, a HIP translator that is used to "hipify" CUDA code intended for a CUDA platform into HIP code that can be compiled and executed on a ROCm platform. In at least one embodiment, translation of source code 6200 may include parsing source code 6200 and converting calls to API(s) provided by one programming model (e.g., CUDA) into corresponding calls to API(s) provided by another programming model (e.g., HIP), as discussed in greater detail below in conjunction with FIGS. 63A-64. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 6201 may sometimes be incomplete, requiring additional, manual effort to fully port source code 6200.

In at least one embodiment, at least one component shown or described with respect to FIG. 62 is used to implement techniques and/or functions described in connection with FIGS. 1-35. In at least one embodiment, at least one of host executable code 6204 or device executable code 6205 specified in source code 6200 is used to perform an application programming interface to indicate two or more blocks of threads to be scheduled in parallel. In at least one embodiment, at least one of host executable code 6204 or device executable code 6205 specified in source code 6200 is used to perform an application programming interface to determine which of two or more blocks of threads to be scheduled in parallel. In at least one embodiment, at least one of host executable code 6204 or device executable code 6205 specified in source code 6200 is used to perform an application programming interface comprising one or more parameters to cause a scheduling policy of one or more blocks of one or more threads to be performed. In at least one embodiment, at least one of host executable code 6204 or device executable code 6205 specified in source code 6200 is used to perform an application programming interface comprising one or more parameters to indicate a scheduling policy of one or more blocks of one or more threads. In at least one embodiment, at least one of host executable code 6204 or device executable code 6205 specified in source code 6200 is used to perform an application programming interface to indicate a maximum number of blocks of threads capable of being scheduled in parallel. In at least one embodiment, at least one of host executable code 6204 or device executable code 6205 specified in source code 6200 is used to perform an application programming interface comprising one or more parameters to indicate one or more attributes of one or more groups of blocks of one or more threads. In at least one embodiment, at least one of host executable code 6204 or device executable code 6205 specified in source code 6200 is used to perform an application programming interface to indicate a maximum number of blocks of threads to be scheduled in parallel. In at least one embodiment, at least one of host executable code 6204 or device executable code 6205 specified in source code 6200 is used to perform an application programming interface to cause a kernel to be generated to cause two or more blocks of two or more threads to be scheduled in parallel. In at least one embodiment, at least one of host executable code 6204 or device executable code 6205 specified in source code 6200 is used to perform an application programming interface comprising one or more parameters to indicate one or more limitations of one or more attributes of one or more groups of blocks of one or more threads. In at least one embodiment, at least one of host executable code 6204 or device executable code 6205 specified in source code 6200 is used to perform an application programming interface to indicate whether one or more threads within two or more blocks of threads have performed a barrier instruction. In at least one embodiment, at least one of host executable code 6204 or device executable code 6205 specified in source code 6200 is used to perform an application programming interface to cause performance of one or more threads within a group of blocks of threads to stop at least until all threads within the group of blocks have performed a barrier instruction. In at least one embodiment, at least one of host executable code 6204 or device executable code 6205 specified in source code 6200 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one of host executable code 6204 or device executable code 6205 specified in source code 6200 is used to perform an application programming interface to cause memory to be shared between two or more groups of blocks of threads.

In at least one embodiment, at least one of host executable code 6204 or device executable code 6205 specified in source code 6200 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Configuring GPUs for General-Purpose Computing

The following figures set forth, without limitation, exemplary architectures for compiling and executing compute source code, in accordance with at least one embodiment.

Figure 63A:
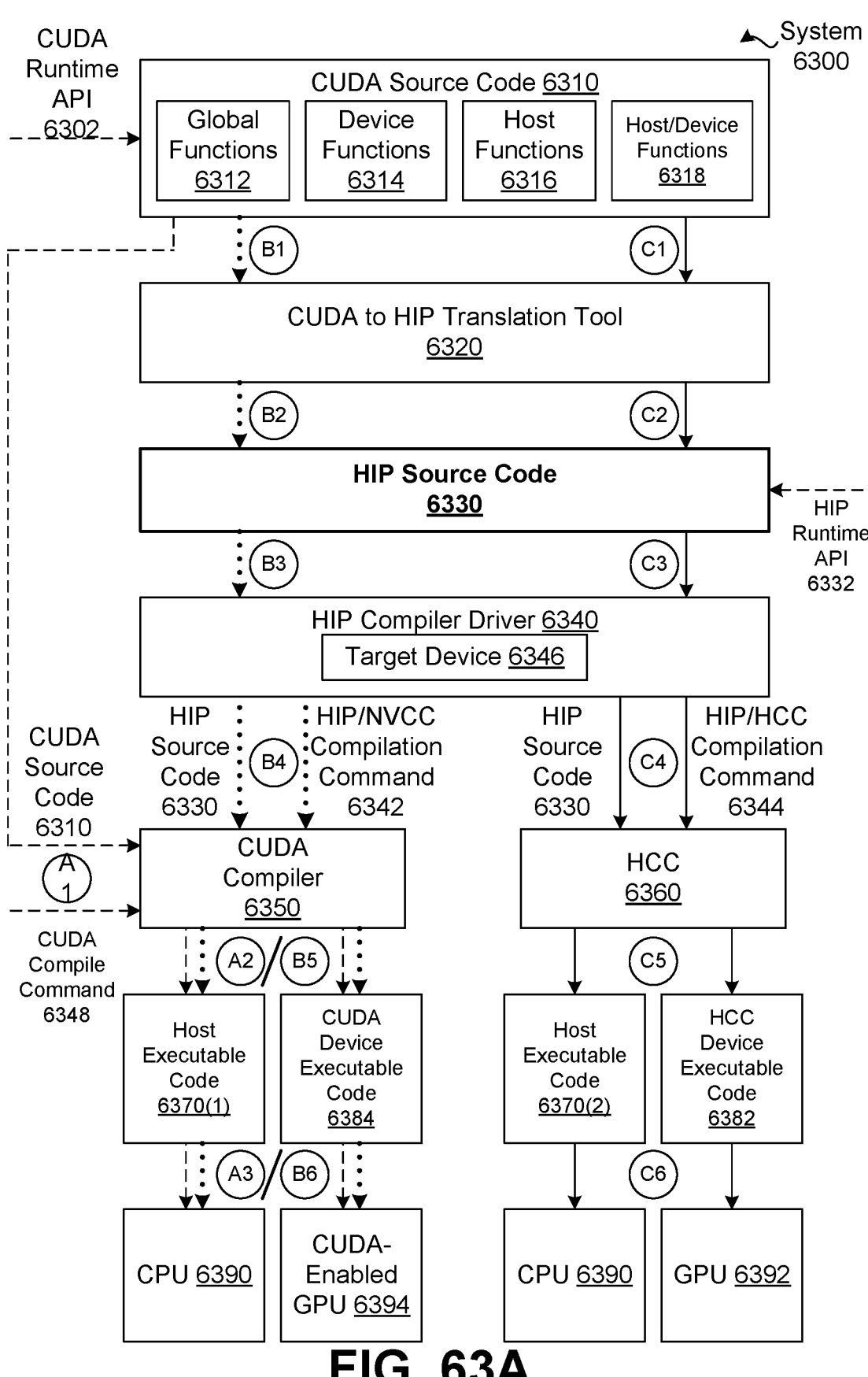
FIG. 63A illustrates a system configured to compile and execute CUDA source code using different types of processing units, in accordance with at least one embodiment.

FIG. 63A illustrates a system 63A00 configured to compile and execute CUDA source code 6310 using different types of processing units, in accordance with at least one embodiment. In at least one embodiment, system 63A00 includes, without limitation, CUDA source code 6310, a CUDA compiler 6350, host executable code 6370(1), host executable code 6370(2), CUDA device executable code 6384, a CPU 6390, a CUDA-enabled GPU 6394, a GPU 6392, a CUDA to HIP translation tool 6320, HIP source code 6330, a HIP compiler driver 6340, an HCC 6360, and HCC device executable code 6382.

In at least one embodiment, CUDA source code 6310 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 6390, GPU 63192, or another GPGPU, etc. In at least one embodiment, host code is source code that, after compilation, is executable on a host. In at least one embodiment, a host is a processor that is optimized for sequential instruction processing, such as CPU 6390.

In at least one embodiment, CUDA source code 6310 includes, without limitation, any number (including zero) of global functions 6312, any number (including zero) of device functions 6314, any number (including zero) of host functions 6316, and any number (including zero) of host/device functions 6318. In at least one embodiment, global functions 6312, device functions 6314, host functions 6316, and host/device functions 6318 may be mixed in CUDA source code 6310. In at least one embodiment, each of global functions 6312 is executable on a device and callable from a host. In at least one embodiment, one or more of global functions 6312 may therefore act as entry points to a device. In at least one embodiment, each of global functions 6312 is a kernel. In at least one embodiment and in a technique known as dynamic parallelism, one or more of global functions 6312 defines a kernel that is executable on a device and callable from such a device. In at least one embodiment, a kernel is executed N (where N is any positive integer) times in parallel by N different threads on a device during execution.

In at least one embodiment, each of device functions 6314 is executed on a device and callable from such a device only. In at least one embodiment, each of host functions 6316 is executed on a host and callable from such a host only. In at least one embodiment, each of host/device functions 6316 defines both a host version of a function that is executable on a host and callable from such a host only and a device version of the function that is executable on a device and callable from such a device only.

In at least one embodiment, CUDA source code 6310 may also include, without limitation, any number of calls to any number of functions that are defined via a CUDA runtime API 6302. In at least one embodiment, CUDA runtime API 6302 may include, without limitation, any number of functions that execute on a host to allocate and deallocate device memory, transfer data between host memory and device memory, manage systems with multiple devices, etc. In at least one embodiment, CUDA source code 6310 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 6302, a CUDA driver API, APIs for any number of CUDA libraries, etc. In at least one embodiment and relative to CUDA runtime API 6302, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 6350 compiles input CUDA code (e.g., CUDA source code 6310) to generate host executable code 6370(1) and CUDA device executable code 6384. In at least one embodiment, CUDA compiler 6350 is NVCC. In at least one embodiment, host executable code 6370(1) is a compiled version of host code included in input source code that is executable on CPU 6390. In at least one embodiment, CPU 6390 may be any processor that is optimized for sequential instruction processing.

In at least one embodiment, CUDA device executable code 6384 is a compiled version of device code included in input source code that is executable on CUDA-enabled GPU 6394. In at least one embodiment, CUDA device executable code 6384 includes, without limitation, binary code. In at least one embodiment, CUDA device executable code 6384 includes, without limitation, IR code, such as PTX code, that is further compiled at runtime into binary code for a specific target device (e.g., CUDA-enabled GPU 6394) by a device driver. In at least one embodiment, CUDA-enabled GPU 6394 may be any processor that is optimized for parallel instruction processing and that supports CUDA. In at least one embodiment, CUDA-enabled GPU 6394 is developed by NVIDIA Corporation of Santa Clara, CA.

In at least one embodiment, CUDA to HIP translation tool 6320 is configured to translate CUDA source code 6310 to functionally similar HIP source code 6330. In a least one embodiment, HIP source code 6330 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 6312, but such a HIP programming language may lack support for dynamic parallelism and therefore global functions 6312 defined in HIP code may be callable from a host only.

In at least one embodiment, HIP source code 6330 includes, without limitation, any number (including zero) of global functions 6312, any number (including zero) of device functions 6314, any number (including zero) of host functions 6316, and any number (including zero) of host/device functions 6318. In at least one embodiment, HIP source code 6330 may also include any number of calls to any number of functions that are specified in a HIP runtime API 6332. In at least one embodiment, HIP runtime API 6332 includes, without limitation, functionally similar versions of a subset of functions included in CUDA runtime API 6302. In at least one embodiment, HIP source code 6330 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 6332, a HIP driver API, APIs for any number of HIP libraries, APIs for any number of ROCm libraries, etc.

In at least one embodiment, CUDA to HIP translation tool 6320 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 6320 converts any number of calls to functions specified in CUDA runtime API 6302 to any number of calls to functions specified in HIP runtime API 6332.

In at least one embodiment, CUDA to HIP translation tool 6320 is a tool known as hipify-perl that executes a text-based translation process. In at least one embodiment, CUDA to HIP translation tool 6320 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 6320.

In at least one embodiment, HIP compiler driver 6340 is a front end that determines a target device 6346 and then configures a compiler that is compatible with target device 6346 to compile HIP source code 6330. In at least one embodiment, target device 6346 is a processor that is optimized for parallel instruction processing. In at least one embodiment, HIP compiler driver 6340 may determine target device 6346 in any technically feasible fashion.

In at least one embodiment, if target device 6346 is compatible with CUDA (e.g., CUDA-enabled GPU 6394), then HIP compiler driver 6340 generates a HIP/NVCC compilation command 6342. In at least one embodiment and as described in greater detail in conjunction with FIG. 63B, HIP/NVCC compilation command 6342 configures CUDA compiler 6350 to compile HIP source code 6330 using, without limitation, a HIP to CUDA translation header and a CUDA runtime library. In at least one embodiment and in response to HIP/NVCC compilation command 6342, CUDA compiler 6350 generates host executable code 6370(1) and CUDA device executable code 6384.

In at least one embodiment, if target device 6346 is not compatible with CUDA, then HIP compiler driver 6340 generates a HIP/HCC compilation command 6344. In at least one embodiment and as described in greater detail in conjunction with FIG. 63C, HIP/HCC compilation command 6344 configures HCC 6360 to compile HIP source code 6330 using, without limitation, an HCC header and a HIP/HCC runtime library. In at least one embodiment and in response to HIP/HCC compilation command 6344, HCC 6360 generates host executable code 6370(2) and HCC device executable code 6382. In at least one embodiment, HCC device executable code 6382 is a compiled version of device code included in HIP source code 6330 that is executable on GPU 6392. In at least one embodiment, GPU 6392 may be any processor that is optimized for parallel instruction processing, is not compatible with CUDA, and is compatible with HCC. In at least one embodiment, GPU 6392 is developed by AMD Corporation of Santa Clara, CA. In at least one embodiment GPU, 6392 is a non-CUDA-enabled GPU 6392.

For explanatory purposes only, three different flows that may be implemented in at least one embodiment to compile CUDA source code 6310 for execution on CPU 6390 and different devices are depicted in FIG. 63A. In at least one embodiment, a direct CUDA flow compiles CUDA source code 6310 for execution on CPU 6390 and CUDA-enabled GPU 6394 without translating CUDA source code 6310 to HIP source code 6330. In at least one embodiment, an indirect CUDA flow translates CUDA source code 6310 to HIP source code 6330 and then compiles HIP source code 6330 for execution on CPU 6390 and CUDA-enabled GPU 6394. In at least one embodiment, a CUDA/HCC flow translates CUDA source code 6310 to HIP source code 6330 and then compiles HIP source code 6330 for execution on CPU 6390 and GPU 6392.

A direct CUDA flow that may be implemented in at least one embodiment is depicted via dashed lines and a series of bubbles annotated A1-A3. In at least one embodiment and as depicted with bubble annotated A1, CUDA compiler 6350 receives CUDA source code 6310 and a CUDA compile command 6348 that configures CUDA compiler 6350 to compile CUDA source code 6310. In at least one embodiment, CUDA source code 6310 used in a direct CUDA flow is written in a CUDA programming language that is based on a programming language other than C++ (e.g., C, Fortran, Python, Java, etc.). In at least one embodiment and in response to CUDA compile command 6348, CUDA compiler 6350 generates host executable code 6370(1) and CUDA device executable code 6384 (depicted with bubble annotated A2). In at least one embodiment and as depicted with bubble annotated A3, host executable code 6370(1) and CUDA device executable code 6384 may be executed on, respectively, CPU 6390 and CUDA-enabled GPU 6394. In at least one embodiment, CUDA device executable code 6384 includes, without limitation, binary code. In at least one embodiment, CUDA device executable code 6384 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 6320 receives CUDA source code 6310. In at least one embodiment and as depicted with bubble annotated B2, CUDA to HIP translation tool 6320 translates CUDA source code 6310 to HIP source code 6330. In at least one embodiment and as depicted with bubble annotated B3, HIP compiler driver 6340 receives HIP source code 6330 and determines that target device 6346 is CUDA-enabled.

In at least one embodiment and as depicted with bubble annotated B4, HIP compiler driver 6340 generates HIP/NVCC compilation command 6342 and transmits both HIP/NVCC compilation command 6342 and HIP source code 6330 to CUDA compiler 6350. In at least one embodiment and as described in greater detail in conjunction with FIG. 63B, HIP/NVCC compilation command 6342 configures CUDA compiler 6350 to compile HIP source code 6330 using, without limitation, a HIP to CUDA translation header and a CUDA runtime library. In at least one embodiment and in response to HIP/NVCC compilation command 6342, CUDA compiler 6350 generates host executable code 6370(1) and CUDA device executable code 6384 (depicted with bubble annotated B5). In at least one embodiment and as depicted with bubble annotated B6, host executable code 6370(1) and CUDA device executable code 6384 may be executed on, respectively, CPU 6390 and CUDA-enabled GPU 6394. In at least one embodiment, CUDA device executable code 6384 includes, without limitation, binary code. In at least one embodiment, CUDA device executable code 6384 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 6320 receives CUDA source code 6310. In at least one embodiment and as depicted with bubble annotated C2, CUDA to HIP translation tool 6320 translates CUDA source code 6310 to HIP source code 6330. In at least one embodiment and as depicted with bubble annotated C3, HIP compiler driver 6340 receives HIP source code 6330 and determines that target device 6346 is not CUDA-enabled.

In at least one embodiment, HIP compiler driver 6340 generates HIP/HCC compilation command 6344 and transmits both HIP/HCC compilation command 6344 and HIP source code 6330 to HCC 6360 (depicted with bubble annotated C4). In at least one embodiment and as described in greater detail in conjunction with FIG. 63C, HIP/HCC compilation command 6344 configures HCC 6360 to compile HIP source code 6330 using, without limitation, an HCC header and a HIP/HCC runtime library. In at least one embodiment and in response to HIP/HCC compilation command 6344, HCC 6360 generates host executable code 6370(2) and HCC device executable code 6382 (depicted with bubble annotated C5). In at least one embodiment and as depicted with bubble annotated C6, host executable code 6370(2) and HCC device executable code 6382 may be executed on, respectively, CPU 6390 and GPU 6392.

In at least one embodiment, after CUDA source code 6310 is translated to HIP source code 6330, HIP compiler driver 6340 may subsequently be used to generate executable code for either CUDA-enabled GPU 6394 or GPU 6392 without re-executing CUDA to HIP translation tool 6320. In at least one embodiment, CUDA to HIP translation tool 6320 translates CUDA source code 6310 to HIP source code 6330 that is then stored in memory. In at least one embodiment, HIP compiler driver 6340 then configures HCC 6360 to generate host executable code 6370(2) and HCC device executable code 6382 based on HIP source code 6330. In at least one embodiment, HIP compiler driver 6340 subsequently configures CUDA compiler 6350 to generate host executable code 6370(1) and CUDA device executable code 6384 based on stored HIP source code 6330.

In at least one embodiment, at least one component shown or described with respect to FIG. 63A is used to implement techniques and/or functions described in connection with FIGS. 1-35. In at least one embodiment, at least one element of system 6300 is used to perform an application programming interface to indicate two or more blocks of threads to be scheduled in parallel. In at least one embodiment, at least one element of system 6300 is used to perform an application programming interface to determine which of two or more blocks of threads to be scheduled in parallel. In at least one embodiment, at least one element of system 6300 is used to perform an application programming interface comprising one or more parameters to cause a scheduling policy of one or more blocks of one or more threads to be performed. In at least one embodiment, at least one element of system 6300 is used to perform an application programming interface comprising one or more parameters to indicate a scheduling policy of one or more blocks of one or more threads. In at least one embodiment, at least one element of system 6300 is used to perform an application programming interface to indicate a maximum number of blocks of threads capable of being scheduled in parallel. In at least one embodiment, at least one element of system 6300 is used to perform an application programming interface comprising one or more parameters to indicate one or more attributes of one or more groups of blocks of one or more threads. In at least one embodiment, at least one element of system 6300 is used to perform an application programming interface to indicate a maximum number of blocks of threads to be scheduled in parallel. In at least one embodiment, at least one element of system 6300 is used to perform an application programming interface to cause a kernel to be generated to cause two or more blocks of two or more threads to be scheduled in parallel. In at least one embodiment, at least one element of system 6300 is used to perform an application programming interface comprising one or more parameters to indicate one or more limitations of one or more attributes of one or more groups of blocks of one or more threads. In at least one embodiment, at least one element of system 6300 is used to perform an application programming interface to indicate whether one or more threads within two or more blocks of threads have performed a barrier instruction. In at least one embodiment, at least one element of system 6300 is used to perform an application programming interface to cause performance of one or more threads within a group of blocks of threads to stop at least until all threads within the group of blocks have performed a barrier instruction. In at least one embodiment, at least one element of system 6300 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one element of system 6300 is used to perform an application programming interface to cause memory to be shared between two or more groups of blocks of threads.

In at least one embodiment, at least one element of system 6300 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 63B:
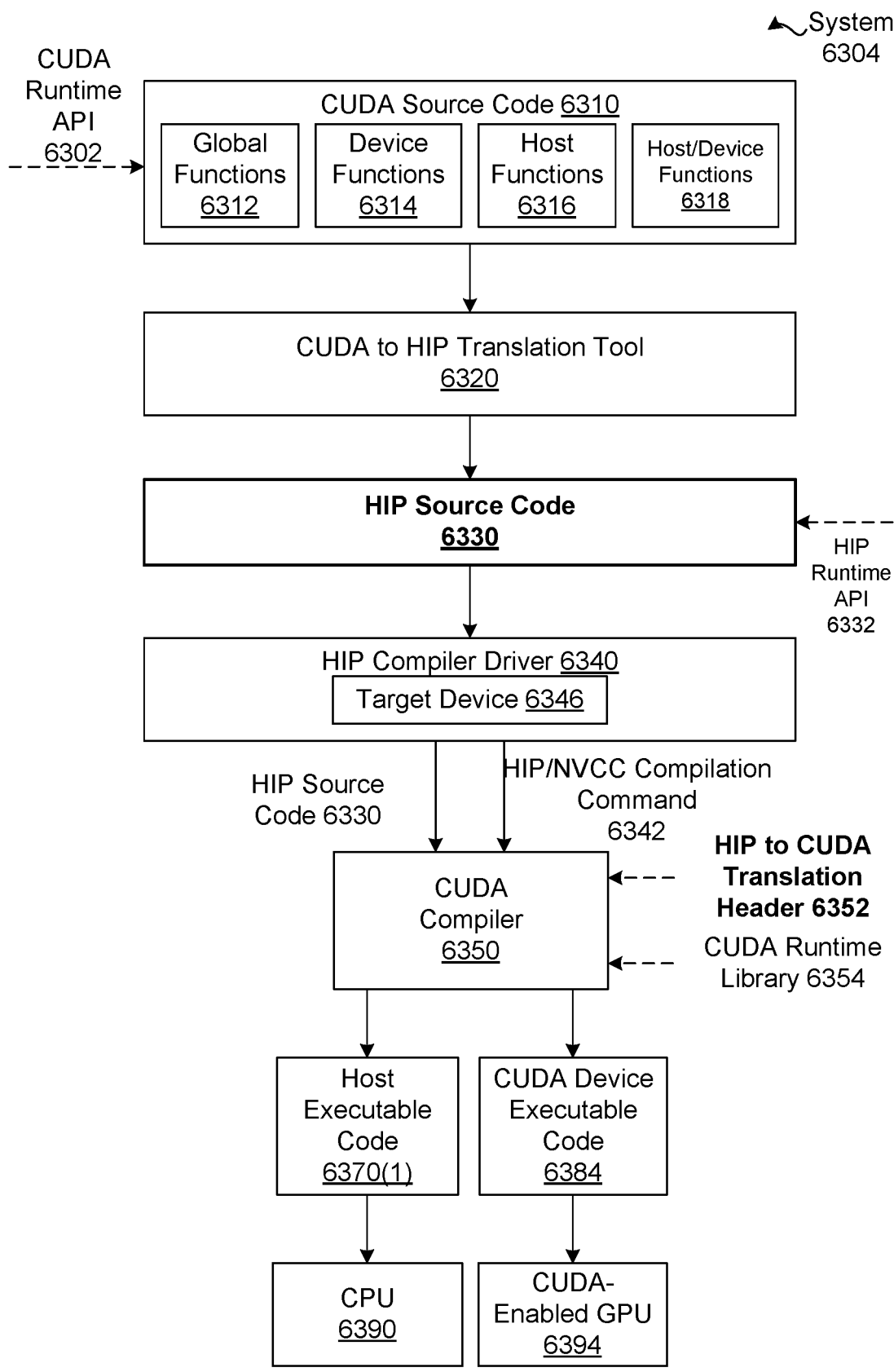
FIG. 63B illustrates a system configured to compile and execute CUDA source code of FIG. 63A using a CPU and a CUDA-enabled GPU, in accordance with at least one embodiment.

FIG. 63B illustrates a system 6304 configured to compile and execute CUDA source code 6310 of FIG. 63A using CPU 6390 and CUDA-enabled GPU 6394, in accordance with at least one embodiment. In at least one embodiment, system 6304 includes, without limitation, CUDA source code 6310, CUDA to HIP translation tool 6320, HIP source code 6330, HIP compiler driver 6340, CUDA compiler 6350, host executable code 6370(1), CUDA device executable code 6384, CPU 6390, and CUDA-enabled GPU 6394.

In at least one embodiment and as described previously herein in conjunction with FIG. 63A, CUDA source code 6310 includes, without limitation, any number (including zero) of global functions 6312, any number (including zero) of device functions 6314, any number (including zero) of host functions 6316, and any number (including zero) of host/device functions 6318. In at least one embodiment, CUDA source code 6310 also includes, without limitation, any number of calls to any number of functions that are specified in any number of CUDA APIs.

In at least one embodiment, CUDA to HIP translation tool 6320 translates CUDA source code 6310 to HIP source code 6330. In at least one embodiment, CUDA to HIP translation tool 6320 converts each kernel call in CUDA source code 6310 from a CUDA syntax to a HIP syntax and converts any number of other CUDA calls in CUDA source code 6310 to any number of other functionally similar HIP calls.

In at least one embodiment, HIP compiler driver 6340 determines that target device 6346 is CUDA-enabled and generates HIP/NVCC compilation command 6342. In at least one embodiment, HIP compiler driver 6340 then configures CUDA compiler 6350 via HIP/NVCC compilation command 6342 to compile HIP source code 6330. In at least one embodiment, HIP compiler driver 6340 provides access to a HIP to CUDA translation header 6352 as part of configuring CUDA compiler 6350. In at least one embodiment, HIP to CUDA translation header 6352 translates any number of mechanisms (e.g., functions) specified in any number of HIP APIs to any number of mechanisms specified in any number of CUDA APIs. In at least one embodiment, CUDA compiler 6350 uses HIP to CUDA translation header 6352 in conjunction with a CUDA runtime library 6354 corresponding to CUDA runtime API 6302 to generate host executable code 6370(1) and CUDA device executable code 6384. In at least one embodiment, host executable code 6370(1) and CUDA device executable code 6384 may then be executed on, respectively, CPU 6390 and CUDA-enabled GPU 6394. In at least one embodiment, CUDA device executable code 6384 includes, without limitation, binary code. In at least one embodiment, CUDA device executable code 6384 includes, without limitation, PTX code and is further compiled into binary code for a specific target device at runtime.

In at least one embodiment, at least one component shown or described with respect to FIG. 63B is used to implement techniques and/or functions described in connection with FIGS. 1-35. In at least one embodiment, at least one element of system 6304 is used to perform an application programming interface to indicate two or more blocks of threads to be scheduled in parallel. In at least one embodiment, at least one element of system 6304 is used to perform an application programming interface to determine which of two or more blocks of threads to be scheduled in parallel. In at least one embodiment, at least one element of system 6304 is used to perform an application programming interface comprising one or more parameters to cause a scheduling policy of one or more blocks of one or more threads to be performed. In at least one embodiment, at least one element of system 6304 is used to perform an application programming interface comprising one or more parameters to indicate a scheduling policy of one or more blocks of one or more threads. In at least one embodiment, at least one element of system 6304 is used to perform an application programming interface to indicate a maximum number of blocks of threads capable of being scheduled in parallel. In at least one embodiment, at least one element of system 6304 is used to perform an application programming interface comprising one or more parameters to indicate one or more attributes of one or more groups of blocks of one or more threads. In at least one embodiment, at least one element of system 6304 is used to perform an application programming interface to indicate a maximum number of blocks of threads to be scheduled in parallel. In at least one embodiment, at least one element of system 6304 is used to perform an application programming interface to cause a kernel to be generated to cause two or more blocks of two or more threads to be scheduled in parallel. In at least one embodiment, at least one element of system 6304 is used to perform an application programming interface comprising one or more parameters to indicate one or more limitations of one or more attributes of one or more groups of blocks of one or more threads. In at least one embodiment, at least one element of system 6304 is used to perform an application programming interface to indicate whether one or more threads within two or more blocks of threads have performed a barrier instruction. In at least one embodiment, at least one element of system 6304 is used to perform an application programming interface to cause performance of one or more threads within a group of blocks of threads to stop at least until all threads within the group of blocks have performed a barrier instruction. In at least one embodiment, at least one element of system 6304 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one element of system 6304 is used to perform an application programming interface to cause memory to be shared between two or more groups of blocks of threads.

In at least one embodiment, at least one element of system 6304 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 63C:
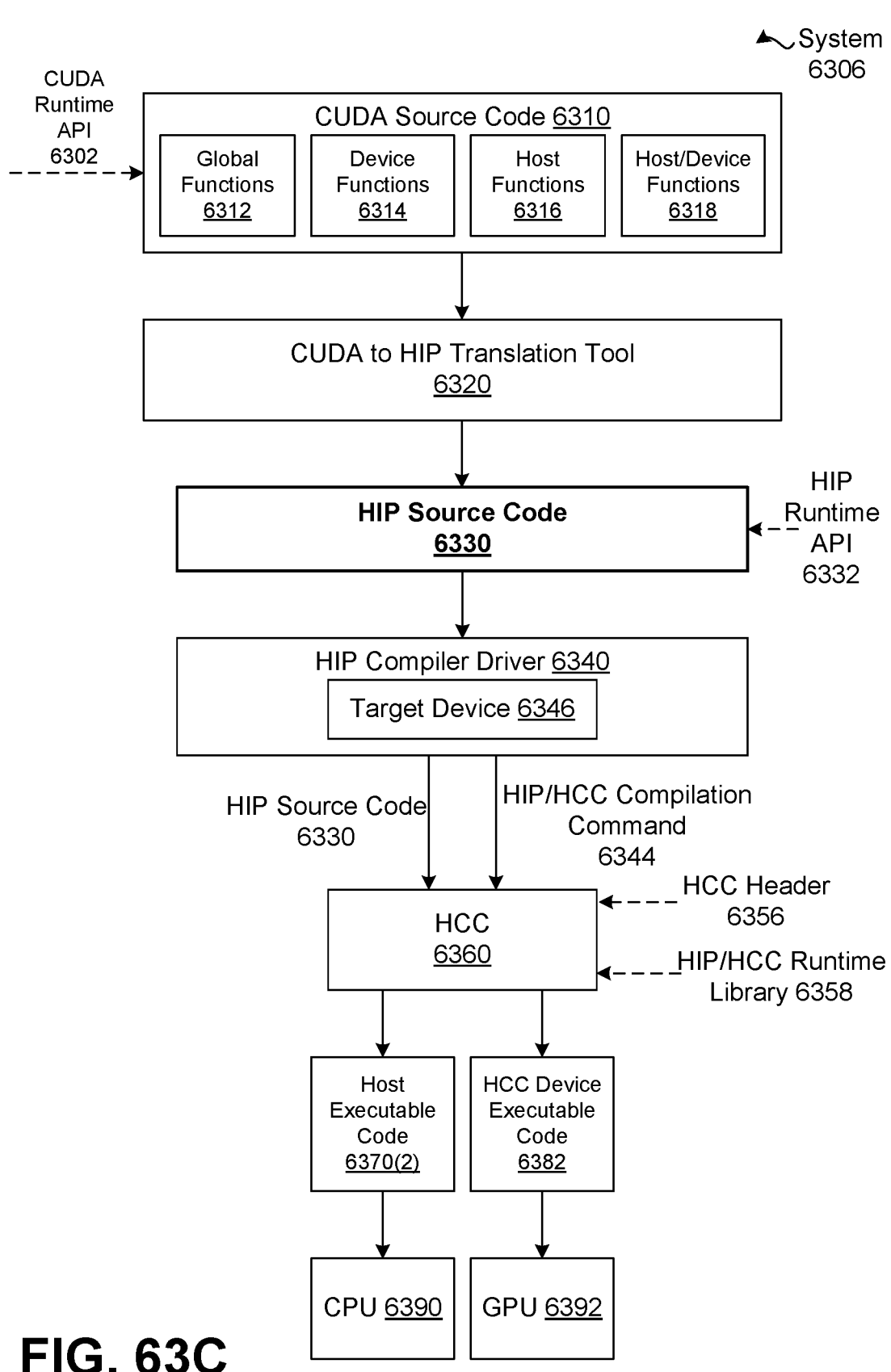
FIG. 63C illustrates a system configured to compile and execute CUDA source code of FIG. 63A using a CPU and a non-CUDA-enabled GPU, in accordance with at least one embodiment.

FIG. 63C illustrates a system 6306 configured to compile and execute CUDA source code 6310 of FIG. 63A using CPU 6390 and non-CUDA-enabled GPU 6392, in accordance with at least one embodiment. In at least one embodiment, system 6306 includes, without limitation, CUDA source code 6310, CUDA to HIP translation tool 6320, HIP source code 6330, HIP compiler driver 6340, HCC 6360, host executable code 6370(2), HCC device executable code 6382, CPU 6390, and GPU 6392.

In at least one embodiment and as described previously herein in conjunction with FIG. 63A, CUDA source code 6310 includes, without limitation, any number (including zero) of global functions 6312, any number (including zero) of device functions 6314, any number (including zero) of host functions 6316, and any number (including zero) of host/device functions 6318. In at least one embodiment, CUDA source code 6310 also includes, without limitation, any number of calls to any number of functions that are specified in any number of CUDA APIs.

In at least one embodiment, CUDA to HIP translation tool 6320 translates CUDA source code 6310 to HIP source code 6330. In at least one embodiment, CUDA to HIP translation tool 6320 converts each kernel call in CUDA source code 6310 from a CUDA syntax to a HIP syntax and converts any number of other CUDA calls in source code 6310 to any number of other functionally similar HIP calls.

In at least one embodiment, HIP compiler driver 6340 subsequently determines that target device 6346 is not CUDA-enabled and generates HIP/HCC compilation command 6344. In at least one embodiment, HIP compiler driver 6340 then configures HCC 6360 to execute HIP/HCC compilation command 6344 to compile HIP source code 6330. In at least one embodiment, HIP/HCC compilation command 6344 configures HCC 6360 to use, without limitation, a HIP/HCC runtime library 6358 and an HCC header 6356 to generate host executable code 6370(2) and HCC device executable code 6382. In at least one embodiment, HIP/HCC runtime library 6358 corresponds to HIP runtime API 6332. In at least one embodiment, HCC header 6356 includes, without limitation, any number and type of interoperability mechanisms for HIP and HCC. In at least one embodiment, host executable code 6370(2) and HCC device executable code 6382 may be executed on, respectively, CPU 6390 and GPU 6392.

In at least one embodiment, at least one component shown or described with respect to FIG. 63C is used to implement techniques and/or functions described in connection with FIGS. 1-35. In at least one embodiment, at least one element of system 6306 is used to perform an application programming interface to indicate two or more blocks of threads to be scheduled in parallel. In at least one embodiment, at least one element of system 6306 is used to perform an application programming interface to determine which of two or more blocks of threads to be scheduled in parallel. In at least one embodiment, at least one element of system 6306 is used to perform an application programming interface comprising one or more parameters to cause a scheduling policy of one or more blocks of one or more threads to be performed. In at least one embodiment, at least one element of system 6306 is used to perform an application programming interface comprising one or more parameters to indicate a scheduling policy of one or more blocks of one or more threads. In at least one embodiment, at least one element of system 6306 is used to perform an application programming interface to indicate a maximum number of blocks of threads capable of being scheduled in parallel. In at least one embodiment, at least one element of system 6306 is used to perform an application programming interface comprising one or more parameters to indicate one or more attributes of one or more groups of blocks of one or more threads. In at least one embodiment, at least one element of system 6306 is used to perform an application programming interface to indicate a maximum number of blocks of threads to be scheduled in parallel. In at least one embodiment, at least one element of system 6306 is used to perform an application programming interface to cause a kernel to be generated to cause two or more blocks of two or more threads to be scheduled in parallel. In at least one embodiment, at least one element of system 6306 is used to perform an application programming interface comprising one or more parameters to indicate one or more limitations of one or more attributes of one or more groups of blocks of one or more threads. In at least one embodiment, at least one element of system 6306 is used to perform an application programming interface to indicate whether one or more threads within two or more blocks of threads have performed a barrier instruction. In at least one embodiment, at least one element of system 6306 is used to perform an application programming interface to cause performance of one or more threads within a group of blocks of threads to stop at least until all threads within the group of blocks have performed a barrier instruction. In at least one embodiment, at least one element of system 6306 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one element of system 6306 is used to perform an application programming interface to cause memory to be shared between two or more groups of blocks of threads.

In at least one embodiment, at least one element of system 6306 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

FIG. 64 illustrates an exemplary kernel translated by CUDA-to-HIP translation tool 6320 of FIG. 63C, in accordance with at least one embodiment. In at least one embodiment, CUDA source code 6310 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 6310 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 6410. In at least one embodiment, CUDA kernel launch syntax 6410 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 6410 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 6410, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 6410, SharedMemorySize defaults to zero. In at least one embodiment and with respect to CUDA kernel launch syntax 6410, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 6310 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 6410, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 6310 to HIP source code 6330, CUDA to HIP translation tool 6320 translates each kernel call in CUDA source code 6310 from CUDA kernel launch syntax 6410 to a HIP kernel launch syntax 6420 and converts any number of other CUDA calls in source code 6310 to any number of other functionally similar HIP calls. In at least one embodiment, HIP kernel launch syntax 6420 is specified as "hipLaunchKernelGGL(KernelName,GridSize, BlockSize, SharedMemory Size, Stream, KernelArguments);". In at least one embodiment, each of KernelName, GridSize, BlockSize, ShareMemorySize, Stream, and KernelArguments has the same meaning in HIP kernel launch syntax 6420 as in CUDA kernel launch syntax 6410 (described previously herein). In at least one embodiment, arguments SharedMemorySize and Stream are required in HIP kernel launch syntax 6420 and are optional in CUDA kernel launch syntax 6410.

In at least one embodiment, a portion of HIP source code 6330 depicted in FIG. 64 is identical to a portion of CUDA source code 6310 depicted in FIG. 64 except for a kernel call that causes kernel MatAdd to execute on a device. In at least one embodiment, kernel MatAdd is defined in HIP source code 6330 with the same "global" declaration specifier with which kernel MatAdd is defined in CUDA source code 6310. In at least one embodiment, a kernel call in HIP source code 6330 is "hipLaunchKernelGGL(MatAdd, numBlocks, threadsPerBlock, 0, 0, A, B, C);", while a corresponding kernel call in CUDA source code 6310 is "MatAdd<<<numBlocks, threadsPerBlock>>>(A, B, C);".

In at least one embodiment, at least one component shown or described with respect to FIG. 64 is used to implement techniques and/or functions described in connection with FIGS. 1-35. In at least one embodiment, at least one of CUDA Source Code 6410, CUDA to HIP Translation Tool 6420, or HIP Source Code 6430 is used to perform an application programming interface to indicate two or more blocks of threads to be scheduled in parallel. In at least one embodiment, at least one of CUDA Source Code 6410, CUDA to HIP Translation Tool 6420, or HIP Source Code 6430 is used to perform an application programming interface to determine which of two or more blocks of threads to be scheduled in parallel. In at least one embodiment, at least one of CUDA Source Code 6410, CUDA to HIP Translation Tool 6420, or HIP Source Code 6430 is used to perform an application programming interface comprising one or more parameters to cause a scheduling policy of one or more blocks of one or more threads to be performed. In at least one embodiment, at least one of CUDA Source Code 6410, CUDA to HIP Translation Tool 6420, or HIP Source Code 6430 is used to perform an application programming interface comprising one or more parameters to indicate a scheduling policy of one or more blocks of one or more threads. In at least one embodiment, at least one of CUDA Source Code 6410, CUDA to HIP Translation Tool 6420, or HIP Source Code 6430 is used to perform an application programming interface to indicate a maximum number of blocks of threads capable of being scheduled in parallel. In at least one embodiment, at least one of CUDA Source Code 6410, CUDA to HIP Translation Tool 6420, or HIP Source Code 6430 is used to perform an application programming interface comprising one or more parameters to indicate one or more attributes of one or more groups of blocks of one or more threads. In at least one embodiment, at least one of CUDA Source Code 6410, CUDA to HIP Translation Tool 6420, or HIP Source Code 6430 is used to perform an application programming interface to indicate a maximum number of blocks of threads to be scheduled in parallel. In at least one embodiment, at least one of CUDA Source Code 6410, CUDA to HIP Translation Tool 6420, or HIP Source Code 6430 is used to perform an application programming interface to cause a kernel to be generated to cause two or more blocks of two or more threads to be scheduled in parallel. In at least one embodiment, at least one of CUDA Source Code 6410, CUDA to HIP Translation Tool 6420, or HIP Source Code 6430 is used to perform an application programming interface comprising one or more parameters to indicate one or more limitations of one or more attributes of one or more groups of blocks of one or more threads. In at least one embodiment, at least one of CUDA Source Code 6410, CUDA to HIP Translation Tool 6420, or HIP Source Code 6430 is used to perform an application programming interface to indicate whether one or more threads within two or more blocks of threads have performed a barrier instruction. In at least one embodiment, at least one of CUDA Source Code 6410, CUDA to HIP Translation Tool 6420, or HIP Source Code 6430 is used to perform an application programming interface to cause performance of one or more threads within a group of blocks of threads to stop at least until all threads within the group of blocks have performed a barrier instruction. In at least one embodiment, at least one of CUDA Source Code 6410, CUDA to HIP Translation Tool 6420, or HIP Source Code 6430 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one of CUDA Source Code 6410, CUDA to HIP Translation Tool 6420, or HIP Source Code 6430 is used to perform an application programming interface to cause memory to be shared between two or more groups of blocks of threads.

In at least one embodiment, at least one of CUDA Source Code 6410, CUDA to HIP Translation Tool 6420, or HIP Source Code 6430 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 65:
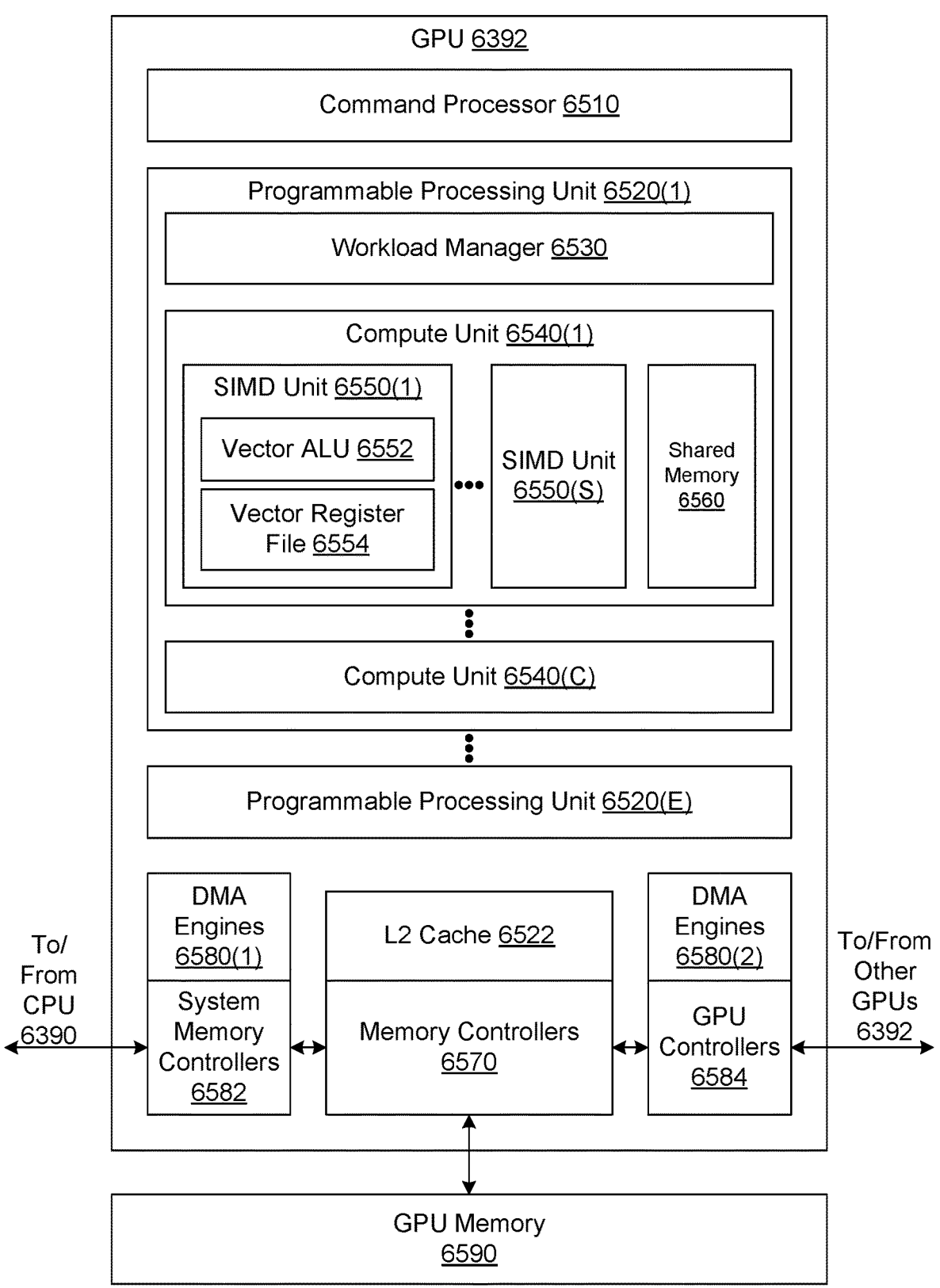
FIG. 65 illustrates non-CUDA-enabled GPU of FIG. 63C in greater detail, in accordance with at least one embodiment.

FIG. 65 illustrates non-CUDA-enabled GPU 6392 of FIG. 63C in greater detail, in accordance with at least one embodiment. In at least one embodiment, GPU 6392 is developed by AMD corporation of Santa Clara. In at least one embodiment, GPU 6392 can be configured to perform compute operations in a highly-parallel fashion. In at least one embodiment, GPU 6392 is configured to execute graphics pipeline operations such as draw commands, pixel operations, geometric computations, and other operations associated with rendering an image to a display. In at least one embodiment, GPU 6392 is configured to execute operations unrelated to graphics. In at least one embodiment, GPU 6392 is configured to execute both operations related to graphics and operations unrelated to graphics. In at least one embodiment, GPU 6392 can be configured to execute device code included in HIP source code 6330.

In at least one embodiment, GPU 6392 includes, without limitation, any number of programmable processing units 6520, a command processor 6510, an L2 cache 6522, memory controllers 6570, DMA engines 6580(1), system memory controllers 6582, DMA engines 6580(2), and GPU controllers 6584. In at least one embodiment, each programmable processing unit 6520 includes, without limitation, a workload manager 6530 and any number of compute units 6540. In at least one embodiment, command processor 6510 reads commands from one or more command queues (not shown) and distributes commands to workload managers 6530. In at least one embodiment, for each programmable processing unit 6520, associated workload manager 6530 distributes work to compute units 6540 included in programmable processing unit 6520. In at least one embodiment, each compute unit 6540 may execute any number of thread blocks, but each thread block executes on a single compute unit 6540. In at least one embodiment, a workgroup is a thread block.

In at least one embodiment, each compute unit 6540 includes, without limitation, any number of SIMD units 6550 and a shared memory 6560. In at least one embodiment, each SIMD unit 6550 implements a SIMD architecture and is configured to perform operations in parallel. In at least one embodiment, each SIMD unit 6550 includes, without limitation, a vector ALU 6552 and a vector register file 6554. In at least one embodiment, each SIMD unit 6550 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 6560.

In at least one embodiment, programmable processing units 6520 are referred to as "shader engines." In at least one embodiment, each programmable processing unit 6520 includes, without limitation, any amount of dedicated graphics hardware in addition to compute units 6540. In at least one embodiment, each programmable processing unit 6520 includes, without limitation, any number (including zero) of geometry processors, any number (including zero) of rasterizers, any number (including zero) of render back ends, workload manager 6530, and any number of compute units 6540.

In at least one embodiment, compute units 6540 share L2 cache 6522. In at least one embodiment, L2 cache 6522 is partitioned. In at least one embodiment, a GPU memory 6590 is accessible by all compute units 6540 in GPU 6392. In at least one embodiment, memory controllers 6570 and system memory controllers 6582 facilitate data transfers between GPU 6392 and a host, and DMA engines 6580(1) enable asynchronous memory transfers between GPU 6392 and such a host. In at least one embodiment, memory controllers 6570 and GPU controllers 6584 facilitate data transfers between GPU 6392 and other GPUs 6392, and DMA engines 6580(2) enable asynchronous memory transfers between GPU 6392 and other GPUs 6392.

In at least one embodiment, GPU 6392 includes, without limitation, any amount and type of system interconnect that facilitates data and control transmissions across any number and type of directly or indirectly linked components that may be internal or external to GPU 6392. In at least one embodiment, GPU 6392 includes, without limitation, any number and type of I/O interfaces (e.g., PCIe) that are coupled to any number and type of peripheral devices. In at least one embodiment, GPU 6392 may include, without limitation, any number (including zero) of display engines and any number (including zero) of multimedia engines. In at least one embodiment, GPU 6392 implements a memory subsystem that includes, without limitation, any amount and type of memory controllers (e.g., memory controllers 6570 and system memory controllers 6582) and memory devices (e.g., shared memories 6560) that may be dedicated to one component or shared among multiple components. In at least one embodiment, GPU 6392 implements a cache subsystem that includes, without limitation, one or more cache memories (e.g., L2 cache 6522) that may each be private to or shared between any number of components (e.g., SIMD units 6550, compute units 6540, and programmable processing units 6520).

In at least one embodiment, at least one component shown or described with respect to FIG. 65 is used to implement techniques and/or functions described in connection with FIGS. 1-35. In at least one embodiment, at least one component shown or described with respect to FIG. is used to perform an application programming interface to indicate two or more blocks of threads to be scheduled in parallel. In at least one embodiment, at least one component shown or described with respect to FIG. 65 is used to perform an application programming interface to determine which of two or more blocks of threads to be scheduled in parallel. In at least one embodiment, at least one component shown or described with respect to FIG. 65 is used to perform an application programming interface comprising one or more parameters to cause a scheduling policy of one or more blocks of one or more threads to be performed. In at least one embodiment, at least one component shown or described with respect to FIG. 65 is used to perform an application programming interface comprising one or more parameters to indicate a scheduling policy of one or more blocks of one or more threads. In at least one embodiment, at least one component shown or described with respect to FIG. 65 is used to perform an application programming interface to indicate a maximum number of blocks of threads capable of being scheduled in parallel. In at least one embodiment, at least one component shown or described with respect to FIG. 65 is used to perform an application programming interface comprising one or more parameters to indicate one or more attributes of one or more groups of blocks of one or more threads. In at least one embodiment, at least one component shown or described with respect to FIG. 65 is used to perform an application programming interface to indicate a maximum number of blocks of threads to be scheduled in parallel. In at least one embodiment, at least one component shown or described with respect to FIG. 65 is used to perform an application programming interface to cause a kernel to be generated to cause two or more blocks of two or more threads to be scheduled in parallel. In at least one embodiment, at least one component shown or described with respect to FIG. 65 is used to perform an application programming interface comprising one or more parameters to indicate one or more limitations of one or more attributes of one or more groups of blocks of one or more threads. In at least one embodiment, at least one component shown or described with respect to FIG. 65 is used to perform an application programming interface to indicate whether one or more threads within two or more blocks of threads have performed a barrier instruction. In at least one embodiment, at least one component shown or described with respect to FIG. 65 is used to perform an application programming interface to cause performance of one or more threads within a group of blocks of threads to stop at least until all threads within the group of blocks have performed a barrier instruction. In at least one embodiment, at least one component shown or described with respect to FIG. 65 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one component shown or described with respect to FIG. 65 is used to perform an application programming interface to cause memory to be shared between two or more groups of blocks of threads.

In at least one embodiment, at least one component shown or described with respect to FIG. 65 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

FIG. 66 illustrates how threads of an exemplary CUDA grid 6620 are mapped to different compute units 6540 of FIG. 65, in accordance with at least one embodiment. In at least one embodiment and for explanatory purposes only, grid 6620 has a GridSize of BX by BY by 1 and a BlockSize of TX by TY by 1. In at least one embodiment, grid 6620 therefore includes, without limitation, (BX*BY) thread blocks 6630 and each thread block 6630 includes, without limitation, (TX*TY) threads 6640. Threads 6640 are depicted in FIG. 66 as squiggly arrows.

In at least one embodiment, grid 6620 is mapped to programmable processing unit 6520(1) that includes, without limitation, compute units 6540(1)-6540(C). In at least one embodiment and as shown, (BJ*BY) thread blocks 6630 are mapped to compute unit 6540(1), and the remaining thread blocks 6630 are mapped to compute unit 6540(2). In at least one embodiment, each thread block 6630 may include, without limitation, any number of warps, and each warp is mapped to a different SIMD unit 6550 of FIG. 65.

In at least one embodiment, warps in a given thread block 6630 may synchronize together and communicate through shared memory 6560 included in associated compute unit 6540. For example and in at least one embodiment, warps in thread block 6630(BJ,1) can synchronize together and communicate through shared memory 6560(1). For example and in at least one embodiment, warps in thread block 6630(BJ+1,1) can synchronize together and communicate through shared memory 6560(2).

In at least one embodiment, at least one component shown or described with respect to FIG. 66 is used to implement techniques and/or functions described in connection with FIGS. 1-35. In at least one embodiment, at least one thread of exemplary CUDA grid 6620 is used to perform an application programming interface to indicate two or more blocks of threads to be scheduled in parallel. In at least one embodiment, at least one thread of exemplary CUDA grid 6620 is used to perform an application programming interface to determine which of two or more blocks of threads to be scheduled in parallel. In at least one embodiment, at least one thread of exemplary CUDA grid 6620 is used to perform an application programming interface comprising one or more parameters to cause a scheduling policy of one or more blocks of one or more threads to be performed. In at least one embodiment, at least one thread of exemplary CUDA grid 6620 is used to perform an application programming interface comprising one or more parameters to indicate a scheduling policy of one or more blocks of one or more threads. In at least one embodiment, at least one thread of exemplary CUDA grid 6620 is used to perform an application programming interface to indicate a maximum number of blocks of threads capable of being scheduled in parallel. In at least one embodiment, at least one thread of exemplary CUDA grid 6620 is used to perform an application programming interface comprising one or more parameters to indicate one or more attributes of one or more groups of blocks of one or more threads. In at least one embodiment, at least one thread of exemplary CUDA grid 6620 is used to perform an application programming interface to indicate a maximum number of blocks of threads to be scheduled in parallel. In at least one embodiment, at least one thread of exemplary CUDA grid 6620 is used to perform an application programming interface to cause a kernel to be generated to cause two or more blocks of two or more threads to be scheduled in parallel. In at least one embodiment, at least one thread of exemplary CUDA grid 6620 is used to perform an application programming interface comprising one or more parameters to indicate one or more limitations of one or more attributes of one or more groups of blocks of one or more threads. In at least one embodiment, at least one thread of exemplary CUDA grid 6620 is used to perform an application programming interface to indicate whether one or more threads within two or more blocks of threads have performed a barrier instruction. In at least one embodiment, at least one thread of exemplary CUDA grid 6620 is used to perform an application programming interface to cause performance of one or more threads within a group of blocks of threads to stop at least until all threads within the group of blocks have performed a barrier instruction. In at least one embodiment, at least one thread of exemplary CUDA grid 6620 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one thread of exemplary CUDA grid 6620 is used to perform an application programming interface to cause memory to be shared between two or more groups of blocks of threads.

In at least one embodiment, at least one thread of exemplary CUDA grid 6620 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

Figure 67:
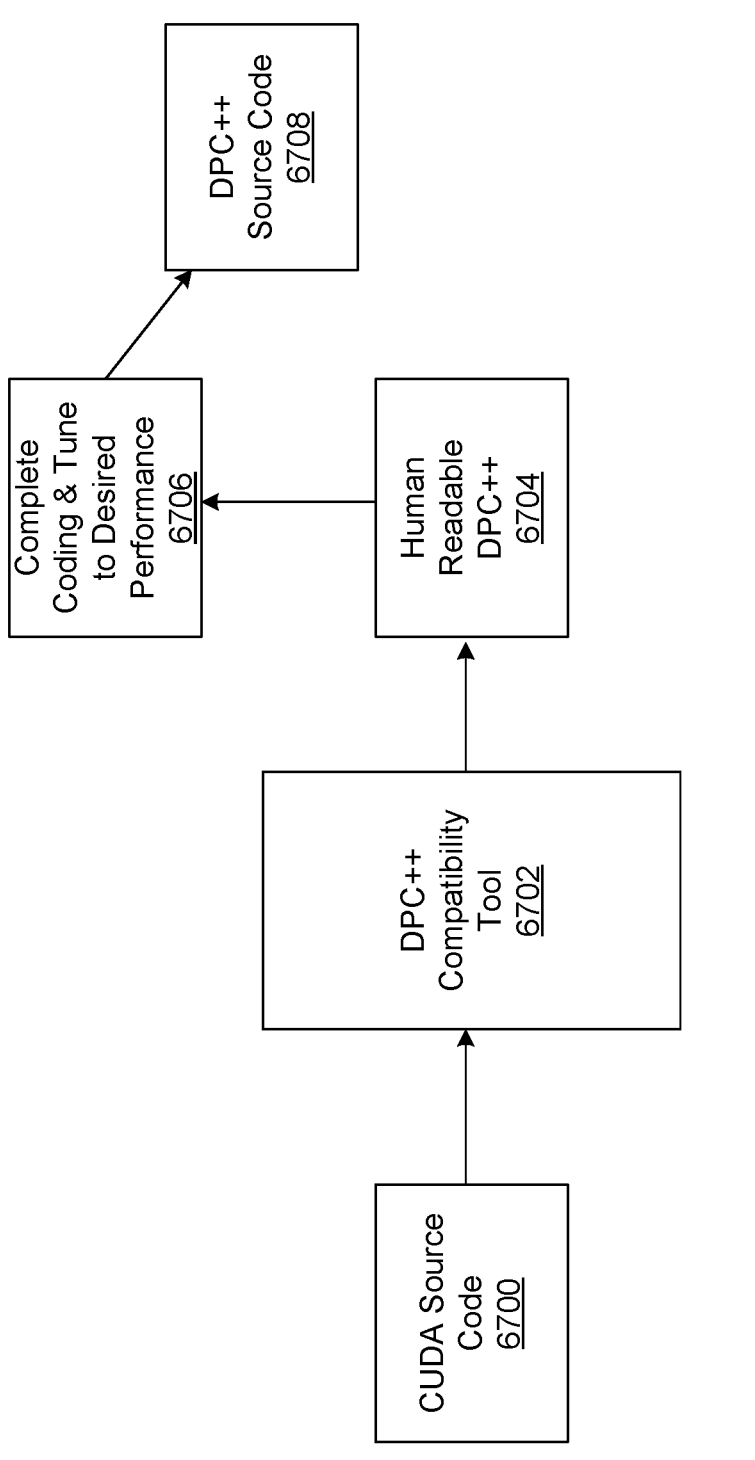
FIG. 67 illustrates how to migrate existing CUDA code to Data Parallel C++ code, in accordance with at least one embodiment.

FIG. 67 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload.

A host may be available to simplify development and debugging of device code, even on platforms that do not have an accelerator available.

In at least one embodiment, CUDA source code 6700 is provided as an input to a DPC++ compatibility tool 6702 to generate human readable DPC++ 6704. In at least one embodiment, human readable DPC++ 6704 includes inline comments generated by DPC++ compatibility tool 6702 that guides a developer on how and/or where to modify DPC++ code to complete coding and tuning to desired performance 6706, thereby generating DPC++ source code 6708.

In at least one embodiment, CUDA source code 6700 is or includes a collection of human-readable source code in a CUDA programming language. In at least one embodiment, CUDA source code 6700 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 6700 described in connection with FIG. 67 may be in accordance with those discussed elsewhere in this document.

In at least one embodiment, DPC++ compatibility tool 6702 refers to an executable tool, program, application, or any other suitable type of tool that is used to facilitate migration of CUDA source code 6700 to DPC++ source code 6708. In at least one embodiment, DPC++ compatibility tool 6702 is a command-line-based code migration tool available as part of a DPC++ tool kit that is used to port existing CUDA sources to DPC++. In at least one embodiment, DPC++ compatibility tool 6702 converts some or all source code of a CUDA application from CUDA to DPC++ and generates a resulting file that is written at least partially in DPC++, referred to as human readable DPC++ 6704. In at least one embodiment, human readable DPC++ 6704 includes comments that are generated by DPC++ compatibility tool 6702 to indicate where user intervention may be necessary. In at least one embodiment, user intervention is necessary when CUDA source code 6700 calls a CUDA API that has no analogous DPC++ API; other examples where user intervention is required are discussed later in greater detail.

In at least one embodiment, a workflow for migrating CUDA source code 6700 (e.g., application or portion thereof) includes creating one or more compilation database files; migrating CUDA to DPC++ using a DPC++ compatibility tool 6702; completing migration and verifying correctness, thereby generating DPC++ source code 6708; and compiling DPC++ source code 6708 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 6702 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 6702 migrates CUDA code (e.g., applications) written in CUDA to DPC++ by generating DPC++ wherever possible. In at least one embodiment, DPC++ compatibility tool 6702 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 6702 to migrate CUDA code to DPC++. In at least one embodiment, non-CUDA C++ code and files are migrated as is. In at least one embodiment, DPC++ compatibility tool 6702 generates human readable DPC++ 6704 which may be DPC++ code that, as generated by DPC++ compatibility tool 6702, cannot be compiled by DPC++ compiler and requires additional plumbing for verifying portions of code that were not migrated correctly, and may involve manual intervention, such as by a developer. In at least one embodiment, DPC++ compatibility tool 6702 provides hints or tools embedded in code to help developers manually migrate additional code that could not be migrated automatically. In at least one embodiment, migration is a one-time activity for a source file, project, or application.

In at least one embodiment, DPC++ compatibility tool 67002 is able to successfully migrate all portions of CUDA code to DPC++ and there may simply be an optional step for manually verifying and tuning performance of DPC++ source code that was generated. In at least one embodiment, DPC++ compatibility tool 6702 directly generates DPC++ source code 6708 which is compiled by a DPC++ compiler without requiring or utilizing human intervention to modify DPC++ code generated by DPC++ compatibility tool 6702. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 6702. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global___ void VectorAddKernel(float* A, float* B, float* C)
{
    A[threadIdx.x] = threadIdx.x + 1.0f;
    B[threadIdx.x] = threadIdx.x + 1.0f;
    C[threadIdx.x] = A[threadIdx.x] + B[threadIdx.x];
}
int main( )
{
    float *d_A, *d_B, *d_C;
    cudaMalloc(&d_A, VECTOR_SIZE*sizeof(float));
    cudaMalloc(&d_B, VECTOR_SIZE*sizeof(float));
    cudaMalloc(&d_C, VECTOR_SIZE*sizeof(float));
    VectorAddKernel<<<1, VECTOR_SIZE>>>(d_A, d_B, d_C);
    float Result[VECTOR_SIZE] = { };
    cudaMemcpy(Result, d_C, VECTOR_SIZE*sizeof(float),
cudaMemcpyDeviceToHost);
    cudaFree(d_A);
    cudaFree(d_B);
    cudaFree(d_C);
    for (int i=0; i<VECTOR_SIZE; i++ {
        if (i % 16 == 0) {
            printf("\n");
        }
        printf("%f ", Result[i]);
    }
    return 0;
}
```

In at least one embodiment and in connection with CUDA source file presented above, DPC++ compatibility tool 6702 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 6702 converts CUDA thread IDs used to index work elements to SYCL standard addressing for work elements via a local ID as part of migrating CUDA code to DPC++ code. In at least one embodiment, DPC++ code generated by DPC++ compatibility tool 6702 can be optimized—for example, by reducing dimensionality of an nd item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 6702. In at least one embodiment, DPC++ compatibility tool 6702 modify CUDA APIs for memory setup and/or host calls to execute kernel on the acceleration device. In at least one embodiment and in connection with CUDA source file presented above, a corresponding human readable DPC++ 6704 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
            sycl::nd_item<3> item_ct1)
{
  A[item_ct1.get_local_id(2)] = item_ct1.get_local_id(2) + 1.0f;
  B[item_ct1.get_local_id(2)] = item_ct1.get_local_id(2) + 1.0f;
  C[item_ct1.get_local_id(2)] =
      A[item_ct1.get_local_id(2)] + B[item_ct1.get_local_id(2)];
}
int main( )
{
  float *d_A, *d_B, *d_C;
  d_A = (float *)sycl::malloc_device(VECTOR_SIZE * sizeof(float),
    dpct::get_current_device( ),
    dpct::get_default_context( ));
  d_B = (float *)sycl::malloc_device(VECTOR_SIZE * sizeof(float),
    dpct::get_current_device( ),
    dpct::get_default_context( ));
  d_C = (float *)sycl::malloc_device(VECTOR_SIZE * sizeof(float),
    dpct::get_current_device( ),
    dpct::get_default_context( ));
  dpct::get_default_queue_wait( ).submit([&](sycl::handler &cgh) {
    cgh.parallel_for(
      sycl::nd_range<3>(sycl::range<3>(1, 1, 1) *
          sycl::range<3>(1, 1, VECTOR_SIZE) *
          sycl::range<3>(1, 1, VECTOR_SIZE)),
      [=](sycl::nd_items<3> item_ct1) {
        VectorAddKernel(d_A, d_B, d_C, item_ct1);
      });
  });
  float Result[VECTOR_SIZE] = { };
  dpct::get_default_queue_wait( )
    .memcpy(Result, d_C, VECTOR_SIZE * sizeof(float))
    .wait( );
  sycl::free(d_A, dpct::get_default_context( ));
  sycl::free(d_B, dpct::get_default_context( ));
  sycl::free(d_C, dpct::get_default_context( ));
  for (int i=0; i<VECTOR_SIZE; i++ {
    if (i % 16 == 0) {
      printf("\n");
    }
    printf("%f ", Result[i]);
  }
  return 0;
}
```

In at least one embodiment, human readable DPC++ 6704 refers to output generated by DPC++ compatibility tool 6702 and may be optimized in one manner or another. In at least one embodiment, human readable DPC++ 6704 generated by DPC++ compatibility tool 6702 can be manually edited by a developer after migration to make it more maintainable, performance, or other considerations. In at least one embodiment, DPC++ code generated by DPC++ compatibility tool 67002 such as DPC++ disclosed can be optimized by removing repeat calls to get current device( )

and/or get_default_context( ) for each malloc_device( ) call. In at least one embodiment, DPC++ code generated above uses a 3 dimensional nd range which can be refactored to use only a single dimension, thereby reducing memory usage. In at least one embodiment, a developer can manually edit DPC++ code generated by DPC++ compatibility tool 6702 replace uses of unified shared memory with accessors. In at least one embodiment, DPC++ compatibility tool 6702 has an option to change how it migrates CUDA code to DPC++ code. In at least one embodiment, DPC++ compatibility tool 6702 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 6702; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, at least one component shown or described with respect to FIG. 67 is used to implement techniques and/or functions described in connection with FIGS. 1-35. In at least one embodiment, at least one component shown or described with respect to FIG. 67 is used to perform an application programming interface to indicate two or more blocks of threads to be scheduled in parallel. In at least one embodiment, at least one component shown or described with respect to FIG. 67 is used to perform an application programming interface to determine which of two or more blocks of threads to be scheduled in parallel. In at least one embodiment, at least one component shown or described with respect to FIG. 67 is used to perform an application programming interface comprising one or more parameters to cause a scheduling policy of one or more blocks of one or more threads to be performed. In at least one embodiment, at least one component shown or described with respect to FIG. 67 is used to perform an application programming interface comprising one or more parameters to indicate a scheduling policy of one or more blocks of one or more threads. In at least one embodiment, at least one component shown or described with respect to FIG. 67 is used to perform an application programming interface to indicate a maximum number of blocks of threads capable of being scheduled in parallel. In at least one embodiment, at least one component shown or described with respect to FIG. 67 is used to perform an application programming interface comprising one or more parameters to indicate one or more attributes of one or more groups of blocks of one or more threads. In at least one embodiment, at least one component shown or described with respect to FIG. 67 is used to perform an application programming interface to indicate a maximum number of blocks of threads to be scheduled in parallel. In at least one embodiment, at least one component shown or described with respect to FIG. 67 is used to perform an application programming interface to cause a kernel to be generated to cause two or more blocks of two or more threads to be scheduled in parallel. In at least one embodiment, at least one component shown or described with respect to FIG. 67 is used to perform an application programming interface comprising one or more parameters to indicate one or more limitations of one or more attributes of one or more groups of blocks of one or more threads. In at least one embodiment, at least one component shown or described with respect to FIG. 67 is used to perform an application programming interface to indicate whether one or more threads within two or more blocks of threads have performed a barrier instruction. In at least one embodiment, at least one component shown or described with respect to FIG. 67 is used to perform an application programming interface to cause performance of one or more threads within a group of blocks of threads to stop at least until all threads within the group of blocks have performed a barrier instruction. In at least one embodiment, at least one component shown or described with respect to FIG. 67 is used to perform an application programming interface to indicate whether one or more threads within two or more blocks of threads have performed a barrier instruction and to cause performance of one or more threads within the group of blocks of threads to stop at least until all threads within the group of blocks have performed the barrier instruction. In at least one embodiment, at least one component shown or described with respect to FIG. 67 is used to perform an application programming interface to cause memory to be shared between two or more groups of blocks of threads.

In at least one embodiment at least one component shown or described with respect to FIG. 67 is used to perform at least one aspect described with respect to example computer system 100, example diagram 200, example diagram 300, example diagram 400, example diagram 500, example process 600, example diagram 700, example application programming interface 800, example application programming interface 900, example diagram 1000, example diagram 1100, example application programming interface 1200, example application programming interface 1300, example computer system 1400, example application programming interface 1500, example diagram 1600, example application programming interface 1700, example computer system 1800, example application programming interface 1900, example computer system 2000, example application programming interface 2100, example diagram 2200, example diagram 2300, example diagram 2400, example diagram 2500, example application programming interface 2600, example diagram 2700, example diagram 2800, example diagram 2900, example application programming interface 3000, example application programming interface 3100, example application programming interface 3200, example diagram 3300, example application programming interface 3400, example software stack 3500, and/or other systems, methods, or operations described herein.

It should be noted that, while example embodiments described herein may relate to a CUDA programming model, techniques described herein can be utilized with any suitable programming model, such HIP, oneAPI (e.g., using oneAPI-based programming to perform or implement a method disclosed herein), and/or variations thereof.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

At least one embodiment of the disclosure can be described in view of the following clauses:

1. A processor comprising:
   one or more circuits to perform an application programming interface (API) to cause memory to be shared between two or more groups of blocks of threads.

2. The processor of clause 1, wherein the two or more groups of blocks of threads are groups within a software kernel.

3. The processor of clause 1 or 2, wherein the two or more groups of blocks of threads are groups within a grid of blocks of threads.

4. The processor of any of clauses 1-3, wherein the two or more groups of blocks of threads are partitions of a partitioning of blocks of threads.

5. The processor of any of clauses 1-4, wherein the memory is memory of a graphics processing unit (GPU).

6. The processor of any of clauses 1-5, wherein the API is to cause at least one thread of one group of blocks of threads to be able to access a memory location accessible to at least one thread of another group of blocks of threads.

7. The processor of any of clauses 1-6, wherein the API is to cause at least one thread of one group of blocks of threads to provide a memory address of the memory to be shared to the two or more groups of blocks of threads.

8. The processor of any of clauses 1-7, wherein the API is to cause at least one thread of a first group of blocks of threads to calculate a memory address of the memory to be shared based, at least in part, on an identifier of a block of the first group of blocks of threads.

9. The processor of any of clauses 1-8, wherein the API is to cause at least one thread of a first group of blocks of threads to calculate a memory address of the memory to be shared based, at least in part, on an identifier of the first group of blocks of threads.

10. A computer-implemented method comprising:
    performing an application programming interface (API) to cause memory to be shared between two or more groups of blocks of threads.

11. The computer-implemented method of clause 10, wherein the two or more groups of blocks of threads are groups within a software kernel.

12. The computer-implemented method of clause 10 or 11, wherein the two or more groups of blocks of threads are groups within a grid of blocks of threads.

13. The computer-implemented method of any of clauses 10-12, wherein the two or more groups of blocks of threads are partitions of a partitioning of blocks of threads.

14. The computer-implemented method of any of clauses 10-13, wherein the memory is memory of a graphics processing unit (GPU).

15. The computer-implemented method of any of clauses 10-14, wherein the API is to cause at least one thread of one group of blocks of threads to be able to access a memory location accessible to at least one thread of another group of blocks of threads.

16. The computer-implemented method of any of clauses 10-15, wherein the API is to cause at least one thread of one group of blocks of threads to provide a memory address of the memory to be shared to the two or more groups of blocks of threads.

17. The computer-implemented method of any of clauses 10-16, wherein the API is to cause at least one thread of a first group of blocks of threads to calculate a memory address of the memory to be shared based, at least in part, on an identifier of a block of the first group of blocks of threads.

18. The computer-implemented method of any of clauses 10-17, wherein the API is to cause at least one thread of a first group of blocks of threads to calculate a memory address of the memory to be shared based, at least in part, on an identifier of the first group of blocks of threads.

19. A computer system comprising:

one or more processors and memory storing executable instructions that, if performed by the one or more processors, are to perform an application programming interface (API) to cause memory to be shared between two or more groups of blocks of threads.

20. The computer system of clause 19, wherein the two or more groups of blocks of threads are groups within a software kernel.

21. The computer system of clause 19 or 20, wherein the two or more groups of blocks of threads are groups within a grid of blocks of threads.

22. The computer system of any of clauses 19-21, wherein the two or more groups of blocks of threads are partitions of a partitioning of blocks of threads.

23. The computer system of any of clauses 19-22, wherein the memory is memory of a graphics processing unit (GPU).

24. The computer system of any of clauses 19-23, wherein the API is to cause at least one thread of one group of blocks of threads to be able to access a memory location accessible to at least one thread of another group of blocks of threads.

25. The computer system of any of clauses 19-24, wherein the API is to cause at least one thread of one group of blocks of threads to provide a memory address of the memory to be shared to the two or more groups of blocks of threads.

26. The computer system of any of clauses 19-25, wherein the API is to cause at least one thread of a first group of blocks of threads to calculate a memory address of the memory to be shared based, at least in part, on an identifier of a block of the first group of blocks of threads.

27. The computer system of any of clauses 19-26, wherein the API is to cause at least one thread of a first group of blocks of threads to calculate a memory address of the memory to be shared based, at least in part, on an identifier of the first group of blocks of threads.

28. A machine-readable medium having stored thereon a set of instructions, which if performed by one or more processors, are to perform an application programming interface (API) to cause memory to be shared between two or more groups of blocks of threads.

29. The machine-readable medium of clause 28, wherein the two or more groups of blocks of threads are groups within a software kernel.

30. The machine-readable medium of clause 28 or 29, wherein the two or more groups of blocks of threads are groups within a grid of blocks of threads.

31. The machine-readable medium of any of clauses 28-30, wherein the two or more groups of blocks of threads are partitions of a partitioning of blocks of threads.

32. The machine-readable medium of any of clauses 28-31, wherein the memory is memory of a graphics processing unit (GPU).

33. The machine-readable medium of any of clauses 28-32, wherein the API is to cause at least one thread of one group of blocks of threads to be able to access a memory location accessible to at least one thread of another group of blocks of threads.

34. The machine-readable medium of any of clauses 28-33, wherein the API is to cause at least one thread of one group of blocks of threads to provide a memory address of the memory to be shared to the two or more groups of blocks of threads.

35. The machine-readable medium of any of clauses 28-34, wherein the API is to cause at least one thread of a first group of blocks of threads to calculate a memory address of the memory to be shared based, at least in part, on an identifier of a block of the first group of blocks of threads.

36. The machine-readable medium of any of clauses 28-35, wherein the API is to cause at least one thread of a first group of blocks of threads to calculate a memory address of the memory to be shared based, at least in part, on an identifier of the first group of blocks of threads.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed.

No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor comprising:
   one or more circuits to perform an application programming interface (API) to cause memory to be shared between two or more groups of blocks of threads.

2. The processor of claim 1, wherein the two or more groups of blocks of threads are groups within a software kernel.

3. The processor of claim 1, wherein the two or more groups of blocks of threads are groups within a grid of blocks of threads.

4. The processor of claim 1, wherein the two or more groups of blocks of threads are partitions of a partitioning of blocks of threads.

5. The processor of claim 1, wherein the memory is memory of a graphics processing unit (GPU).

6. The processor of claim 1, wherein the API is to cause at least one thread of one group of blocks of threads to be able to access a memory location accessible to at least one thread of another group of blocks of threads.

7. The processor of claim 1, wherein the API is to cause at least one thread of one group of blocks of threads to provide a memory address of the memory to be shared to the two or more groups of blocks of threads.

8. The processor of claim 1, wherein the API is to cause at least one thread of a first group of blocks of threads to calculate a memory address of the memory to be shared based, at least in part, on an identifier of a block of the first group of blocks of threads.

9. The processor of claim 1, wherein the API is to cause at least one thread of a first group of blocks of threads to calculate a memory address of the memory to be shared based, at least in part, on an identifier of the first group of blocks of threads.

10. A computer-implemented method comprising:
    performing an application programming interface (API) to cause memory to be shared between two or more groups of blocks of threads.

11. The computer-implemented method of claim 10, wherein the two or more groups of blocks of threads are groups within a software kernel.

12. The computer-implemented method of claim 10, wherein the two or more groups of blocks of threads are groups within a grid of blocks of threads.

13. The computer-implemented method of claim 10, wherein the two or more groups of blocks of threads are partitions of a partitioning of blocks of threads.

14. The computer-implemented method of claim 10, wherein the memory is memory of a graphics processing unit (GPU).

15. The computer-implemented method of claim 10, wherein the API is to cause at least one thread of one group of blocks of threads to be able to access a memory location accessible to at least one thread of another group of blocks of threads.

16. The computer-implemented method of claim 10, wherein the API is to cause at least one thread of one group of blocks of threads to provide a memory address of the memory to be shared to the two or more groups of blocks of threads.

17. The computer-implemented method of claim 10, wherein the API is to cause at least one thread of a first group of blocks of threads to calculate a memory address of the memory to be shared based, at least in part, on an identifier of a block of the first group of blocks of threads.

18. The computer-implemented method of claim 10, wherein the API is to cause at least one thread of a first group of blocks of threads to calculate a memory address of the memory to be shared based, at least in part, on an identifier of the first group of blocks of threads.

19. A computer system comprising:
    one or more processors and memory storing executable instructions that, if performed by the one or more processors, are to perform an application programming interface (API) to cause memory to be shared between two or more groups of blocks of threads.

20. The computer system of claim 19, wherein the two or more groups of blocks of threads are groups within a software kernel.

21. The computer system of claim 19, wherein the two or more groups of blocks of threads are groups within a grid of blocks of threads.

22. The computer system of claim 19, wherein the two or more groups of blocks of threads are partitions of a partitioning of blocks of threads.

23. The computer system of claim 19, wherein the memory is memory of a graphics processing unit (GPU).

24. The computer system of claim 19, wherein the API is to cause at least one thread of one group of blocks of threads to be able to access a memory location accessible to at least one thread of another group of blocks of threads.

25. The computer system of claim 19, wherein the API is to cause at least one thread of one group of blocks of threads to provide a memory address of the memory to be shared to the two or more groups of blocks of threads.

26. The computer system of claim 19, wherein the API is to cause at least one thread of a first group of blocks of threads to calculate a memory address of the memory to be shared based, at least in part, on an identifier of a block of the first group of blocks of threads.

27. The computer system of claim 19, wherein the API is to cause at least one thread of a first group of blocks of threads to calculate a memory address of the memory to be shared based, at least in part, on an identifier of the first group of blocks of threads.

28. A machine-readable medium having stored thereon a set of instructions, which if performed by one or more processors, are to perform an application programming interface (API) to cause memory to be shared between two or more groups of blocks of threads.

29. The machine-readable medium of claim 28, wherein the two or more groups of blocks of threads are groups within a software kernel.

30. The machine-readable medium of claim 28, wherein the two or more groups of blocks of threads are groups within a grid of blocks of threads.

31. The machine-readable medium of claim 28, wherein the two or more groups of blocks of threads are partitions of a partitioning of blocks of threads.

32. The machine-readable medium of claim 28, wherein the memory is memory of a graphics processing unit (GPU).

33. The machine-readable medium of claim 28, wherein the API is to cause at least one thread of one group of blocks of threads to be able to access a memory location accessible to at least one thread of another group of blocks of threads.

34. The machine-readable medium of claim 28, wherein the API is to cause at least one thread of one group of blocks of threads to provide a memory address of the memory to be shared to the two or more groups of blocks of threads.

35. The machine-readable medium of claim 28, wherein the API is to cause at least one thread of a first group of blocks of threads to calculate a memory address of the memory to be shared based, at least in part, on an identifier of a block of the first group of blocks of threads.

36. The machine-readable medium of claim 28, wherein the API is to cause at least one thread of a first group of blocks of threads to calculate a memory address of the memory to be shared based, at least in part, on an identifier of the first group of blocks of threads.

* * * * *